US010248653B2

(12) United States Patent
Blassin et al.

(10) Patent No.: US 10,248,653 B2
(45) Date of Patent: Apr. 2, 2019

(54) INFORMATION TECHNOLOGY PLATFORM FOR LANGUAGE TRANSLATION AND TASK MANAGEMENT

(71) Applicant: Lionbridge Techologies, Inc., Waltham, MA (US)

(72) Inventors: Eric A. Blassin, Alpes-Maritimes (FR); Daniel L. Spector, Brookline, MA (US); Joachim Schurig, Berlin (DE); Seth G. Gottlieb, Florence, MA (US); Marc D. Osofsky, Concord, MA (US)

(73) Assignee: Lionbridge Technologies, Inc., Waltham, MA (US)

( * ) Notice: Subject to any disclaimer, the term of this patent is extended or adjusted under 35 U.S.C. 154(b) by 672 days.

(21) Appl. No.: 14/933,465

(22) Filed: Nov. 5, 2015

(65) Prior Publication Data

US 2016/0162478 A1      Jun. 9, 2016

Related U.S. Application Data

(60) Provisional application No. 62/084,521, filed on Nov. 25, 2014, provisional application No. 62/086,463, filed on Dec. 2, 2014.

(51) Int. Cl.
*G06F 17/28* (2006.01)
*G06N 99/00* (2010.01)
*G06Q 10/06* (2012.01)

(52) U.S. Cl.
CPC ......... *G06F 17/289* (2013.01); *G06N 99/005* (2013.01); *G06Q 10/06311* (2013.01); *G06Q 10/063112* (2013.01)

(58) Field of Classification Search
USPC ............................................. 706/12
See application file for complete search history.

(56) References Cited

U.S. PATENT DOCUMENTS 8,046,233 B2 * 10/2011 Schurig ............... G06F 17/2836
704/2
8,335,679 B2 * 12/2012 Schurig ............... G06F 17/2836
704/2

(Continued)

FOREIGN PATENT DOCUMENTS

EP       3026614 A1    6/2016
WO     2014062941 A1    4/2014

OTHER PUBLICATIONS

Journal of Medical Internet Research, Web 2.0-Based Crowdsourcing for High-Quality Gold Standard Development in Clinical Natural Language Processing, Zhai et al., Division of Biomedical Informatics, Cincinnati Children's Hospital Medical Center, Cincinnati, OH, United States, Published on Apr. 2, 2013 in vol. 15, No. 4 (2013): Apr., pp. 1-26.*

(Continued)

*Primary Examiner* — Michael B Holmes
(74) *Attorney, Agent, or Firm* — GTC Law Group PC & Afiliates

(57) ABSTRACT

A platform and related components are provided for managing and executing various processes involving distributed, crowd and automated resources, including human and machine language-based translation, are described, including methods and systems for creating and intelligently distributing cognizable translation units among internal workers, outsourcing centers, and crowd workers and methods and systems for on-demand translation.

19 Claims, 52 Drawing Sheets

(56) References Cited

U.S. PATENT DOCUMENTS

| | | | | |
|---|---|---|---|---|
| 8,374,843 | B2* | 2/2013 | Schurig | G06F 17/2836 704/2 |
| 8,494,834 | B2* | 7/2013 | Schurig | G06F 17/2836 704/2 |
| 9,058,502 | B2* | 6/2015 | Schurig | G06F 21/6218 |
| 2008/0120088 | A1* | 5/2008 | Schurig | G06F 17/2288 704/2 |
| 2008/0120089 | A1* | 5/2008 | Schurig | G06F 17/2288 704/2 |
| 2008/0120090 | A1* | 5/2008 | Schurig | G06F 17/2288 704/2 |
| 2011/0066469 | A1 | 3/2011 | Kadosh et al. | |
| 2012/0065958 | A1* | 3/2012 | Schurig | G06F 21/6218 704/3 |
| 2012/0236201 | A1* | 9/2012 | Larsen | G06Q 10/10 348/468 |
| 2012/0303354 | A1* | 11/2012 | Schurig | G06F 17/2288 704/2 |
| 2014/0278850 | A1* | 9/2014 | Boccuzzi, Jr. | G06Q 30/0208 705/14.11 |
| 2014/0310746 | A1* | 10/2014 | Larsen | G06Q 10/10 725/37 |
| 2016/0162478 | A1* | 6/2016 | Blassin | G06Q 10/0631 706/12 |
| 2016/0196533 | A1* | 7/2016 | Naveh | G06F 9/5088 705/7.14 |
| 2016/0253606 | A1* | 9/2016 | Pellant | G06Q 10/0633 705/7.27 |
| 2017/0249566 | A1* | 8/2017 | Mandel | H04M 3/5233 |
| 2018/0143975 | A1* | 5/2018 | Casal | G06F 17/289 |

OTHER PUBLICATIONS

Chimera: Large-Scale Classification using Machine Learning, Rules, and Crowdsourcing, Sun et al., @WalmartLabs, University of Wisconsin-Madison, 40th International Conference on Very Large Data Bases, Sep. 1-5, 2014, Hangzhou, China. Proceedings of the VLDB Endowment, vol. 7, No. 13 Copyright 2014 VLDB Endowment 2150-8097/14/08.*

Cost-Effective Crowdsourced Entity Resolution: A Partial-Order Approach, Chai et l., Department of Computer Science, Tsinghua National Laboratory for Information Science and Technology (TNList), Tsinghua University, Beijing, China, SIGMOD'16, Jun. 26-Jul. 1, 2016, San Francisco, CA, USA. 2016 ACM. ISBN 978-1-4503-3531-7/16/06.*

Crowdsourcing Translation: Professional Quality from Non-Professionals, Omar F. Zaidan and Chris Callison-Burch Dept. of Computer Science, Johns Hopkins University, Baltimore, MD 21218, USA.*

ACM SIGSPATIAL Crowdsafe: crowd sourcing of crime incidents and safe routing on mobile devices, umit Shah, Fenye Bao, Chang-Tien Lu, Ing-Ray Chen, GIS '11 Proceedings of the 19th ACM SIGSPATIAL International Conference on Advances in Geographic Information Systems, pp. 521-524 Nov. 4, 2011.*

"European Application Serial No. 15195858.4, Extended European Search Report dated Mar. 30, 2016", Lionbridge Technologies, Inc., 8 Pages.

* cited by examiner

| \multicolumn{4}{l}{LIONBRIDGE VENDOR DATABASE} |
|---|---|---|---|
| \multicolumn{4}{l}{HISTORY: SEARCH (ACTIVE VENDORS)   SEARCH (# LQIS > 10)} |
| \multicolumn{4}{l}{HOME  SEARCH    ADD VENDOR   REPORTS▼    ADMINISTRATION▼} |
| SEARCH VENDER | \multicolumn{3}{l}{SEARCH RESULTS} |
| [SEARCH] [CLEAR] | \multicolumn{3}{l}{YOU ARE VIEWING PAGE 1 OF 1} |
| PROFILE DETAILS ■ | ID | COMPANY NAME / QUALIFICATION STATUS | PRIMARY CONTACT |
| LOCATION ■ | ○ 26902 | AUTHORIZED/ACTIVATED-LEGACY | BAERBEL........ +40 68............ BR@............ |
| ADMINISTRATION ■ | | | |
| LANGUAGES AND ■ ACTIVITIES | | | |
| CAPACITY ■ | ○ 20692 | +40 68............ AUTHORIZED/ACTIVATED-LEGACY | BAERBEL........ +40 68............ BR@............ |
| KNOWLEDGE ■ AND TOOLS | | | |
| EXPERIENCE ■ | ○ 6393 | AUTHORIZED/ACTIVATED-LEGACY | HERIL......... +40 68............ HB@............ |
| PRICING ■ | | | |
| QUALITY ■ | ○ 20556 | AUTHORIZED/ACTIVATED-LEGACY | STEPHAR..... +40 68............ S.@............ |
| MIN # LQIs: [10] | | | |
| MIN AVG LQX: [90] | ○ 33664 | AUTHORIZED/ACTIVATED-LEGACY | BAERBEL........ +40 68............ BR@............ |
| MAX STD DEV: [ ] | | | |
| MAX ERROR R.[ ]% | | | |
| | ○ 29186 | AUTHORIZED/ACTIVATED-LEGACY | BAERBEL........ +40 68............ BR@............ |
| QUERY OUTPUT ■ OPTIONS | | | |
| SAVED SEARCHES ■ | ○ 21009 | AUTHORIZED/ACTIVATED-LEGACY | BAERBEL........ +40 68............ BR@............ |
| [SEARCH] [CLEAR] | ○ 11815 | AUTHORIZED/ACTIVATED-LEGACY | BAERBEL........ +40 68............ BR@............ |

*FIG. 17A*

| FILE | FORMATTED SOURCE | FORMATTED TRANSLATION | DIFF | ISSUE |
|---|---|---|---|---|
| MS LIVE MEETING ES.TMX | YOU CANNOT USE MEET NOW IN PROJECT TO SHARE A DOCUMENT FOR VIEWING | YOU CANNOT USE MEET NOW IN PROJECT TO SHARE A DOCUMENT FOR VIEWING. | | SEGMENT NOT TRANSLATED |
| SPA MS | © 2007 MICROSOFT CORPORATION | © 2007 MICROSOFT CORPORATION | | SEGMENT NOT TRANSLATED |
| SPA MS | LMSETUP.EXE-OUT LMCCONSOLE.MSI | LMSETUP.EXE-OUT LMCCONSOLE.MSI | | SEGMENT NOT TRANSLATED |
| SPA MS | SAINT GEORGE LSLAND | SAINT GEORGE LSLAND | | SEGMENT NOT TRANSLATED |
| SPA MS | PAUL ALBERT BESNARD | PAUL ALBERT BESNARD | | SEGMENT NOT TRANSLATED |
| SPA MS RTCFT NALUOD ATE.TMX | START AN AUDIO/VIDEO CONFERENCE | INICIAR UNA AUDIOCONFERENCIA 0 VIDEOCONFERENCE | [AUDIOCONFERENCIA/ CONFERENCIA DE AUDIO] @[VIDEO// VIDEOCONFERENCIA] | INCONSISTENT TRANSLATION |
| SPA MS RTCFT NALUOD ATE.TMX | START AN AUDIO/VIDEO CONFERENCE | INICIAR UNA AUDIOCONFERECIA 0 VIDEO | [AUDIOCONFERENCIA/ CONFERENCIA DE AUDIO] @[VIDEO// VIDEOCONFERENCIA] | INCONSISTENT TRANSLATION |
| SPA MS RTCFT NALUOD ATE.TMX | THIS ACTION IS ONLY AVAILBLE IF YOU INITIATED THE CONFERENCE AND ARE THE CONFERENCE LEADER | ESTA ACCION SOLE ESTA DISPONIBLE SI USTED INICO LA CONFERECIA Y ES EL COORDINADOR DE LA MISMA. | [~ / USTED] | INCONSISTENT TRANSLATION |
| SPA MS RTCFT NALUOD ATE.TMX | THIS ACTION IS ONLY AVAILBLE IF YOU INITIATED THE CONFERENCE AND ARE THE CONFERENCE LEADER. | ESTA ACCION SOLE ESTA DISPONIBLE SI INICO LA CONFERECIA Y ES EL COORDINADOR DE LA MISMA. | [~ / USTED] | INCONSISTENT TRANSLATION |
| SPA MS RTCFT | CALL FORWARDING (WITH ENTERPRISE VOICE) | DESVIAR lIAMADAS (CIN ENTERPRISE VOICE) | [DESVIAR / TRANSFERIR] | INCONSISTENT TRANSLATION |
| SPA MS RTCFT | CALL FORWARDING (WITH ENTERPRISE VOICE) | TRANSFERIR lIAMADAS (CIN ENTERPRISE VOICE) | [DESVIAR / TRANSFERIR] | INCONSISTENT TRANSLATION |
| SPA MS RTCFT | INVITE A PARTICIPANT TO A NEW CONVERSATION | INVITAR A UN PARTICIPANTE A UNA NUEVA CONEXION | [CONEXION / CONVERSACION] | INCONSISTENT TRANSLATION |
| SPA MS RTCFT NALUOD ATE.TMX | INVITE A PARTICIPANT TO A NEW CONVERSATION | INVITAR A UN PARTICIPANTE A UNA NUEVA CONVERSACION | [CONEXION / CONVERSACION] | INCONSISTENT TRANSLATION |

*FIG. 20*

| JOB | STATUS | DELIVERY | CURRENT STEP | LANGUAGES | TRANS-LATED | DELIV-ERED | TASKS | AVG EWC | CONFIGURATION |
|---|---|---|---|---|---|---|---|---|---|
| ▸ ECOMMERCE ONDEMAND | | | | | | | | | (6) |
| TEST PURE MT V2 | COMPLETED | OCT 08 10:24 AM | TXTCONVERTTOTAG _DESC <>... | DE-DE > EN-GB;FR-FR;IT-IT;ES-... | 0/4 | 4/4 ▾ | | 31 | PURE MT |
| LIONBRIDGE: TEST_PRODUCT.. | COMPLETED | OCT 28 11:19 AM | TXTCONVERTTOTAG _DESC <>... | EN-GB > FR-FR,DE-DE;IT-IT;ES-... | 0/4 | 4/4 ▾ | | 1329 | PURE MT |
| LIONBRIDGE: TEST_PRODUCT.. | COMPLETED | OCT 30 1:49 AM | TXTCONVERTTOTAG _DESC <>... | EN-GB > FR-FR,DE-DE;IT-IT;ES-... | 0/4 | 4/4 ▾ | | 1329 | PURE MT |
| LIONBRIDGE: TEST_PRODUCT.. | IN PROGRESS.. | NOV 03 10:29 AM | | EN-GB > FR-FR,DE-DE;IT-IT;ES-... | 0/4 | 4/4 ▾ | | | PURE MT WITH TITLE AND DES... |
| LIONBRIDGE: TEST_PRODUCT.. | IN PROGRESS.. | NOV 04 1:50 AM | | EN-GB > FR-FR,DE-DE;IT-IT;ES-... | 0/4 | 4/4 ▾ | | | PURE MT WITH TITLE FOR BPC |
| TEST_TITLE_MERGE | COMPLETED | NOV 04 1:50 AM | XMLCONVERTTOTAG _DESC <>... | EN-GB > FR-FR,DE-DE;IT-IT;ES-... | 0/4 | 4/4 ▾ | | 1778 | PURE MT |

*FIG. 21*

PRICING OPTIONS

PRICING UNITE TYPE: [MINUTES ▽]

— WORDS
— MINUTES
— PAGES
— STANDARDIZED PAGES
— ROWS
— CHARACTERS
— FILES

PRICING MIN UNITS:

BASE COST:

PER UNIT COST: 0.0

PER LANGUAGE / UNIT COST: 0.0

THREE UNIQUE OPTIONS

OUR THREE UNIQUE OPTIONS QUICKLY CONNECT YOU WITH IN-MARKET CUSTOMERS, WITH ALL COSTS BUNDLED INTO A PER-VIDEO LANGUAGE-MINUTE FEE.

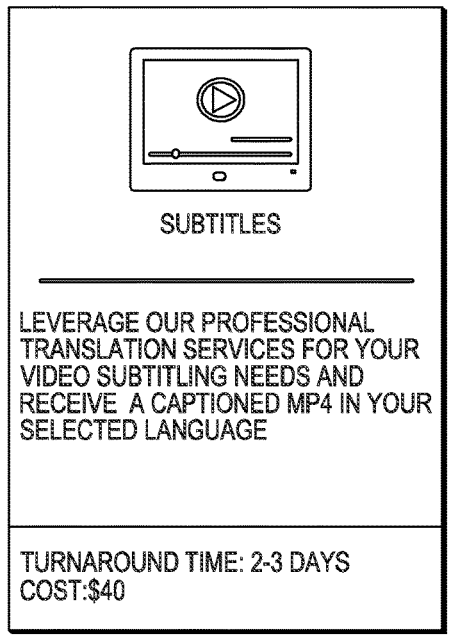

SUBTITLES

LEVERAGE OUR PROFESSIONAL TRANSLATION SERVICES FOR YOUR VIDEO SUBTITLING NEEDS AND RECEIVE A CAPTIONED MP4 IN YOUR SELECTED LANGUAGE

TURNAROUND TIME: 2-3 DAYS
COST: $40

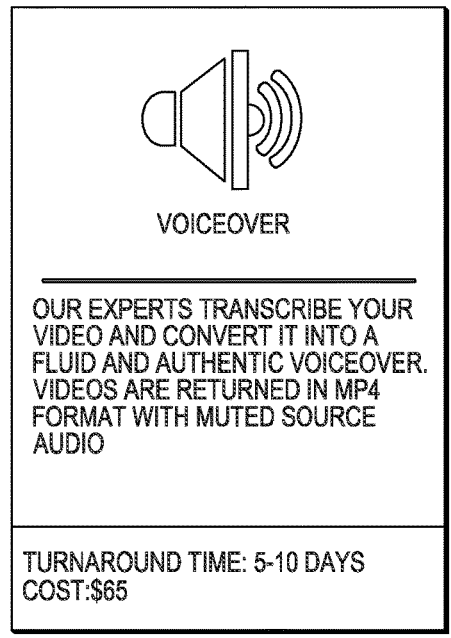

VOICEOVER

OUR EXPERTS TRANSCRIBE YOUR VIDEO AND CONVERT IT INTO A FLUID AND AUTHENTIC VOICEOVER. VIDEOS ARE RETURNED IN MP4 FORMAT WITH MUTED SOURCE AUDIO

TURNAROUND TIME: 5-10 DAYS
COST: $65

*4802*

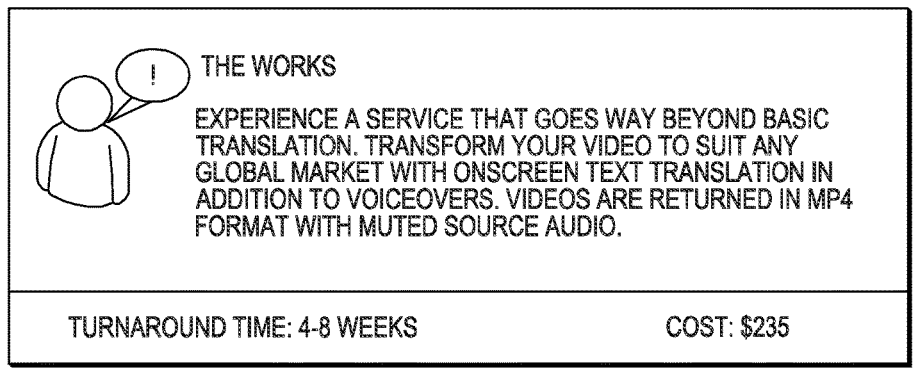

THE WORKS

EXPERIENCE A SERVICE THAT GOES WAY BEYOND BASIC TRANSLATION. TRANSFORM YOUR VIDEO TO SUIT ANY GLOBAL MARKET WITH ONSCREEN TEXT TRANSLATION IN ADDITION TO VOICEOVERS. VIDEOS ARE RETURNED IN MP4 FORMAT WITH MUTED SOURCE AUDIO.

TURNAROUND TIME: 4-8 WEEKS         COST: $235

FIG. 48

INFORMATION TECHNOLOGY PLATFORM FOR LANGUAGE TRANSLATION AND TASK MANAGEMENT

CROSS-REFERENCE TO RELATED APPLICATIONS

This application claims the benefit of the following provisional applications, each of which is hereby incorporated by reference in its entirety:

U.S. Provisional Application No. 62/084,521, filed Nov. 25, 2014; and U.S. Provisional Application No. 62/086,463, filed Dec. 2, 2014.

SUMMARY

A translation configuration, operation, and management platform facilitates robust inflow, in-process operation, and post-process analysis of a multitude of overlapping activities through machine, human and a combination of machine operation with human refinement. Automated processes are selectable based on a large range of factors including client rules, task/translation unit generation rules, translator/crowd resource selection rules, post processing/audit rules, and the like.

BRIEF DESCRIPTION OF THE FIGURES

The invention and the following detailed description of certain embodiments thereof may be understood by reference to the following figures:

FIGS. 17A and 17B depict an interface for viewing crowd worker metadata;

FIG. 20 depicts an exemplary translation memory or database of translated content;

FIG. 21 depicts an exemplary job status report;

FIG. 34 is a schematic view of configuring client-specific third-party websites/environments for use of an on-demand translation application programming interface ("API");

FIG. 48 depicts an exemplary portal sub-screen of the on-demand translation portal depicted in FIG. 47;

DETAILED DESCRIPTION

Part I

Figure 1:
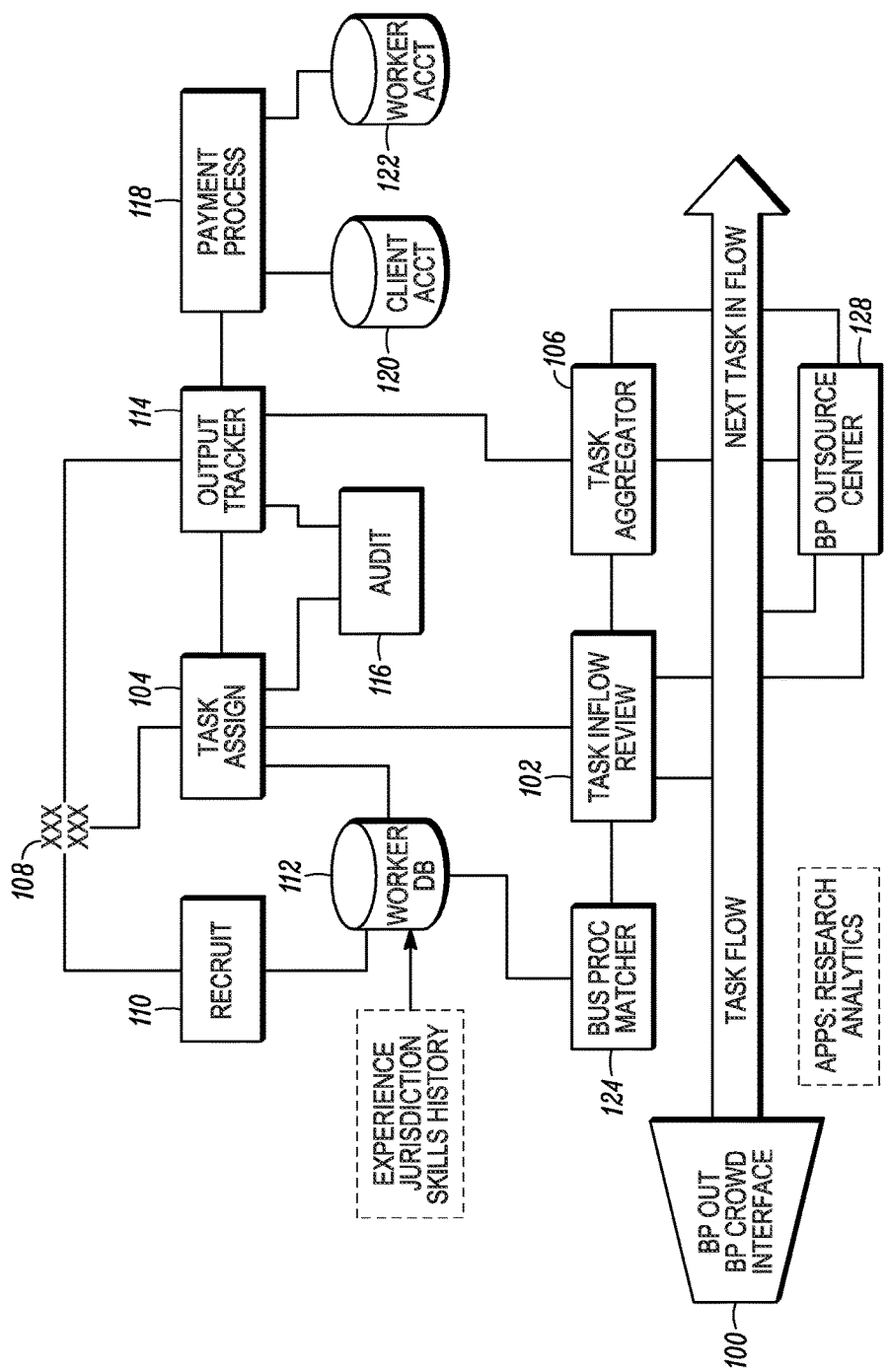
FIG. 1 depicts a schematic of a platform for business process crowd source task execution.

Methods and systems for translation services with distributed, crowd and automated resources, including human and machine language-based translation, are described herein. The methods cover a range of crowd sourcing and outsourcing activities for configuring and managing an international, complex translation platform, including for language translation and other tasks. Techniques for performing language translation services that leverage the advantages of the crowd sourcing platform, while flexibly delivering a wide range of translation service quality, performance, and cost are also described herein.

Establishing, maintaining, and economically operating a high quality crowd sourcing platform to provide business operations (e.g., business processes) with access to the best matched crowd resources involves providing a full range of capabilities, from recruiting crowd resources through managing those resources to meet fast-paced business demands and, among other examples and applications, settling collections and payments in a timely manner. A crowd sourcing platform to deliver these capabilities may therefore comprise a wide range of computer automated and computer assisted functionality while leveraging existing infrastructure, such as transaction payment gateways, distributed databases for process rules, crowd source resource profiles, task management, workflow adherence, and the like.

Accomplishing economies of scale that are achievable with crowd sourcing while timely delivering work that meets customer expectations may require automating functions such as recruiting, worker and work product auditing, project workflow generation, and project breakdown into distributable and traceable tasks that are suitable for execution by crowd source resources. Overcoming challenges to achieve such business processing may include innovations, automation algorithms, communication techniques, system architectures, automating best practices, and the like that are depicted, described, and claimed herein.

Translation is an exemplary business process that has its own challenges. Certain techniques related to the generation of and end-to-end management of segment-specific translation are believed to offer an innovative path to substantially more efficient and better translation using a combination of automation (e.g. machine translation) and human (e.g. crowd sourced) translation. Deconstructing a document or other source content to translate into cognizable units that can be efficiently processed through machine translation, human translation, and a combination thereof involves developing a highly sophisticated understanding of the content to be translated, the customer requirements of the translation, the capabilities and costs of available resources, and the like. Determining how to break up a business process into component task units that achieve goals similar to those for translation also may require efficiently gathering and processing project requirements, cost goals, delivery objectives, resource matching, and the like. However, merely generating a set of suitable tasks for any business process (e.g. translation) may not be sufficient to achieve the benefits of crowd sourcing on a large scale. The innovative methods and systems described herein also cover end-to-end handling of these task/translation units with a platform architecture that is both flexible and expandable while robust and stable.

In embodiments, provided herein is a platform architecture that is designed to provide these many benefits for business process crowd sourcing (including translation).

With reference to FIG. 1, there is illustrated a block diagram of a crowd sourcing business process system according to an exemplary and non-limiting embodiment.

This crowd sourcing business process system comprises many multi-function interoperable modules. To initially describe an example of this system and its modules, we will follow task flow through the system. While a task is generally referred to in this initial description, a business process may include many tasks or sub-tasks. Alternatively, the system may be used to process a business project that may comprise one or multiple tasks. References to each of these terms should be understood to encompass any of them, except where context indicates otherwise. The system here may be used to facilitate generating tasks and, in embodiments, a project may be deconstructed into parts, referred to herein as cognizable task units (CTU), that may be processed by the multi-function modules using various methods and techniques described herein. One such business process that is described later in detail comprises language translation, wherein a CTU may represent a cognizable translation unit, and references to a CTU should be understood to encompass both cognizable task units and cognizable translation units except where context specifically indicates one or the other. Techniques for generating CTUs are described later herein. By way of example, and without limitation, a CTU may comprise enough content that a task can be performed properly (for example, in language translation, enough words that a translator can understand a context of use, such as to select among possible alternatives for translating a word that could have more than one meaning), while not containing so much content that other adverse effects occur (such as creating delays in processing individual units or revealing too much sensitive information to any single worker in a business process). Formation and sizing of a CTU may involve considerations that are particular to the context, such as the source or target language in language translation, the sensitivity of the source information (e.g., containing personally identifiable information (PII), trade secrets, or otherwise sensitive or regulated information), the complexity of the sensitive information (where longer chunks may be needed to provide adequate context for complex content), and other factors. References to CTUs throughout should be understood to include such adaptations and optimizations except where context indicates otherwise.

To begin, at least one task of a business process may be received at or accessed by a project manager interface 100. The business process project manager interface 100 may, for example, comprise a dashboard for commencing and managing the flow of business process project tasks until completion. As illustrated in FIG. 1, the task flow continues, generally, from left to right. The project management interface 100 may set up workflows and monitor and control the progress of a business process project. Access to this interface may be restricted, such as on a per-user, per-organization, per-task, per-crowd, per-location, per-workgroup, per-project, or other basis.

The project manager interface 100 may facilitate access to crowd source resources, outsource center resources, internal resources, and the like for processing one or more tasks in a project. The interface 100 may provide tools that help a user determine whether crowd source resources, outsource center resources, internal resources, or a combination thereof may satisfy project requirements. The user interface 100 tools may include task delivery date estimation, task cost estimation, task quality estimation, task size information, task complexity information, billing options, and the like that may help a user determine which type of resource, or combination of resources, may satisfy project requirements. Likewise, the interface 100 may be adaptable to ensure that resources that satisfy the specified project resources are presented or highlighted to the user. As an example, if a project specifies that the work must be performed within certain cost and time parameters, resources that are determined not to satisfy those parameters might not be presented to the user, may be made un-selectable, may be indicated as not preferred, may be ranked or listed lower in a list, or the like.

The project manager interface 100 may facilitate exposure to the user of various resources so that the project manager may indicate preferred resources for certain tasks, batches, projects, and the like. A project manager may be notified that a qualified crowd source resource will become available in time to meet a delivery requirement of the project. The project manager may indicate that the task should be offered to this particular crowd source resource before being offered to other resources. Likewise, the project manager interface 100 may facilitate a user indicating that a sequence of tasks should be assigned to different resources to avoid any one resource from having access to too much information associated with the set of tasks. Such resource restriction functionality may be useful when handling tasks of a project that comprises confidential information or information that is subject to regulation, such as Personally Identifiable Information (also known as "PII"). In another possible use of the project manager interface 100, a user may indicate that certain tasks should be initially assigned to outsource center resources and be followed by crowd source resource verification.

The project manager interface 100 may also generally facilitate a user configuring a workflow for a set of tasks, such as a set of tasks for a given project. Workflows may be configured to ensure compliance with project requirements, such as geographic worker restrictions, technical or other expertise, cost limits or goals, schedule requirements, profit goals, quality goals, and many others as described herein or generally known. The interface 100 may facilitate visually configuring workflows so that tasks, individually or in groups, may be assigned to a portion of the workflow. A configured workflow may facilitate automated routing, distribution, and processing of tasks, such as data entry tasks, translation tasks, calculation tasks, research tasks, analytic tasks, audit/review/supervisory tasks, creative/content generation tasks, and any other type of business process task or set of tasks.

Once a business process project is directed to commence, the task is communicated to a task review module 102 where data relevant to performance of the task as a component of the business process project is organized and analyzed. The task review module 102 may be a semi-automated or fully automated process through which a task may be configured to ensure compliance with business process requirements, such as those noted above for project requirements. Tasks may be configured for automation through the use of metadata that may be transferred with the task throughout its flow. This metadata may have data and/or instructions that may be useful to automation capabilities for processing tasks. Task metadata may also include information that facilitates referencing a workflow under which the task is to be processed so that automated functions can self-configure based on workflow requirements. In an example of using task metadata for automation, a project may include a sequence of data validation tasks, such as for fact checking a publication. Metadata associated with each task may include a link to a source of data to be validated. Task metadata may alternatively include a reference to a requirement in the workflow for the task that may indicate that two sources need to be checked to validate the data. Automated fact checking functions may utilize the metadata to retrieve resources, such as content from a URL indicated by the link to the source of data to be validated.

Some examples of categories of metadata may include:
Segment metadata
Match percentage+match type
User
Time
Xliff states—In XLIFF 2.0, STATE (initial, translated, reviewed, final)+SUBSTATE with a custom value
translate flag
review result accepted/rejected
Collection/Job metadata (may apply to a group of segments/Translation units):
Translation Memory ("TM") to use, including which server to use
Project information (name, contact, instructions etc.)
Review result accepted/rejected
Start by dates/due dates
Completed items Each task that comes into the system may have a "task type" that defines various configuration and metadata for that task. This task type may be configured by an operator, user, or facilitator of the platform. Configuration of task types may be performed through a user interface or dashboard, such as the business process project manager interface 100. The business process project manager interface 100 may comprise a crowd operations website for such configuration and control capabilities. The task type may be associated with a workflow that may also be configured through the business process project manager interface 100. This workflow may define or reference one or more automated processes that the task may pass through. These processes may also be configured through an interface such as crowd operations website, the business process project manager interface 100 and the like. These automated processes may be defined by and/or may comprise executable code that may be associated with the platform similarly to a "plug-in" that can be run as the process. Such an automated process may define configuration properties that each task type must define for the process to know how to run automation on any given task of the particular task type. For example, if the process is "OCR", the configuration may include whether the tasks of the task type are expected to be "numeric" vs. "alpha" characters, the language of the task, and the like. If the automation process were "Automated Entity Tagging", for example, the configuration per task type might contain information about what language the task is in, where the configuration file for the automation sits, etc. The configuration data, configuration properties, location of configuration file, and the like may be accessible in one or more of the data sets, such as client-specific rules and the like.

The task review module 102 may provide information about in-flowing tasks to a task aggregator module 106 to facilitate reassembly of the separately processed tasks into a coherent result (e.g., a finished tax return, a translated document, an audited financial statement, and the like). Information that may be useful to the task aggregator 106 may include relative positioning of the data being produced by the task compared to data from other tasks, and the like. Other information about tasks that may be communicated to the task aggregator module may include workflow data, task metadata, project metadata, scheduling data, and the like. The task review module 102 may further receive information from the task aggregator module 106 that may facilitate determining distribution or routing of additional tasks. In an example of a task aggregator 106 communicating with the task review module 102 to potentially impact task routing, a single task may be needed to complete aggregation of the coherent output, yet the task flow module 102 may detect that the task may have been assigned to a resource that is now off-line and thus not immediately available. The task review module 102 may evaluate this status against a set of rules, such as workflow-specific rules, system performance rules, and the like and may determine that it requires that the remaining task be redirected to an available resource to facilitate timely completion of the remaining task and subsequently finalizing the aggregation. Other information that the task review module 102 may receive about tasks from the task aggregator module 106 may include task audit status, task completion status, task output quality, project status, access or delivery requests received from a customer or other computing system, and the like.

The task review module 102 may have as its primary responsibility reviewing the content of tasks and related parameters, then facilitating assigning tasks to resources that meet the requirements for completing the task. This may, as noted above and elsewhere herein, include parameters related to task cost, task schedule, task complexity, task type, task desired quality, profit from the task, geographic preferences or limitations (e.g. no exporting of the task), and the like. To facilitate assigning the task to a suitable resource, such as a crowd source, an internal worker, or an outsource center resource, the task review module 102 may interface with the business process matcher module 124. The business process matcher module 124 may gather data about the task or project, such as from the task review module 102, and may analyze resource metadata to determine the resources that may meet (or best meet) the requirements for successful completion of the task. The business process matcher module 124 may ensure that specific business process requirements associated with the task have a corresponding match with resource parameters, such as reflected in analysis of the resource an/or in metadata. In an example of matching business process requirements with resource metadata, a business process requirement may require that a resource for a task have previously successfully performed comparable tasks a minimum of ten times. The business process matcher may analyze the resource metadata to filter out all resources that have not performed this or a comparable task at least ten times. The results of such a filtering may be further filtered for other business process requirements, such as availability, so that if a resource that has completed comparable tasks ten times is not available to perform the task in the time allotted for the task, this resource may be eliminated from consideration. While matching resources to tasks is described further elsewhere herein, the methods and systems of matching resources to tasks may be performed by the business process matcher 124, the task review module 102, or by a combination of these modules or other modules as may be described herein.

The task flow review module 102 may include capabilities for generating cognizable task units (CTUs) as noted herein above. Generating a CTU may be performed automatically by the task review module 102 through the application of task identification techniques known in the art. Alternatively, generating a CTU from an inflowing project or set of tasks may include using a processor to analyze task or project metadata, project workflow data, task description, task activities, and the like to identify task units (e.g. CTUs) that can be processed by the resources that are available to perform the tasks and complete the work within time, cost, and quality requirements. In an example of generating a task unit for a data entry project, the task review module 102 may apply a CTU generation rule that may indicate that no more than three data items from any one data entry project should be routed to a single crowd source resource. The task review module 102 may configure task units that include data for, as an example, up to three data items for a plurality of data tables requiring the data entry and forward this as a single task, along with suitable resource information (e.g., instructions on how to enter the data) to a crowd resource.

The following example provides exemplary details for generating task units in a general business process flow.

For example, a file may be received in Comma Separated Values, Tab Delimited, Compressed OfficeOpenXML format or the like. At least some of the spreadsheet's columns may have headers whose names match the expected schema for the data fields of a given task type. Each row of the spreadsheet may be turned into a task, with the cells' data being placed in Task fields of the same name. If the file can contain more than one type of task, then one or more of the columns is used to determine which task type applies to each row. For example, a "Language" column might have values that map each row to different types of tasks:

| ID | Name | Company | Language | RelevantData1 |
|----|------|---------------|----------|---------------|
| 1  | Jim  | Acme, Inc.    | French   | Foo           |
| 2  | Jane | Amalgamated, Co | French | Bar           |
| 3  | John | Industrials, LLC | English | Baz         |

For example, the above table might create 3 tasks, one per row, of the following structure:
Task 1: TaskType: Classification—French
　TaskData fields:
　ID: 1
　Name: Jim
　Company: Acme, Inc
　Language: French
　RelevantData1: Foo
Task 2: TaskType: Classification—French
　TaskData fields:
　ID: 2
　Name: Jane
　Company: Amalgamated, Co Language: French
RelevantData1: Bar
Task 3: TaskType: Classification—English
  TaskData fields:
  ID: 3
  Name: John
  Company: Industrials, LLC
  Language: French
  RelevantData1: Baz In an alternative example, an XML file may be received wherein at least some of whose Element names match the expected schema for the data fields of a given task type. Each XML node below some configurable Element name is turned into a task, with the Element values being placed in Task fields of the Element names:

```
<Classifications>
    <Classification>
        <UID>1234</UID>
        <TaskDataField1>Good</TaskDataField1>
        <Name>Smith</Name>
    </Classification>
    <Classification>
        <UID>2468</UID>
        <TaskDataField1>Better</TaskDataField1>
        <Name>Jones</Name>
    </Classification>
    <Classification>
        <UID>3690</UID>
        <TaskDataField1>LessGood</TaskDataField1>
        <Name>Kim</Name>
    </Classification>
</Classifications>
```

This might create 3 tasks, one per Classification element, of the following structure:
Task 1: TaskType: Classification
  TaskData fields:
  UID: 1234
  TaskDataField1: Good
  Name: Smith
Task 2: TaskType: Classification
  TaskData fields:
  UID: 2468
  TaskDataField1: Better
  Name: Jones
Task 3: TaskType: Classification
  TaskData fields:
  UID: 3690
  TaskDataField1: Leood
  Name: Kim In a business process project embodiment, data relevant to performance of the task may be received at the task review module 102 in an original file format. In a translation business process embodiment, file formats may be normalized to one or multiple platform data formats. The chosen format may be, for example, Translation Memory eXchange format (TMX), or XML Localization Interchange File Format (XLIFF) 2.0 which are both self-sufficient on the segment level. In addition, XLIFF can be converted into TMX and back. Other choices could be native XML, or Unicode text format, or other formats known to those of skill in the art. After conversion, the segments of the files so produced may be stored into a platform database. The data structure may be hierarchically structured in a way that allows later recomposition of the original input data, but at the same time allows access, which may be scrambled access, including random access, to the separate segments.

The task review module 102 may interface to a task assignment module 104 to facilitate assignment and routing of tasks to resources, such as crowd source, internal worker and outsource center resources. The task assignment module 104 may access an array of crowd sourced, internal and/or outsourced resources 108 for the assignment of tasks. Task assignment may comprise offering assigned tasks to certain workers, including allowing the certain workers an opportunity to accept or decline the task offer, or to suggest modifications or negotiate with respect thereto, such as to bid for a task by providing an estimate or price for performing it. The task assignment module 104 may keep track of resources to whom an assignment has been offered and may redirect the task assignment to another resource when the present resource declines the task, the offer expires, the offer is withdrawn, and the like. In a bidding arrangement, the task assignment module 104 may offer the task to a plurality of resources and require that the resources provide a bid or proposal for completing the task. The task assignment module 104 may automatically evaluate, or facilitate a human evaluation of these resource bids, select a best-fit proposal and assign the task accordingly. The task assignment module 104 may access worker/resource database 112 to gather information about workers (e.g., worker profiles) to facilitate matching potential resources with task requirements. The task assignment module 104 may communicate with an audit module 116. This communication may facilitate cooperative operation of the audit module with an output tracker module 114 so that resource auditing may be performed. The task assignment module 104 may further communicate with the output tracker module 114 so that, for example, the output tracker module 114 can track performance of each resource to which a task is assigned. Specific examples and further details of the full responsibilities and functionality of the task assignment module 104 are described elsewhere herein.

As illustrated, the resources 108 may be recruited via the operation of a recruit module 110. Recruiting resources may include a wide range of manual, automated, and computer assisted actions. A fundamental function of the recruit module 110 is to ensure that qualified resources/workers 108 are made accessible to the task assignment module 104 and other modules described herein to ensure an appropriate degree of bandwidth, productivity, and quality for processing business processes. The recruit module may access the data stored in the worker/resource database 112 to facilitate evaluating potential recruits to serve as workers capable of engaging in processing of a task in a business process project. The recruit module 110 may further evaluate a variety of third-party data sources (e.g. credit reports, law enforcement databases, tax databases, and the like) when recruiting a potential resource. Information about evaluations of potential workers may be stored in the worker/resource database 112. Candidates who are successfully recruited may be indicated as qualified workers in the database 112. Candidates who are not successfully recruited may not be visible to the other modules, such as the task assignment module 104 even though information that may be useful in future recruitment activity may be maintained about such candidates.

Both the recruit module 110 and the task assignment module 104 may access a worker/resource data resource, such as a worker/resource database 112. The worker/resource data resource or database 112 receives as input and stores data describing, for example, experience, jurisdiction, skills and history of each worker/resource 108. In order to evaluate the attributes of a worker 108 and determine, for example, the suitability of each individual worker/resource 108 for a given task, the task assignment module 104 may access resource profile and other worker/resource evaluation data stored in the database 112. Resource/worker-related data that may be input to or accessed in the resource database 112, the sources and techniques for gathering such data, and the benefits and/or value of such data is described elsewhere herein.

Figure 16:
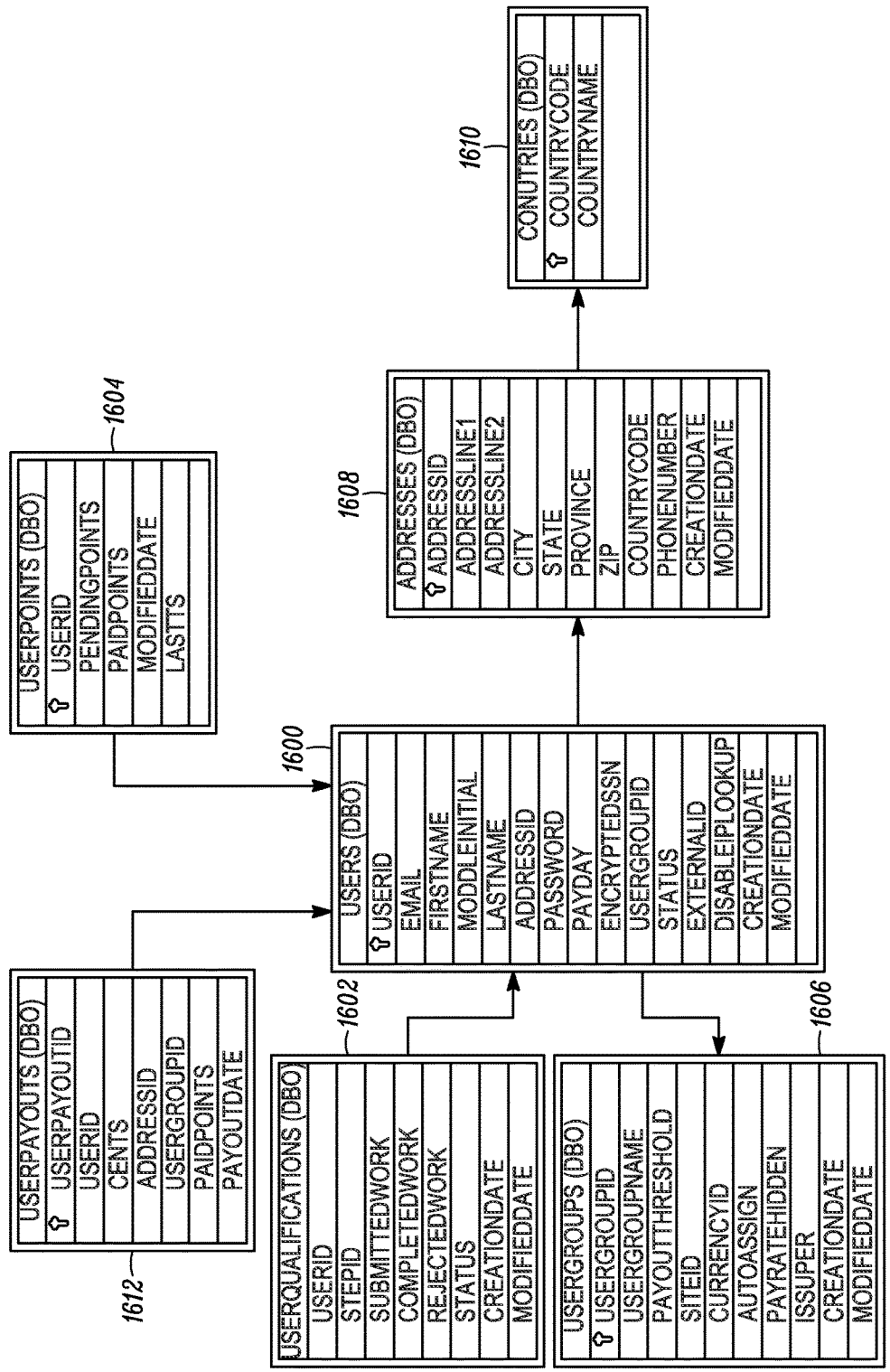
FIG. 16 depicts a schematic of a crowd worker metadata database.

With reference to FIG. 16, there is illustrated an exemplary and non-limiting embodiment of the relationship between and amongst various databases. As illustrated, Users database 1600 shares a key field of UserID with UserQualifications database 1602, UserPoints database 1604 and UserPayouts database 1612. Users database 1600 is comprised of a UserGroupID field and an AddressID field by which there may be accessed UserGroups database 1606 and Addresses database 1608, respectively. The Country-Code field of the Addresses database 1608 may be used to access Countries database 1610

As generally described above output tracker module 114 may facilitate tracking task status and performance of workers. In addition, the output tracker module 114 and audit module 116 may interact in various ways to facilitate performing audits of tasks, workers, projects, automated functions, and the like. The audit module 116 and auditing of business processes in general within the scope of the inventive business process crowd sourced and outsourced systems and methods are described elsewhere herein.

As the output tracker module 114 generates output, details describing the progress of individual work units may be communicated to a payment process module 118. The payment process module 118 may operate to facilitate the transfer of funds from a client account database 120 to one or more worker accounts stored in a worker account database 122 in accordance with the work performed by, for example, translators 108. In an exemplary embodiment, as tasks are completed by workers 108, the payment process module 118 continually or periodically debits a client account 120 and transfers funds to the account or accounts 122 of workers 108 responsible for the completion of the work.

A final step in task flow may include each task being processed by the task aggregator 106. The task aggregator generally functions to reconstruct projects from their component task units so that a user can receive a completed project. Another important function of the task aggregator 106 is to collect (e.g., aggregate) output from a plurality of tasks that is necessary or desirable to perform one or more subsequent tasks. In an example of such task output aggregation, a form completion project, such as a tax form completion project, may include several discrete tasks to fill in forms. The filled in forms may then need to be checked through an automated checking task. This subsequent automated form-checking task may only be executed once the discrete data entry tasks are completed for each form. The task aggregator module 106 may ensure that the outputs of the discrete data entry tasks are aggregated into data representing a complete form to be used in the checking task.

The business process crowd source and outsource architecture depicted in FIG. 1 may further be used in a fully automated process for recruitment, qualification, account creation, work, and payment processing for crowd workers, among many other potential applications.

In accordance with exemplary and non-limiting embodiments, potential worker information comprising worker self-reporting of various data, such as, without limitation, any of personal data, demographic data, professional data, skills data, location data, experience data, interest data, preference data, and on-line presence data of a potential worker may be received. As described above, the recruit module 110 may retrieve such information. It may also be stored in the worker/resource database 112. The recruit module 110 may, in a fully automated fashion, communicate with a potential worker, such as via email, text messaging, via a webpage, and the like to obtain such information. In embodiments, the recruit module 110 may dynamically vary the questions and/or queries presented to a potential worker based on a predefined or predetermined decision tree in order to obtain information sufficient to evaluate the suitability of a potential worker to tasks in general or, conversely, to a specific task. Such information as is received may be stored in a format or using conventions unique to, or shared by, one or more other potential workers or may be normalized in accordance with the information describing attributes of other potential or approved workers.

Next, at least one element of data for each of the personal data, demographic data, professional data, skills data, location data, experience data, interest data, preference data, and on-line presence data may be automatically validated by a comparison with independently gathered data from at least one independent networked data source. Such automatic validation may utilize third-party data sources, such as, for example, credit reports, law enforcement databases, tax bases and the like. The recruit module may, upon confirmation of any data stored in the worker/resource database 112, store as an attribute of the information an indication that the information has been independently verified. Such an indication may further reflect a degree of confidence with regard to the accuracy of the information. For example, information that is independently verified by more than one source may be tagged as more reliable than information that is verified by only a single source. Similarly, data or information regarding a potential worker that cannot be validated may be deleted, may be presumed to be incorrect, or may by tagged to indicate that it has not been verified.

Next, a worker qualification process may be administered in which the potential worker is prompted to perform at least one skills activity, which may optionally be computer-based, that is based on the received potential worker demographic data and professional data. The recruit module 110 may perform the task of administering that at least one skills activity. Any computer-based skills activity may be statically stored and retrieved for provision to a potential worker or may be dynamically generated. For example, a preconfigured translation task may be provided to all potential workers who indicate fluency in French and the source language. Conversely, a questionnaire may be dynamically constructed and provided to a potential worker based on the potential worker's advanced degree and work experience.

Next, based on an automated evaluation of the skills activity, the potential worker may be rejected or accepted as a qualified worker. Auditing of the performance of a potential worker may be automatically performed, such as by the audit module 116. For example, the audit module 116 may send a skills activity comprising a portion of text to be translated to a potential worker. The audit module 116 may further request from the task assignment module 104 an example of the portion of text as previously translated by a worker during the course of completing a previous or current task. Alternatively, the task assignment module 104 may send the activity to the potential worker and send activity output validation information to the audit module 116. As a result, the audit module 116 may compare in an automated fashion the work product resulting from the potential worker's skills activity to the example received from the task assignment module 104 to determine whether a potential worker should be rejected or accepted as a qualified worker, to classify the worker in a quality classification, to determine an appropriate cost/wage for the worker, or the like.

Next, a financial institution-connected work credit account to which the qualified worker has confidential access may be created or accessed. The payment process module 118 may operate to establish and/or access the work credit account such as, for example, worker account 122. In one embodiment, a worker may provide information detailing the parameters and attributes of the work credit account to be established. In other embodiments, such information may be retrieved, such as from the worker/resource database 112. Such information may include, for example, a preferred bank or jurisdiction for the work credit account. In yet another embodiment, the system may employ a default bank or other financial institution at which a work credit account may be established. Such a default institution may be selected from a plurality of options, such as based on worker physical jurisdiction.

In some embodiments, upon acceptance of a completed unit of work from the qualified worker, a credit corresponding to the unit of work, such as one that is redeemable for legal tender or other value, such as through the financial institution, may be automatically applied to the worker-exclusive work credit account 122, such as by the payment process module 118.

Example of Resource/Worker Accessing Assignments is Now Described

In accordance with an exemplary embodiment, a registered resource 108 may login to a worker interface port of the business process task processing system. After entering credentials, a worker may be asked how much time she intends to work in her current session. The task assignment module 104 may use this information to pre-assign tasks to be offered to the workers 108 and present the workers 108 a brief overview about the domain of work to be offered, variety of tasks to expect, and quantity of pre-assigned work. A worker 108 may request a new task mix from the task assignment module 104 or may identify attributes of the pre-assigned tasks that she prefers in lieu of others that she does not. However, requesting a new mix or selecting a subset of task attributes does not guarantee the worker will receive substantially different work, especially if the worker 108 was assigned to be offered specific tasks by manual selection as described more fully below.

In some embodiments, pre-assignment may be changed at any time, e.g. if there had been quality issues with a deliverable and work needs to be redone. In such an instance, a worker 108 may be informed about the change and given a reason for it.

If a worker 108 repeatedly quits a log-in session significantly earlier than announced, the business process task management system may be configured to take one or more of the following measures: reminding the translator 108, automatically adjusting expectations to be lower than entered at the next log-in, assigning lower pay work, and other actions that may trigger remediation by the worker.

Translation Flow Embodiment of the Business Process Flow of FIG. 1 is Now Described In some embodiments of business process task management, workers may be identified based on their ability to be translators of content provided to be translated, such as with a translation workflow. Translation methods and systems are described below in greater detail. Translation workers 108 may receive translation tasks, such as in the form of cognizable translation units (CTUs) described more fully below, from the task assignment module 104. Upon completing a translation of a CTU, a translator worker 108 may communicate either partial or final results to an output tracker module 114. The output tracker module 114 may receive information describing aspects of a translation project, such as the type of task (e.g., manual translation), including, but not limited to, information denoting which CTUs have been assigned to and accepted by which translator 108. The output tracker module 114 may also receive translated CTUs from worker translators 108. Access to information about the translation project, CTU assignment and acceptance, and other expectations related to the project may enable the output tracker module 114 to monitor or otherwise evaluate the progress made in completing the CTUs that comprise a translation project or set of tasks. In accordance with exemplary and non-limiting embodiments, the output tracker 114 need not be passive. For example, the output tracker 114 may communicate with a translator 108, such as via email, to inquire as to the progress being made in translating a particular CTU.

An audit module 116 may receive data regarding the assignment of CTUs and the progress of translation output from the task assignment module 104 and/or the output tracker module 114. The audit module 116 may operate to monitor the progress of the translation process by comparing derived statistics to predetermined benchmarks. For example, the audit module 116 may periodically or continually monitor and compare the output of individual translators 108 to benchmarks regarding, for example, total cost of translation, quality of translation and timeliness of translation. For example, the audit module 116 may monitor the average time taken by a translator 108 to translate a CTU. From this, the audit module 116 may determine that a particular translator is proceeding too slowly to finish the translation task in an acceptable amount of time or at an acceptable price. Similarly, the audit module 116 may sample the quality of translated CTUs so as to assure a specified quality level for the translation process. The audit module 116 may operate to give feedback to task assignment module 104 to dynamically change workflow based on an audit.

In accordance with exemplary and non-limiting embodiments, for each of the domains and languages for which a translator 108 is approved, a distinct and continuing evaluation of quality may be conducted, such as by the audit module 116. Sources for this automatic evaluation may include:

a. Revision history on translated CTUs that may be generated when a translation is reviewed explicitly in the workflow may include an edit distance that represents a degree of correction required during the review.

b. Sample-based human review even if the process does not include an explicit review (e.g., every N translations get reviewed by a peer anonymously, where edit distance between two translations represents a likely degree of needed correction).

c. Sample-based dual translations (e.g., every N translations get translated by more than one translator). If the translated results differ more than an acceptability threshold, an explicit review may be run on the produced translations. It is possible that good translators may tend to create similar translations, whereas worse translators may be more likely to create differing translations. It is possible that, even with only two sample translations at a time, a good translator's output may match more closely to other good translators, whereas a worse translator constantly may show worse matches against good translators, and also against other bad translators (bad translations may tend to be heterogeneous, because basic rules are not known). In such a scenario, even without other input such as formal translator reviews, good translators may be characterized by having the highest degree of translation similarity for a given translation sample.
  d. Automated quality checks on the translations—particularly "safe" checks such as bad style and false cognates (may require established rules for source and target language pairs).

In accordance with exemplary and non-limiting embodiments, the output tracker 114 passes completed CTUs received from translators 108 to the task aggregator module 106. The task aggregator module 106 may then operate to assemble translated CTUs into a finished product. As illustrated, once a task is successfully completed via the translation of the CTUs comprising the task and the assembly of the translated CTUs into a finished product, the task is sent or otherwise communicated to a requesting party and a new task is accepted.

Figure 2:
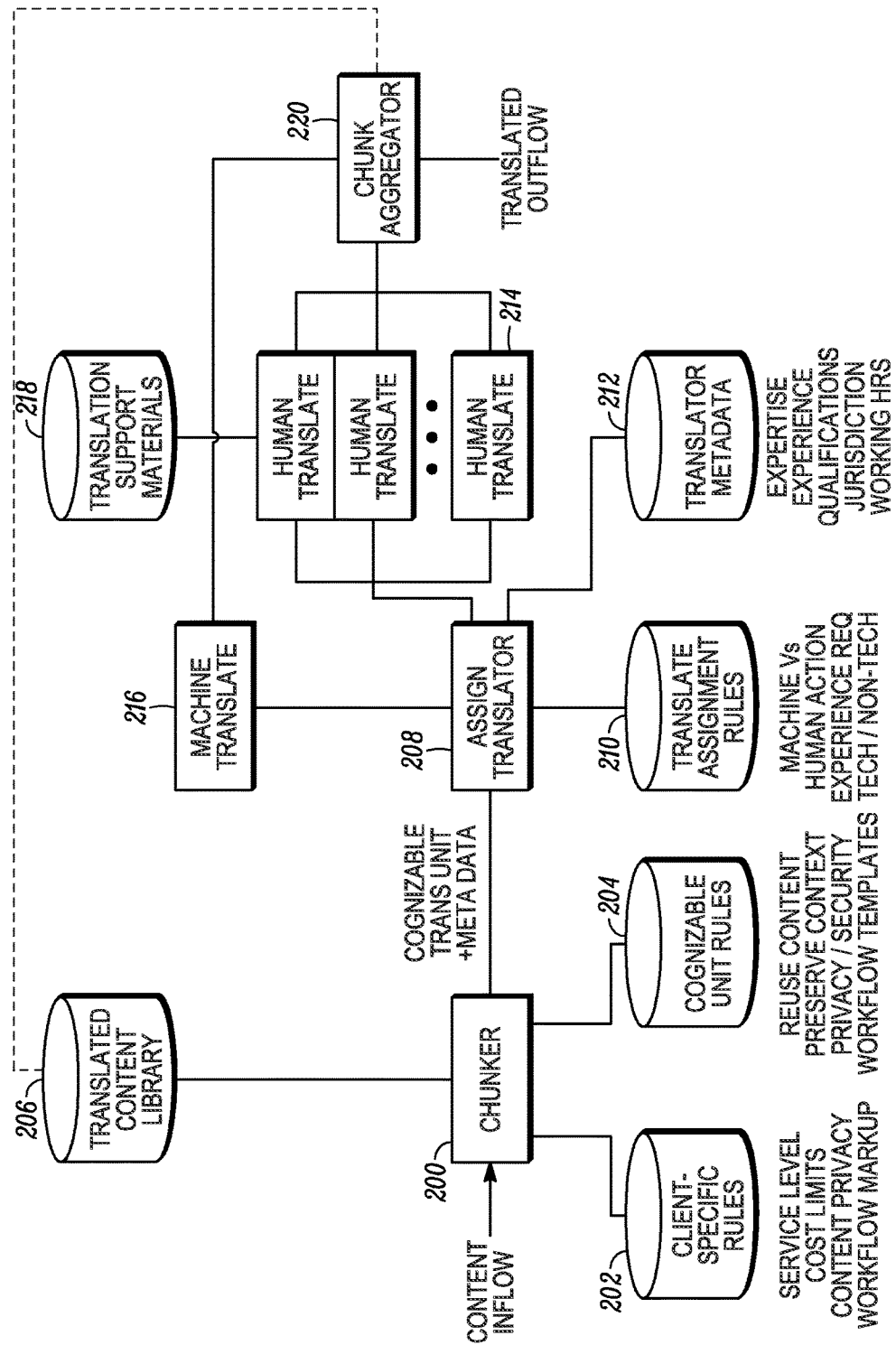
FIG. 2 depicts a schematic of a platform for dynamic multi-flow translation and localization.

With reference to FIG. 2, a flowchart illustrates a process of managing translation of content based on processing cognizable translation units (CTUs) according to an exemplary and non-limiting embodiment. One specific property of this translation system is the deconstruction of any input material into separate segments (typically at the size of sentences), which may then be translated into any desired sequence (including the original one). Only at the end of the translation and quality assurance process will the original input format be recreated. As illustrated, content to be translated enters a chunker module 200. The chunker module 200 may operate to break the received content into CTUs. The manner in which the chunker module 200 operates to produce CTUs may be partially defined in data resources, such as a client-specific rules database 202 and in a content chunking rules database 204, among other rules sources. The client-specific rules database 202 may store rules that are driven, at least in part, by a desired level of service, cost limits, style guides, content privacy requirements, and the like. The client-specific rules database 202 may also store client-specific workflow mark-ups, such as client-specific amendments to a template workflow, and the like. In an example of a client-specific rule that may be stored in the client-specific rules database 202, a rule may stipulate that the translation is to be of at least moderate quality. Another client-specific rule may, for example, stipulate that the overall cost of translating is not to exceed $5,000. Yet another client-specific rule may, for example, stipulate that certain content is to be machine translated as a unit so as to avoid the source content or the translation being accessed by human translators. Similarly, the content chunking rules database 204 may store rules that are driven, at least in part, by desired content reuse, the preservation of context, sufficient context for translation, privacy/security issues and the like or combinations thereof. The content chunking rules database 204 may also store workflow templates that may be accessed or referenced by the chunker module 200 when generating CTUs. In an example of content chunker rule use, the chunker module 200 may determine the size of a CTU based, in part, upon the requisite amount of material required to maintain the necessary context for translating the CTU, the amount of material that may exceed privacy or confidentially thresholds, and the like. In another content chunker rule example, the chunker module 200 may form one or more CTUs from contiguous or related matter having a need for similar security.

In some instances, the chunker module 200 may access a translated content library 206 when forming a CTU, thereby taking advantage of the presence of previously translated material such as may be stored in the translated content library 206 when generating CTUs. In such instances, the chunker module 200 may generate one or more CTUs that may include reference to an entry in the translated content library 206 where there may be retrieved a corresponding translation of at least a portion of the CTU.

Having been organized into discrete CTUs as described above, the CTUs and attendant metadata are forwarded to an assign translator module 208 for offering CTUs to assigned translators. The assign translator module 208 operates to identify at least one translator to be offered each of the CTUs based at least in part, for example, upon the content of CTUs and/or metadata associated with each CTU. The operation of the assign translator module 208 may be based, at least in part, upon rules stored in a translate assignment rules database 210. Rules stored in such a translate assignment rules database 210 may define a wide range of conditions to be considered when determining a translator for offering any given CTU. In an example of use of rules from the translate assignment rules database 210, the assign translator module 208 may access the rules to determine when a human or machine translator should be used, what translation experience is required for a given CTU, whether the domain of a CTU to be translated needs to be factored into translator assignment, and the like.

Various exemplary rules may be utilized when determining which resource will receive an offer to perform a translation task. For example, with regard to crowd translators, the following elements may be considered: (1) a list of skills that the worker has claimed, including without limitation languages of proficiency, areas of expertise and interest, computing devices owned, ways in which the worker has used the Internet; (2) one or more evaluations that the worker has passed, which might include reading and/or translation proficiency in one or more languages, research skill ability, typing ability, in-country/native speaker status, college degree or six year professional experience status, two year specific medical field status, written exam pass rate, verified paperwork and references and acceptance rate; (3) location of the worker, possibly verified based on IPAddress, including, for example, a region of a country; (4) past task types at which a worker has shown proficiency, which might include the source and target language pair or language direction for a current translation project (possibly with an area of expertise that is different from the current translation project or the same area of expertise but a different language). In an example of use of these elements, a level of proficiency or worker score for past task types that are similar to the current task type can be considered. Additional meta data about the worker that, for example may have been manually input by a crowd manager or other resource with administrative access rights to the translation platform based on claimed or proven skills or experiences of the worker (e.g., tags) may be considered.

When applying such rules, the assign translator module 208 may access data descriptive of translators from a translator metadata database 212. Data stored in the translator metadata database 212 may include, but is not limited to, translator expertise, translator experience, translator qualifications, translator jurisdiction and translator working hours as may be stored in association with a translator profile. Such a profile may consist of a public part, which may be visible to anyone on the platform or on the same project, a private part which is only visible to the platform owner and the translator 108, and a hidden part, which may be used by the different algorithms utilized by, for example, assign translator module 208 to estimate properties like quality and speed (also by domain), reliability, recorded typical weekly work schedule (important for overall scheduling), and other rating information. All of this hidden information may also be made visible, at least privately. Also, any of the algorithms described herein may utilize any of the public, private, secure, or hidden data (in whole or in part) as necessary or desirable to perform the algorithm. In an example of algorithmic use of private information, an algorithm that calculates and deposits a payment for services into a translator financial account may access private financial account information for a translator. In an example of algorithmic use of public information, an algorithm that determines if a translator meets geographic criteria for translation of a CTU may access the translator's public location information.

Using translator metadata database 212 data in accordance with rules accessed from the translate assignment rules database 210, the assign translator module 208 may assign each CTU to one or more of a machine translate module 216 and a plurality of human translators 214. The machine translate module 216 may operate to translate CTUs without substantial or any human intervention. During translation of a CTU the human translators 214 may draw upon data from a translation support materials database 218 as needed to perform translation of one or more CTUs.

A translation support materials database 218 may contain information suitable for use by a human translator when translating material for a client. Therefore, a translation support materials database 218 may be client-specific or may include a plurality of client-specific sections. Such a database 218 may include general or client non-specific translation support materials, such as a technical term translation reference, a client-specific glossary or dictionary, a client-specific list of preferred terms for particular items, a client product catalog, a document type style guide, and the like. Because each CTU may be processed through a translation workflow independently of other CTUs from the same source, each CTU may be configured with data that facilitates a translator using translation support material from the database 218. Translation support material from the database 218 may be delivered to the translator with a CTU or a link to a relevant portion of the database 218 may be delivered to the translator.

The aggregate output of human translators 214 and machine translate modules 216 are aggregated by chunk aggregator module 220 to form the translated outflow and to provide translation feedback in the form of translated content that may be suitable for storing in the translated content library 206.

To facilitate optimization of the translation resources for productivity, cost, and performance considerations, content inflow and translated outflow is not required to be linear or sequential. The order of data passing from the chunker module 200 through to the chunk aggregator module 220 may result in data being received at the chunk aggregator module being received in a different order than the content inflow received by the chunker module. One technique that may be used to facilitate optimization is batching of content inflow. The chunker module 202 or a batcher module (not shown) may break the content inflow (e.g. for a given translation project) into numerous batches that may contain a reference to a customer ID, information about the domain (subject matter), and may include general instructions which are valid for all batches in this project. Translation projects may be filled over time with actual work through the creation of one or multiple batches.

As used herein, a "batch" may consist of input data (typically multiple files) that share common aspects such as a workflow, client-specific rules, quality expectations, content type (e.g., documentation vs. resources), language directions, and the like. Depending on the degree to which these differ for a given content inflow, multiple batches may need to be created. The batch capabilities described herein may allow for content that has different delivery dates to be included in a single batch if the constraints for delivery timing (e.g. no later than) can be met with the single batch. Alternatively, although the delivery dates for a batch may be targeted to meet the earliest required delivery date of content in the batch, the translated outflow date for each aggregated translated outflow can be adjusted individually. In an example, a translation workflow for the batch may be automatically chosen according to the criteria for translation that most impact the final result (e.g., the requested quality). Alternatively, additional workflow adjustments and/or entirely different workflows may be created or adjusted by an operator. A workflow will be described in greater detail below, but as an example, the translation machine setup and other translation resources, such as client-specific terminology and the like may be configured as part of the workflow requirements for each batch.

After upload of content inflow, a cost for completion of the batch with the requested quality and the scheduled delivery date will be estimated. This estimation may be automated, manual, or a combination thereof, such as if a human may evaluate an automated estimation and make adjustments either to the estimate or to parameters used to generate the automated estimation after which the automated estimation is regenerated. As the batch progresses, this information is updated. The whole setup of the batch parameters (e.g. workflow) may be stored as a template in one or more of the client-specific rules database 202 and the content chunking rules database 204, and may be selectable by the operator upon creation of another batch, such as a batch in the same translation project.

The work progress on the input data comprising a translation project may be monitored on a project, batch, sub-batch, and CTU-level. At least percentage of completion, names and number of associated translators, expected due date, current and estimated final costs, and an overall status indication on all progress indicators vs. delivery schedule and planned costs may be accessible to an operator.

When all CTUs of a sub-batch (e.g., an individual inflow file that is part of a batch) are completed, the sub-batch (e.g., file) may be marked as completed. When all sub-batches in a batch are completed, the batch may be marked as completed. At any point in time after content inflow is received, any file or any batch can be requested to be output with the current level of completion. Such a request may include an instruction to stop further processing of the file/batch or may not impact the flow other than to ensure proper capture of the current state of completion of the file/batch. On completion of any level of translation (e.g., CTU, project, sub-batch, batch, and the like) an operator may get a notification.

Error handling, including auditing, and other techniques for mitigating the generation of a final deliverable with errors are described elsewhere herein. However, as an example of error handling, errors detected during translation or during recreation of the translated output data may be displayed. Instead of a final version of the translated original format, a skeleton view plus raw data, such as raw XML Translation Memory eXchange (TMX) data, XLIFF or XML data may be returned in case of errors. An operator may use a user interface to re-run the creation of an output file with manually corrected data.

After completion of a batch and after the completed data have been downloaded or otherwise further consumed, the transaction, file, and batch data belonging to the batch may be stored in a memory that is accessible to at least the operator, or may be immediately removed from the system. If regulatory control or client specific rules require it for a project, the inflow and outflow data, along with intermediate data as required e.g. for audit purposes, may be automatically exported and archived.

In accordance with another exemplary and non-limiting embodiment, there is described a method of free-flow cognizable translation unit-based document translation with reference, generally, to the elements of FIG. 2. First, a source document to be translated serves as content inflow to the chunker module 200. The chunker module 200 may operate further to break down the source document into a plurality of discrete cognizable translation units, wherein each unit is associated with a position in the source document.

In accordance with some exemplary embodiments, each CTU may be attributed with data indicating various properties of the CTU in addition to the text to be translated. For example, each CTU may be attributed with a sequential number indicating a placement of the translated CTU with respect to other translated CTUs. As a result, once assigned, the sequential number may serve to identify a placement of each translated CTU in relation to other CTUs and obviates any knowledge of its placement in the original source document when operating to aggregate the translated CTUs, such as by chunk aggregator 220. In some embodiments, the sequential number may indicate an absolute position in the aggregated translated outflow. For example, a CTU may be comprised of a header or title introducing a chapter and may require positioning at the top of page 4. As a result, translated CTUs appearing previous to the header CTU, such as those having smaller valued sequential numbers, may have their font size adjusted, margins increased, and the like, to assure the proper placement of the header CTU.

Conversely, some sequential numbers may refer merely to the sequence in which a CTU is to be reproduced once aggregated with other CTUs. In addition to attributes specifying the sequence in which CTUs are to be aggregated, CTU attribution may indicate aggregation requirements such as the placement of a CTU with respect to another CTU. For example, a CTU may comprise an image with embedded text elements to be translated. Another CTU may comprise a description of the image and may be intended to appear immediately below the image but not to appear on a page separate from the image. In this example, the image CTU may be attributed with information identifying the description CTU and information indicating that both are to be reproduced on the same page and in close proximity to one another. In this manner, aesthetic and placement information present in the source document may be maintained when the CTUs are aggregated without reference to the source document while enabling the independent and atomic nature of each CTU. While described with reference to CTU attribution providing placement information and aesthetic information, various embodiments are not so limited but, rather, are drawn broadly to encompass any and all forms of CTU attribution.

Other information that may be attributed to a CTU may include specific reference to a known translation for a portion of the CTU, such as trademarks, product names, tag lines, or other client-specific content. Complete CTUs that have previously been translated may be substituted with the translated content and so attributed. Conversely, a CTU may only be generated that has not previously been completely translated, such as if a trademark in a sentence was previously translated, but the entire sentence was not previously translated. CTU size (e.g. number of sequential words) may be limited in such a way as to ensure that each CTU contains a minimum amount of not-yet-translated content, without violating other CTU generation rules, such as, for example, rules that protect confidentiality and the like. Next, the assign translator module 208 may operate to determine a translator for each of the units based on a workflow requirement for translating the document. For example, CTUs corresponding to sensitive portions of the source document that require secure access may be assigned to a translator 214 or translators with appropriate security clearances, to internal workers of an enterprise, or the like. In another example, selected CTUs may be assigned to translators 214 with lower rates in order to deliver an aggregated translated product having a specified cost.

The process consisting of generating segments from a document or a file is called the segmentation. The purpose of the segmentation is to break down a flow of text into translation units. There may be most often two types of segmentation, one at paragraph level and one at sentence level. A sentence is usually the smallest linguistically "logical" unit at which one segments a file or document. Segmenting a sentence at smaller units, for instance at phrase level, may not allow proper reconstruction of a translated sentence. Non-text formats may be parsed for translatable content, such as by separating text from structure/markup before being segmented. Parsing non-text formats (or partially non-text formats) for portions of translatable content may be a form of filtering.

After determining a translator or translators 214 for each CTU, each of the units may be distributed to a determined translator 214 for translating into translated units independently of the source document position of each of the units. That is, translators 214 may proceed to translate their assigned CTUs without knowledge of the position of their CTUs vis-à-vis the positions of other CTUs in the source document.

Once translated, the translated units may be received in an order of translation such as by the chunk aggregator module 220. In accordance with exemplary embodiments, the chunk aggregator module 220 may assemble the translated units into a translated document based on the position of each corresponding CTU in the original source document.

Figure 2A:
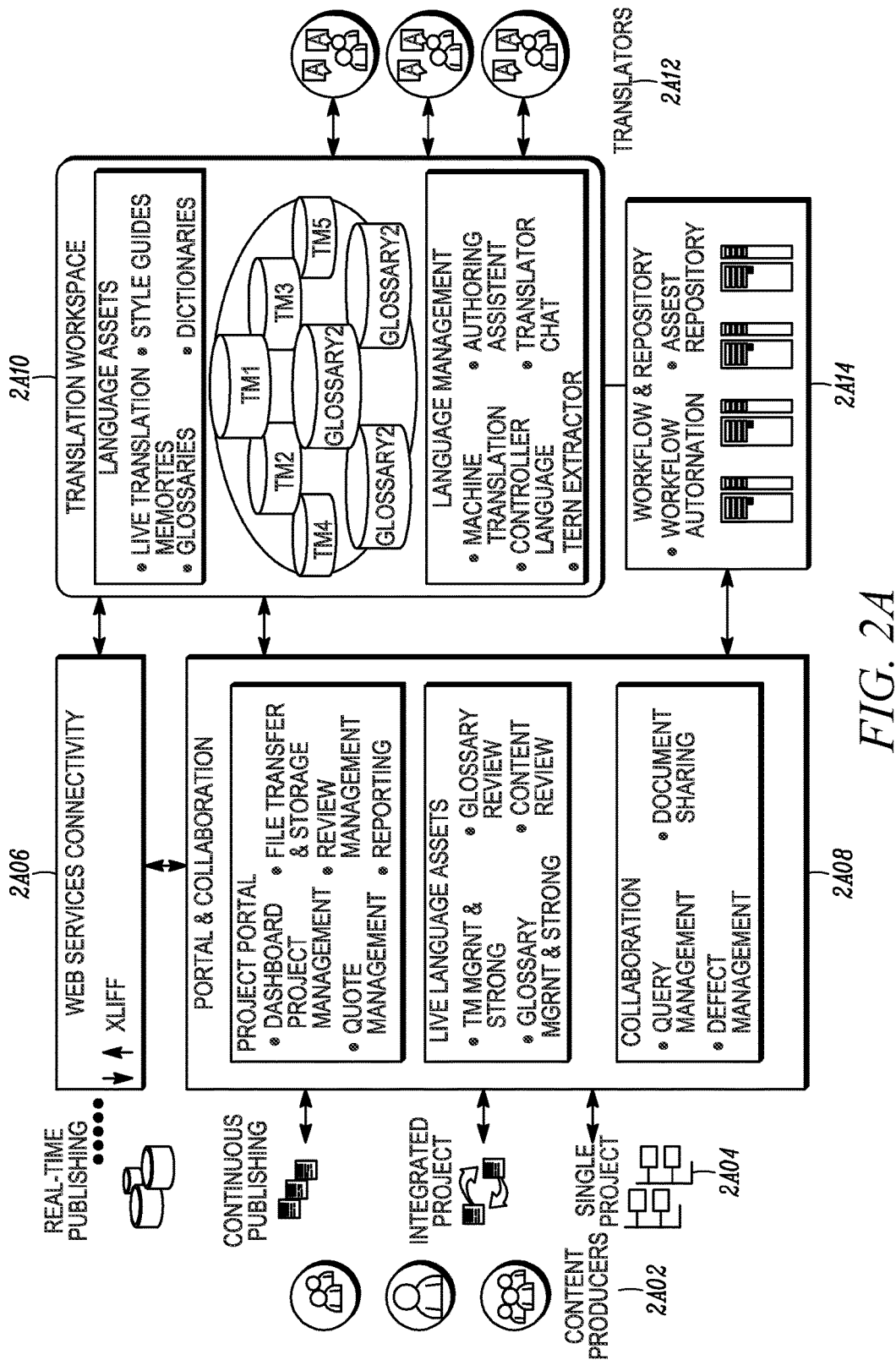
FIG. 2A depicts a high-level schematic of a platform for workflow-based translation.

With reference to FIG. 2A, there is illustrated an exemplary and non-limiting embodiment of a technology platform that may provide business process services, such as content translation using the methods and systems described herein. As illustrated, content producers 2A02, such as clients or customers, may engage in the production of a published product 2A04. Such publishing products may include continuous publishing materials, integrated project materials, single projects and real-time publishing. As illustrated, a web services connectivity module 2A06 operates as an automated portal to receive real-time publishing material and to communicate with a portal & collaboration module. 2A08. The portal 2A08 may facilitate access to the translation workspace 2A10 by the clients or customers, while the translators 2A12 may access the workspace 2A10 for language processing. Workflow and repository information 2A14 may also be accessed through the translation workspace 2A10.

Figure 3:
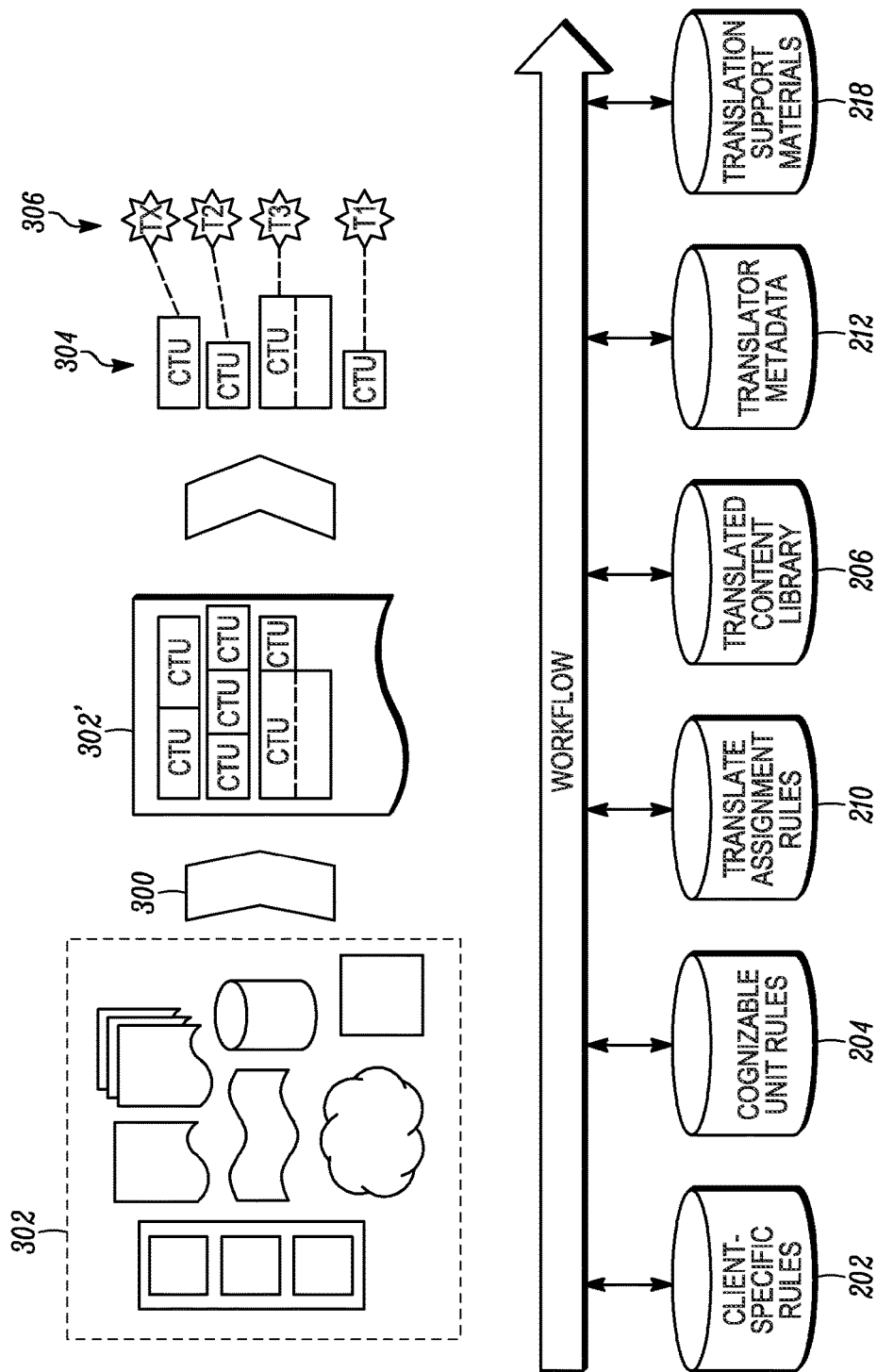
FIG. 3 depicts a flowchart of distributing source documents in cognizable translation units.

With reference to FIG. 3, there is illustrated an exemplary and non-limiting embodiment of the distribution of source documents in the form of cognizable translation units (CTUs), or chunks, such as individual sentences for translation. To begin, at step 300, there is provided a source document 302 for translation. As illustrated, a source document may take many forms. Examples of forms or formats for a source document include, but are not limited to, formatted text documents such as Microsoft Word™ documents, PDF formatted documents and the like, portions of a contiguous file in a database, images of a scanned paper document, a data stream, a blog, a web page, a frame of a web page, a spreadsheet, a caption of an image, a movie or a section of it, a newspaper, a sports report, a live event feed, a stock ticker, and the like.

As illustrated, each source document may be broken down into a plurality of discrete cognizable translation units, or CTUs 304. As described above and elsewhere herein, the chunker module 200 may operate to break down the source document into a plurality of discrete cognizable translation units. As is evident, CTUs 304, even those derived from the same document 302, may comprise different amounts of text as illustrated by the differing shape of the CTUs 304 forming the document 302'.

A cognizable translation unit may comprise an independently translatable text string subset of a source document 302, such as a paragraph, a complete sentence, a portion of a sentence, a bullet point, a plurality of sequential sentences, an independent clause, a dependent clause, a string of words, an word, or various other arrangements of words from the source document 302.

The size of a CTU 304 may be selected to provide enough content to enable a translator to understand the grammatical context of the translation unit while optionally obscuring the substantive content of the source document from which the translation unit is derived.

Once broken down into discrete CTUs 304, a translator 306 for each of the CTUs 304 may be determined based on a workflow requirement for translating the source document 302'.

As illustrated, the workflow is both informed by and updates the database elements along the way. For example, the workflow may include an instruction to access customer-specific data in the translated content library. In some embodiments, a user may have proprietary translations for trademarked content. In yet other embodiments, a user may have previously translated a highly technical passage of content. In such instances, the workflow may be annotated with an instruction to draw upon such translations as may be stored in the translated content library 314. Conversely, any part of a CTU, such as highly technical content, may be identified for future use by storing such content in the translated content library 314. In a similar fashion, as described above, translator metadata 316 may be accessed and used to select a prospective translator 306. As translation commences along the workflow, experience gained by translators 306 may be added to or updated in the translator metadata 316. Likewise, metadata reflecting the quality of a translator's work, such as might be determined by an audit of a translator's output, may be stored or updated in the translator metadata 316 as workflow progresses. In yet another embodiment, translation support materials 318 may be provided to translators 306 during the course of workflow.

As described above in the embodiment depicted in FIG. 2, the assign translator module 208 may operate to determine a translator for each of the units based on a workflow requirement for translating the document. After determining a translator or translators 306 for each CTU 304, each of the units may be distributed to a determined translator 306 for translating. Upon receiving one or more CTUs to be translated, a translator 306 may accept or decline the task. If accepted, the translator proceeds to translate the CTU or CTUs prior to forwarding the translated CTUs to the chunk aggregator 220. Should a translator 306 decline the opportunity to translate the assigned CTUs, the assign translator module 208 may select another translator 306 to be offered the task of translating the CTU or CTUs.

As illustrated in FIGS. 2 and 3, and as described above in reference to FIG. 2, the translation process may utilize, for example, client-specific rules database 202, chunking rules database 204, translate assignment rules database 210, translated content library 206, translator metadata database 212 and translation support materials database 218.

Figure 23:
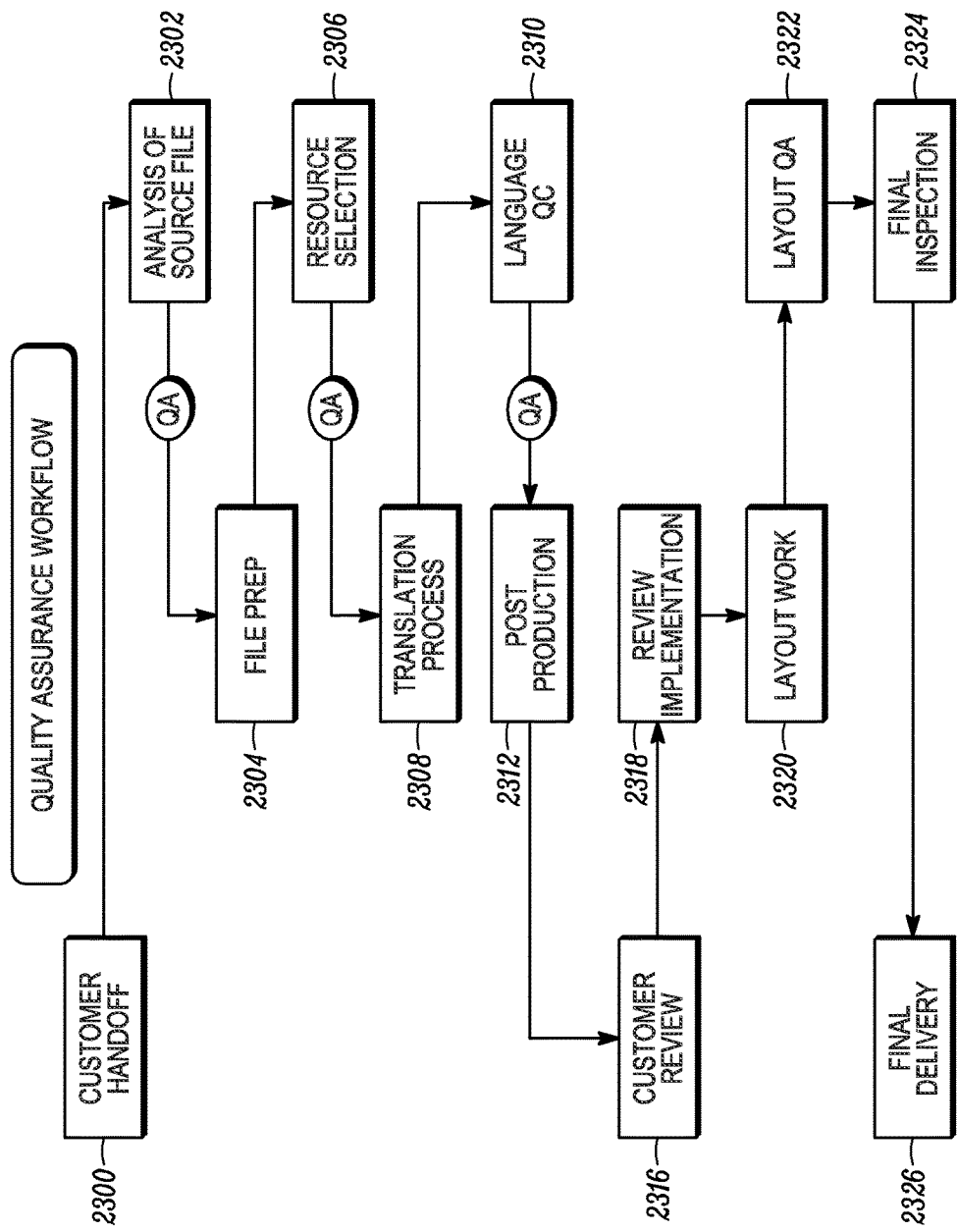
FIG. 23 depicts a quality assurance workflow.

With reference to FIG. 23, there is illustrated an exemplary quality assurance workflow for a translation project. To begin, a customer hands off the project at step 2300. Next, at step 2302, there may be performed analysis of the source files followed by a quality assurance step. Next, at step 2304, the file is prepared, such as by chunking the file into CTUs. Once again, at step 2306, quality assurance is performed as described elsewhere herein. At step 2308, resources are selected, quality assurance is performed once again and, at step 2310, the translation process commences. At step 2312, language quality assurance may be performed on the outputs of the translation process with the outputs serving as input to the post-production and customer review at steps 2314 and 2316, respectively. Then, at step 2318, there may be implemented a review of the implementation that serves as an input to the layout work at step 2320. Following a layout quality assurance at step 2322, a final inspection of the completed task is performed at step 2324 prior to customer delivery at step 2326.

Part II

Figure 4:
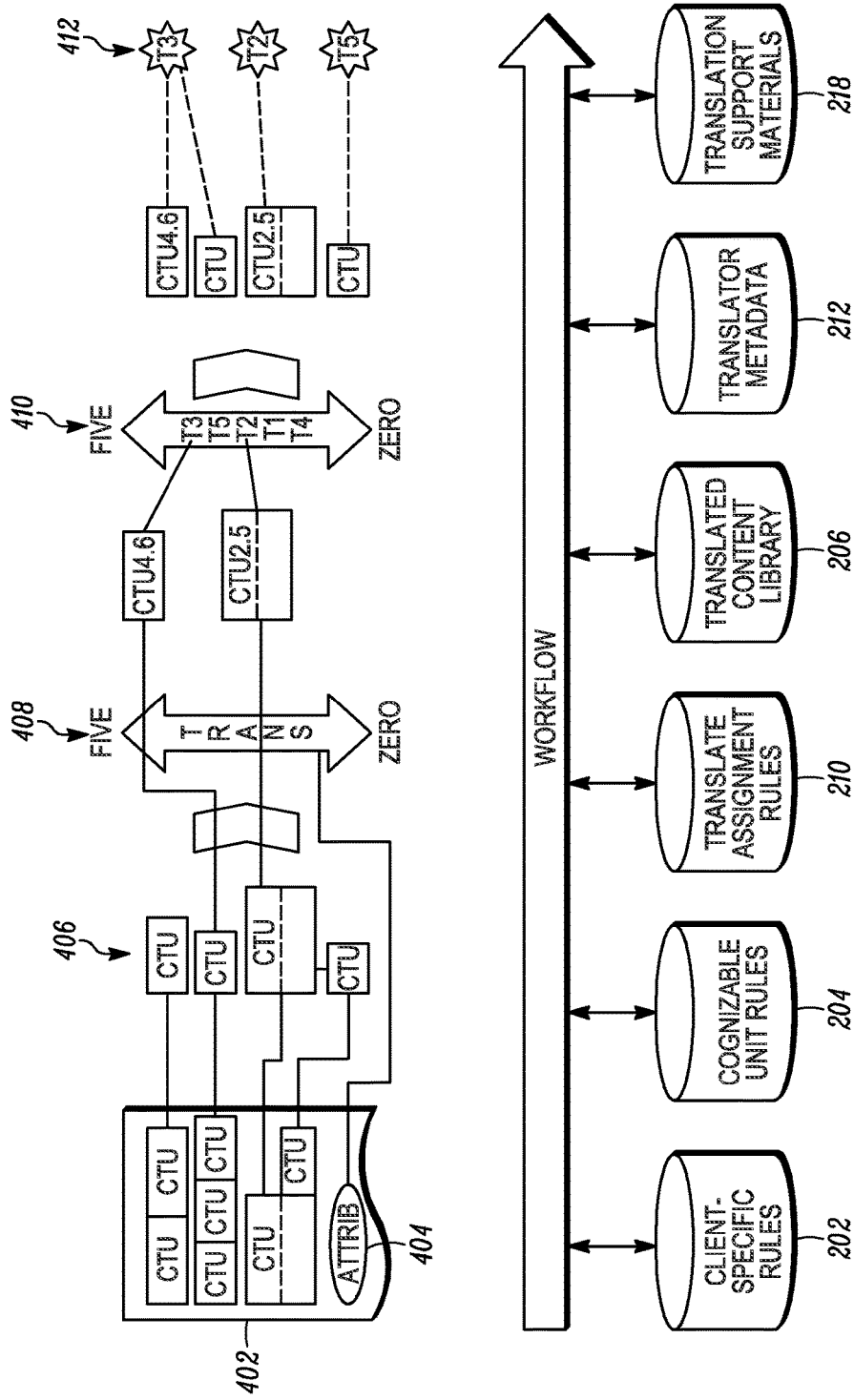
FIG. 4 depicts a flowchart of a workflow for facilitating differentiated translation based on a unit-specific degree of difficulty.

With reference to FIG. 4, there is illustrated an exemplary and non-limiting embodiment of the distribution of discrete cognizable translation units to support differentiated translation based on unit specific degrees of difficulty. To begin a source document 402 for translation is provided. As described above with reference to FIG. 3, a source document may take many forms. In the present instance, the source document 402 contains an embedded content attribute 404. In an exemplary embodiment, the embedded content attribute 404 contains information descriptive of a degree of difficulty of the source document 402 or portions of the source document 402 such as, for example, one or more CTUs 406. While the current embodiment depicts content attribute 404 embedded in the document 402, a content attribute 404 may alternatively be external to the source document. The content attribute 404 may be provided directly by a user as part of a translation request for translating the source document 402. The user may alternatively provide a link to the content attribute at the time of translation request. Such a link may be explicitly provided by the user or may be inferred based on an aspect of the user's request, such as the user's ID or other identifier included in the request. The user may be presented with suggested attributes based on attributes provided during previous translation requests by the user or other users. The user may alternatively select from a set of previously saved attributes. Alternatively, the attribute may be indicated by a portion of the content, such as through a link or other metadata embedded in the content. As can be seen by this description, an attribute that may be suitable for distributing discrete cognizable translation units to support differentiated translation based on unit specific degrees of difficulty may be sourced from a wide range of sources associated with the content, the user, other users, and the like.

The content attribute 404 may describe or facilitate determining the manner in which the source document or a CTU or CTUs derived from the source document are to be assessed when determining a difficulty of translation. Such information may be useful as described below when configuring one or more workflow steps for translating a portion of the source document. The content attribute 404 may facilitate selecting a translator or translators for a CTU or CTUs, determining the extent of use of machine translation, specifying a degree of dependency on user-specific translation reference material, and the like. For example, the content attribute 404 may describe or facilitate determining that translation of the document or of a CTU derived from the document may require knowledge of a specialized vocabulary associated with, for example, physics, chemistry, mathematics, business jargon, or the like. Because translation services may not be purely limited to direct language-to-language translation, translators may be called upon to perform crucial ancillary actions, such as resolving inconsistencies in the source document. Therefore, in addition to indicating a degree of translation difficulty based on a subject or the jargon of a source document, a content attribute provided in association with a source document or derived from such a content attribute may, for example, describe or indicate that a portion of the source document (e.g., a CTU) may require editing due to the source text portion (e.g., comprising a CTU) being poorly written or otherwise expressed.

The content attribute may apply to a degree of difficulty attributable to the source document 402 as a whole; selectively to a predefined portion of the source document 402; differently to different subsets of the source document 402, such as a CTU or CTUs, or even portions of a CTU, and the like.

Next, at step 408, there may be a degree of difficulty of translating at least one of the CTUs, which may be calculated, such as based on the frequency with which words in the CTU are used in a given language as compared to other words in the language, based on the length of the words, based on the length of sentences, based on sentence structure, based on the subject matter of the content or the like or may be estimated, such as by an individual requesting the translation. The content attribute 404 may be utilized, in part, to determine a degree of difficulty in translating the CTU or CTUs. In embodiments, the degree of difficulty determined for a CTU or CTUs is independent of any degree of difficulty of any other CTU and is unrelated to the ability of a translator to translate it. For example, at this point in the process, the possibility of assigning a CTU to a translator with exceptional skill in the realm of translating a particular CTU is not taken into consideration. For example, a CTU may be accorded a difficulty rating of 4.6 on an exemplary five-point scale, where five points is the most difficult. Such a difficulty rating may be assigned, for example, as a result of the CTU under consideration comprising long passages of a complex mathematical notation. The difficulty rating of 4.6 may be an objective measure of the general degree of difficulty of translating the CTU that may not take into consideration whether an as-yet unassigned translator may have exceptional proficiency in translating the CTU. Matching a translator to a CTU with any particular difficulty degree may be performed separately from determining a CTU difficulty rating.

The degree of difficulty of translating may be calculated based, at least in part, on a client-specific rule from a client-specific rules database 202. In an example of use of a client-specific rule for calculating a degree of difficulty, a translating difficulty cross-reference of document metadata (e.g. attributes) and translation difficulty ratings may be accessed. In this way, a translation client may bias certain documents toward a higher or lower degree of difficulty than might otherwise be determined during a calculation of translation difficulty.

In embodiments the degree of translation difficulty may be calculated based, at least in part, on a cognizable rule from a cognizable unit rules database 204. In an example of use of a cognizable unit rule to facilitate calculating a degree of translation difficulty for a portion of a document, cognizable translation units that are located in a source document proximal to units that are determined to have a high degree of difficulty may be adjusted in difficulty based on the proximity. Such adjustment may be limited to proximal units that are above a threshold, therefore indicating that it may be beneficial for high quality translated output if the translator who translates the more difficult unit also translates the proximal units.

The degree of translation difficulty may be calculated based, at least in part, on a translated content library 206. In an example of use of a translated content library to calculate a degree of translation difficulty for a portion of a document, fuzzy matching of a portion of the document to be translated (e.g., a CTU) with existing translated content in a translated content library 206 may result in an indication of the difficulty of translating the CTU based on the previously determined degree of difficulty of translating the matched translated content.

Various methods for determining a difficulty of a translation may be employed. For example, methods to determine the difficulty of a translation may involve: a) matching a percentage to existing translations (the higher the similarity the easier the translation task); b) considering segment length determined by word count; c) considering segment structure (e.g. in languages which allow free word positioning detection if word order is differing from standard order, or detection of other syntactic or semantic indicators for a complex structure ("refers to", "taking into account that", and the like); d) considering indicator terms for complex language (e.g. terms from other languages like Greek, for English the average word length); e) using complexity indication from either the author, or the authoring process (by means of annotations); f) considering unavailability of identified terminology in available glossaries; and the like. Also, the user requesting the translation can give an indication of average complexity of the text that is input, which may facilitate discriminating all segments of complex text from all segments of less complex text.

Assignment of highly difficult translation units to workers may depend on a workflow requirement for translating the document. For example, a workflow requirement for the source document 402 may access a translate assignment rules dataset where it is specified that no CTU being processed via the current workflow is to be translated by a translator having a general degree of proficiency less than "2.0" as described more fully below.

Next, at step 410, there may be determined a translator 412 for at least a portion of the plurality of CTUs based on the calculated degree of difficulty. As illustrated, a plurality of translators 412, (T1-T5), have been assigned associated degrees of topic-specific proficiency ranging from, for example, zero to five. In accordance with exemplary and non-limiting embodiments, a topic-specific degree of proficiency may be assigned, generally, to a translator 412 and may reflect a degree of proficiency at translating CTUs of various degrees of difficulty for the given topic. Therefore, a translator degree of proficiency value may correspond to the degree of translation difficulty values calculated for CTUs, so that matching a translator with the same or higher proficiency degree as the difficultly degree of a CTU likely results in a valid match of a qualified translator for the content to be translated based on the determined degree of difficulty. However, it may be possible to match a translator with a proficiency degree that is lower than the degree of translation difficulty of a CTU and produce acceptable results. Matching of translators to CTUs based on proficiency degree and translation difficulty degree may be adjusted for other factors such as resource availability, cost limits, and the like. In embodiments, a translator's degree of proficiency may be computed based, at least in part, upon the translator's proficiency in a realm of subject matter associated with the CTU to be translated.

Each translator's proficiency for translating difficult content may be topic-specific as noted above or may be topic-independent, thereby representing a general proficiency for translating difficult content. Use of general and topic-specific translator proficiency rating may include the following example. As illustrated in FIG. 4, a CTU having a degree of difficulty of "2.5" is shown being assigned to translator 412-T2 possessing a degree of proficiency of approximately "2.5" or higher. In such an instance, the translator's degree of proficiency may be retrieved from the translator metadata database 212. In another embodiment, not illustrated, the CTU may have a degree of difficulty of "2.5" associated with a level of difficulty related to mathematical terms which comprise a portion of the CTU to be translated. In such an example, it may be the case that translator 412-T2 has a degree of proficiency in math that is only "2.1", while translator 412-T4, having a general level of proficiency of "0.7", may in fact have a level of proficiency in math that is "4.2". In such an example, the CTU may be assigned to translator 412-T4.

The translator's levels of proficiency may change as the workflow proceeds. Ongoing audits of a translator's work products may serve to upgrade or downgrade a translator's general level of proficiency rating and/or ratings for levels of proficiency in a particular realm in dynamic fashion. Such changes to a translator's general or specific level of proficiency may be updated and/or stored in the translator metadata database 212.

In an exemplary embodiment, the translator metadata database 212 may comprise one or more qualifications such as, for example, in-country/native speaker status, college degree or six year professional experience status, two year specific medical field status, written exam pass rate, verified paperwork and references and acceptance rate. As described elsewhere herein, project managers may access translator profiles and qualifications from the translator metadata database 212.

In some embodiments, translators may sign service level agreements that may be documented in the translator metadata database 212. In operation, ongoing evaluations may be conducted of individual translator performance using, for example, quality assurance inspections as described elsewhere herein. Translators may be graded and ranked on performance, such as throughput, work times, and the like.

Unsatisfactory translators may be released. In some embodiments, translators must keep current with relevant terminology results of ongoing evaluations, including performance grade or rank, release status, currency of relevant terminology and the like may also be documented in the translator metadata database 212.

Figure 17B:

Information in the translator metadata database may be accessed and viewed via a user interface 1700 as illustrated with regard to FIG. 17.

Each CTU of the plurality of CTUs may be distributed to a determined translator. As described above in the embodiment depicted in FIG. 2, the assign translator module 208 may operate to determine a translator 412 for each of the CTUs based on the degree of difficulty for each CTU as well as the prospective translator's topic-specific and/or general proficiency at translating difficult content as described above. After determining a translator or translators 412 for each CTU 406, each of the units may be distributed to a determined translator 412 for translating. Upon receiving one or more CTUs to be translated, a translator 412 may accept or decline the task. If accepted, the translator proceeds to translate the CTU or CTUs. Should a translator 412 decline the opportunity to translate the assigned CTUs, the assign translator module 208 may select another translator 412 to be offered the task of translating the CTU or CTUs. When assigning translators, it is understood that the workflow may include a plurality of available translators 412 at numerous remote locations.

Once selected to perform a translation task, translators may be provided detailed instructions in the form of a translation kit comprising all of the information required to effectively complete a translation task. As illustrated in FIGS. 2 and 3, and as described above in reference to FIG. 2, the translation process may utilize, for example, client-specific rules database 202, chunking rules database 204, translate assignment rules database 210, translated content library 206, translator metadata database 212 and translation support materials database 218.

Figure 18:
FIG. 18 depicts a workflow configuration summary report.
Figure 19:
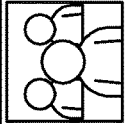
FIG. 19 depicts search results of searching for a crowd resource.

With reference to FIG. 18 there is illustrated an exemplary user interface 1800 displaying data from translate assignment rules database 210. With reference to FIG. 19 there is illustrated an exemplary user interface 1900 displaying data from translator metadata database 212.

Figure 5:
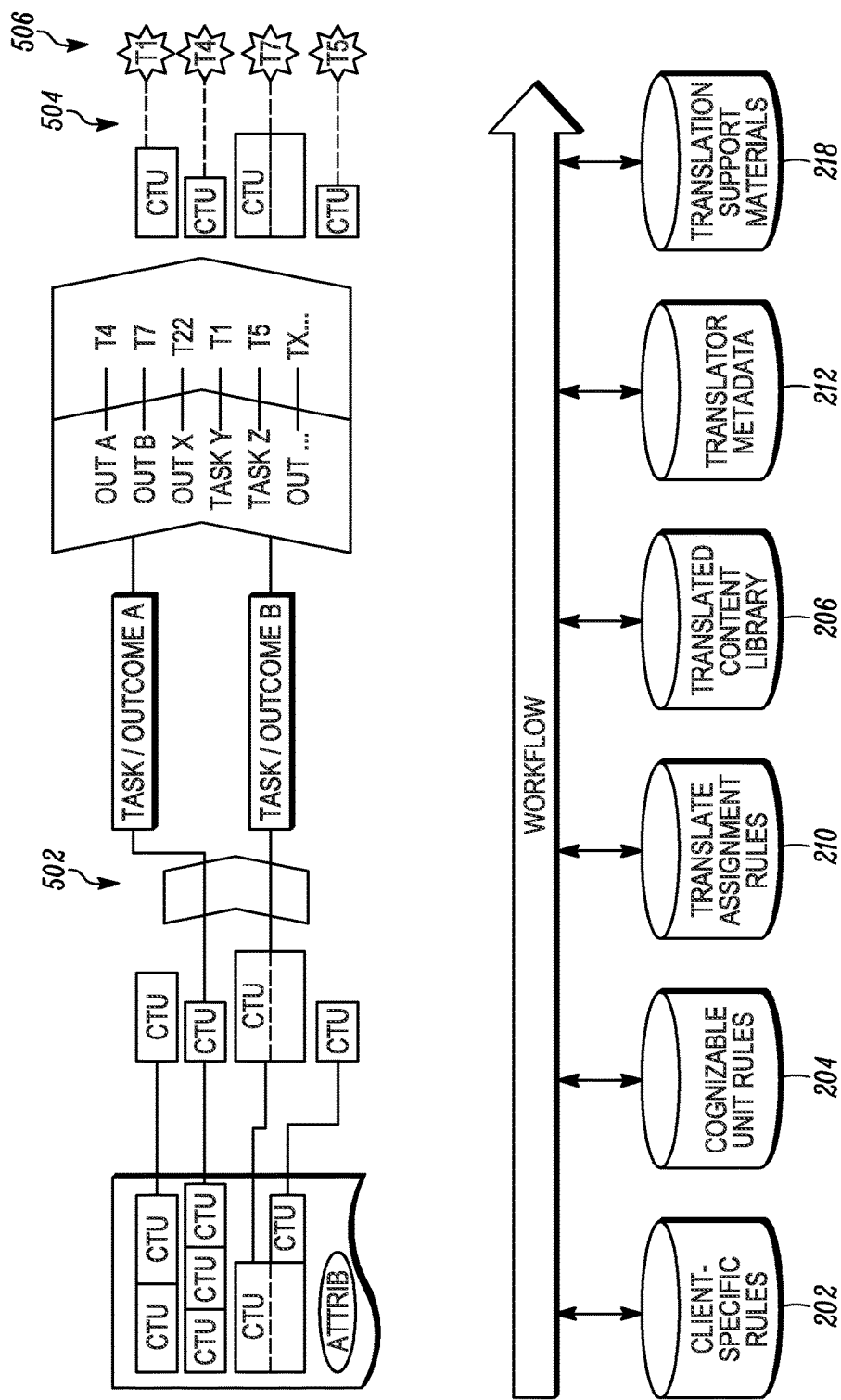
FIG. 5 depicts a flowchart of a workflow for facilitating differentiated translation based on unit-specific outcome objective and/or task parameter.

With reference to FIG. 5, there is illustrated an exemplary and non-limiting embodiment of the distribution of discrete cognizable translation units to support differentiated translation based on translation project outcome objectives. To begin, there is provided a plurality of cognizable translation units.

Next, at step 502, an outcome objective of translating at least one of the units may be determined. In accordance with exemplary and non-limiting embodiments, an outcome objective may be expressed as a level of quality for the translation, an aggregated total cost of translation for an item or source document containing the cognizable translation units, a delivery schedule, a degree of accuracy of the translation, and any other such translation outcome objective as may be determined or suggested. As such, an outcome objective may be derived for an individual CTU based upon an outcome objective attributed to a source document or task as a whole, or, conversely, may be defined on an individual CTU basis.

An outcome objective may be determined by referring to configuration and/or control data associated with a translation workflow for the item to be translated. Such a workflow may include specific outcome objectives. Alternatively, a workflow may include parameters that may indicate an outcome objective, such as a budget for translation. Outcome objectives of a translation project may be determined based on data retrievable from a client-specific rules database 202. Client-specific rules relating to determining an outcome objective may include limitations such as on use of machine translation. When so limited, an outcome objective related to cost of translation may result in routing of translation tasks to translators who can produce an acceptable level of translation quality while incurring a cost that enables meeting an overall outcome cost objective. Therefore, an outcome objective of "no machine translation" may be determined. Similarly, jurisdictional restrictions in client-specific rules may impact an outcome objective, such as "no translation to be performed by translators in specific jurisdictions" or "all translation to be performed by translators in other specific jurisdictions".

Generation of CTUs, and therefore their impact on meeting an outcome objective, may be influenced by cognizable unit rules 204. In an example, if an outcome objective is to perform translation or localization without machine translation below a total cost, CTU generation may result in smaller, simpler units to translate, thereby allowing for distribution of such units to lower cost translators.

Translation goals may comprise: quality, cost, delivery date, schedule, and the like. Cost and schedule can be measured algorithmically/automatically by accumulating all individual costs for a CTU translation and verifying that the delivery date is on time. Quality can be measured by specialized tools automatically, testing for known common mistakes for the particular target language or language direction, verifying for false friends, improper but frequently used target language constructs, inconsistent target language use and the like. Additionally, manual quality assessment may be performed by experienced translators assessing the quality of translations, and giving indicators both on issue category and issue severity, which result in a combined overall quality indicator. There are many different taxonomies and algorithms in use for this, but the ITS 2.0 standard from the W3C provides a particularly well-researched set of indicators.

FIG. 20 illustrates an exemplary computer assisted quality control output 2000 while FIG. 21 illustrates an exemplary sobs status view measuring adherence to schedule and delivery dates.

Next, at step 504, a translator for each of the CTUs may be determined based, at least in part, on the determined outcome objective. As illustrated in FIG. 5, each CTU is identified as associated with a defined outcome, e.g., "outcome A", "outcome B", etc. For example, an outcome objective for a source document may be that the completed translation of all of the component CTUs should not exceed $100. To achieve this total translation cost, each CTU may be analyzed to determine a maximum translation cost for it. Factors such as size of the CTU, technical complexity, domain specificity availability of relevant translated content in a translation content library, availability of translation support material and the like may impact how a cost objective of each CTU is determined. At step 502, described above, it may be determined that that four CTUs, comprising the whole of the source document, are to be translated such that an outcome objective for a first CTU is to translate it for $50 due to its high degree of originality, an outcome objective for a second CTU is to translate it for $25 due to its relatively small size and complexity, an outcome objective for a third CTU is to translate it for $5 due to available corresponding translated content in a translated content library and an outcome objective for a fourth CTU is to translate it for no more than $20 for a total outcome objective of no more than $100 for the entire source document.

Once the outcome objectives for each CTU are determined, one or more translators may be determined that are capable of translating each CTU while meeting the outcome objective. For example, as illustrated, translators 506-T4 and 506-T7, are qualified to translate CTUs having objective outcome A and objective outcome B, respectively. Determining which translators are capable of meeting the outcome objective may be based on analyzing translator metadata and/or comparing translator metadata to an outcome objective. Further, in the example above of a total translation cost of $100, translators who charge a minimum of $25 to translate a CTU may be eliminated from consideration for the fourth CTU that has a translation maximum of $20. In another example of determining one or more translators to achieve an outcome objective, a qualified translator for the first CTU who charges $40 may be identified, which is below the maximum translation cost for the first CTU of $50. The additional $10 from the first CTU translation cost may be used to select translators who may charge up to $30 for the fourth CTU while keeping the entire translation cost outcome objective to $100. While cost is used here, schedule may similarly be exemplified in that otherwise qualified translators who cannot provide a translation within a required time frame (e.g., the translators might be busy or unavailable) may be excluded from consideration for distribution of CTUs in a project that requires translation within a certain schedule.

Outcome objectives may be used in various ways when selecting translators. For example, pools assignment may be employed. When an outcome objective is "best time", the primary way to support the objective is to send the task to several translators in parallel, with a first come first serve approach. In other embodiments, priority assignment may be employed. When the outcome objective is "best price", the primary way to support such an objective is to send the task to the cheapest qualified translators and expand the offer to more expensive translators if no one takes the assignment. A similar approach can be taken for quality/specialization, such as when the objective is to use the most specialized translators. The assignment may be sent to a plurality of most specialized translators and then redirected to less specialized translators if needed. Priority assignment can be handled in an automated way based on a ranking of resources that can be a computed value based on resources metadata, such as may be found in translator metadata database 212 and elsewhere as described herein.

Lastly, each CTU of the plurality of CTUs may be distributed to a determined translator. As described above in the embodiment depicted in FIG. 2, the assign translator module 208 may operate to determine a translator 506 for each of the CTUs based on the outcome objective for each CTU as well as the prospective translator's ability to perform within the boundaries specified by each outcome objective as described above. After determining a translator or translators 506 for each CTU 502, each of the units may be distributed to a determined translator 506 for translating. Upon receiving one or more CTUs to be translated, a translator 506 may accept or decline the task. If accepted, the translator proceeds to translate the CTU or CTUs. Should a translator 506 decline the opportunity to translate the assigned CTUs, the assign translator module 208 may select another translator 506 to be offered the task of translating the CTU or CTUs. When assigning translators, it is understood that the workflow may include a plurality of available translators 506 at numerous remote locations.

While described above with reference to differentiated translation based on unit specific outcome objectives, there may be employed differentiated translation based, at least in part, on translation task parameters. Similar to outcome objectives described above, translation task parameters may be determined and applied to one or more CTUs with a translator being subsequently determined for each of the CTUs based, at least in part, on the task parameter.

Examples of such task parameters include wherein the task parameter is determined, at least in part, from a workflow requirement for translating the plurality of cognizable translation units. In some exemplary embodiments, a task parameter may be selected from a group consisting of a price paid for the task, a cost for executing the task, a quality level required for the task, a deadline for the task, a budget for the task, a time for starting the task, jurisdictional limits for translation, a size of the task, and the like.

Distribution of translation units may further be based on combinations of outcome objectives, task parameters, degree of difficulty and the like. Such combinations may be applied for an individual CTU, for a project, or the like. Additionally, an overall translation outcome objective may be met by selecting translators for a subset of all CTUs in a project that impacts the outcome. In an example, if an outcome objective involves overall quality achieving a certain level (e.g. 95% accuracy), once translators are selected and sufficient CTUs are distributed to achieve this outcome objective, rules for ensuring the outcome objective may be omitted or adjusted for the remaining CTUs.

Figure 6:
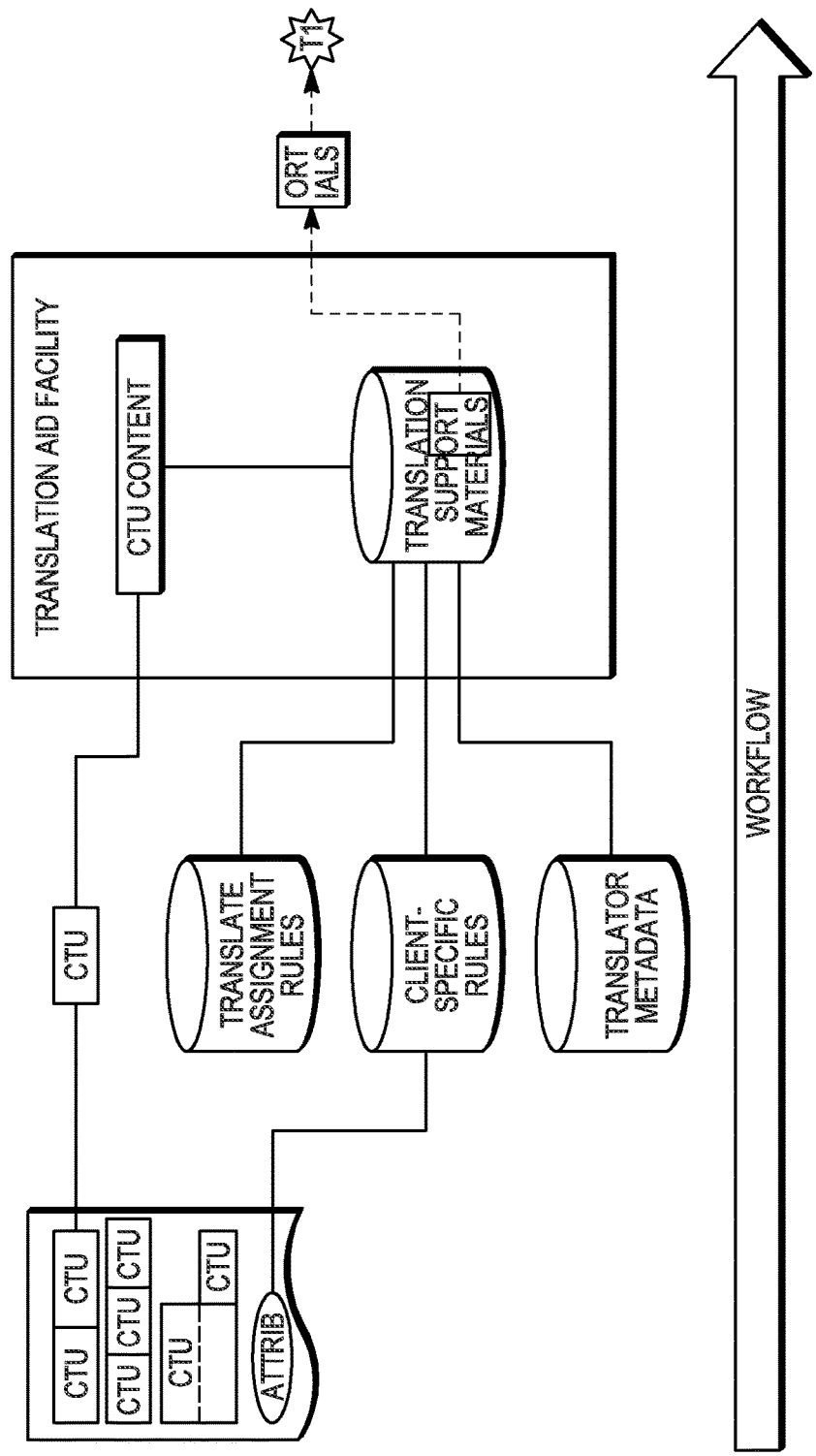
FIG. 6 depicts a flowchart of a workflow for facilitating operation with customized translation support materials.

With reference to FIG. 6, there is illustrated an exemplary and non-limiting embodiment of a flowchart of a workflow for facilitating operation with customized translation support materials. To provide customized support materials for translators, there may initially be determined at least one translation aid that corresponds to a CTU to be translated based, at least in part, on at least one characteristic of the contents of the CTU and translation requirements of a document of which the CTU is a part. Customized translation support material may be assembled based on the CTU content, translation assignment rules, translator metadata, and client-specific rules. At any given point in time during translation, a portion of the translation support materials as depicted in FIG. 6 may be made available to the translator. The portion made available may be relevant to a portion of content that the translator is currently translating.

Figure 7:
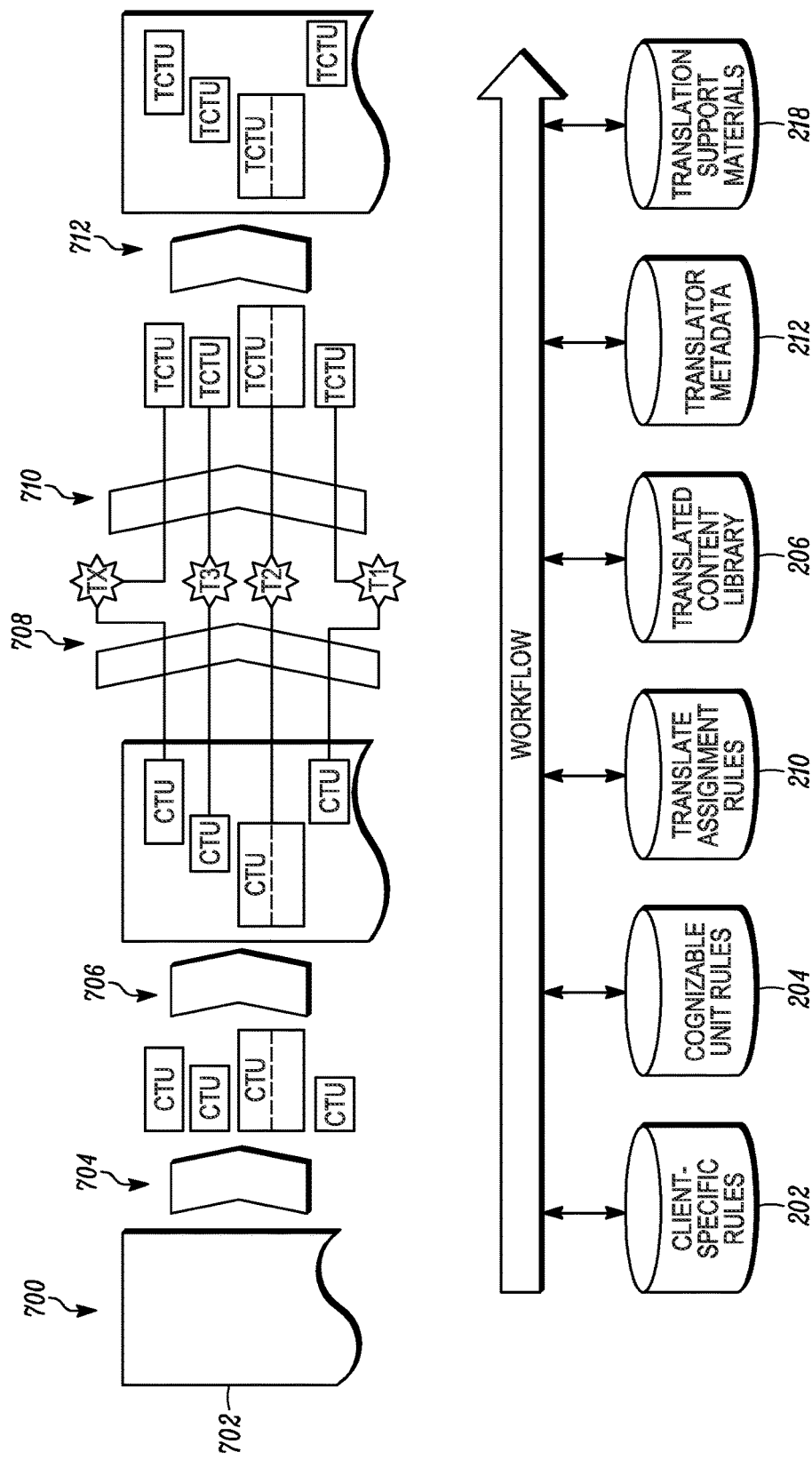
FIG. 7 depicts a flowchart of a workflow for facilitating parallel processing of task units.

With reference to FIG. 7, there is illustrated an exemplary and non-limiting embodiment of a parallel processing platform for tracking and enabling parallelized translation of CTUs, including distribution to distinct translators and merging of content into output sets.

To begin, at step 700, there is provided a source document 702 for translation. As described above with reference to FIG. 3, a source document may take many forms. At step 704, the source document 702 is broken down into one or more CTUs as described with reference to numerous embodiments described herein.

Next, at step 706, the one or more CTUs may be mapped to positions in an original document. For example, each CTU may be attributed, such as via metadata associated with each CTU, with a position in the source document using any of a number of coordinate systems. For example, a CTU may be attributed with a source document reference number identifying the source document with which the CTU is associated, as well as an X and Y coordinate attribute, section attribute, a word position attribute, an ordinal attribute (e.g., this is segment 201, which follows segment 200) or other attribute that specifies, in absolute, relative, ordinal, percentage or other units or indicators, the position of the CTU on the associated source document. In embodiments, the position of each CTU may be attributed by its relation to, or relative position with respect to other, CTUs. For example, a first CTU may be defined as being above a second CTU and to the right of a third CTU. The third CTU may be attributed as being to the left of the first CTU and the second CTU may be attributed as being below the first CTU. In this manner, when arranging the translated CTUs into a finished output document, the relative placement information so defined may be used to place each CTU at an appropriate location relative to at least one other CTU.

Figure 22:
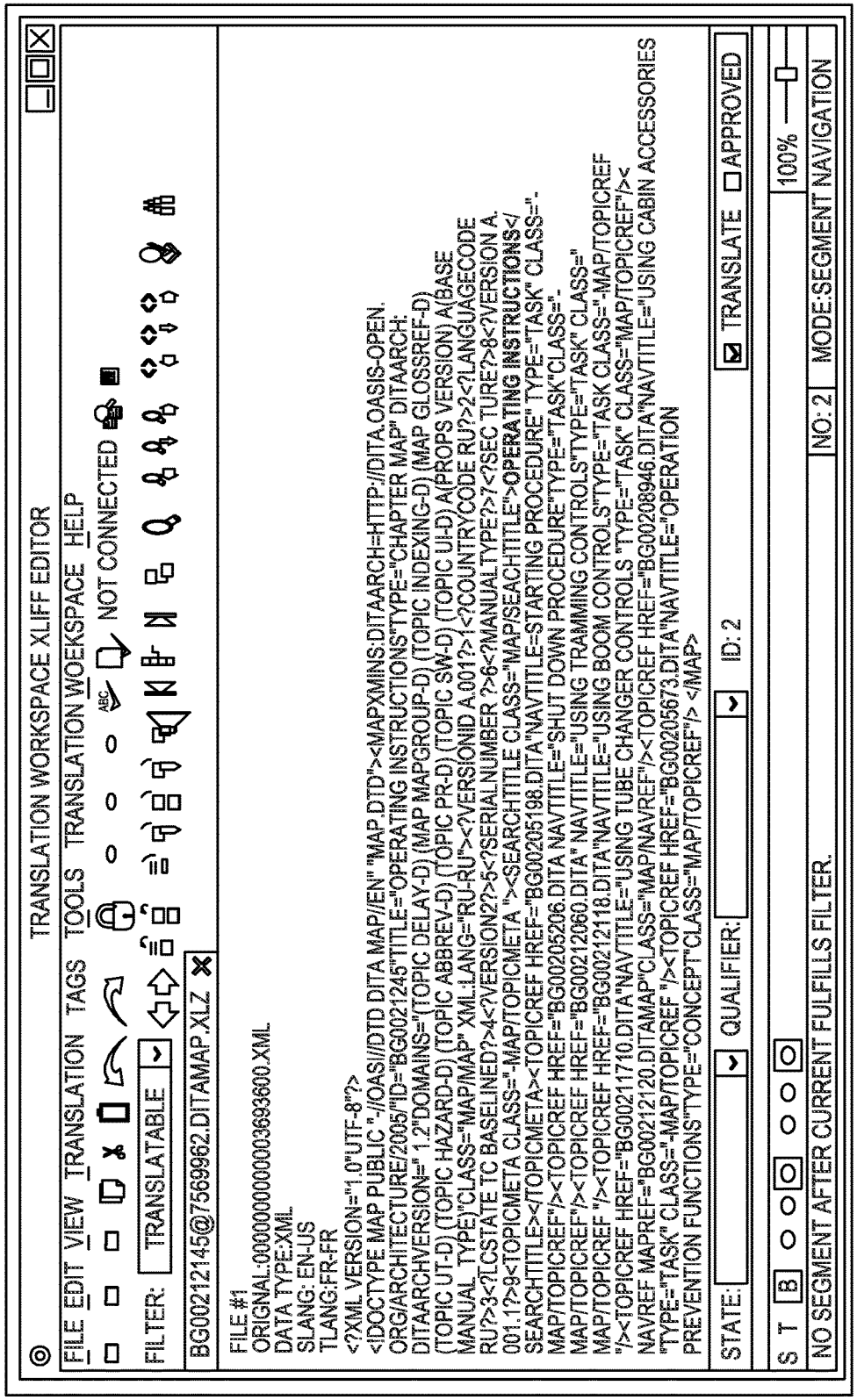
FIG. 22 depicts a screen shot of content with translatable content ("Operating Instructions") that may be highlighted.

By way of an example, a translation process may comprise the following steps. First, an original document in original format (for instance Powerpoint/PPTX, XML, HTML or the like) is received. Next, the original format is converted to a unique translation tool internal format via a process of format normalization. This translation tool format may be based, for example, on the XLIFF standard, and may enable the separation of translatable text from presentation attributes (e.g., font, style, color, etc.), storage attributes of both source and target language for each segment/CTU (e.g., source format, encoding, and the like), as well as various metadata that may be necessary for proper presentation, storage, or printing of the source or target language document. In this translation tool format the CTUs may be already (1) identified, (2) appearing in the same sequence as in the original document and (3) have an ID that facilitates the reconstruction of the original document. The document in translation tool format may be translated as a whole or as independent CTUs. After translation and quality assurance, the document is back-converted from translation tool format to original format. An example of an XML file converted to translation tool format and edited in the translation tool is illustrated with reference to FIG. 22 in which the "Title" string ("Operating Instructions") is the only translatable string in the exemplary file.

Electronically maintained documents possess an inherent, linear, sequence of CTUs, as storage typically is handled sequentially. This sequence can be used to represent the CTUs of a document in an incremental order, from CTU 1 to CTU n. Other identification mechanisms than natural increment can be used in many cases too. In today's electronic storage formats (e.g., CMS systems and the like), content units are often assigned unique identifiers natively, which can then equally be used to track the place a translation has to be reintroduced into the general structure of a document.

In accordance with exemplary embodiments, a CTU may be mapped to a plurality of discrete positions in the original document. In this manner, a CTU whose translation is to appear at more than one place in the finished and translated document need only be translated once with the embedded metadata and attributes specifying more than one place where the translated CTU is to be placed in the finished and translated document.

In embodiments, CTUs may be identified that have redundant subject matter, and each such CTU may be mapped to a plurality of discrete positions within the document that use the redundant subject matter, so that redundant items can be translated only once, but used more than once in the assembly of the finished and translated document.

Next, at step 708, a translator may be determined for each of the units based, at least in part, on a workflow requirement for translating the source document as described with reference to numerous embodiments described herein. Upon receiving back the translated CTUs, at step 710, the destination objects comprised of the translated CTUs may be assembled, at step 712, into a translated document based on the specified discrete position of each corresponding cognizable translation unit in the original source document. Metadata for each CTU may be attached, or otherwise linked, to a CTU throughout its progress through the workflow. The metadata, such as position-related metadata, may be attached or linked to a resulting translated CTU. Other metadata, such as a document identifier, project identifier, and the like may similarly be attached or linked to source CTUs, as well as translated CTUs (also referred to herein as resulting or translated objects). Through maintaining a traceable association of at least a portion of source document metadata throughout workflows for processing of each CTU, any number of concurrent translation tasks may be active within a translation system based on workflow methods and systems described herein, including architectures described herein with respect to at least FIGS. 1 and 2. In this way, parallel and asynchronous translation activity for a plurality of source documents, translation requests, and workflow activity may be enabled while ensuring a high degree of predictability of translation quality, delivery timing, cost, and a range of other desirable outcomes.

By splitting up a larger translation project (or any work) into the smallest possible "cognizable" units, and determining properties, requirements, cost and schedule parameters, then matching and assigning these parameters on the CTU level with a group of workers and their individual properties and cost and schedule, any level of quality, cost, and schedule can be matched (including matching through a range of combinations of approaches) and predicted. Even if a given combination of quality, cost and schedule cannot be achieved, this can be reliably predicted and alternative, "close" alternatives presented. The predictability stems from the fact that a summary of the properties of the single CTUs of the work task give a much more accurate and scaling image of the real efforts, and their matching with the available workers at any given time (e.g., schedule).

The CTUs of multiple projects may be merged to a total input set for translation, as there is always desired to have a logical link to the original position in a certain document through the project, document and sequence ID which are all maintained in the CTU. In embodiments, a logical link to the original position may be required. A CTU itself may exist and be tracked in multiple versions, such as the source language version, one or multiple target language versions, and different corrected versions of the target language versions. The relevant translation for a CTU identified in a source document is the CTU in the relevant target language with the latest version.

In embodiments, assembling the destination objects formed of translated CTUs into a translated document is further based, at least in part, on a syntax reference that is specific to the language of the translated document. For example, the prose forming a translated CTU may be a description of and make reference to a table appearing "below". In such an instance, care is taken to make sure that the positioning of the translated CTU and the translated CTU comprising the table are arranged as described in the text of the CTU.

In the process of conversion of the original document to translation tool internal format, one may keep a version of the original document where the CTUs are replaced with placeholders with IDs. The CTUs may be stored in a file sequentially. They can be reinserted back in place of placeholders at the end of the translation process.

While the application of translation is described herein for the methods and systems of parallel processing, such techniques may be similarly applied, including generating and handling cognizable task units in a generalized crowdsourcing business process platform. In an example, maintaining traceable metadata for a plurality of CTUs generated from a business process project request (e.g., data entry) may enable similar parallel and asynchronous business process activity for a plurality of business process requests/projects while ensuring a high degree of predictability of business process output quality, delivery timing, cost, and a range of other desirable outcomes.

In accordance with another exemplary embodiment, free flowing translation may operate at a CTU level of granularity to enable merging the translated CTUs into a translated version of an original source document. As above, a plurality of source document CTUs may be defined, with each CTU being mapped to positions in the source document. As before, a translator is determined for each of the CTUs based, at least in part, on a workflow requirement for translating the document. Each of the CTUs is then distributed to a determined translator for translating into translated units independently of the source document position of each of the CTUs. Once received back from the translators in an order of translation, the CTUs are assembled into a translated document based on the discrete position of each corresponding CTU in the original document. In some exemplary embodiments, the order of translation is independent of the positions of the CTUs in the source document. In yet other embodiments, assembling the translated CTUs into a translated document is done as each translated CTU is received. In other embodiments, assembling the translated CTUs into a translated document is done after all translated CTUs comprising a portion of the source document are received. Such portions may include the entire document, a paragraph or any other section of the source document defined in a translation workflow for translating the source document.

In the crowd platform, there may be a series of queues. Each queue is defined as the combination of a task type along with a work group (may be based on customer) and a worker or worker group (e.g., based on location, who manages them, etc.). Each worker may then be only allowed access to certain queues based on their skill sets. If a single document has different translation segments that need to be worked on by different workers, based on skill set, those segments may be assigned different task types which places them in different queues. Since workers may only access tasks in queues to which they are assigned, they only work on the proper segments. However, the system as a whole may have a mapping of the document to the segments, and when all segments are complete, the document can be reconstituted. Further, all segments from a document may receive similar priority, meaning that even if they are done by different workers in different queues, they will still be done around the same time.

In accordance with various exemplary embodiments, a supply chain management process may be modeled in many different ways. Some embodiments consist of a feedback system, which does predictions (on available resources, their efficiency, and ability to output a certain quality, and the difficulty of the work), and adjustments (looking at effective efficiency and quality) and an incremental approach to meet the goals.

In some embodiments, there is employed a scheduling engine. Scheduling is a process, which compares requirements from two different layers. The first layer is selecting resources by criteria, such as domain expertise, cost, and quality. All these criteria add a relative priority on available resources. The second layer may select transactions according to criteria such as difficulty, frequency, length, delivery date, similarity, and quality. These criteria add a relative priority on available transactions.

With regard to the second layer, the scheduling engine knows different scheduling modes. These can be combined, as different batches and projects might require different strategies. Also, it is assumed that the modification and introduction of new scheduling modes will be a constant process. All of the second layer modes will try to be translator-sticky, that is, not changing translators for a specific sequence. They will also try to be batch and domain sticky, as changing context results in causing an additional effort for the translator and subsequent throughput reduction. The delivery date is an increasingly strong prioritization factor the closer the date gets.

Implemented modes may include:
1. Group sequential—this is a representation of the traditional file-based approach, where one user equals one file (or a larger chunk of it). It may be desirable for high quality batches that do not contain sensitive or confidential information.
2. By difficulty, length, and quality—representation of different quality levels.
3. By similarity—it is possible to create a similarity-sorted sequence of segments. As sorted sequences by even less perfect algorithms have shown, this increases throughput significantly.
4. Semi-manual—operators can pool translators with preference adjustments. This will not guarantee the use of a certain translator, but it will make it much more probable that it will be assigned.

The scheduling engine may be self-adjusting on throughput and quality estimations. This may be achieved by constant monitoring in real time or near real time of the transaction frequency and quality assessment of the different users. Schedules are constantly compared with delivery dates, and excess dates are flagged and notified immediately, so that re-staffing or re-negotiation on deliveries can take place.

In embodiments, manual intervention may be reserved for when delivery dates are likely to be missed. As the system preferably does not overlook potential factors for prioritization in a resource conflict (bad publicity, client reputation, contractual obligations, etc.), selected arbitrators may be allowed to reallocate resources to batches and projects.

Figure 9:
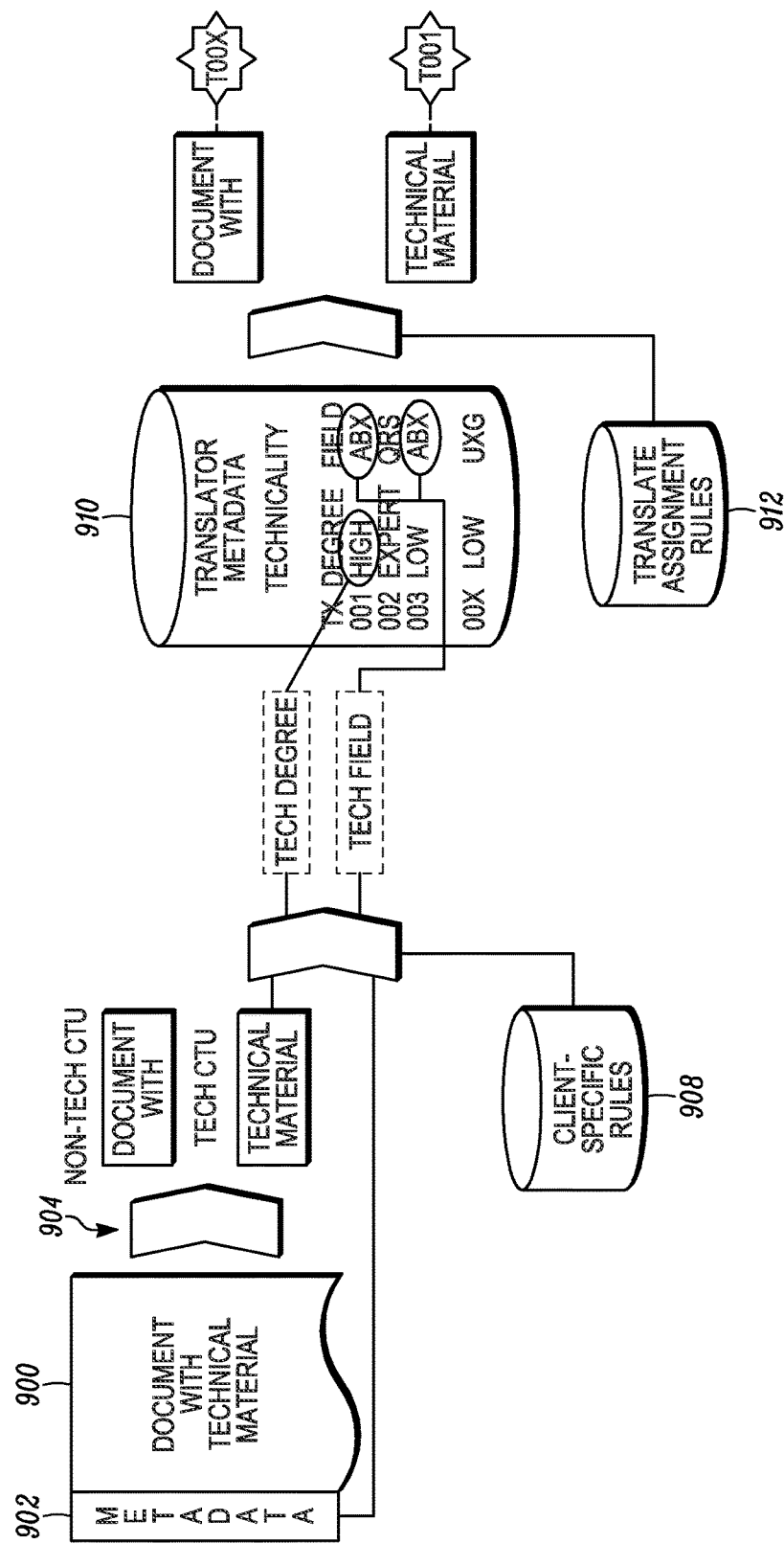
FIG. 9 depicts a flowchart of a workflow for matching units for translation with relevant technical expert translators.

With reference to FIG. 9, there is illustrated an exemplary and non-limiting embodiment of a method for matching CTUs to translators based, at least in part, on a degree or measure of domain specificity of a CTU. As illustrated in FIG. 9 and described below, domain-specific CTUs may be matched to translators with relevant domain expertise while non-domain-specific CTUs may be matched to any translators.

As illustrated in FIG. 9, a source document 900 comprises both domain-specific material and other material. The document 900 may also contain metadata 902. Alternatively, the metadata 902 may be associated to the document 900 as part of submitting a request to translate the document 900. This association may be explicit (e.g., a user enters the metadata or a reference to the metadata directly when submitting the translation request) or implicit (e.g., a metadata access client-specific rule 908 may indicate how to access the metadata). In embodiments, metadata may comprise statically stored and/or dynamically generated or computed information or data (such as from content) describing the domain-specific or other nature of a portion or portions of the source document 900. For example, a portion of the metadata 902 may be created via the application of an algorithm to determine a portion or portions of the source document 900 as pertaining to a specific domain, such as a result of using terms that are identified in domain-specific dictionaries, using terms that have low frequency in general language use, or the like. In yet another embodiment, an individual such as, for example, a drafter of a portion or portions of the source document 900 may identify, broadly or specifically, content comprising domain-specific material. The metadata 902 may also indicate that a document, such as the document 900, should be evaluated for a measure of domain specificity. This may be helpful when a user may not know the nature or exact location of the domain-specific content but may otherwise be informed that a submitted document may contain such content that needs to be evaluated to determine a measure of domain specificity.

As discussed above, the domain of a source document, or parts of it, can be determined by terminological analysis of the content. A domain is called a domain because it has its own domain of terminology, which, although overlapping with other domains, can be detected given enough input samples are available. Another means of determining a domain can be annotations made by e.g. the author of the text, e.g. in the form of ITS 2.0 domain indications.

At step 904 the source document 900 may be analyzed for the purposes of determining portions that might be domain-specific. This analysis may be useful in generating CTUs for translation that can be readily characterized as domain-specific. As a result of analysis step 904, the source document is broken into CTUs wherein at least a portion of the CTUs are identified as comprising non-domain-specific matter or, conversely, some domain-specific matter. The decision as to whether to analyze a CTU may be based on the metadata 902. If the metadata 902 indicates that an introductory portion of the document is not domain-specific, then the CTUs in this portion may not be analyzed for domain specificity. If the metadata 902 does not distinguish which portions of the document may be domain-specific, then each CTU may be analyzed for a measure of its domain specificity. In accordance with exemplary embodiments, one or more aspects of each CTU to be translated may be analyzed to determine a degree of domain specificity of the CTU. As described above, one aspect of the process may be derived from the metadata 902. A measure of domain specificity may be automatically generated, semi-automated, manually generated, and the like, such as by recognizing relatively high frequency of use of terms that are known to be part of a domain. Automatic or semi-automatic domain specificity measuring may be done when an algorithm may be applied, such as by a computing machine, to determine a degree of domain specificity for each CTU. Semi-automated or manual measurement of domain specificity may include a human reviewing each CTU and classifying each CTU according to a numerical system wherein a score or ranking is assigned to each CTU reflecting either a relative or absolute degree of domain specificity. In any event, the degree of domain specificity so determined may be compared to a domain-specific content threshold value to determine, among other things, additional processing for the CTU.

For each CTU that exceeds the domain content threshold value, at least one of the contents of the CTU or the measure of the degree of domain specificity of the CTU may be processed to determine a domain field of the unit. Such processing may make use of the metadata 902, the actual content of the CTU and, for example, data retrieved from the client-specific rules database 908. For example, a client defined rule accessed from the client-specific rules database 908 may instruct that any CTU comprised of a mathematical symbol, such as an integral symbol, be classified as belonging to one of the fields of mathematics, physics, economics, or the like, and other words can determine which of those fields is most likely. Similarly, a client defined rule accessed from the client-specific rules database 908 may instruct that any CTU comprised of a periodic table identifier, such as Au, H, Ti, Mo and the like, be classified as belonging to the field of chemistry. Metrics may be derived from the content of the CTU that are indicative of a field to which the CTU belongs. Sources such as dictionaries, third-party references, technical publications, publication abstracts, technical or scholarly publication metadata, and the like may also be used to facilitate determination of whether a portion of a document submitted (e.g., a CTU of the document) contains domain-specific content. When metrics of the source document appear to correlate to terms in these sources, the source document may be determined to be of a domain-specific nature.

However derived, once determined, both the measure or degree of domain specificity and the field of each CTU may be utilized to identify a suitable translator based, at least in part, on a comparison of the field of the CTU and translator field-related expertise as derived or accessed from the translator metadata database 910. As illustrated, a database in the translator metadata database 910 records, for each translator, a degree of domain specificity for each translator in each of various fields. For example, as illustrated, translator "001" possesses a high degree of acumen in field "ABX". Conversely, translator "003" possesses a low degree of acumen in field "ABX" while translator "002" possesses an expert degree of acumen in field "QRS" and translator "00X" possesses a low degree of acumen in field "UXG".

Using such data, as well as, for example, rules derived from the translate assignment rules database 912, each domain-specific and non-domain-specific CTU may be assigned to an appropriate translator. For example, as illustrated, the non-domain-specific CTU may be assigned to translator T00X resulting, in part, from a rule, that, whenever possible, non-domain-specific CTUs should preferably be assigned to translators with less domain-specific acumen. As further illustrated, the domain-specific CTU may be assigned to translator T001 resulting, in part, from a rule that, whenever possible, domain-specific CTUs should be assigned to an available translator with the most acumen in the field to which the CTU belongs. In addition to these exemplary assignments, other factors may override translator assignment so that a lower cost translator who has a modest degree of acumen in a field may be chosen over a more expensive translator who has a high degree of acumen in the field. Selection of one or more translators based on measures of domain specificity of a source document or CTU using the methods and systems described herein may, therefore, be combined with other translator selection techniques for various purposes including, without limitation, cost management, profit management, translator reward, translator incentives, schedule management, translator workload leveling, and the like.

Figure 10:
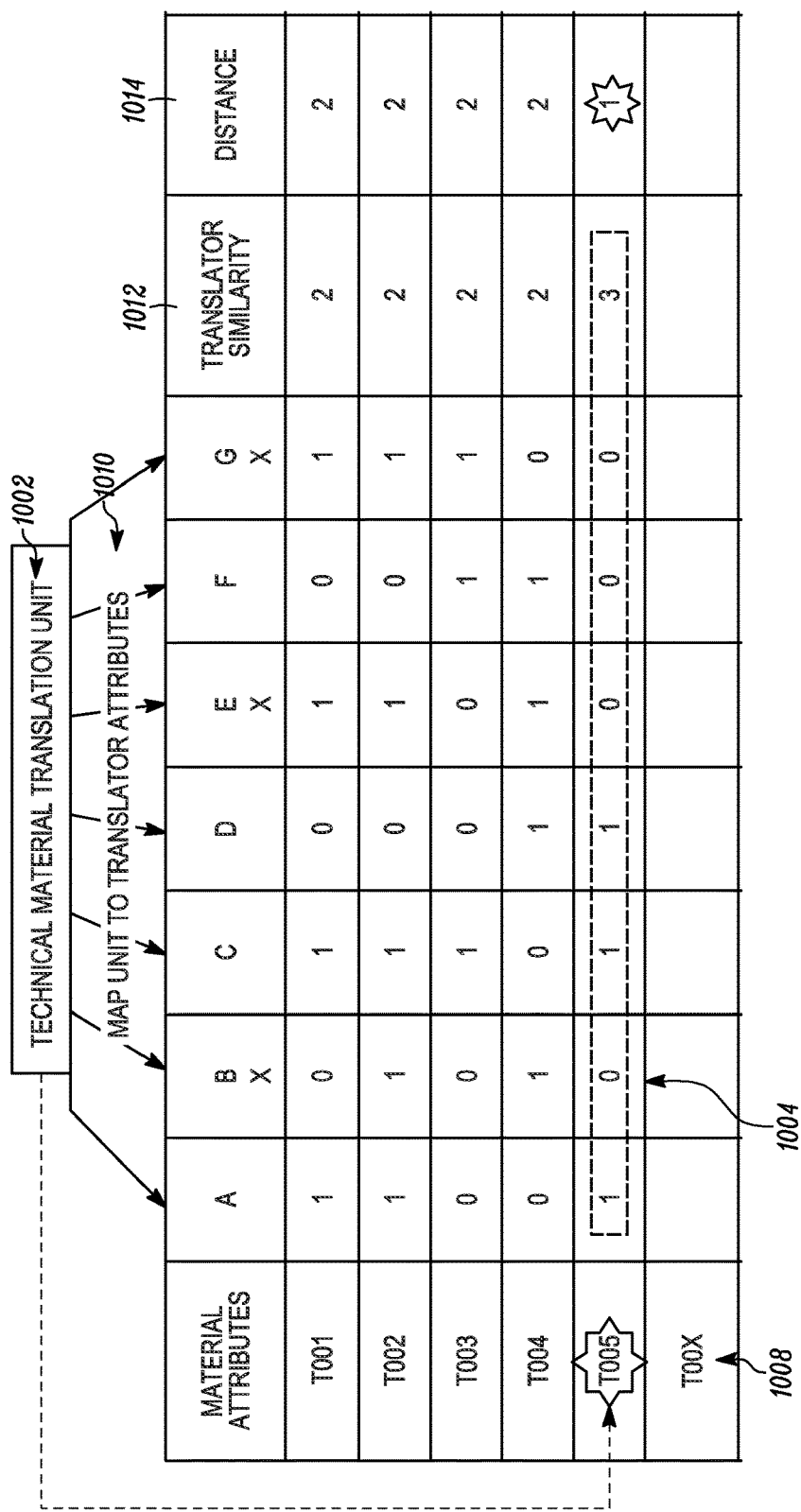
FIG. 10 depicts a translator matching table based on translator and content attributes.

With reference to FIG. 10, there is illustrated an exemplary and non-limiting embodiment of a method for routing CTUs based, at least in part, on a best match of a translation object, such as a CTU, to a resource or translator based, at least in part, on similarity distance between translation CTUs and translator attributes. In addition to the matching of acumen amongst translators with the requirements of translating individual CTUs as depicted in FIG. 9 and its accompanying description, various other attributes of translators may be considered.

First, there is provided as input a domain-specific material translation unit 1002 to be translated, such as a CTU, at the top of FIG. 10. Next, there is accessed data, such as from, for example, the translator metadata database 910, indicative of translator attributes 1004. The translator metadata database 910 may comprise at least one of a relational database, an SQL database, an object-oriented database, a NoSQL database, a NewSQL database, and an XML database. In addition to the matching of acumen amongst translators with the requirements of translating individual CTUs, various other attributes of translators may be considered. Translator attributes 1004 may include, for example, error rates or other indicators of overall translator quality for a particular area of expertise, previously displayed competence in a field of expertise and the like. Such attributes may assume a normalized or scaled value or, in embodiments, such as the one illustrated, may assume a binary value indicative of possessing or not possessing an attribute. As illustrated, each of five exemplary translators 1008 have associated binary values indicating the possession by each translator 1008 of each of seven attributes 1004, namely, A, B, C, D, E, F and G. For example, as illustrated in FIG. 10, translator T001 possesses attributes A, C, E and G while translator T005 possesses attributes A, C and D.

The inputted translation unit 1002 may be mapped 1010 to an attribute vector representation wherein each of the attributes required for translating the CTU is identified with dimension length of one. In the illustrated example of FIG. 10, the vector description of the requirements for the translation unit 1002 is 1, 0, 1, 1, 0, 1, 0 corresponding to a vector comprising translator attributes A, B, C, D, E, F, an G. That is to say, attributes B, E and G are not required for proper translating. Each attribute of an attribute vector representation may be indicative of a dimension of potential differentiation between the content to be translated and potential translators. For simplicity of depiction, dimensions of the attribute vector representation and a resulting vector length or distance from the material to any given translator are presented as numerical values in the table of FIG. 10. Next, a translator similarity value may be computed for each translator by summing the number of required attributes possessed by each translator and such value may be stored as translator-specific similarity indicators 1012. In the illustrated example, translator T005 possesses a similarity of three because the attributes of this translator match to three of the required attributes of the material to be translated. Note that translators T001-T004 possess a similarity of two because a translator having an attribute value of 1 that corresponds to a required attribute vector element of the translation unit counts toward the translator-specific similarity indicator for that translator and the translators T001-T004 only match two of the attribute dimensions of the material attribute vector representation. A translator attribute value of 1 that corresponds to an attribute vector element that is not required by the translation unit does not count toward the translator-specific similarity vector. In the example of FIG. 10, even though translator T002 has five attribute vector elements (A, B, C, E, and G), only two of those element vector attributes correspond to required attributes for translating as determined by the attribute vector representation of the translation unit 1002. This results in translator T002 having a translator-specific similarity indicator of 2. Also, although only seven attribute dimensions (A, B, C, D, E, F, G) are depicted in FIG. 10, the number of potential attributes associated with any translator or with any material to be translated can be larger or smaller than seven.

There may next be computed a vector difference indicative of the distance of each translator's specific similarity indicator from a translator similarity indicator of an ideal match. In the present example, a perfectly conforming translator would have each of four attributes, namely A, C, D and F. As, for example, translator T005 possesses three of these attributes, the vector difference is equal to four minus three for a resultant vector distance 1014 of one. Repeating this exercise for each of translators T001-T004 yields a vector distance of two. It is therefore evident, in the present example that translator T005, having the shortest or smallest vector distance, is typically the most appropriately matched translator for translating the inputted translation unit.

As a result, the CTU forming the inputted translation unit may be routed to a translator based on the calculated distance of the translation similarity metric with translator-specific values of the translation-specific attributes in the data store of translators. Such vector distance calculation may be repeated for a portion of all available translators to determine a subset of ranked potential translators with the translators having the smallest vector distance ranked highest. While the example of FIG. 10 depicts selecting a translator based on attribute vector distance 1014, such resulting vector may be incorporated into a translator assignment algorithm that bases assignment in part on the resulting vector while incorporating other elements into translator assignments.

Translators may be selected by properties like: domain expertise (which can be a leveled value), quality (per domain and overall, a leveled value), availability by date and span of continuous assignability (both throughout one work day and multiple days), language direction, cost (per language direction and, possibly, required quality level, domain, work type), previous assignments to the same project, throughput (even independently from cost), and the like.

Figure 15:
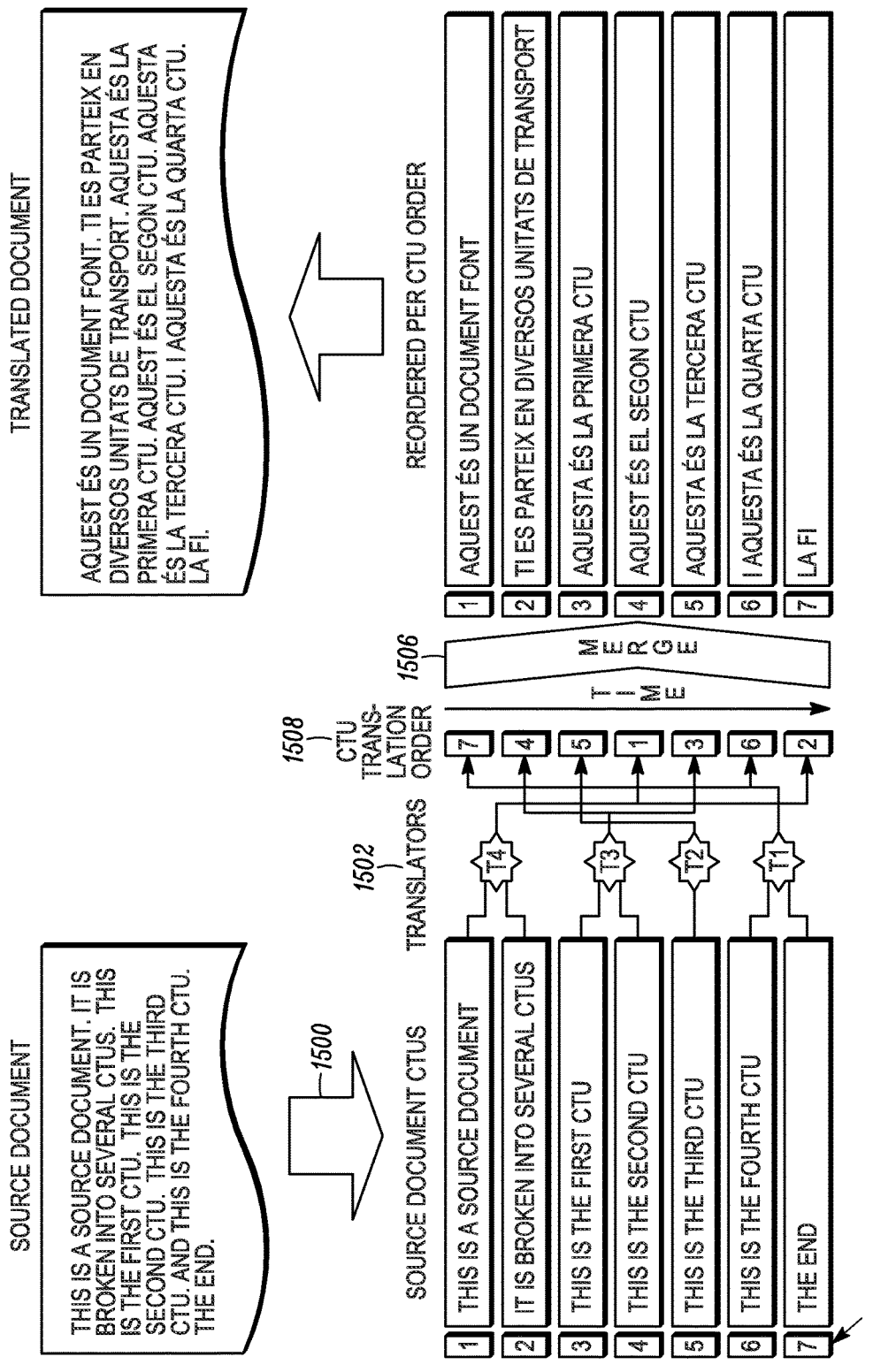
FIG. 15 depicts a flowchart for position dependent merging of translation units.

With reference to FIG. 15, in accordance with another exemplary embodiment, free flowing translation may operate at a translation unit level of granularity while facilitating merging the translated units into a translated version of an original source document. As described above and elsewhere herein for processing a source document into cognizable translation units, at step 1500, a plurality of CTUs of a source document are defined with each CTU being tagged (e.g. with metadata) to facilitate determining an order or position of each of the CTUs in a source document. Although the embodiment of FIG. 15 indicates that each CTU is associated with a single position tag, as described elsewhere herein, any given CTU may have a plurality of position tags. As described before and elsewhere for CTU to translator assignment, at step 1502, at least one translator is determined for each of the CTUs based, at least in part, on a workflow requirement for translating the document. Each of the CTUs is then distributed to a determined translator for translating into translated units independently of the discrete source document position of each of the CTUs. At step 1504, once received back from the translators in a time-based order of translation completion 1508, the CTUs are assembled, at step 1506, into a translated document based on the discrete position of each corresponding CTU in the original document.

In exemplary embodiments, the order of translation completion is independent of the discrete positions of the CTUs in the source document. Merging the translated CTUs into a translated document may be performed as shown, when all of the CTUs of the source document are completed through a translation process. However merging translated CTUs into a translated document may be done as each translated CTU is received. Merging the translated CTUs into a translated document may be performed based on completion of translation of a subset of the CTUs, such as after all translated CTUs comprising a portion of the source document are received. Such portions may include the entire document, a paragraph or any other section of the source document defined in a translation workflow for translating the source document.

Merging of translated CTUs may also be performed based on system resource and performance factors, such as access to temporary data storage for translated but unmerged CTUs, reconciliation requirements that may require merging a certain portion of the translated document before payments for services can be made, availability of automated merging processing resources, and the like. Merging may be activated for a given source document translation project based on a minimum number of CTUs being translated. Merging may be activated when a given number of proximal CTUs are translated (e.g. when 10 CTUs that appear in sequence in the source document are translated). Merging for a given CTU may alternatively be held until the CTU that immediately precedes the given CTU has been translated.

Figure 24:
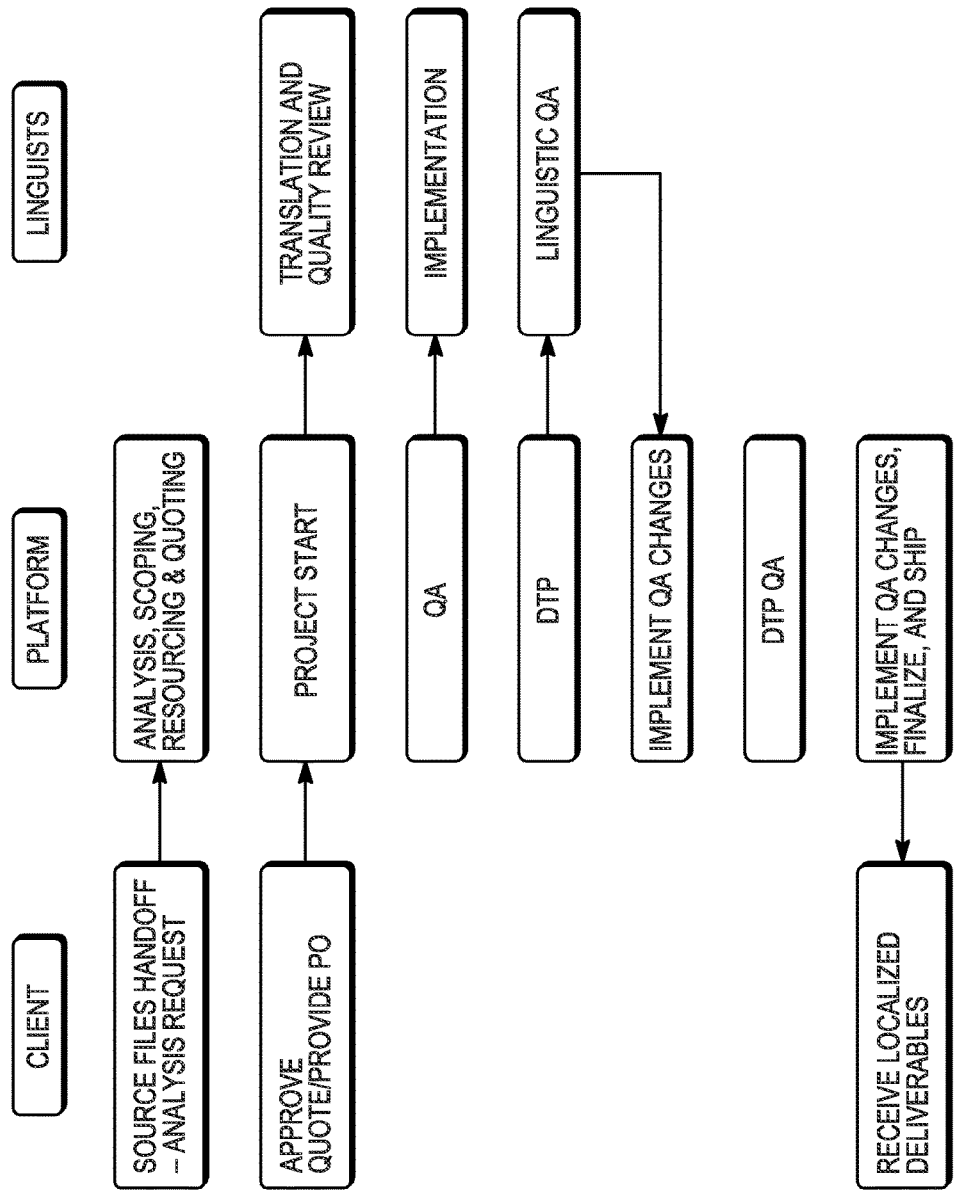
FIG. 24 depicts a block diagram of data flowing among three parties to deliver translated content.

With reference to FIG. 24, a baseline translation project process is depicted. In accordance with an exemplary embodiment, source files may be handed off by a customer to the system, optionally including an analysis request. Upon receipt by the system, there may be performed analysis, scoping, resourcing and quoting of the project with the final quote returned to the customer/client. If the customer approves the quote, the project may be started by the system. Once started, the system proceeds to distribute tasks to linguists/translators who may engage in translation and quality review, implementation and linguistic quality assurance. Next, the system may engage in quality assurance and DTP before implementing quality assurance changes and DTP quality assurance. Next, the system may implement quality assurance changes, finalize and ship the finished product to the customer who receives the localized deliverables.

In accordance with various exemplary and non-limiting embodiments of translation described above, there are provided various use cases as follow. Translation services as described above may be applied, for example, in the regulatory field in such instances as labeling, submissions, documentation, packaging and online help. Translation services may likewise be applied in the field of sales and marketing in such instances as web globalization, training, collateral, market research and branding. Translation services may likewise be applied in corporate departments in such instances as training and development, legal, human resources, call center support and intranet. Translation services may likewise be applied in clinical settings in such instances as Patient reported Outcome (PRO) Scales, International Classification of Functioning, Disability and Health (ICF), adverse event/serious adverse event (AE/SAE) and electronic patient-reported outcome (ePRO).

In accordance with various exemplary and non-limiting embodiments of crowd sourcing described above, there are provided various use cases as follow. With regard to global language and translation, crowd sourcing may be utilized to translate and adapt products and content for international markets including, but not limited to, user interfaces for software, online content, interpretation, product documentation, marketing content, training materials and customer support. With regard to global marketing operations, crowd sourcing may be utilized for end-to-end digital marketing operations, global consistency and local optimization including, but not limited to, global campaign operations/localization, program management, digital asset management, global web operations/localization, execution and publishing, global SEO and SEM and content analytics and optimization. With regard to global content and engineering, crowd sourcing may be utilized for learning development (eLearning, mobile, classroom), technical documentation authoring and maintenance, assess and certify competency levels and to improve end-customer experience and satisfaction. With regard to global sourcing and search, crowd sourcing may be utilized with professional and at-home workers in cities and markets managed as one global community, to provide relevant, real-time information to global brands who represent all consumers of online content and advertising and to improve the online experience and increases online revenues by optimizing the relevance of local content.

Part III

A. Privacy

Figure 8:
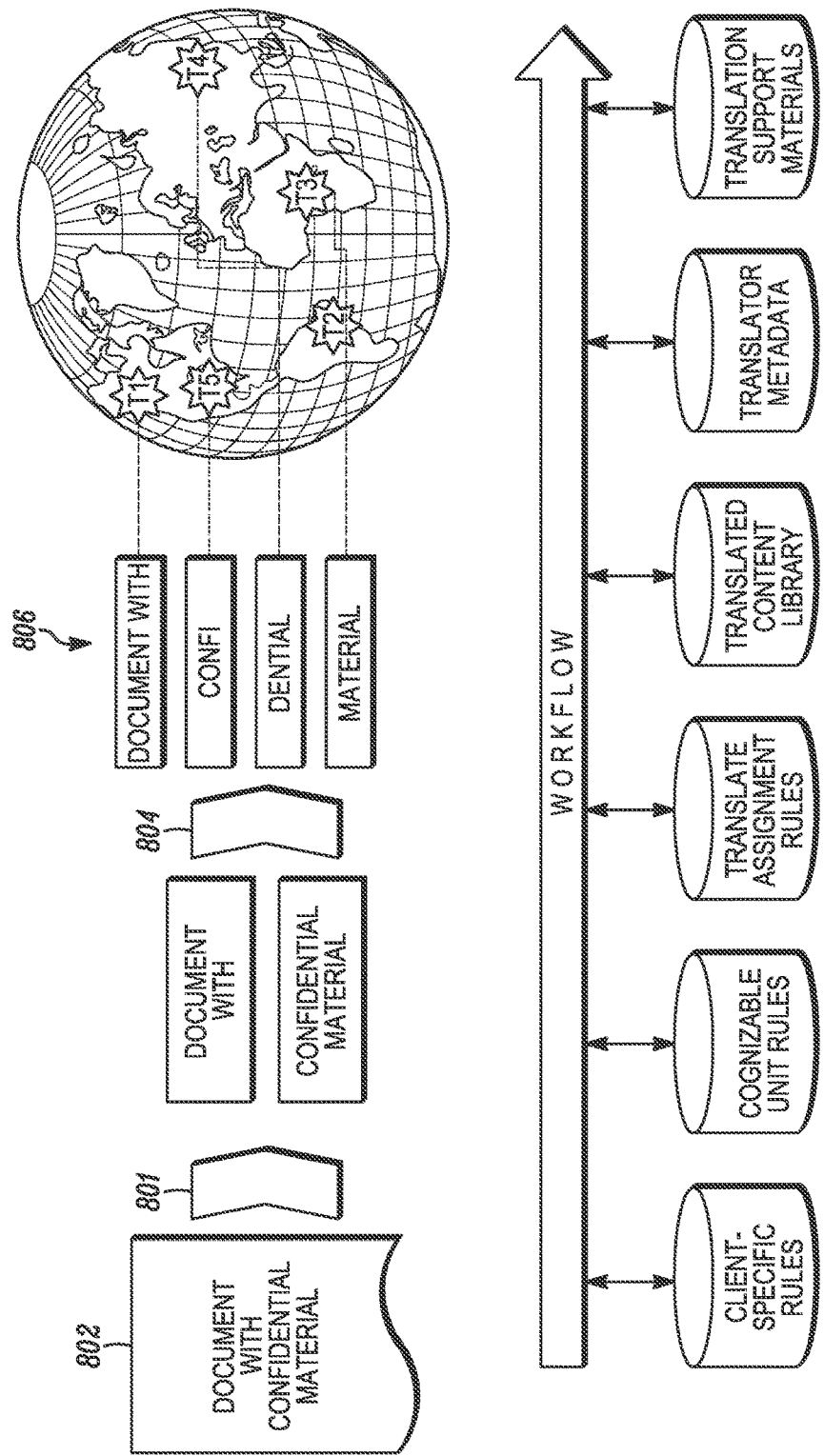
FIG. 8 depicts a flowchart of a workflow for facilitating data privacy during translation.

With reference to FIG. 8, there is illustrated an exemplary and non-limiting embodiment of a method for generating CTUs to preserve data privacy and confidentiality during translation so that no one translator sees enough of the source material to compromise the privacy and/or confidentiality of that material or any individual or entity identified in or associated with the source material.

In the example depicted in FIG. 8, there is provided a source document 802 comprised of text, data or other content that includes confidential material and non-confidential material. As used herein, "confidential material" refers to any material that the client wishes to not be disseminated in a manner that may enable one or more translators to discern a confidential aspect or the overall meaning of the material. Examples of commonly known "confidential material" may include addresses, social security numbers, bank account totals, tax return information, formula, sales plans, trade secrets, meeting attendees, agreement terms, and the like. Such confidential material may also include Personally Identifiable Information (PII). These examples of commonly known information that may be confidential are for illustrative purposes only because any portion of source material may comprise confidential material.

Next at step 801 confidential material is identified in the source material. Identifying confidential material may be performed by a human operator of a confidential information content intake facility or by automated processes, such as machine-recognizing certain formats, such as those of social security numbers, credit card numbers, or the like. The confidential material may be marked or designated as such (e.g., via a metadata tag or the like) so that subsequent steps follow the proper actions with respect to the confidential material.

Next, at step 804, the source material is separated into one or more segments (e.g., CTUs) wherein at least one CTU comprises confidential material. However, converting a portion of a source document that is tagged as confidential likely requires generating a plurality of CTUs each with only a subset of the confidential material. In the present illustration, the verbiage reading "Confidential Material" represents that portion of the source document 802 comprising confidential material. As illustrated in FIG. 8, the confidential portion of the source document is divided into three CTUs each represented by a portion of the confidential material, namely, "confi", "dential" and "material". This is merely meant to illustrate that the confidential material may be broken into various CTUs such that the overall meaning of the confidential material is not possible to ascertain based on viewing any one of the chunked CTUs. For example, a financial transaction record may be identified as confidential material and broken down, or chunked, into three CTUs: a first CTU or chunk comprising transaction participant name(s), a second CTU or chunk comprising a transaction amount and a third CTU or chunk comprising the transaction account information. In an alternative embodiment, the transaction account information may be further chunked into separate CTUs for each transaction account. Likewise, a social security number may comprise a single CTU or may be chunked into a plurality of CTUs.

In some exemplary and non-limiting embodiments, chunking confidential material may be automated. The format of transaction account information, telephone numbers, social security numbers and the like may generally be fixed and may be identified through the application of automated algorithms. In other embodiments, a workflow requirement may specify words or subject matter that are to be considered confidential material. For example, a client may specify that information pertaining to the "Northeastern real estate deal" is confidential. As a result, material from the source document 802 comprising any of the terms "Northeastern", "real", "real estate" and "estate", or appearing in proximity to such terms, may be deemed confidential. Such information may be chunked, for example, at the paragraph, sentence, word and even sub-word level so long as context and inherent meaning is not compromised. For example, "Northeastern" may be chunked into "North" and "eastern" so long as such chunking does not violate the meaning of Northeastern. If, for example. "Northeastern" merely indicates a compass direction, then sub-word chunking seems acceptable. However, if "Northeastern" is a name of a real estate transaction company or a deal name, then sub-work chunking would not be acceptable. Context alone may facilitate such an automated determination, although other information, such as metadata that indicates that "Northeastern" should not be chunked may also be used for automated processing.

A client or other human operator or user may designate selected portions of the source document 802 as confidential. Such designations may be based, at least in part, on a client's subjective desire to designate a portion of the source document 802 as confidential. Conversely, such determinations may be rule-based and implemented by the human operator.

A hybrid form of confidential material chunking may be employed wherein human-based determinations serve as the basis for subsequent machine-based confidentiality determinations. For example, expert systems may be employed which use human-based designations as input for a machine learning process. Over time, the machine learning process functions to effectively mimic or mirror the actions of a human with regard to identifying and designating portions of the source document 802 as confidential. In some embodiments, CTUs are each assigned a confidentiality factor attribute value indicative of an absolute or relative degree of confidentiality of the CTU.

Once chunked, at step 806, any CTU or discrete segments of any CTU with a confidentiality factor attribute value that exceeds a document-specific confidentiality threshold may be distributed to one of a plurality of distinct determined translators such that any specific determined translator receives only a portion of the discrete segments so that the translator cannot determine the confidential aspect of the information from the received portion of segments. Typically one segment is provided to each translator. Distribution for maintaining confidentiality may be further enhanced so that the confidential material is distributed for translation to workers in different geographic areas; thereby reducing the likelihood that these workers can readily collude to decipher the overall meaning of the confidential information. In some embodiments, each translator is geographically separated from all other translators. In an example of geographically separated translators, FIG. 8 depicts translators T1-T5 as being remotely located from each other. In accordance with exemplary embodiments, document-specific confidentiality thresholds may be adapted to classify the type of source document. For example, a client's marketing document may have a lower confidentiality threshold value than a client's internal sales reporting document.

In yet other embodiments, once confidential information is identified in a source document, the source document may be divided into a plurality of CTUs, wherein the CTUs are sized to reduce the ability of a translator or other person to discern the substance of the confidential material from a single CTU. Confidentiality of information may also apply to task unit distribution so that a single worker (or group of proximally located workers) can perform the required business process task without having any substantive ability to determine any context for confidentiality of any other task or an overall business process project.

In some instances, determining a maximum size CTU to maintain confidentiality may be influenced by the presence of non-disclosure and/or confidentiality agreements with workers. If a worker with a proper non-disclosure and/or confidentiality agreement can be determined to be accessible for translation (e.g., the worker is qualified for domain, cost, quality, and any other parameter or group of parameters), generating of CTUs to ensure confidentiality may be relaxed or eliminated altogether. Therefore, not only is the subject matter to be translated and the client requirements or objectives of translation considered when generating CTUs, worker parameters, such as those accessible in a worker metadata database 212 may be factored into a CTU generation algorithm. In other instances sensitive terms such as proper names may be replaced with immutable placeholders. This may also impact how CTU generation may be performed. It is noted that, in some instances, shortening the length of a CTU below the limit of a sentence or different concatenated phrases of a sentence may not work linguistically for translating. For example, splitting NORTH WEST into "NORTH" and "WEST" may not work in practice.

B. Rule-Based Routing

Figure 11:
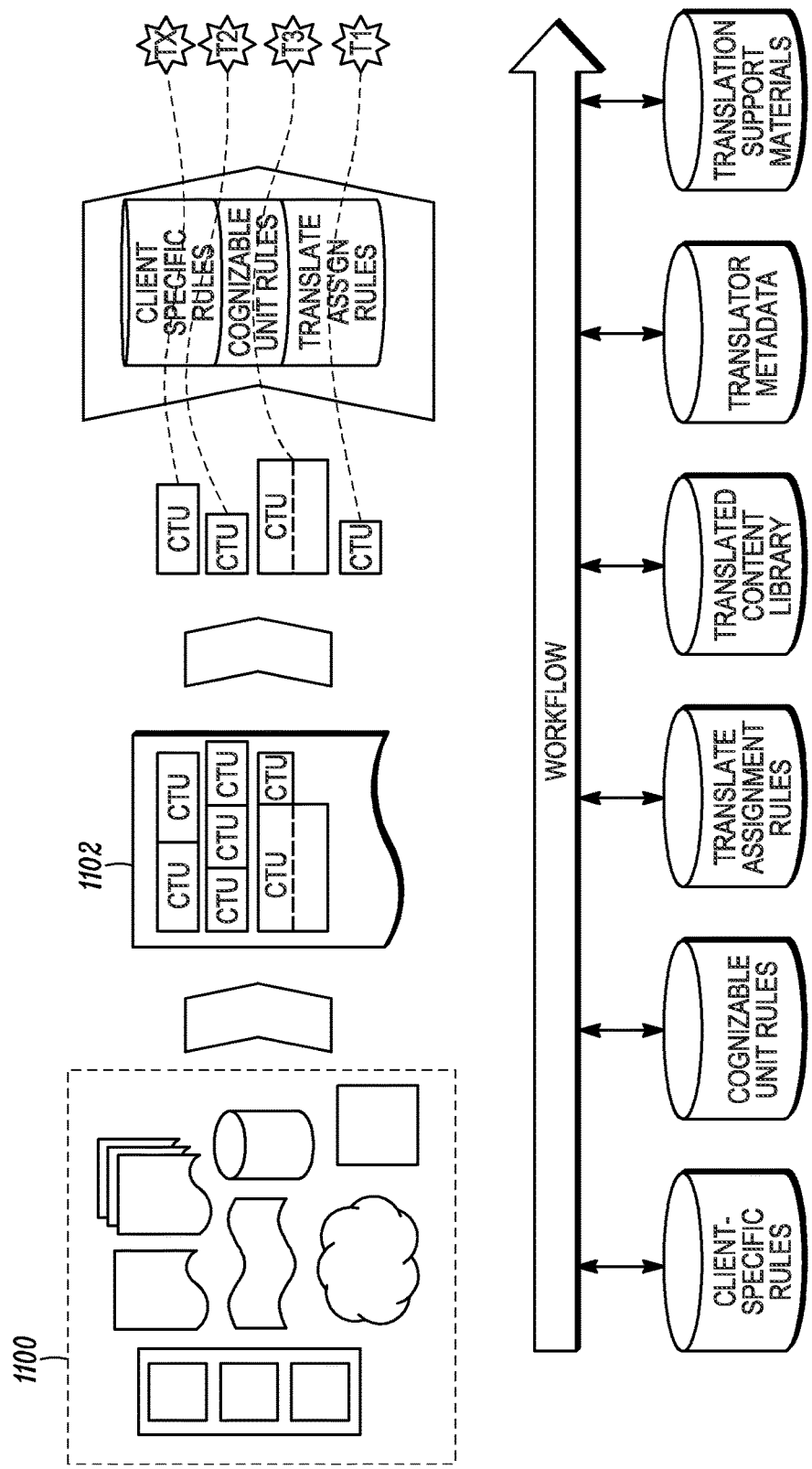
FIG. 11 depicts a flowchart of a workflow for routing content to be translated to translators based on a set of smart rules.

With reference to FIG. 11, there is illustrated an exemplary and non-limiting embodiment of a method for intelligent routing of distributable chunks (e.g., cognizable translation units) of translation material based on logical rules. To begin, there is provided a source item 1100 for translation. As described above with reference to FIG. 3, a source item 302 may take many forms. The source item 1100 depicted in FIG. 11 may take any of the source items 302 forms, as well as others not specifically enumerated herein but otherwise familiar to one knowledgeable in the state of the art. At step 1102, the source document is broken down, via at least one process of chunking or segmenting into a plurality of discrete CTUs. As described above and elsewhere herein, the division of a source document or other content item 1100 into one or more CTUs may be accomplished in accordance with numerous exemplary and non-limiting embodiments. While breaking down a source document is described as a step in the embodiment of FIG. 11, such a step may be optional and may not be required, such as if at least one CTU is made available to be processed in the remainder of the steps, beginning with step 1102.

At step 1102, a translator for each of the CTUs may be determined based, at least in part, on one or more predetermined rules for translating the document. Such cognizable rules may be retrieved or extracted from, for example, the client-specific rules database, the cognizable unit rules database and the translate assignment rules database. Such rules may be provided as part of a workflow for translating any specific document or CTU. Rules for determining a translator may also be provided as metadata associated with a CTU to be translated. Likewise, system-level translator determination rules may further be provided, such as if access to certain translators in certain jurisdictions is temporarily curtailed due to jurisdiction-specific system outages, export restrictions, government actions, and the like.

For example, a client-specific rule may specify that only a translator that has previously worked on translating other tasks for the client is eligible to translate any CTU comprising a part of a current source document 1100. As yet another example, a client-specific rule may specify that only a translator having a predefined level of security clearance vis-à-vis the client or greater is eligible to translate any CTU comprising a part of a current source document 1100.

Likewise, a cognizable unit rule may specify that if a CTU exceeds a predefined length limit, the CTU may only be translated by a translator having at least a predefined experience level. In a similar fashion, a cognizable unit rule may specify that a CTU bearing a determined degree of similarity to another CTU should be translated, if possible, by the same translator.

In yet other exemplary embodiments, a translate assignment rule may specify that all CTUs pertaining to a particular domain be preferably assigned to a translator having a requisite degree of domain expertise. In another embodiment, once a translator has translated a CTU that contains certain confidential information (such as if the translator is authorized to know that information), other CTUs containing the same confidential information may be routed to that translator.

In some embodiments, it is possible that the dictates, requirements and/or suggestions embodied in cognizable unit rules, client-specific rules, translate assign rules, and other sources of rules may conflict with each other when selecting a translator for a CTU. For example, a client-specific rule requiring a certain level of security clearance for a translator may prove incongruent if a CTU to be translated for the client requires proficiency in a specialized field and the only available translator in the field lacks the requires security clearance. In such an instance, constraints imposed by the cognizable unit rules, client-specific rules and translation assignment rules may be relaxed in order to determine a translator for translating the CTU. Such a relaxation may proceed in a predefined or default order. In some embodiments, the default order for relaxation of rules may be predefined by the client. In other embodiments, when such incongruities arise, the client may be dynamically queried to choose which constraints are to be adhered to when determining a translator. Such dynamic querying may allow the client to interactively choose different rule constraints on a CTU-by-CTU basis in order to arrive at a set of rule constraints that is appropriate for assigning each CTU. In various exemplary embodiments, determining a translator relies upon at least two such logical rules.

Rules for translator selection may define a range of criteria that must be satisfied for a translator to be selected. Such rules may be satisfied by comparing rule criteria with translator-related information, such as translator information that is accessible in a translator metadata database that is described herein. Additionally, satisfying a translator assignment rule may be conditionally met through a combination of actions. In an example, a client-specific rule may require that a translator have a minimum amount of prior experience with the client or that a translator must pass a test regarding the client. In another example, a dual state of translator topic proficiency may be specified so that a highly proficient translator may be preferred, but a less proficient translator may be selected if translation support material that is pertinent to translating the particular CTU is available to the translator. In another example, a translator who does not have a sufficient degree of domain-specific proficiency may be selected if the translator agrees to receive a lower rate in exchange for receiving training, such as through having a more experienced translator providing feedback on his/her translated work output. All of these conditional criteria may be present in the client-specific rules and another source of rules used for translator selection.

Next, having determined a translator for each CTU, each of the CTUs may be distributed to at least one translator as described herein.

Various exemplary algorithms may be employed to distribute CTUs for translation. For example, to route a CTU to a cost effective qualified resource, for each CTU, one may check the percentage of fuzzy matching of the unit to translated content in a translation memory or database and determine the domain of the CTU (e.g., check the metadata defining the domain). If the fuzzy match is lower than a predefined translated content threshold, such as below a minimum percentage fuzzy match on a scale of 0 to 100% matching (meaning there is potentially substantive, domain-specific subject matter to translate in the unit), the CTU may be routed to translators ranked highly in the domain, (e.g., likely the best and therefore likely most expensive translators). When a fuzzy match percentage is acceptable (e.g., at or above a translated content threshold), the CTU may be routed to translators of lower rank in the domain, who are likely to be less experienced and cheaper translators.

In accordance with another example, CTUs may be routed to the most cost effective qualified resource based, at least in part, on CTU linguistic complexity. For each CTU, the complexity of the CTU may be determined, such as by checks of CTU or translation source terminology against existing complexity references, such as standard or customized dictionaries. Metadata defining a domain of the CTU may be checked. Such metadata may be CTU-specific, paragraph-specific, section-specific, or may apply to a portion of the source item from which the CTU is derived. If the complexity level is higher than a maximum linguistic complexity percentage threshold, the unit may be routed to translators who are ranked highly in the determined domain. Such a translator may be the best in the domain but may also be a high cost translator. A lower linguistic complexity determination for a CTU may indicate that the chunk may be routed to a translator of lower rank in the domain, such as a less experienced and cheaper translator.

C. Routing Based on Similarity

In accordance with exemplary and non-limiting embodiments, there is provided a method for the routing of material to be translated based on the similarity of portions of the information, such as CTUs as described herein. When applying this similarity-based routing method to CTUs, a plurality of CTUs may be determined utilizing any of the methodologies described herein. While CTU translation is used in this embodiment, the methods of similarity-based distribution for translation may be applied at various levels of granularity, including without limitation at a CTU level, at a section level, at a paragraph level, at a document level, at a project level, and the like. Next in the current example of applying a similarity-based distribution method to translating CTUs, similarity of the contents of at least a portion of the CTUs is determined. In embodiments, the degree of similarity may be based on the judgment of a human operator, such as the client. In yet other embodiments, the degree of similarity may be determined by an automated algorithm that compares the content of two or more CTUs, such as based on use of common terms (including use of common terms on a frequency-weighted basis, so that relatively rare terms, like technical terms, if used in two CTUs, increase the chances that the CTUs are deemed similar). In some embodiments, the degree of similarity may be assigned a number reflecting the degree to which one CTU resembles another CTU with the result compared to a threshold value for establishing requisite similarity. In some instances, the threshold value may be a default system value. In other embodiments, the threshold value may be client specified. In yet other embodiments, the threshold value may be determined based on workflow requirements.

In some embodiments, a document may be broken into CTUs with each CTU compared to all other CTUs of the document. The CTUs that are determined to have the closest similarity may then be grouped together to be routed to one translator, such as for purposes of productivity, greater translator satisfaction, lower translator management overhead, higher profit, and the like.

Statistics may be gathered during CTU generation and similarity detection that indicate a degree to which translation source content (e.g. a document) exhibits similarity of expression or the like. These statistics can be utilized to determine how best to address distribution of the CTUs that make up the source content. In an example, if there appears to be a high degree of similarity found throughout a document, the CTUs representing the source material may be marked for distribution across a small number of translators; thereby increasing the likelihood that a single translator receives similar CTUs.

Examples of content similarity statistics include, without limitation edit distance, fuzzy matching of CTUs, and the like. In some examples, CTUs within a certain edit distance may be grouped as similar. As used herein, "edit distance" is the difference in word(s) addition or deletion between two units. For instance "The cat is black" and "The dog is black" have an edit distance of two. In other examples, a level of fuzzy match of one CTU against another CTU may be utilized as another statistic similar to the edit distance but operating independent of word differences. For example "the dog is black" and the "dog was black" have a 95% fuzzy match relationship. CTUs with fuzzy matches above a similarity threshold may be grouped for common translator assignment.

Once one or more CTUs are determined to be requisitely similar, at least one workflow may be configured or adapted for translating the plurality of cognizable translation units so that similar units are routed to the same translators. Specifically, in some embodiments, CTUs determined to be similar to a predetermined degree may be sent to a single translator. A CTU distribution module may keep track of which CTUs are being assigned to which translators so that when similar CTUs are presented for distribution, the same translator can be readily referenced. In another example of similarity-based CTU distribution, similar CTUs may be aggregated into a translation queue for one or more workers so that the one or more workers receive the similar CTUs for translation as a series of translation tasks. In yet other embodiments, the similar CTUs may be grouped and sent to plurality of specific translators who, for example, all have experience with or are otherwise qualified to translate any of the group of CTUs.

D. Metadata

In accordance with exemplary and non-limiting embodiments, there is provided a method for: 1) associating a CTU to be translated with metadata from which may be determined a likelihood that the translated CTU will be accessed frequently and 2) assigning a translation level of service value to each such CTU.

In practice, it is acknowledged that different portions of a source document are likely to be accessed at different frequencies. For example, an abstract is likely to be read at a higher frequency than "footnote 412" at the bottom of page 327. When operating under the assumption that more frequently accessed CTUs are preferably translated at a higher quality level than those that are accessed less frequently, metadata that identifies an expected access frequency of a CTU may serve to guide a workflow so as to obtain a satisfactory translated product within defined workflow parameters, such as translation cost, schedule, overall quality, and the like. Access likelihood may be based on measurement of actual access, such as observing user access behavior for an original/source document in a viewer, browser or application and assuming a similar pattern of access will likely occur in a translated document.

First, as described elsewhere herein, a source document is broken down, or chunked, into a plurality of CTUs. There is then determined a frequency with which at least one CTU is likely to be accessed after translation. As noted above, it may be preferable to translate CTUs likely to be accessed at a high frequency at a commensurate higher level of translation service or quality. In some embodiments, the determination of a CTU's prospective access frequency may be derived, such as from a location of the CTU in the source document or based on analysis of access patterns for the source document. For example, abstracts and the introductory sections of chapters are likely to be more frequently accessed than later paragraphs or paragraphs that fall near the end of sections. In some embodiments, a position of a CTU within a source document may be determined by interpreting an index contained in the source document. For example, a source document may comprise an index that indicates that a section titled "Asymptotic Singular Decomposition Made Simple" is, for example, section 15 and begins on page 294 of the source document. This information may be utilized to evaluate an expected frequency of access of the section and/or may be appended as metadata to all CTUs derived from section 15 so as to assist when distributing the CTUs. In a related and exemplary embodiment, a position of a CTU may be identified within a section from examination of a section index.

However determined, a translation level of service value may be assigned to each CTU based, at least in part, on the expected frequency of access of the translated CTU. This level of service value may be used to intelligently route the CTUs to a translator or translators as described elsewhere herein. For example, the level of service value may be used to determine, at least in part, a required translation quality value, an acceptability of machine-only translation, a preferred translator compensation value and/or a preferred translator compensation range.

As used herein, "position" is but one means to determine frequency of access. The frequency of access is a means to determine the needed quality of translation and/or the urgency of translation. The underlying idea is that translations that are rarely watched/accessed could afford less accurate translation, such as by lower cost translators, and/or later scheduling.

In today's translation environments, it is not uncommon that parts of, for example, a website remain in the source language until actually requested by users in a particular language (or is requested multiple times in that language). Only then is translation triggered. Also, in tight time-to-market situations, only front pages (for example) may get translated before first publication with the rest remaining initially in the origin language to be replaced with translations over time.

In another embodiment, whenever a document or set of documents is broken down into CTUs, one might store metadata with the CTU defining the frequency/number of occurrences of the CTU in the document. Translating high frequency occurrence CTUs has a higher impact on a percentage of translation of the whole document and on quality of the translation in general, compared to translating the same count of lower frequency CTUs.

E. Delivery Quality Target Metric

Figure 12:
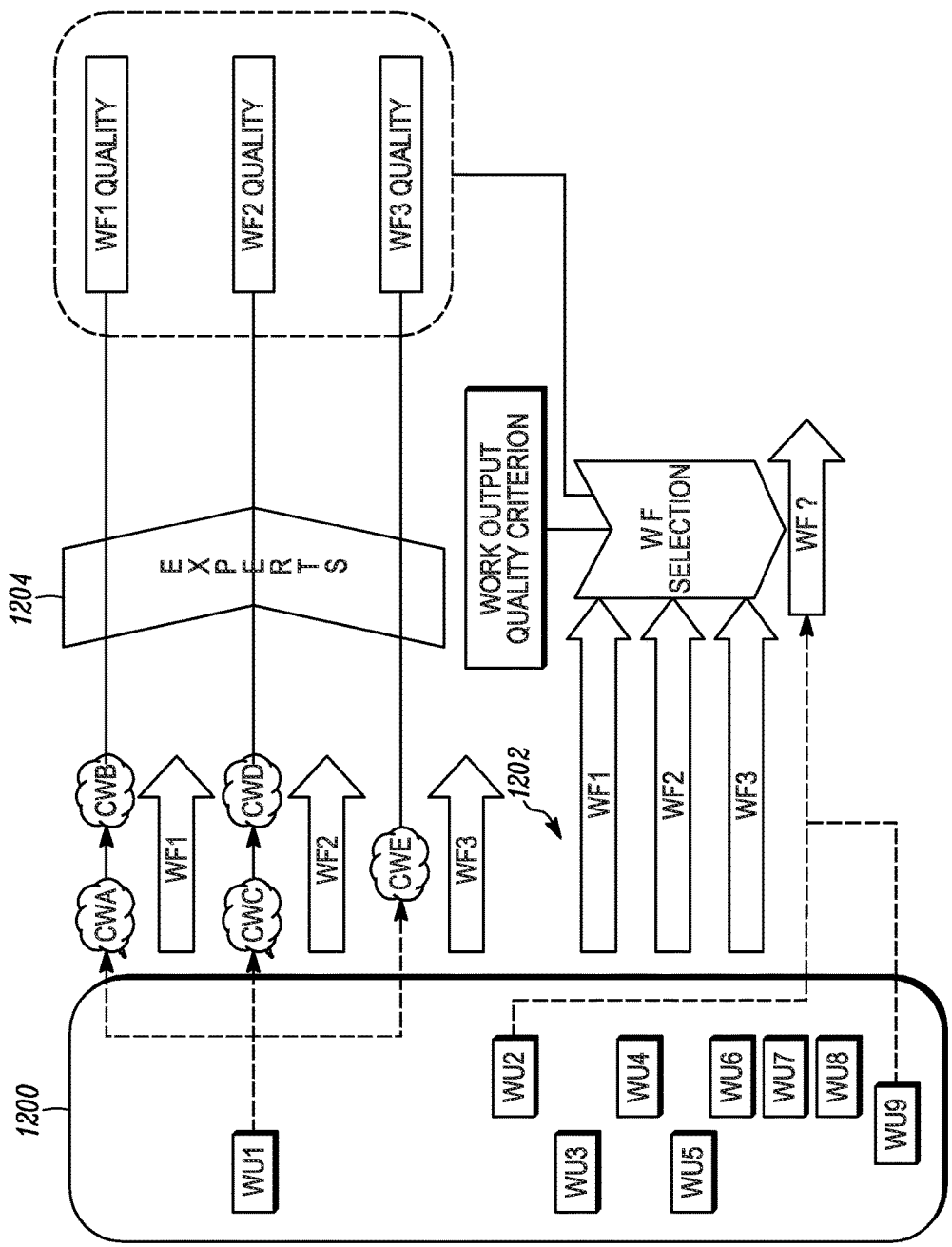
FIG. 12 depicts a flowchart of workflow selection.

With reference to FIG. 12, there is illustrated an exemplary and non-limiting embodiment of a process of task design to support multi-sourcing with expert review utilizing, at least in part, a metric of quality. As illustrated, a source project 1200 is comprised of a number of discrete tasks, or work units WU1, WU2, etc. In accordance with some exemplary embodiments, the work units WU in the aggregate, comprise all of the tasks or work required to fully complete a given source project 1200.

First, at step 1202, a plurality of test work unit task flows, or, workflows (WF), are determined for completing a project. As illustrated, a first workflow comprises actions performed to complete work unit WU1 by a first crowd worker CWA—in series with actions performed by a second crowd worker CWB. As further illustrated, a second workflow comprises actions performed to complete a work unit WU1 by crowd worker CWC in series with actions performed by crowd worker CWD. In the present example, a third workflow comprises actions performed to complete the work unit WU1 by crowd worker CWE acting alone.

The manner by which the exemplary test workflows are determined may vary. In some embodiments, the number of crowd workers engaged in series may simply be varied. In other embodiments, the identities of the crowd workers utilized for each workflow may be determined based, at least in part, on client-specific rules, the cognizable unit rules and the translation assignment rules that may be specific to the source project. In yet other embodiments, the nature and configuration of the crowd workers utilized for each test workflow may be based, at least in part, on parameters exogenous to quality such as, for example, price, speed of completion and the like.

The work unit WU1 may be processed through one or more of the test work unit task flows (e.g., WF1, WF2, WF3). Next, at step 1204 one or more experts evaluate the results of the exemplary test workflows to assess and assign a quality rating to each of the test workflows. In some exemplary embodiments, the experts may be comprised of a group of individuals. In other embodiments, the role of various experts may be performed by one or more automated systems employed to automatically assess a quality level of each test workflow. In yet another embodiment, the client may assess the quality of the test workflows. In all such instances, such assessments may be absolute measures of the quality of each workflow product or, conversely, may be relative assessments ranking each test workflow against each other test workflow.

In one example, evaluation of a workflow might comprise a linguistic quality rating, either through a) automatic quality rating, b) manual quality rating through language experts and/or c) manual quality rating through subject matter experts. Also, other objectives than quality can be measured, such as d) cost by adding the expenses for the respective workflows and/or e) schedule by verifying the time passed since feeding the WU1 until completion in the different workflows.

In accordance with some exemplary embodiments, a data research task might be evaluated by the expert doing the data research task and comparing their results to the worker results. If the worker result is close enough, the task is accepted, and if not, it is rejected. By measuring the number of accepted tasks out of the total tasks reviewed, a score may be determined for the workflow in general.

In other exemplary embodiments, a translation task might be evaluated by the expert looking at the worker's translation and scoring the translation based on how many mistakes were made, versus the length of the translation. This score as a percentage may then be averaged into the percentage score for all tasks evaluated, and a score generated for the workflow in general.

Regardless of the nature of each assessment, the outcome of the quality assessments for each of the test workflows may be combined with work output quality criterion to select an optimal, near optimal or preferred test workflow. In some exemplary embodiments, the work output criterion may comprise a threshold quality value. In some exemplary embodiments, the test workflow that most exceeds the threshold quality value is the preferred workflow. In other embodiments, attributes of the test workflows may influence the selection of a preferred workflow. For example, if, as illustrated, it is found that workflow WF 3 and workflow WF 1 each exhibit a sufficiently high degree of quality, workflow WF 3 may be selected resulting from the attribute that a single crowd worker is required to perform the workflow task. Conversely, workflow WF 1 may be chosen based, at least in part, on a determination that the volume of work to be performed when completing work tasks WU2-WU9 may be too great for one crowd worker to complete in a timely and efficient manner. As a result, in such an instance, workflow WF 1 may be selected. In yet other embodiments, acceptable test workflows may be ranked in order of preference to be utilized as discussed more fully below.

In some exemplary embodiments, workflows may either be manually assigned, randomly assigned for sampling, or based, at least in part, on a scoring metric using an algorithm based on factors described herein for workflow evaluation.

Whatever the result of the workflow selection based, at least in part, upon the quality assessments of each test workflow and the work output quality criterion, the selected workflow or workflows are utilized to perform remaining work tasks WU2-WU9. While illustrated as being performed by a single selected workflow having a predetermined acceptable quality level and meeting one or more work output quality criterion, the remaining work tasks WU2-WU9 may be performed in accordance with more than one workflow. For example, in accordance with the previous example, workflow WF 3 may be most preferred but the volume of workflow tasks able to be effectively performed by crowd worker CWE may be limited by exogenous crowd worker or workflow variables such that it is not possible or desirable for crowd worker CWE to perform all of work tasks WU2-WU9. In such an instance, perhaps, for example, work tasks WU2-WU6 may be performed by crowd worker CWE while work tasks WU7-WU9 are performed by crowd workers CWA and CWB.

F. Providing Context for Chunks

In accordance with exemplary and non-limiting embodiments, there is provided a method for providing associated context with a CTU to be translated such that the needed context is preserved for meaningful translation. In some instances, the context of a CTU may affect the manner in which the CTU is best translated. Specifically, in some instances, the emotive content and/or mood being expressed by surrounding text and images may affect the way a CTU is to be translated. References to emotive content in this disclosure should be understood to include, except where context indicates otherwise, content that conveys emotion, reflects a certain mood, conveys a certain tone, or otherwise is intended to produce specific reactions on the part of a consumer (e.g., a reader). Examples may include, without limitation, song lyrics, poetry, advertising (e.g., tag lines, jingles, and the like), editorials, persuasive essays, content with idiomatic expressions, fiction, political content (e.g., speeches), and many other types of content.

In an emotive content translation example, a CTU may contain colloquial expressions that, while not grammatically correct or capable of literal translation, should be preserved to the extent possible. In such instances, the added context may aid in translation. For example, when translating from English to French, a CTU may be comprised of the text "Oh, rats!" It is unclear when read in isolation if the quote is indicative of someone pointing to a grouping of actual rats or, conversely, if the observer is merely exclaiming frustration. When provided with context, it may be evident that the CTU reflects the latter instance. As a result, the translator may preserve the idiomatic nature of the CTU by translating it as "Oh, la vache!" The resulting translation literally means "Oh, the cow!" However, it is idiomatically equivalent to the English "Oh, rats!"

In some embodiments, the proximal portion of the source document may comprise text or imagery that is immediately before or after the CTU to be translated. In other embodiments, the proximal portion may be from an abstract or other portion of the source document that provides the needed context.

Once the proximal portions are determined, the proximal portions and the CTU to be translated may be combined to form a contextual CTU. In some embodiments, the contextual CTU may be prepared by either prepending and/or appending at least one other or adjacent CTU to the CTU to be translated. In other embodiments, the contextual CTU comprises a paragraph adjacent to the CTU to be translated. In yet other embodiments, the contextual CTU comprises at least two non-adjacent CTUs. In some embodiments, the contextual CTU comprises a CTU to be translated and a translation of the proximal portion of the source document.

Once determined, the contextual CTU may then be distributed to a translator as described elsewhere herein in accordance with various exemplary embodiments.

In general, any kind of additional information related to or informing a linguist about the CTU to be translated can contribute context for translation purposes. Information such as: language domain, quality expectation, intended audience, information about the speaker, project introduction, client glossaries, origin culture, and certainly the surrounding text presents data that is useful context for translation. Surrounding text typically permits a translator to deduce much of the content information from the content of a CTU. In general, text or CTUs preceding a target CTU may be weighted more heavily than the text following a CTU. A notable exception is the single next following CTU or phrase in a case of an open rhetoric figure that will generally be weighted more heavily than preceding text or CTUs.

Context may be determined from analyzing neighboring content (from a few chunks up to a whole document), translation rules for the project, graphics which illustrate the layout/visual environment for the CTU, general domain or product information, and the like. Analysis of these items may be performed by a translator, by a computer algorithm that processes text, rules, graphics, and the like to detect contextual clues, or a combination of partial computer analysis (e.g., processing translation rules) and human translator analysis.

G. Immutable Target Language Chunks

Figure 14:
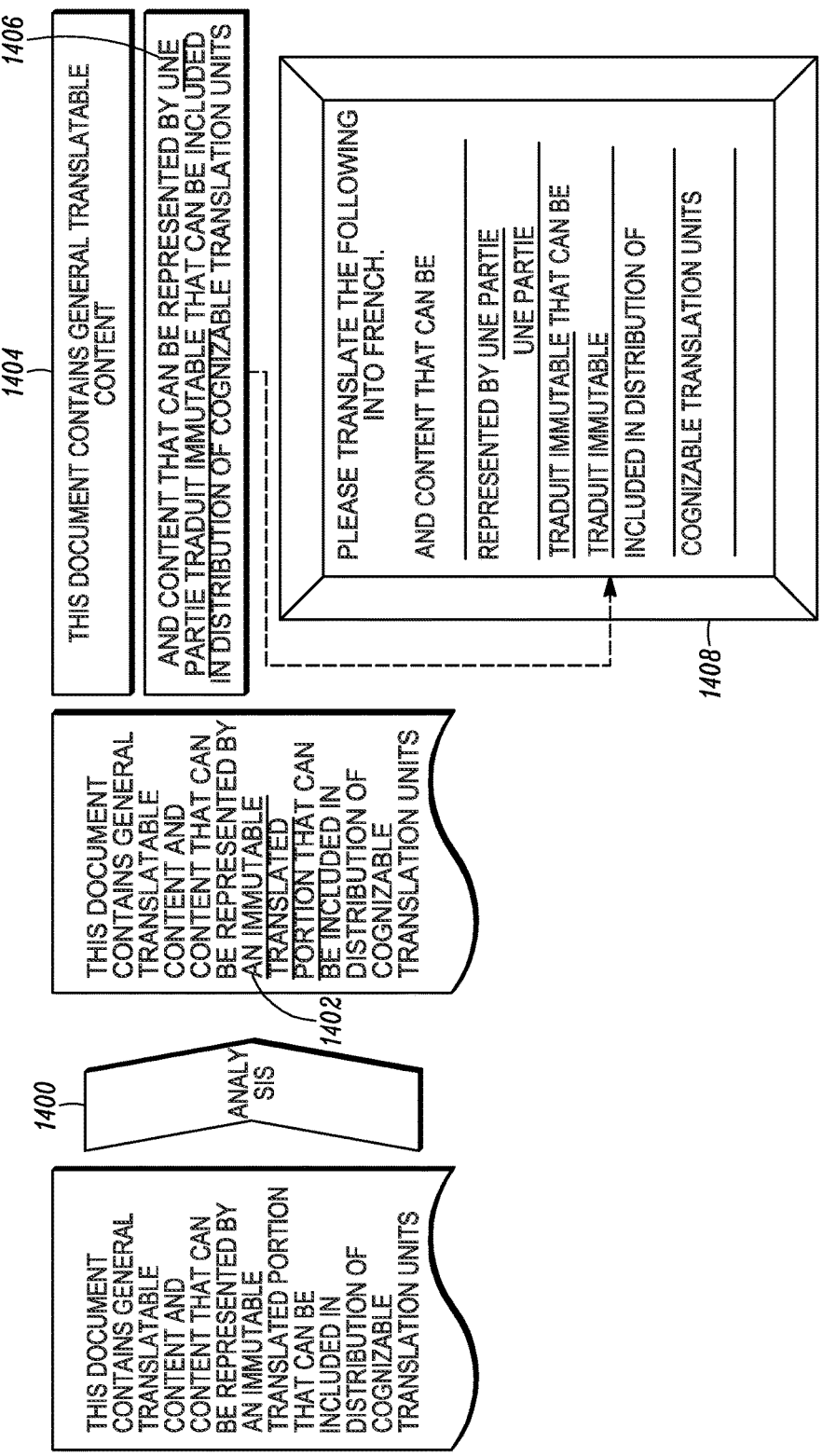
FIG. 14 depicts a flowchart for use of immutable translation units.

With reference to FIG. 14, there is illustrated a method for facilitating human translation of content comprising immutable target language sections. As illustrated in FIG. 14, a source document is comprised of general translatable content and content that can be represented by an immutable translated portion that may be included in a user interface for translating of one or more CTUs. The immutable translated portion may be distributed with the one or more CTUs. It may also be distributed as a portion of a CTU. Rather than distributing the immutable translated portion that corresponds to a immutable target language section, the immutable target language section may be tagged (e.g. with metadata) in such a way as to indicate that the immutable target language section should be substituted with a corresponding immutable translated portion when a corresponding CTU is presented to a translator in a translation user interface. In an example of tagging immutable target language sections, such a tag may include a reference (e.g. a link or other identifier) to a portion of translation support material and/or previously translated content that is accessible to be used in the translation user interface. In such an example, a metadata reference may be useful in reducing the amount of content transferred for individual CTUs, particularly if the immutable translated portion is referenced several times throughout a document being translated.

At step 1400, the source document is analyzed to identify at least one immutable target language section 1402. As used herein, "immutable target language section" refers to a portion of a source document that, once translated, is indivisible and not permitted to be altered by any translator. In the present example, at step 1404, the source document is chunked into two CTUs with the bottom CTU comprising a translated version of the immutable target language section 1402, namely, the text reading "an immutable translated portion". Note that the immutable target language section 1402, once translated, appears in translated form in French as "une partie traduit immutable" 1406. Elsewhere herein, various techniques for generating CTUs, performing machine translation, accessing prior translation in a translation library, accessing customer-specific pre-translated reference material, and the like are described. Such techniques may be applied to step 1404 in FIG. 14 to cause the immutable target language section to be substituted with a target language translation thereof.

In some embodiments, immutable target language sections are determined via identifying source terms or phrases, which are stored in a glossary and may reference or be stored together with suitable translations.

Next, as illustrated, at step 1408, the CTU comprising the translated immutable target language section 1406 is presented to a translator. In an exemplary embodiment, the CTU is displayed in an electronic user interface that permits translation of the CTU while preventing changes to the immutable translated portion 1406. Specifically, space in the translation interface is provided for the translator to translate the words and elements of the CTU with the exception of the immutable translated portion 1406, which appears pre-translated and is unable to be altered by the translator.

In accordance with some exemplary embodiments, the immutable translated portion 1406 may comprise as little as a single word. In other embodiments, the immutable translated portion 1406 may be customer or context specific. In yet other embodiments, the user interface may allow a translator to edit or otherwise alter the immutable translated portion 1406 of a CTU, such as if a translator receives secondary information (e.g. user specific translation rules, and the like) that conflicts with the translation of the corresponding immutable target language section. Permission to change an immutable translated portion may require separate authorization from a translation client, or other authorized individual or entity.

H. Auditing Crowd Output

Figure 13:
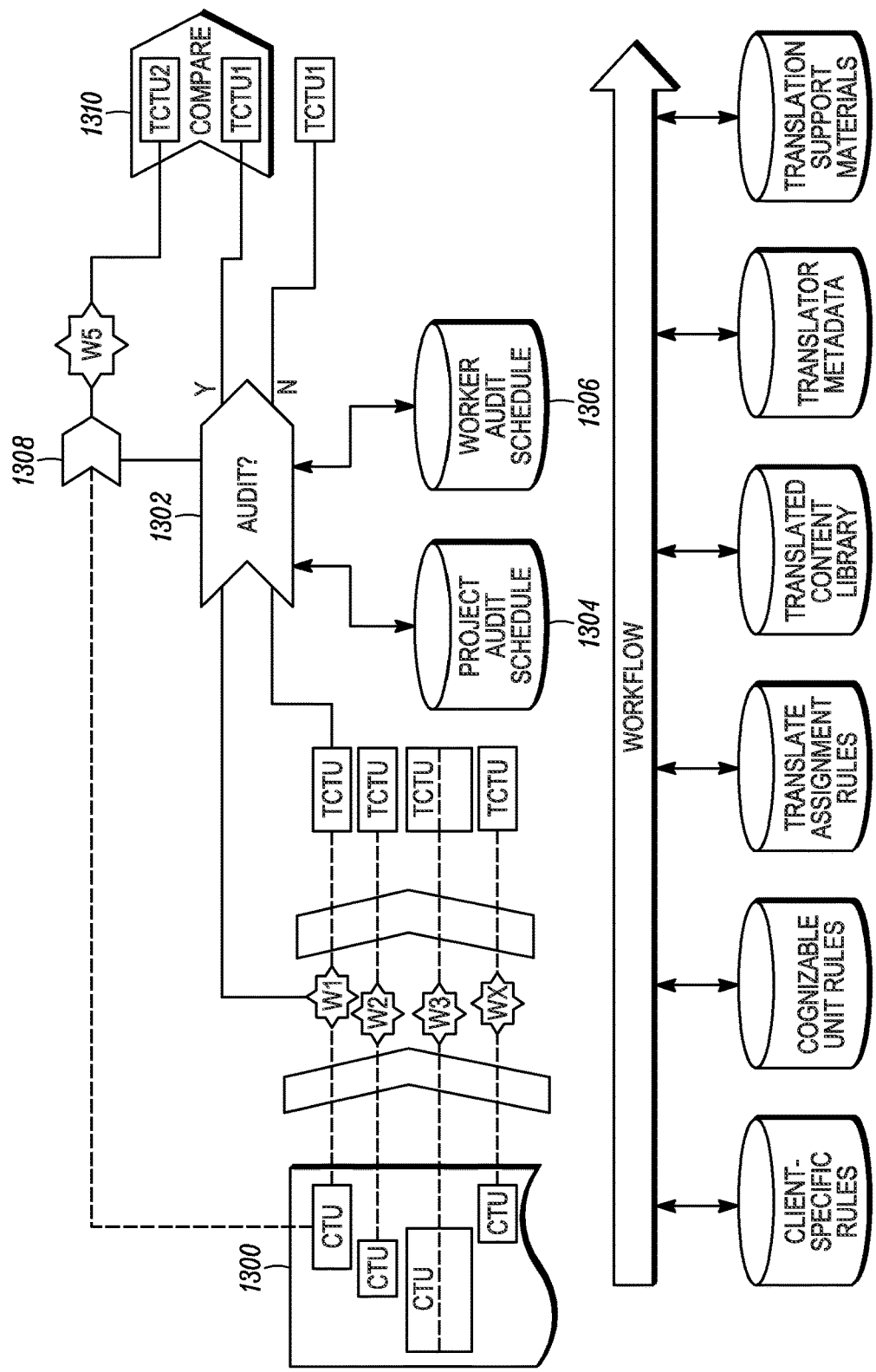
FIG. 13 depicts a flowchart for automated auditing of crowd worker quality.

With reference to FIG. 13, there is illustrated an exemplary and non-limiting embodiment of automated auditing of crowd worker quality. In this illustrated example, the task being performed is the translation of a source document 1300. However, the present embodiment is not so limited. Rather, present embodiments are drawn broadly to encompass any and all workflow tasks as described herein, including without limitation business process workflow tasks.

As illustrated in FIG. 13, a source document 1300 is converted into a plurality of CTUs. Alternatively, one or more CTUs or other translatable item may be provided, such as for distribution. One or more of the plurality of CTUs may next be distributed to one or more of a plurality of workers W1-Wx, such as, without limitation crowd sourced workers. As illustrated in the example in FIG. 13, each of four CTUs to be translated is distributed to a different worker W1-Wx resulting in four separate translated CTUs, or, TCTUs. Because a range of techniques for distributing CTUs to workers is described elsewhere herein, the embodiment of FIG. 13, while not explicitly identifying any particular technique is not necessarily limited to any particular CTU distribution approach. Consequently, any distribution technique, process, action, module, system or the like described herein may be applied to the CTU distribution depicted in FIG. 13.

Next, at step 1302, a determination may be made as to whether the outputted TCTU of a worker is to be audited. In the present example, the TCTU from worker W1 is analyzed for such a determination. The determination may be based, at least in part, on data retrieved from a project audit schedule database 1304 and a worker audit schedule database 1306. In accordance with exemplary embodiments, data retrieved from the project audit schedule database 1304 may indicate when and under what conditions an audit of a work unit, CTU or TCTU is to be audited. For example, a CTU may be randomly chosen for audit as a result of data retrieved from the project audit schedule database 1304 specifying that one CTU is to be audited every hour, every day, every specified number of completed CTUs, etc. A project audit schedule database 1304 may include one or more variables that may be dependent on context at the time that a project audit schedule database 1304 is referenced. In an example of variable-based project auditing, an audit action may be taken sooner when a prior audit action result was below an audit threshold value than if the prior audit action result were above the audit threshold value. A project audit schedule database 1304 may be dependent on another aspect of the project, such as the number of different workers being used to perform the work, the source or destination language, a domain of the content to be translated, availability of translation support material, use of such material, and the like. Likewise, a CTU may be chosen for audit as a result of data retrieved from the worker audit schedule database 1306. For example, data retrieved from the worker audit schedule database 1306 may specify that a given worker W1 is to be audited at present. In yet other exemplary embodiments, a combination of data retrieved from each of the project audit schedule database 1304 and the worker audit schedule database 1306 may be utilized to determine if an audit of the work task output is to be audited. As an example of combining project and worker audit schedule information to determine if an audit of a particular TCTU is to be performed, a project audit schedule may require auditing at least every 1000 words translated per worker, yet the worker audit schedule indicates that the worker requires auditing every 750 words. The combination results in the project audit schedule limit never being attained, so the project audit schedule action is never activated.

Next, at step 1308, if an audit schedule for one of the crowd workers and a project of the unit of work indicates auditing a current work output (e.g., TCTU), the CTU that corresponds to the audited TCTU may be dispatched to at least one other crowd worker for translation. In the present example of FIG. 13, the CTU translated by worker W1 is distributed to worker W5 for translating. Next, at step 1310, the translated CTU from worker W1, TCTU1, is compared to the translated output generated by worker W5, TCTU2. Such a comparison may be performed in an automated manner by a computer, by a human evaluator or by some combination of the two to yield an output comparison result. A range of real-world actions may result from such an audit comparison, including rewarding worker W1 for a positive audit, notifying an operator of a system processing the workflow to make or accept a suggested adjustment in one of the worker or project audit schedules, and other such actions. Other actions may include adjusting distribution of additional CTUs of a current project to worker W1 if an audit result is negative.

If, conversely, at step 1302, an audit of the TCTU from worker W1 is not indicated, work unit TCTU1 is output without audit, parallel distribution, or comparison. It is further noted that translated unit TCTU1 may be output in parallel with auditing in such a way that a result of audit may or may not impact output of TCTU1.

For translation, but also for other business processes, CTUs may be sent to two or more workers, and the results compared. The difference in the results may be expressed numerically, e.g. by edit distance or fuzzy matching algorithms, or whichever quality or correctness algorithm may be applied. For each worker, the difference value may be added to the average value calculated from previous audits. The bigger the average difference after a series of evaluations, the greater the likelihood that the quality of the work performed is getting worse.

In some exemplary embodiments, a worker's result may be run through a series of rules that use regular expressions to apply rules to each field of data that comprises the worker's answer. For each field, for each rule, the result may be compared against the rule, and if the rule passes (the regular expression either hits or does not hit, depending on whether the rule is positive or negative), tally 1 value against the number of rules. The percentage of rules passing becomes a score, and that score can then be averaged into all other scores for that worker to generate an overall quality score for that worker in that queue.

I. Data Storage Architecture

In accordance with exemplary and non-limiting embodiments, a data storage architecture, comprising a relatively flat set of key-value pairs forming a non-SQL database may be utilized for both the storage and handling of task elements. In some exemplary embodiments, a data storage architecture may be based on a plurality of sets of key-value pairs containing workflow information, task handling information, work unit input information, work unit output information and participating crowd worker information. The plurality of sets of key-value pairs may be configured as a substantially flat set of data records. The flat set of data records may, for example, be JSON or XML records.

Part IV-A

A. Quality-Tuned Chunking

Workflows for processing units, such as cognizable translation units, cognizable task units, crowd-sourced task units, and the like as described herein may facilitate end-to-end business processes, such as translation and the like. Workflows may be configured, at least initially, to process each unit for a given project, or to source content to be processed or translated to achieve one or more processing goals, such as quality goals, cost goals, delivery schedule goals and the like. While workflows may be configured with conditional control logic that may facilitate routing of one or more units along a plurality of optional paths based on, for example, a result of a workflow step, additional conditional capabilities may be included in workflow configuration and deployment. To achieve additional conditional capabilities, workflows may be configurable to be flexible so that such workflows can be adapted contextually during processing of units in a given project or to source content, and the like. The following describes an exemplary and non-limiting embodiment of quality-tuned chunking (e.g., generating task units) to facilitate variable and/or adaptive quality workflows based, at least in part, on intelligent routing factors. In particular, the following example is for a translation business process; however, any other business process may be substituted here with an expectation of comparable benefits.

As an initial exemplary condition, a definition of translation quality for a CTU or CTUs to be translated may be received and/or determined. Such a definition may comprise a default level of translation quality. In other embodiments, the translation quality level may be client-specified. In yet other embodiments, a translation quality level may be determined based, at least in part, upon an automated assessment of a source document comprising the CTU or CTUs to be translated. Certain embodiments described elsewhere herein capture various techniques for analyzing source documents for certain defined characteristics, including, for example, type of content, technicality of content, genre of content, and the like. Any of these analysis results may be useful in determining a definition of translation quality. Alternatively, translation quality level for purposes of determining a definition of translation quality may be automatically determined based on a number of CTUs generated for a given source document. In an example of such automated determination, if an overall quality of a 95% accurate translation is initially set, at least 95% of the CTUs generated should be processed through a workflow that yields near perfect (e.g., approximately 100% translation accuracy) to achieve the overall quality goal of 95%. Other combinations of a number of CTUs and a corresponding quality level are also possible and may be considered when configuring an adaptable workflow.

A translation workflow may be configured with intelligent routing factors to facilitate delivering the defined translation quality for the CTU or CTUs. Examples of intelligent routing factors that may be utilized include, but are not limited to, the language expertise of a translator, the domain-specific expertise of translator, an availability of a translator, a backlog of a translator, a price of a translator, the domain expertise of a translator, the similarity of sentences to previously translated metadata for content and resources (e.g., a vector distance between the CTU and the resource), suitability for machine translation, a need/desire for redundancy/confirmation, fitting a total translation price to a budget by allocating across resources, a difficulty factor of the CTU similarity of the CTU to previously translated material, a translator's legal expertise in a country, value of the material (e.g., how often it is viewed, how many people view it, presence on home page, presence in publication versus knowledge base), metadata associated with the material, legal/liability concerns (e.g., drug labels), emotive content (e.g., the emotive content may require routing by paragraph rather than by sentence), and the like.

As noted, any and all of these exemplary intelligent routing factors may be used when configuring a translation workflow, such as a workflow that facilitates adaptive chunking and/or routing for quality. For example, numerous CTUs may be identical or nearly identical in content and format. In such an instance, all of the similar CTUs may be routed or distributed to the same translator. In another example, ten CTUs may be identified as amenable to machine translation and may be intelligently routed to machine translators. In another embodiment, it may be determined that, in order to keep translation costs below a predefined threshold, no more than forty percent of all CTUs are to be translated by humans. In such an instance, forty percent or less of all CTUs to be translated may be routed to human translators.

In accordance with exemplary and non-limiting embodiments, the intelligent chunking and subsequent routing of CTUs may take place repeatedly throughout a workflow. For example, as described above, it may be determined that ten CTUs may be machine translated with the resulting translation falling within a predefined translation quality. As a result, an audit of some or all of the CTUs so translated may be conducted to determine if the established workflow will, in fact, deliver the desired level of quality. In the event that one, some or all of the audits so conducted indicate that the quality level is likely to be met, the workflow may not be required to be adapted. However, in the event that the audits reveal that the present workflow ratio of machine translation to human translation may not be sufficient to produce a work product of sufficient quality, the workflow may be dynamically and/or iteratively altered to achieve the desired quality level. Such altering may include adapting the workflow (e.g., by changing a parameter of a configured workflow and the like) so that fewer than ten CTUs are machine translated.

Likewise, as described above, it may be determined that routing forty percent of CTUs to be translated by humans is likely to result in the translation quality falling within a predefined translation quality range or above a predefined translation quality level. An adaptive workflow may be configured to submit some or all of the CTUs so translated to be audited to determine if the established workflow will, in fact, likely deliver the desired level of quality. In the event that one, some or all of the audits so conducted indicate that the quality level is likely to be met, no change to the workflow is required. If the results of such audits are not conclusive regarding the current configuration of the workflow achieving the desired quality level, the workflow may adapt to call for additional audits. However, in the event that the audits reveal that the present workflow ratio of machine translation to human translation is not likely to be sufficient to produce a work product of sufficient quality, the workflow may be dynamically and/or iteratively altered to achieve the desired quality level. Such altering may include adapting the workflow so that a higher degree of human translation is performed. Such altering may alternatively include adding a second human translator in a verification role and/or in a parallel translation role to achieve the desired translation quality level. These alterations are merely exemplary and altering any aspect of the workflow or workflow control-related factors as described herein may be employed to achieve an adapted workflow.

In some exemplary embodiments of chunking-related alterations to a workflow to achieve a translation quality level, changes to how the source document is broken down into CTUs may be made, including, for example, breaking down the source document into CTUs comprising a plurality of sequential words that is smaller or larger than originally configured in the workflow. In other embodiments, a start position in the content of a CTU and a length of a CTU may be adjusted based on contextual aspect of the workflow during its execution to meet the defined translation quality. Regardless of the nature, content and length of the chunked CTU, the CTUs may then be intelligently routed to available translators based, at least in part, upon the translation workflow.

B. Quality-Based Routing

As described herein, particularly in the embodiments described above, workflows may be configurable to provide flexibility to achieve a desired outcome, such as translation quality, a translation cost, meeting a translation schedule, or the like. This flexibility may be provided on a unit-by-unit basis so that a first unit of a particular translation project flowing through a workflow may be processed through a first translation path and a second unit of the translation project may be routed via a change in the workflow through a second translation path. Adapting a project workflow between the first and second units may provide a form of differentiated translation quality for the first and second units. Another method of providing differentiated translation quality on a unit-by-unit basis for any given translation project may include a workflow that is preconfigured to route units to achieve differentiated translation quality. In an example of differentiated translation quality routing, a workflow may reference translation distribution/routing/translator selection rules or criteria (e.g., as may be accessed in a translate assignment rules database 210, a translation metadata database 212, a client specific rules database 202, and the like) to effect differentiated translation quality on a unit-by-unit basis. Differentiated translation quality may be achieved by determining that every Nth unit/CTU may be routed to a lower cost resource even if the anticipated level of quality from the lower cost resource is below a translation quality for an entire source document. Differentiated translation quality may also be achieved by routing CTUs that include at least a minimum number of words longer than a maximum length (e.g., 9 letters) to a translator with a quality rating at least one grade higher than a translator to which shorter CTUs are routed. Likewise, routing CTUs at the beginning and/or the end of a paragraph of the source document to a higher quality translator than used for CTUs from a central portion of the paragraph may achieve differentiated translation quality. There are many other ways in which differentiated translation quality can be achieved. Some of these ways may use differentiated translation quality routing to achieve, for example, an overall translation cost or a translation delivery schedule, and the like. There may be other purposes or criteria for determining when and how to apply differentiated translation quality techniques. One such criterion is described elsewhere herein in regards to determining an acceptable level of translation quality for one or more units based on a location of the units in the source document. Applying this criterion may result in routing CTUs that are located in portions of a source document that are anticipated to be rarely accessed to translators or to translation processes that are not expected to yield as high quality as translators or translation processes used to translate content that is anticipated to be highly accessed.

C. Budget-ROI Based Routing

Various criteria may be used to determine a distribution or routing scheme for any translation project. Once such criterion may include achieving a certain budget for an overall translation project, for portions of a translation project, across multiple translation projects, or for individual translation units. Budget-based distribution for translation may also be combined with a desire to ensure an acceptable level of translation quality while taking into consideration factors that may indicate that differentiated translation quality across CTUs in a translation project is prudent. In this regard, budget-based routing of CTUs of a source document may be based, at least in part, on a variable quality of translation of different CTUs. An example of such variable translation quality with budget-based translation distribution is described next.

First, there may be provided a defined translation budget for translating source content from a source language into a destination language. Next, there may be provided a plurality of cognizable translation units that together comprise the source content to be translated.

Next, the CTUs may be routed to translators to deliver translation of the source content within the translation budget while ensuring that translation quality of a portion of the plurality of cognizable translation units complies with translation quality criteria of a workflow for translating the content. In some embodiments, the translation quality criteria may be a default system value. In other embodiments, the translation quality criteria may be client-specified on a client basis, on a workflow basis or on a sub-workflow/task basis, as described elsewhere herein. In yet other embodiments, the translation quality criteria may be based on a level of service requirement for translating the source content.

Regardless of the manner in which the translation quality criteria is established, CTUs may be intelligently routed to translators to deliver translation of the source content within the translation budget, while complying with translation quality criteria. For example, when determining translators to perform the translation of one or more CTUs, only prospective translators with a determined ability to translate CTUs at a level in excess of the translation quality criteria may be considered. In other embodiments, a mix of translators wherein some have translating abilities above the required level and some have translating abilities below the required level with respect to the translation quality criteria may be selected, such that the overall quality of translated content meets the specified translation quality criteria.

In some embodiments, once the pool of prospective translators is determined, the CTUs may be routed based on an expected aggregate cost of translation being at or below the defined translation budget. For example, there will likely be multiple permutations of translator assignments that will fulfill the budget requirements. In some embodiments, the translators of the highest possible quality will be selected such that the overall cost of translation is as close to the translation budget as possible without exceeding it. In other embodiments, translators of the lowest possible quality that are still above the translation quality criteria may be selected, such that the overall cost of translation is as low as possible and does not exceed the translation budget.

In some embodiments, a first portion of the plurality of CTUs is routed to translators who have achieved a first level of translation quality based on prior translations, and a second portion of the plurality of CTUs is routed to translators who have achieved a second level of translation quality based on prior translations. In some exemplary embodiments, the first level of translation quality is a higher level of quality than the second level of translation quality. In yet other embodiments, the first portion of the plurality of CTUs is routed to first translators who have a level of subject matter expertise of the subject matter in the content to be translated that is above a subject matter expertise threshold defined in the workflow. In accordance with some exemplary embodiments, the plurality of CTUs may be routed to translators who have achieved a translation quality rating that is greater than or equal to the translation quality criterion for each CTU.

In yet other exemplary embodiments of budget-based distribution/routing of units for translation, a first portion of a plurality of CTUs may be routed to a set of translators based on their average translation compensation, thereby consuming an estimated first portion of the translation budget. Based on this estimate, an average translator compensation for translators for a second portion of the plurality of CTUs may be determined or defined and the CTUs corresponding to this second portion may be directed appropriately to ensure a total cost of translation of the source content does not exceed a translation budget for the project.

D. Emotive Content

Another criteria for determining at least a model for generation of CTUs and/or for setting a distribution or routing scheme for CTUs to be translated may include a type of content being translated. One such type of content may include emotive content. Routing CTUs may be based, at least in part, on the emotive content of a document, passage, paragraph, sentence, or other portion, such as a CTU of the document. First, the method may include receiving source content, such as, for example, a source document along with at least one translation workflow requirement for translating the source content.

Next, at least one portion of the content to be translated and, optionally, the workflow requirements, are analyzed to initially determine if the analyzed portion of content comprises emotive subject matter. In some embodiments, this analysis is performed by a human, such as the client, a candidate translator, an administrator of a translation platform, a third-party, or other person. In other embodiments, this analysis for emotive content may be automated. For example, an automated emotive content detection algorithm may process the source content, such as by parsing, searching and the like for grammatical indicators of emotive content such as exclamation points. Other indicators include, but are not limited to, words typically associated with emotive content such as "shockingly" and/or phrases such as "a call to arms." Other emotive content may include positive emotion indicators, such as a holiday brochure promoting a venue for meeting friends and celebrating the holiday. An automated emotive content algorithm may gather clues regarding the potential emotive nature of the content from other aspects of the content, such as analysis of figures found in the content and the like. Additionally, content attributes (e.g., source document metadata) may indicate that the content (or some specific portion(s)) may be emotive in nature. When emotive content is determined, chunking may be adjusted to preserve the emotive nature of the content, such as by chunking whole pages. Emotive content may also trigger capturing at least a snapshot image of a source page containing emotive content that can be saved and provided to the translator as translation support material.

Regardless of the manner by which emotive content is determined, once determined, the definition of CTUs to be chunked from the source content may be configured (or adjusted if initially configured) without taking into consideration the emotive nature of the content. For example, once it is determined that source content comprises emotive content, the definition of a CTU may be adjusted such that in all instances a CTU comprises, at a minimum, a complete paragraph. In some instances, this may involve increasing the scope of sequential content to be included in a CTU as previously defined. As a result, a translator that receives the CTU for translating will be assured to at least receive source content that includes context indicative of the need to capture emotive content in the CTU that is greater than an isolated sentence or portion thereof. To the extent that a determination of emotive content may be determined on each of a plurality of portions of a source document, a corresponding definition of a CTU for each portion may be different. Portions with emotive content may define a CTU to have expanded sequential scope. Likewise, portions that are not determined to have emotive content may have a definition of a CTU for these portions to be less expanded or not expanded at all beyond a default or initial CTU definition. A generalized approach for context driven CTU definitions, low context content may effectively apply a default CTU definition; whereas generating CTUs for high context content may rely on a context rich CTU definition when chunking.

As an alternative to adjusting a definition of CTUs, a routing/distribution scheme for CTUs from a portion of a document determined to include emotive content may be adjusted to enhance the likelihood that emotive-based CTUs are properly translated. In an example of emotive content-based routing, a plurality of generated CTUs, such as CTUs of a source paragraph, may be grouped for translation by the same translator, potentially as a single translation task. In this way, CTU generation may be unaffected by a determination of emotive content, yet through proper distribution of emotive content-based CTUs, the emotive nature of the content may be preserved through translation. In an example of grouping CTUs for preserving emotive content through translation, each of the CTUs so grouped may be tagged with translator selection metadata that may indicate a requirement of unified distribution/routing. A task assign module 104 or an assign translator module 208 as depicted in FIGS. 1 and 2, respectively, herein may interpret CTU metadata to effect the proper distribution and/or translator selection to attempt to achieve preservation of an emotive nature of the content during translation. Grouping of CTUs for maintaining source content context may be applied to high context content; whereas grouping of CTUs for low context content may be avoided, thereby simplifying generation and distribution of CTUs.

Once the source content is broken down or chunked into a set of CTUs for translation based on the original and/or adjusted CTU definition, it may be distributed to one or more translators for translating based on the translator assignment workflow requirements as described elsewhere herein.

E. Customized Support Materials

As described elsewhere herein, translation may include use of translation support materials, such as may be accessible in translation support material database 218 of FIG. 2. Translation support material may be standardized, generic, language specific, and the like. Translation support material may include dictionaries, and other references. To provide customers with high value services, it may be beneficial to offer means for a customer to contribute or otherwise indicate customized translation material to be used for translation of the customer's projects. In accordance with exemplary and non-limiting embodiments, there is provided a method for providing such customized support materials for translators of CTUs.

To provide customized support materials for translators, there may initially be determined at least one translation aid that corresponds to a CTU to be translated based, at least in part, on at least one characteristic of the contents of the CTU and translation requirements of a document of which the CTU is a part. For example, an automated analysis of the CTU may identify one or more words that are uncommon, domain-specific, or otherwise not often appearing in translation memories. In response, a dictionary definition of the words may be accessed. For example, the Latin words "sui generis" may give rise to accessing a dictionary definition of "unique or occupying a class of its own". Likewise, for example, if it was determined from analysis of keywords forming a part of a CTU that the CTU dealt, at least in part, with the Gettysburg Address, a copy of the text of the Gettysburg Address may be accessed from a database. Examples of translation aids include, but are not limited to, dictionary entries, an entry of a client-specific dictionary, a representative translation, a complete or partial translation of a portion of the CTU, and an immutable object that represents a translation of a subset of the CTU. Any of the translation support material mentioned above and otherwise described elsewhere herein may be customized for a particular translation customer. Such customization may extend the usefulness of standard translation support material by including customer-specific elements such as logos, trademarks, slogans, product descriptions, marketing catch phrases, business names, and a range of other content items that a customer may have a preferred or defined way of translating. Generally, a translation support material database 218 may include standard translation support material, client-specific translation support material, or a combination of such material. If a combination is employed, a rule for translation support material use may indicate that the client-specific translation support material is to be used even if the standard translation support material would provide some useful aid to translating a CTU.

A workflow requirement for translating a CTU, such as a workflow requirement for a translation project comprising the CTU, may be configured so that customized translation support material is accessed rather than standard translation support material to aid translators. Distribution of customized translation support materials may be conditional based on, for example, a familiarity of a translator with the customized translation support material. Such familiarity may be determined based on a translation quality metric of the translator for the client-specific content previous translated by the translator. If a translator has no prior experience translating the client-specific content, use of the customized translation support material may be mandatory and enforced by requiring the translator to acknowledge receipt and use of provided customized translation support material. If a translator has extensive, positive experience with client-specific content, the customized translation support material may be made available to the translator (e.g., via a link to access the support material if so desired), but its use may not be mandatory.

F. Database Comparison at Segment Level

Various techniques described herein may be beneficial in optimizing operation of a translation platform that provides translation from a plurality of source languages to a plurality of destination languages for a plurality of distinct translation clients. Having an understanding of potential options for handling content to be so translated may benefit substantively operational efficiency of such a platform. As an example, if content is generally found to contain a high percentage of content that has previously been translated or that has a high likelihood of being very similar to previously translated content, such as content that may be found in a translated content library 206, platform resources to translate the content may be lightly consumed. On the other hand, if the content to be translated generally appears to be original, at least in terms of previously translated content, then the platform resources required to translate the content may be greater. Therefore, having methods of classifying portions of a document to be translated by systematically comparing the document content against a database of previously translated content capable of being indexed by client, project identifier and the like may be desirable.

In some exemplary embodiments, a translation database comprises one or more previously performed translations in both at least one source language and at least one destination language. Each translation in such a translated content library may be further attributed or indexed by additional parameters including, but not limited to, a translation customer identifier, a source language keyword, a destination language keyword, a source language and a destination language.

While evaluating source content to be translated, such as for example to determine a potential impact on translation platform resources (e.g., to provide a quote for translation of the source content), the translation database may be accessed in order to make a determination as to whether the database stores a translation that is similar to the content to be translated. Generally, such determination is made on a CTU-by-CTU basis during active translation. CTU-by-CTU determination may be applied during classification of the source content; however, other techniques may be used that are not CTU-based. In an example, content containing the Gettysburg Address may employ a search methodology using the keywords "four score" to narrow down the universe of stored translations in a translated content library 206. The search parameters may additionally include text comprising a remaining portion of the Address.

The results of the search may be used to classify the content to be translated as one of frequently previously translated, needing original translation (e.g., little or no matches to previously translated content), or moderately previously translated, that may further include needing adjustment to a previous translation based on the determination of a corresponding translation. The resulting classification of the content to be translated may be used in an automated workflow selection algorithm that selects one of a plurality of workflow templates based on parameters such as the translation requirement classification of the content to be translated. The resulting classification of the content to be translated may also or alternatively be used in an automated or semi-automated translation project cost quote algorithm to provide the translation customer with a quote for translating the content. The resulting classification of the content to be translated may also be used in translation platform resource planning and management algorithms and techniques, such as, for example, automated recruiting of crowd-sourced translators, automated alerts to translators of potential upcoming work, automated scaling of cloud-based or other computing resources to meet the anticipated resource demand to translate the content, and the like.

G. Fuzzy Match; Matched Pairs; and Fuzzy Match—Similarity

Distribution or routing of units to be translated may be optimized or operationally guided based on a likelihood that previously translated content may be useful in translating a unit to be translated. If a near match to previously translated content is found, this previously translated content may be used by a translator in translating the corresponding unit that needs to be translated. A near match (a/k/a "fuzzy" match) between a unit to be translated and previously translated content may include calculating a match percentage between the CTU and previously translated content based, at least in part, on search results of the previously translated content. In some embodiments, the match percentage may represent a measure of sameness that is less than a direct match between the CTU and content in the translation database. The CTU may be distributed or routed to a translator based, at least in part, on the calculated match percentage. For example, if a CTU to be translated is found to be 97% similar to a previously translated CTU, the CTU and corresponding previously translated content may be routed to the translator of the previously translated CTU. Alternatively, a CTU with a high match percentage may be routed with a corresponding previously translated content to a low cost translation resource since the amount of translation required may be limited. In this way, translation resource utilization and/or cost can be managed by a translation platform.

Using translation libraries (a.k.a. translation memories) may further include accessing non-copyrightable segments from such translation libraries so that third-party translated content may be used when translating content without risk of violating copyright of the third-party. Such a technique may be useful when existing translated content may be accessible as units that are not copyrightable. A CTU to be translated may be found to have been previously translated as two or more non-copyrightable portions of third-party previously translated content. Using such a technique for matching units to be translated with content previously translated may facilitate use of content that was translated for a first translation client when translating content for a second translation client. While use of a client's translated content library may typically require authorization by the translation client, in certain cases matching portions of a CTU to non-copyrightable portions of a client's translated content may be performed without requiring such authorization. Matching portions of a CTU to non-copyrightable portions of a translated content library may also be useful for improving human translation efficiency by providing representative translation of a subset of a CTU to be translated. In a non-limiting example of such assisted human translation, a CTU to be translated may be determined to have two non-copyrightable subsets of the CTU in two different clients' translated content libraries. These translated subsets, that may be overlapping or distinct, may be provided along with the CTU to be translated to a human translator and presented in an electronic user interface so that a correspondence between the two translated subsets and the content of the CTU is unambiguously observable.

In accordance with other exemplary embodiments of use of third-party translated content libraries, a translation of a CTU (T-CTU) may be compared to previously translated content in one or more translated content libraries, such as in one or more translated content databases. In the event that the T-CTU matches, directly or otherwise, a previously translated CTU stored in the translation database, a link that may facilitate accessing the matching previously translated CTU may be created and stored in the translation database and/or associated with the translated CTU, thereby facilitating linking the source language version of the T-CTU with the translated version and/or the source language version of the matching previously translated CTU stored in the translation database. In some embodiments, the owner of the translated CTU and the owner of the matching translation in the translation database may be different. When the link to the matching previously translated content is accessed, the owner of the previously translated content may be notified, such as to enable authorization of access to the translated content and/or to be compensated for use of the previously translated content. Such compensation may be provided in a variety of ways, including without limitation, translation credit toward translation project requests. In this way, an owner of previously translated content may be incentivized to authorize use of the previously translated content.

H. Multi-Frame User Interface ("UI")

Human translation may be performed via an electronic, computer-based interface that may facilitate viewing the content to be translated, translation support materials, translation statistics, translation requirements (e.g., due date), compensation for translating the content, previously translated content, information about a next unit to be translated, and may include space for entering translation of the content to be translated, a communication field, and other optional or necessary information fields, and the like. To provide this or other information in the user interface, the interface may comprise a multi-frame user interface that maximizes display real estate for side-by-side utilization, while providing access to relevant documents and other information via one or more sliding frames.

I. Automated Engine Training Using a Crowd

Automating the processing of tasks in a business process, such as, for example, translation, can greatly improve worker efficiency, reduce costs, and improve delivery timing, among other things. However, determining how to utilize automated processing may be challenging because many business processes have unique requirements. Developing automated solutions that are all encompassing of all possible unique requirements may be prohibitive as business needs are not constant. Likewise, developing a dedicated automated processing system for any given business process may be prohibitive due to costs required to do so for many and varied business processes. Systems that provide machine learning or other pattern-based learning techniques or the like (e.g., fuzzy logic, neural networks, and the like) may be beneficially applied to business process execution. In some embodiments, the automated engine may examine past human actions such as, for example, the designation of portions of a source document or one or more CTUs as confidential, and may develop algorithms therefrom so as to enable the automated engine to identify confidential information in other source documents.

A training process to achieve automated processing often involves a feedback loop that enables the automated engine to produce iteratively improved results. In order to do so, the automated engine may be provided feedback on how well the application of a derived algorithm worked in performing a particular business process. The automated engine may use this information as input for refining the algorithm, thereby delivering improved business processing results. Crowd sourcing of business processes can be used to deliver improved results of performing the business processes. When business process results from a large number of crowd workers is aggregated for similar business processes, certain patterns may be detectable among the results. These patterns may be useful in a feedback loop or may be indicative of an automated approach to performing a business process. When aggregated crowd-sourced business process results are combined with human or computerized assessment of the individual results (e.g., via auditing, error checking, automated validation and the like), an automated algorithm that is based on the results may be further improved. For example, an algorithm for detecting emotive content in a source document to be translated may be executed by an automated engine to designate a CTU as containing emotive content. The algorithm may be based, at least in part, on the presence and/or arrangement of keywords previously determined to be indicative of emotive content by crowd workers having performed such a business process, by the general topic of source document from which a CTU is taken being recognized as having primarily emotive content, by designation (such as in metadata) of portions of a source document as having emotive content, or the like. As a way of improving the algorithm to detect emotive content, the CTU may subsequently be provided to one or more crowd sourced workers as part of a task to determine if the CTU has emotive content. The results of this crowd-sourced task may be used to evaluate the accuracy of the automated engine designation of emotive content. The individual crowd-sourced results and/or the evaluation of the individual results may be returned to the automated engine to be used as input for emotive content detection algorithm refining purposes.

J. Fuzzy Match—Similarity (Continued)

Automated processes for matching source content to be translated with previously translated content, such as in a translated content library 218 as described herein may include determining exact matches, near matches, and similar content matches. Some of these matches may be based on fuzzy matching algorithms, such as those described herein, that facilitate providing translations of content that are likely to be close to correct, although not in all cases. Fuzzy matching techniques may be useful for helping to improve translation efficiency, although potentially at a cost to the resulting quality of the translation. There may be certain cases where fuzzy matching is not permissible due to the potential for a high cost of quality, at least from a translation customer's perspective. Phrases, logos, product names, document headings, trademarks, copyrights, and the like are some examples of items that may not be suitable candidates for fuzzy matching algorithms. To facilitate efficient use of fuzzy matching for accessing previously translated content, a blacklist of content items that are not to be applied to a fuzzy matching process may be stored in a database, such as client-specific rules database 202. Alternatively, such a blacklist may be applied when results of fuzzy matching are evaluated, automatically or via human assistance, as to whether the fuzzy matched previously translated content should be retained.

K. Training a Machine Learning System/Automated Engine to Improve Routing within a Distributed Translation Process Distributed translation processes may have a range of resources available for cost effective, predictable translation and localization. Large-scale translation systems may process a very high volume of translation work around the globe for a range of different clients. Automation of aspects of such a translation process may benefit substantively from effective collection and use of a range of data items throughout the translation process. This translation metadata may help characterize and improve automation, thereby effecting improved translation quality, performance, cost, and the like. A data collection and processing engine to handle large volumes of such data can facilitate automated learning and translation improvement.

Routing of content to be translated may be a key area of potential improvement through use of translation processing metadata. Use of advanced self-learning and randomization may facilitate dynamic and continuous routing improvement.

Training an automated engine, such as a machine learning system to improve routing within a distributed translation process may leverage data derived from translation requests as well as data captured during the translation process for a large number of translation requests to automatically improve routing.

Figure 25:
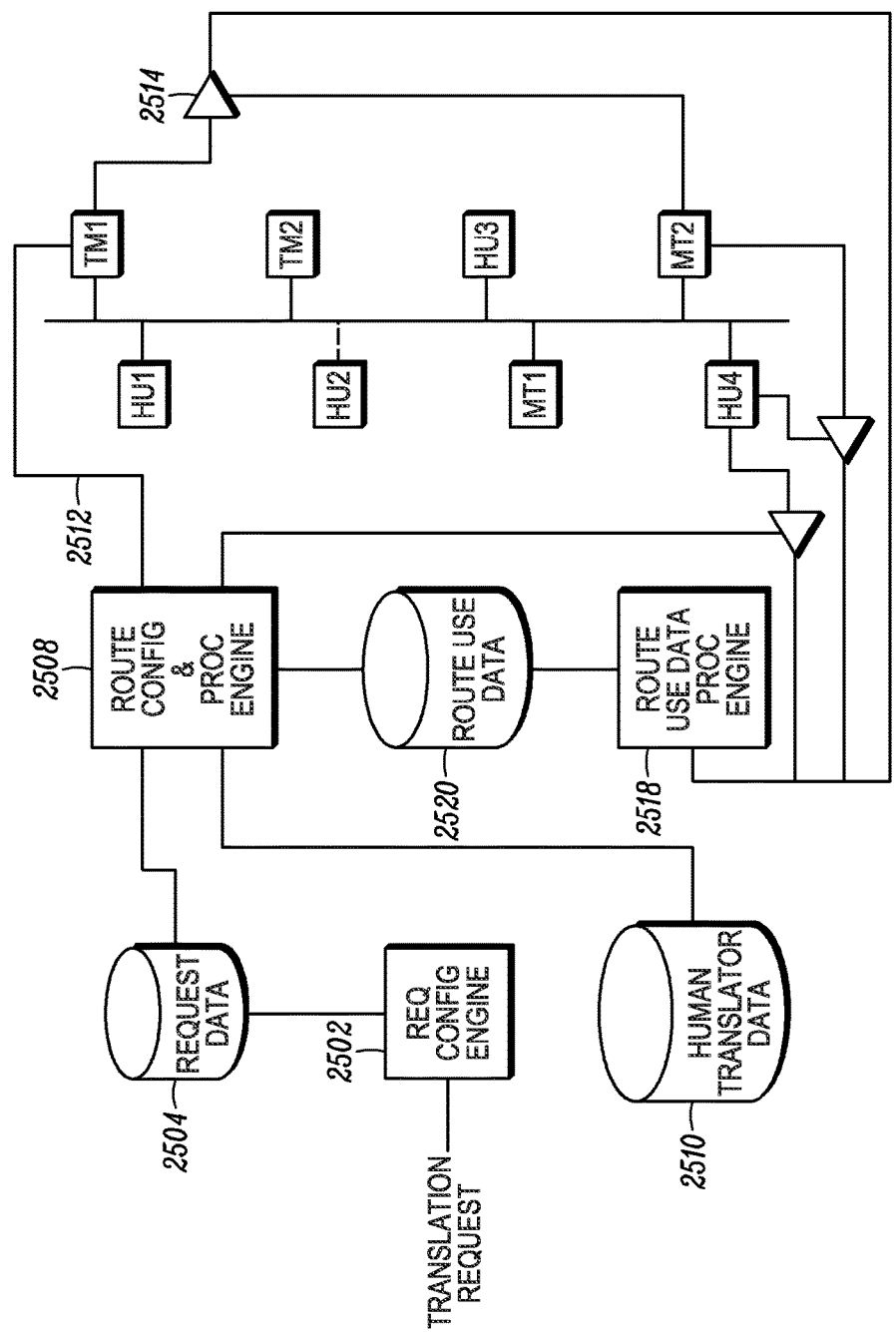
FIG. 25 depicts training a machine learning system/automated engine to improve routing within a distributed translation process.

Referring to FIG. 25, which depicts a block diagram, an embodiment for facilitating machine-based automated route configuration and improvement within a distributed translation process, including without limitation metadata-based improvement of routing segments for translation among a plurality of human and machine translators is described as follows. In an exemplary embodiment of a self-learning/ automated routing translation process, a request configuration engine 2502 may receive translation requests from a range of clients. The request configuration engine 2502 may generate request data 2504 that may include metadata that may characterize goals, requirements, desired outcomes and the like of translating content associated with the requests. Likewise client metadata may be captured directly or via reference as part of the request process. This client metadata may be stored in association with the request data 2504. This client metadata may include information about client-specific resources, translation history, and the like. A request may be analyzed to produce request-specific metadata. Likewise content to be translated that is associated with the request may be processed to produce source content-specific metadata. This metadata may be stored in association with the request data 2504 or may be stored separately therefrom. This rich context may be captured and processed by a self-learning route configuration engine 2508 to determine initial or ingestion-based route configuration data. This data may be combined with further data, such as human translator metadata 2510 associated with a pool of human translation resources available to the platform, translation memory data, automated translation engine data, and aggregated or otherwise consolidated metadata from the potentially large history of translations handled by the platform. This combined data may be processed to determine and configure a route for translating the content associated with each specific request. The route configuration engine 2508 may identify candidate routes for translating the content of each specific request. Each route may be further characterized by a range of factors, such as those that may facilitate optimizing processing of the content to achieve various desired outcomes, such as total cost, translation quality, adherence to certain translation requirements (e.g., restriction of access to the content), and the like.

The route configuration engine 2508 may further process the content through one of the candidate routes 2512 that may include use of a range of translation sources, such as translation memories (TMx), machine translation (MTx), human translation (HUx) and the like. The resources configured for each candidate route may be selected from pools of resources, such as translation memories, servers for performing machine translation, and individual human translators. Resources for some candidate routes may not be available (e.g., a human translator or translation center may be off-line during the time available for performing the translation, such as HU2). Candidate routes that may include one or more resources that may not be available in a required delivery timeframe may not be promoted for further consideration for the current translation request. Alternatively other comparable available resources (e.g., another translator who is not off-line, such as HU4) may be substituted.

Data from each action performed along all selected candidate routes may be captured by data capture nodes 2514, processed by a route use data processing engine 2518, and stored in a route use data facility 2520 during translation of content associated with the request with a route use data processing engine 2518 or the like. This engine may update the route use data 2520 to reflect what has been learned during the routing of the content for translation. The content being routed may be part of a digital data structure (not depicted) that may include the request-related metadata, the content to be translated, one or more versions of the translated content, route use data, and the like. This digital structure may be updated with each translation process step so that it contains a substantially complete archival of the content as routed through the selected candidate translation route.

The route configuration engine 2508 may be a randomized routing engine that may accumulate the various metadata including route use and content-specific metadata among others to configure candidate routes, as a candidate route is selected, data captured during the use of a selected candidate route may be processed with the randomized routing engine to increase the probability that a configured route will achieve the desired outcomes. Routes may be rated and/or ranked across a plurality of metrics to facilitate improving future route selection.

Various embodiments for training a translation processing facility for improving routing of content for translation are described below.

In an aspect of methods and systems for machine-based automated route configuration and improvement within a distributed translation process, metadata-based improvement of routing segments for translation among a plurality of human and machine translators may include a plurality of logical arrangements of metadata. A first set of metadata may be associated with a content unit or segment for translation. This first set of metadata may be derived from contextual information gathered during ingestion of the segment for translation. A second set of metadata may be associated with the segment for translation and may be derived during translation processing of the segment within a distributed translation process. Additionally, a segment routing engine may determine a plurality of candidate routes for translating the segment based at least in part on the first set of metadata. The engine may select at least one of the candidate routes based on a correlation between the first set of metadata and the second set of metadata. The engine may also route the segment via the at least one selected candidate route. Additionally the engine may update the second set of metadata in response to the segment being translated via the selected route.

In an aspect above, the first set of metadata may comprise at least one of segment complexity, segment length, an extent of matching of the segment to pre-translated segments in a translation memory, target quality of translation of the segment, client for the segment, translation project ID for the segment, domain/taxonomy of the segment, language of the segment, translation memory match percentage, translation memory match type (e.g., fuzzy, direct, and the like), time of translation request (e.g., time zone of request, time zone of qualified translators, delivery deadline or time frame, and the like), XML Localization Interchange File Format (XLIFF) state data, translation flags (e.g., complete, partial, in review, flagged for auditing, over budget, delayed, exceeding translator rejection threshold, and the like), translation job metadata, translation memory to use, specific server for performing machine translation, client name, client contact, client-specific instructions, translation start-by date/time, translation due-by date/time, and the like. The second set of metadata may comprise at least one of segment translation quality, translator identification, translation cost, translation review accepted/rejected, XLIFF state data, completion of translation of related items, and the like.

The methods and systems may further comprise a data structure that includes content to be translated, a portion of a first data set of metadata, a portion of the second set of metadata, an indication of a candidate translation of the content, and an indication of a final translation of the content, and the like. An example of the indicate of a candidate translation of the content may include a reference to a translation memory, and the like. Examples of an indication of a final translation of the content may include a reference to a translation memory, a translation of a segment, and the like.

The methods and systems described herein may include a segment routing engine that correlates a portion of the first set of metadata with at least one update to the second set of metadata. The segment routing engine may update the second set of metadata with data indicative of a correlation between a portion of the second metadata and a portion of the first set of metadata. Also, the portion of the second set of metadata may include a measure of translation quality, a translator's local time of day when the translator translated the segment, a measure of the translator's current translation work shift, and the like. The data indicative of a correlation among the first and second data sets may be a correlation between a translator of a segment and a client associated with the segment, such as prior translation work performed by the translator for the client, prior translation requests from the client that were offered to the translator but were refused, prior translation work by the translator for specific members of a client (e.g., specific employees of a corporate client, and the like), and others. The data indicative of such a correlation may indicate a preference for a translator who has translated the segment to translate future segments associated with a client that is associated with the segment that was translated by the translator, such as a translator who has translated segments for an affiliate of a client. In an example, a corporate client may require that third parties providing content to the corporate client perform translation of the content. Translators who have previously translated content for the corporate client may be tagged as preferred translators for translation work requested by the third parties when the third parties are requesting translation for delivery to the corporate client. In another example of translator preference correlation, updates to previously translated content (e.g., a new version of a user manual, and the like) may be preferentially translated by a translator who translated the original or prior version of the content. Routing optimization may benefit from such explicit and implicitly determined preferences.

As routing preferences or improvements are determined by the routing engine features described herein, a routing preference data set for a client may be updated. This preference data set may include segment metadata to further facilitate use of the preference data by an automated route configuration engine. In an example, a client may have diverse content to be translated. While a particular translator may be preferred for a first type of content from the client, a different translator may be preferred for a second type of content.

Other techniques for improving routing based on translation metadata may include a method of receiving first metadata that provides routing context about the client and the segment followed by analyzing the first metadata and availability of human translators to produce at least one recommended route for translating the segment, wherein the recommended route includes scheduling the segment to be routed to at least one human translator whose availability is consistent with a translation delivery requirement of the first metadata. The scheduling may be for a time frame that optimizes costs and/or translator resource utilization, addresses translator preferences, meets a variety of platform objectives ranging from costs to scheduling to profit and the like. Such techniques may further include routing the segment to the translator via a translation management system that comprises a logical network of machine translators and human translators, wherein the translation management system is capable of determining that an available human translator in the network is not qualified to translate the segment.

Yet other techniques of the methods and systems for machine-based automated route configuration and improvement within a distributed translation process, including without limitation metadata-based improvement of routing segments for translation among a plurality of human and machine translators may include training a translation routing engine. The translation routing engine may be configured to route sentences, segments, cognizable translation units, and the like for translation within the distributed translation process. A method of training a translation routine engine may include receiving a segment in a first language for translation to a second language and first metadata that describes characteristics of the segment, a client associated with the segment, and translation workflow parameters. A portion of the first metadata may be compared to metadata in a segment routing metadata database to configure a translation route for the segment. The translation route may include at least two translation steps, such as translation memory lookup, machine translation, and human translation and the like. Training may further include gathering metadata from the at least two included translation steps; thereby facilitating the gathered metadata describing the translation route. To further facilitate training, a measure of the success of the translation route may be gathered, produced, or otherwise inferred. Training may be further effectuated by using a machine learning system to process the gathered metadata, the first metadata and the gathered measure of success to train the routing engine to produce improved routing. A measure of success of the translation route may include a quality of the translation; a compliance with schedule, cost, or other aspects of the translation; utilization of translation resources; a degree to which translators accept an offer to perform translation of the segments, and the like.

Using a randomized routing engine may facilitate machine-based automated route configuration and improvement within a distributed translation process, including without limitation metadata-based improvement of routing segments for translation among a plurality of human and machine translators. Such a method may include configuring a translation route for a portion of content to be translated using a randomized routing engine. Configuring the route may be based on aspects of content to be translated, a language pair, metadata associated with the content, a portion of the content, a client and/or client translation criteria (e.g., desired outcomes, cost limits, scheduling restrictions, preferences for machine and/or human translation, and the like). While processing the portion of content along the configured translation route to produce a translation of the content, route-related data may be gathered, such as in the form of feedback from resources being utilized along the route. By rating at least one of the randomized routing engine and the translation route based on a compliance with the client translation criteria, such as may be determined based on the feedback, future randomized routes may better comply with key criteria for the routes. In an example, the machine routing engine may be adjusted to produce more successful routes based on successful routes found by the randomized routing engine as indicated by the feedback. Ratings may be enhanced by direct input from clients, professionals (e.g., translators, platform operators, third parties, translation standards organizations, and the like).

Machine learning may provide additional opportunities for facilitating machine-based automated route configuration and improvement within a distributed translation process, including without limitation metadata-based improvement of routing segments for translation among a plurality of human and machine translators. In an example of machine learning, a translation routing engine may be configured to generate a plurality of available routes among human and machine translation resources. A plurality of translations may be routed according to the plurality of available routes. Outcomes for the plurality of routes may be compared against client-specified criteria. The comparison of these outcomes may be applied to a machine learning engine to improve the generation of routes by the translation routing engine. Generating available routes may be generated based at least in part using a probabilistic route selection facility.

Correlations between and among first metadata (e.g., data available relating to content to be translated), second metadata (e.g., data related to a translation route, translator, and the like) may be based on combinations of metadata so that different basis for evaluating routing engine and/or route performance may be made available. Non-limiting examples of combinations for evaluating performance may include accuracy, speed, availability, cost, and the like.

Correlations and other techniques for determining improvements in route generation may suggest certain themes, such as time of day themes. In an example, routes configured to include human translators who are working close to their normal end of shift and/or have worked consistently for more than a predetermined amount of time performing translations may yield consistently lower ratings than routes that do not include such translators. This intelligence may suggest adjusting routes to include translators in time zones where translators are early in their work day, for example.

Use of data and analysis of this data gathered as described above may include generating visualization of correlations between various metadata topics and outcomes. Visualization techniques, such as using heat maps or other mechanisms that represent metadata categories in visual format to facilitate exploring potential correlations between metadata topics and outcomes.

Part IV-B

A. Blended Worker-Source Process

Referring again to FIG. 1 herein, there is provided a method for managing task flow, task generation, task distribution, resource utilization, consolidation of completed tasks, and the like for a business process by utilizing crowd sourcing resources and outsourcing center-based resources. Outsourcing center-based resources may be treated by the business process architecture depicted in FIG. 1 herein as additional resources to be utilized for business process execution. Alternatively, a business process outsource center 128 may be utilized in parallel to a crowd worker management system as depicted in FIG. 1, wherein task flow is directed to either a task review facility 102, to an internal worker of an organization, or to a business process outsource center 128. The work product of a business process outsource center 128 may be combined with crowd worker work product in a task aggregator 106 or may simply be passed along to a next step/task in a workflow. Although outsourcing center-based resources may be individually managed through work practices of the outsourcing center, parameters related to resource requirements, compensation, scheduling, experience, expertise, location, and the like may be passed from a business process workflow management system to a outsourcing center resource allocation facility. The outsourcing center resource allocation facility may directly apply or otherwise integrate any provided resource parameters into an outsourcing resource selection or distribution scheme. A workflow for work units (e.g., cognizable task or translation units) provided to the outsourcing center may be provided as well to further facilitate outsource center resource allocation.

First, there may be provided a project workflow that defines how a plurality of tasks are to be performed. Next, based at least in part on a parameter associated with the workflow, a determination may be made as to a first portion of the tasks that can be performed by one or more crowd workers. This determination may be performed by task review module 102 that may send this portion to task assign module 104. This determination may be made at task entry/creation, such as in interface 100. Similarly, a determination may be made as to a second portion of the tasks that can be performed by an outsource center. Again, this determination can be made by task review module 102 that may send this second portion to the business process outsource center 128. However, any given task or set of tasks may be designated or otherwise identifiable as suitable or required to be sent to a business process outsource center and therefore may be routed to the outsource center directly from the task creation/intake module 100.

In an example of crowd versus outsource center task execution determination, a first portion of a patent application comprising text may be identified as being able to be translated by one or more crowd workers. This may be based on an analysis of the task (e.g., translating text), or an operator or other resource external to the business processing capabilities depicted in FIG. 1 may make this determination. A task review module 102, for example, may detect that the translation work could be provided to an outsource center but, due to the legal nature (e.g., patent application) of the source document, may instead forward this first portion to task assign module 104 to be distributed to qualified crowd workers 108. In such an example, a second portion of the patent application translation project comprising the figures may be deemed capable of being out-sourced to a business process outsource center 128 with experience in producing translations of formal drawings of patent figures.

In addition to having a module, such as a task review module 102 performing the determination of which resource (crowd or outsource) to utilize for a portion of tasks, the workflow may be adjusted based on the tasks to be performed. In an example of workflow adjustment, once the nature of each of the two portions is determined, the project workflow may be configured to designate the first portion of tasks for distribution to individual crowd workers and to designate the second portion of tasks for distribution to at least one outsourcing center.

Next, the distribution and performance of the plurality of tasks distributed to crowd workers may be based on the configured project workflow and may be managed as described elsewhere herein. As noted above, the work performed at the business process outsource center 128 may be managed by the outsource center with guidance based on workflow parameters, for example. All work may be combined, such as through task aggregator 106 as described herein.

Blending crowd worker resources and outsource center resources as described above may be orchestrated and managed through a dashboard for managing blended worker sourcing. Such a dashboard may include a plurality of business process management frames to facilitate blended worker sourcing. In an example of such a blended worker-sourcing dashboard, a task view frame may be provided for viewing a plurality of tasks (e.g., worker tasks) that are at least partially configurable based on meeting a project workflow objective. The blended worker sourcing dashboard may also include a task analysis frame for selecting criteria to determine one or more tasks that can be performed by individuals, such as individual crowd workers, and for selecting criteria to determine a second portion of the tasks for execution by an outsource center. A project workflow configuration frame of the dashboard may facilitate configuring a project workflow to achieve the blended worker sourcing based on the criteria selected in the task analysis view frame. The dashboard may further comprise a project workflow management frame that may be used for managing distribution and performance of the plurality of tasks to the individual crowd workers and to one or more outsource centers based on the configured project workflow.

B. Location Segmentation

Crowd-workers may be sourced from any jurisdiction. However, from time to time it may be advantageous or warranted to ensure that crowd work product is segmented based on, among other things, crowd worker location-related information. This may be advantageous when, for example, localization of a product is required. While it may be possible for a worker in Germany to localize a product for Botswana, choosing otherwise qualified Botswana-local workers for such a localization project may be advantageous. Worker location may be important for a variety of other reasons, including without limitation, ensuring that tasks are distributed substantially evenly among a number of locations. Even distribution of work tasks may be useful when collecting information about customer use of a new product so as to not develop a bias based on users of the new product from one location. Therefore, methods and systems are described herein for segmenting a crowd of crowd-workers based, at least in part, on worker location, workers at a location and customer work being performed by workers at a worker location.

First, a crowd worker database may be configured with segmentation data and corresponding electronic data structures comprising, for example, a worker location, customer work distributed to workers at the worker location, worker experience with the customer work, customer work type, and the like. Such data may be entered into a crowd worker database in real or near real time as workflow tasks are completed, as workers enroll to receive tasks, or may be retrieved from existing databases for inputting into the crowd worker database. Due to the highly geographically distributed nature of crowd workers, timely and economic entry of and access to segmentation data can only be handled by a networked computing environment, such as the Internet with preconfigured nodes that are capable of facilitating capture of worker experience collection, and the like.

Next, the information for these geographically dispersed workers may be accessed and processed, such as by a database processor to derive a worker location profile for any or all of the geographically dispersed workers based, at least in part, on the segmentation data. Because the worker location profile may include customer work experience, static data entry by workers at enrolment time may be insufficient for the envisioned worker location profile. As noted above, at least some portion of segmentation data in the worker profile, if it is based on customer work experience, is preferably updated as work is completed by the worker. This near real time updating of an electronic data structure that represents experience of a worker in a business process workflow system further enables ongoing and overlapping task allocation to workers for a plurality of simultaneous client projects. Therefore, as a worker completes a task for a particular customer, the worker's location profile may be updated so that a subsequent automated task assignment activity may take into consideration this new customer work experience data. It is also noted that a worker location profile may be impacted by work performed by other co-located workers. Therefore, maintaining a properly updated worker location profile for an individual worker may involve dynamically processing large amounts of data regarding work that is assigned to and completed by dozens or more co-located workers. The worker location profile may comprise a metric of worker experience with customer work for a plurality of customers for whom work has been distributed to workers at the worker location and at least one other metric of customer work type across customer work distributed to workers at the worker location.

Lastly, the crowd workers may be logically segmented into crowd segments based on the metric or metrics of worker experience, worker location, and the customer work type to satisfy any of a range of location-related work requirements for processing business process tasks. These logically segmented crowd segments may further dynamically change as each worker completes tasks.

Figure 26:
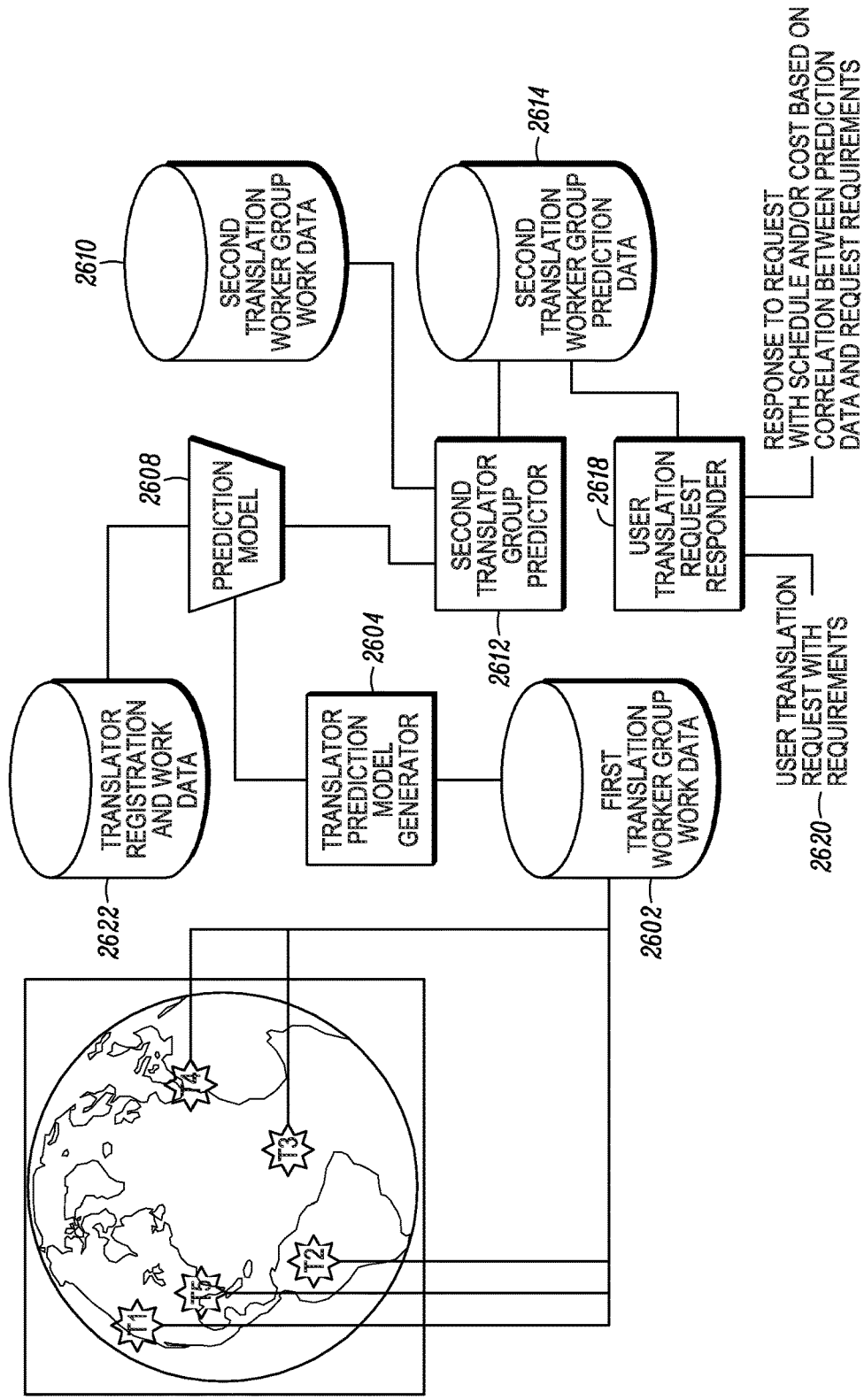
FIG. 26 depicts real time or near real time updating of crowd worker segmentation database to reflect ongoing experience and task allocation (e.g., routing based on awareness of what is currently assigned to other workers and based on current needs)

C. Real Time or Near Real Time Updating of Crowd Worker Segmentation Database to Reflect Ongoing Experience and Task Allocation Real time or near real time updating of a crowd worker segmentation database to reflect ongoing experience and task allocation may include, for example routing based on awareness of what is currently assigned to other workers and based on current needs. In an embodiment depicted in FIG. 26, translation worker data 2602 may be captured for a group of translation workers. The translation workers in the group may be selected from a variety of jurisdictions, locations, languages, translation work, and the like. A translator prediction model generating engine 2604 may derive a prediction model 2608 of translator future unavailability or availability, cost and quality for the group of translators.

The prediction model 2608 may be applied to a second translator worker group work data 2610 set by a second translator group predictor 2612 that may generate a second translation worker group prediction data set 2614. This second data set may be useful in determining future cost, availability (or unavailability) and estimated quality output by workers who may not currently be performing translations (e.g., workers who have logged out of a translator access system). Also, a worker may not have an active task in the system but may, for example, be unavailable for other reasons (work outside of the system, travel, illness, family activities, etc.). Also, a maximum ("max") availability may be declared as the baseline availability of an individual in the system. The prediction data may be applied by a user translation request-processing engine 2618 to respond to the user translation request 2620 with schedule and/or cost based on correlation between the worker prediction data and the translation request requirements.

In an example, workers that are represented in the prediction data may be further filtered so that only workers who meet criteria for translation (e.g., prior experience with the requesting user) may be candidates for receiving the work. Details about the remaining workers may be used when preparing a response to the user translation request.

The prediction model 2608 and corresponding worker historical translation work metadata 2622 may facilitate predicting an evolution of a crowd based on experience with particular workers. The particular worker experience may be used to seed the prediction model so that its results can be applied to a crowd of workers as a whole. By predicting what is going to happen with each segment of a crowd worker pool based on what is happening to a subset of the pool right now, a crowd worker segmentation database may be updated in real-time. Real-time updating may facilitate dynamic/real-time pricing changes to handle spikes in supply and spikes in demand. As a worker pool grows, statistical modeling based on particular worker experience may facilitate more predictable operation of a distributed translation process across a wide range of workers, jurisdictions, time zones, and the like.

This may involve characterizing the distance of a crowd at a given time, based on current availability, to given categories of work. Work can be ordered to optimize use of the current crowd, including based on predicted emergence of a different crowd later. In a simple example, a Chinese to Korean language translation might be delayed from 3 PM EST until waking hours in East Asia, when more crowd workers are likely to be online and ready to work, while an important translation from French to Romanian might be given premium pricing, to take advantage of a disappearing group of European translators in a crowd who are starting to go offline at the end of the evening.

Managing a distributed crowd worker process, such as for language translation, may include attempting to achieve accurate resource availability prediction. Meeting client availability expectations may be handled by all work currently being processed through the translation process being represented as a vector (e.g., an multi-dimensional vector). Predicted availability of worker resources may be represented as a reference vector. A distance or trend of distance between these two vectors may indicate a degree to which the worker platform is meeting expectations; minimizing the distance between the vectors being a primary objective of effective availability prediction.

Methods and systems for real time or near real time updating of crowd worker segmentation database to reflect ongoing experience and task allocation may include a method of global translation of a plurality of word segments (e.g., sentences, and the like) requiring language translation among human and machine resources that become available for translation activities is now described. Such a method may include gathering data that is descriptive of translation work being performed by a group of translation resources that include at least a plurality of human translators in a plurality of international jurisdictions. The gathered data may be applied to a translation resource availability computer model to predict future availability and expected translation quality for at least a portion of the group for at least one translation time period (e.g., a future time period). Because a user typically requests translation through some sort of electronic interface, a reply to such a request may be based on the predicted future availability. Requests for translation may include a plurality of translation requirements so a response may include at least a cost of translation and a schedule of translation that may be determined by applying an output of the translation resource availability model execution to predict future availability and expected translation quality from at least one translation resource that meets at least one of the plurality of translation requirements. In this way not only can an estimate or quotation for translation be based on currently available resources, but it can also be based on a predicted availability of translation resources that may be available at a future time, particularly resources that are not available at the current time. Cost savings may be realized by performing a translation at a future point in time with lower cost resources than are currently available.

The translation resource availability computer model may be applied to predict availability of a different group of translation resources based on data gathered with respect to the first group of translation resources. The prediction of a second group may be beneficial because data from a first group, such as translators who are currently performing translations (e.g., in a first time period) can help determine availability of additional workers, such as from the second group/segment at a future point in time (e.g., a second time period).

Predicting availability of a group of workers may be based on a common attribute shared by translators who may logically be arranged into worker segments (e.g., groups) based on the common attribute. Predicting availability of a group (or a plurality of groups) may include predicting availability of a plurality of worker segments since some worker segments may share the common attribute.

The availability and quality prediction model may facilitate predicting future availability and expected translation quality distinctly for each of a plurality of logically grouped translators (e.g., segments) of the global translator pool.

Quoted or estimated costs and/or translation schedules for a translation request may further be determined by configuring a route for the requested translation that schedules the translation to be performed by a translator from a segment of the global translator pool that is predicted to meet a quality requirement and a cost requirement of the translation request at a point of time in the future. The point in time may be flexible, at least within a certain degree, so that the point of time in the future is based on a minimum number of translators from the segment being predicted to be available to perform the requested translation. At times, a majority of translators associated with the segment of the global translator pool may be unavailable for translation when the request for translation is received; therefore offering a cost/quality goal based on predicted future availability of workers may be desirable.

In another example of real time or near real time updating of crowd worker segmentation database to reflect ongoing experience and task allocation that may include a method of translating content. Such a method may include receiving a request for translation of a segment between two languages; these two languages form a language pair. The language pair includes a reference to a source language of the content to translate and a reference to a target language into which the content is to be translated. A next step may include determining a state of translator availability for translators in a pool of translation resources who can translate between languages in the language pair. Of this pool, only a subset may be suitable for being offered to translate the content. A price for using one of the resources in this subset to perform the translation may be set. However, a time-dependent model of translator availability and quality may be applied to a portion of the pool (e.g., a portion that is otherwise qualified to translate among the language pair) to determine at least two distinct prices for the translation request—a price for using current resources and a price for using resources predicted to be available at a point in time in the future. A future timeframe for which resources are predicted to be available may align with a delivery timing requirement of the translation request, although a future prediction may cover a wide range of future time frames that may overlap but may cover resource availability at times other than those that satisfy the delivery timing requirement. To address the specific request, the method may include presenting at least one of the two distinct prices for the translation based on a timing requirement for delivery of the translated segment to the requester.

Price differentiation may result from different resources being available in different time frames, such as for example, based on different cost bases in different geographic regions. The two distinct prices may be based on scheduling the translation to be performed by a translator in the segment who is available to translate the content contemporaneously with receiving the request, and based on scheduling the translation to be performed by one of a plurality of translators who are not available contemporaneously with receiving the request, but are predicted to be available at a point of time in the future.

The availability prediction model output may be refined by information associated with the request, either directly by the prediction model including request information when generating its output or as a post processing step (e.g., filtering the results). In this way, a current or predicted translator availability for this example embodiment may be refined to only indicate translators who are known to have successfully translated between the language pair at least once previously.

Alternatively, the pool of translators may be filtered or otherwise limited so that segments of the pool are defined at least partially by the translation request information. In this example, a segment-view of the pool may be based in part on language pair experience. Therefore, the pool may be logically configured into multiple segments, one of which is a segment of resources who are known to have successfully translated between the language pair at least once previously.

The method of real time or near real time updating of crowd worker segmentation database to reflect ongoing experience and task allocation may include a method of translating content as follows. A request for translation of a portion of content that may identify a language pair (e.g., a source language of the portion of content and a target language into which the portion of content is to be translated) may be received by a multi-resource distributed translation processing system. The system may provide a translation resource availability computer model that uses gathered data about a pool of translation resources to predict future availability of human translation resources that are capable of translating from the source language to the target language. The system may further use the output from the computer model to generate at least one translation resource utilization routing option and at least one price for the translation that is based on the predicted availability of the resources. The resource availability prediction model may generate a prediction of availability based on the source language, the target language, the time of day at which translation may take place, the location of translation resources, any combination thereof, or other factors related to translation performance, quality, profitability, client preferences, and the like that impact translator or translation resource selection described elsewhere herein.

The system may further include within the computer model for future resource availability or as a separate model, a capability to predict a future demand for translations from the source language to the target language. This prediction may be based on direct past translation request experience of the system, in-direct translation experience (e.g., industry reports), trends in language utilization, population growth estimates, third-party data (e.g., breaking news stories, news cycle, political events), and the like. Such a demand prediction may be based on time of day (e.g., as the sun starts to rise over China, a demand for Chinese source language translators may be predicted to increase due to the China business day starting). The demand range may be modeled so as to be based on a range of prices for the translation. Since demand for translation resources may impact market pricing for these resources, demand prediction may impact a price estimate and/or quote that the system may provide in response to a translation request. Alternatively, demand pricing may result in certain resources being filtered out from the available resources if the pricing for these certain resources is not compatible with a pricing guidance or requirement of the translation request.

The availability and demand predictions may be utilized in conjunction to determine translation pricing, so that, for example the pricing for a translation is based on the output of the translation resource availability model and the output of the demand prediction model. To facilitate combined use of predictions of availability and demand, one or both predictions may be based on a common aspect, such as the source language, the target language, the time of day at which translation may take place, and the location of a translation resources.

In addition to predicting demand and availability of known translators, the system may provide a supply prediction computer model for predicting future supply for translations from the source language to the target language. A supply prediction may be the same as availability in that it may include translation resources that meet the language pair translation capability requirement; however it may be different in that it may include resources that are not necessarily available in a required future time-frame. This may include resources that are already dedicated to be used for different translation requests, resources that are off-line, resources that have not yet been qualified to be utilized by the system, resources that are not yet know to the system but are predicted to become know, such as new human translators who request to join the pool of translators, and the like. The prediction of supply, may also be based on a range of prices for the translation.

The system may put these predictions to work by routing a plurality of translation requests for translation based on the predicted availability of translation resources and based on at least one of the predicted demand for and the predicted supply of translation resources for the language pair for at least one price for the translation of the content. To perform this routing, the system may first identify a price (e.g., based on prior client pricing guidelines or as a client response to a presented price for translation) to guide the resource selection. Next the system may determine the resources that are available (or are predicted to be available) who satisfy the pricing based on the predicted demand. If predicted supply reveals resources that may not otherwise be identified through the other prediction models, pricing for these additional resources could be factored into the resource choices for building a translation route.

The methods and systems related to predicting availability, demand, and/or supply may facilitate predicting other aspects related to worker pools or crowd workers. These other aspects may include without limitation competency-based prediction, such as the availability, demand, and/or supply for a particular competency. Utilizing demand and supply predictions may facilitate configuration of automated worker recruiting websites that adjust automatically to promote particular work opportunities based on, for example, a competency that is predicted to be in demand. Such work opportunity promoting websites may be selectively targeted to certain jurisdictions, based on predictions of availability, demand, and/or supply of translation resources related to a particular jurisdiction. As an example, if a demand for Russian source language translators is predicted, Russian language websites may be promoted in jurisdictions where Russian is a native language.

The methods and systems described herein relating to predicting availability, demand and/or supply may facilitate predicting certain workers who may decline certain work projects, stop accepting work assignments, and the like. Predictions regarding these aspects of workers may facilitate managing a crowd to further improve and/or enhance task and/or translation execution. Information that may be determined with prediction-based crowd management may further enhance crowd worker productivity, satisfaction, profitability, and the like. As an example, by identifying attributes of workers who make a higher percentage of substantive edits during post machine translation editing, other workers who may be highly suited for handling post machine translation editing may be identified based on similarity of worker attributes and/or through modeling of worker availability for certain tasks.

The methods and systems described herein relating to predicting availability, demand, and/or supply of resources for task and/or translation work may facilitate predicting evolutions of a crowd based on experience with particular workers. Changes to a pool of workers (e.g., a global pool of crowd workers, a jurisdiction-specific subset of workers, and the like) may be predicted based on activity of certain workers, such as workers that may have common attributes with a targeted pool, subset or the like of workers.

D. Routing Based on Worker Localization (and Determining Impact of Locale Based on Analysis of Content of CTU)

Near-global mobility of workers in a distributed network of translation workers presents unique challenges for localization/location-based worker constraints in a translation request. Workers may register in the network from a first location; however this location may not be the worker's home location. Likewise registered workers may log into the network to perform translation tasks from a location other than their original and/or home locations.

Workers may initially be selected for location-specific translation and/or localization work based on their original and/or most recently confirmed physical locations. However, to ensure that a location-specific requirement is met, a current physical location of the worker may require validating. This can be accomplished through associating a worker's logical address (e.g. the IP address of the computer on which she is going to do the translation and/or localization work) with a physical address of the logical address. If the logical address is consistent with the location requirement, the work may be offered to the worker.

An alternative physical location consideration may include the worker using a computer that is physically behind a particular firewall, such as firewall of a bank and the like.

Limits on translation may also require that certain competitors who are requesting translation services be served by workers in physically distinct locations. Therefore, in this situation, not only must a specific worker's location be validated, but work performed at that location may also need to be reviewed before a worker can be offered to perform certain work. In an example if translations for Acme Tool are performed by translators in at a translator collaborative facility, the translations of Acme Tool's competitor may be excluded from being translated by any translator at the translator collaborative facility, or by a worker who has ever worked on Acme Tool translation, particularly at the collaborative facility. By determining a physical location of a translator based on the logical address of the translator's computer, location sensitive translation requirements can be met.

Figure 30:
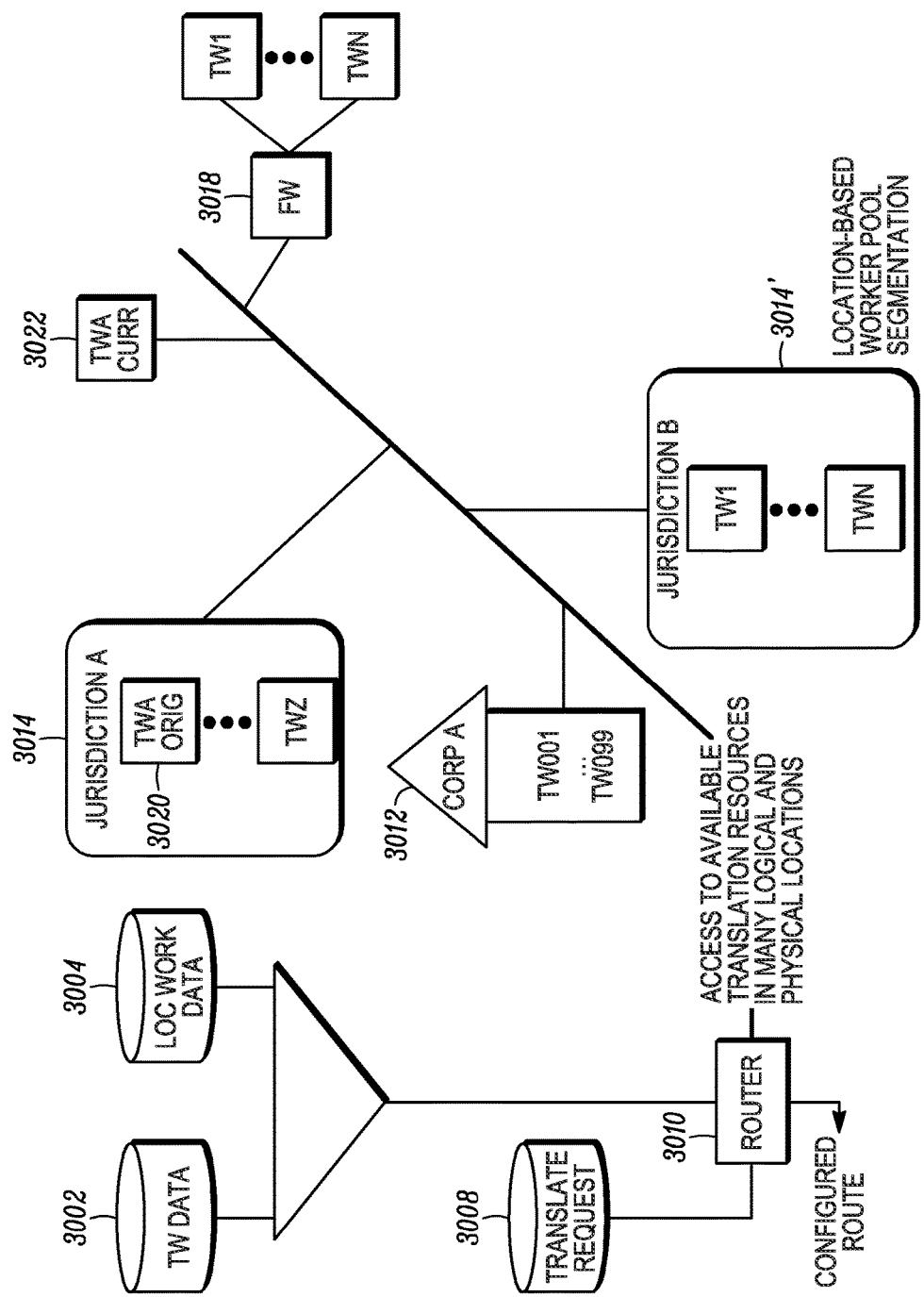
FIG. 30 depicts outing based on worker localization (and determining impact of locale based on analysis of content of CTU).

Referring to FIG. 30, a block diagram of routing based on worker location is depicted. Translation worker data 3002 and translation worker location data 3004 may be processed with a translation request 3008 with a translation work router 3010 to generate one or more configured routes for translating the content in the request. A location constraint in the request may be used by the router to determine which translation resources (e.g., human translators, machine translators, translation memories, and the like) may meet the location constraint. Workers in a pool of workers may be physically located at a range of types of locations including corporate locations 3012, jurisdictions 3014, logical locations 3018 (e.g., behind a firewall), and the like. Additionally, worker locations may include an original worker location 3020 and a current worker location 3022. These two locations may not be the same as workers may be mobile and work from different locations. Based on an aspect of the translation request location information and the current worker physical and logical location(s), certain workers may be selected as candidates for performing the work in the request.

Methods and systems of routing based on worker localization may include a method that starts by receiving request for a task to be performed by a human worker selectable from a predefined pool of human workers, wherein the request includes at least one worker location constraint. The request, or at least the location constraint may be processed with a worker location database that includes worker computer logical address data and worker physical location data. This processing may facilitate determining a candidate set of workers from the pool that satisfy at least the worker location constraint based on, for example the worker physical location in the worker location database. A current location information of a first worker in the candidate set of workers may be requested by sending a digital message to a worker computer logical address of the first worker. In response to the request a message from a computer that is responsive to the worker computer logical address of the first worker may be received. Note that the response may include data that indicates a physical location of the responsive computer. The indication of a physical location may include IP address information that may be cross referenced to physical location via the worker location database. Alternatively, the IP address information in the response may be processed by a third-party processing facility (e.g., a device location determination web service) to generate a physical location. The determined physical location can be validated to comply with the worker location constraint in the original request. When properly validated, the worker may be offered the task (in this example a translation task). If the location is not validated to comply with the worker location constraint, then the candidate worker may be bypassed and another candidate worker may be processed. As note above, validating the physical location comprises comparing an IP address of the responding computer to a database that facilitates matching computer physical location information with IP addresses.

To further ensure that physical location constraints are met, offering the task may include sending a digital message with a sole destination of the computer at the physical location. Even further action to ensure that the physical location constraints in the request are satisfied, the digital message may include an automatic constraint so that the task cannot be forwarded to another computer.

As noted above, a location constraint may be a logical location constraint, such as a network firewall behind which the task must be performed. The request may indicate a location constraint as a plurality of locations where the task is not permitted to be performed, rather than a specific location where the task can be performed. Alternatively, the location constraint may be a plurality of acceptable locations for performing the task.

Not only can a candidate list of workers be identified based on a location constraint in a request, the pool of workers may be configured into a plurality of logical worker segments, the segments representing distinct physical locations of workers. In this way the candidate set of workers may be selected from a segment of the pool of workers that is limited to worker computers with IP addresses that satisfy the localization constraint.

Other methods of remote worker segmentation may include the steps of configuring a crowd worker database with segmentation data comprising worker location, customer work distributed to workers at the worker location, worker experience with the customer work, and customer work type; deriving a worker location profile based on the segmentation data, wherein the worker location profile comprises a metric of worker experience with customer work for a plurality of customers for whom work has been distributed to workers at the worker location and at least one other metric of customer work type across customer work distributed to workers at the worker location; and logically segmenting crowd workers into crowd segments based on the metric of worker experience, worker location, and the customer work type.

E. Time of Day/Competency Segmentation

In addition to segmenting crowds of remote workers based on a location profile, there is provided methods and systems for segmenting crowds based on tasks, competencies and time limitations, such as time zone, time of day, holidays, and the like.

Time-based remote worker management may be performed for one or more of a plurality of work units. To facilitate such time-based remote worker management, each work unit may be associated with at least one competency requirement. For example, some work units may require the worker to apply mathematical principles. Still other work units may require knowledge of life sciences or metalworking. In some instances, the competency requirements may be associated with a particular client. In other embodiments, the competency requirements may be default system values.

Whatever the number and nature of competency requirements associated with one or more work units, there may then be identified a portion of the plurality of work units that share a common competency requirement. In a system that asynchronously handles a plurality of unrelated clients and a plurality of unrelated projects that each may comprise dozens, if not hundreds or thousands, of discrete work units, not only is the problem of organizing a plurality of competency requirements for each task challenging due to the volume of information, identifying a portion of the plurality of work units currently being processed through such a system for the purposes of segmenting geographically dispersed workers is difficult to maintain without a robust computerized networked system with specially programmed computers. Once a common competency requirement is identified for a plurality of potentially unrelated work units, remote workers may be logically grouped into a work-unit capable group comprised of remote workers who share the identified common competency requirement. A properly configured computing environment can be configured to handle hundreds or more of simultaneous common competency requirements across many more work units, thereby not limiting the methods and systems here to a single common competency requirement. Each work-unit capable group may cover workers in a range of time zones, locations, jurisdictions, working hours, personal schedules, and the like. Next, to facilitate time-based management of crowd workers, the work-unit capable group may be segmented into one or more sets comprised of remote workers having a similar time attribute, such as, without limitation, a local time zone attribute. In some instances, the local time zone attribute is a time zone in which a worker resides and/or is currently working. This may result in a plurality of time-segmented crowd worker groups of workers who are capable of meeting the common competency requirement for one or more work units. One such time-segmented group may be in an Eastern U.S. time zone and another may be in a Tokyo, Japan standard time zone. Having segmented a large pool of potential crowd workers into these competency capable groups by time zone, a worker management system may select one or more workers to perform work units that accomplish one or more goals associated with a business process project, while enabling processing of one or more other business process projects contemporaneously. As an example, if the time that a project is to be processed is close to an end of the workday for the Eastern U.S. time zone group, a crowd worker management system may bypass distributing tasks to this group in favor of the Tokyo group who may just be starting their typical workday. Alternatively, a delivery time for the project may allow either group to process the work units, so the management system may choose to de-prioritize selecting a specific group based on the current time of day so that a more urgent project that may be pending can be processed by the Tokyo workers as it becomes active during the Tokyo worker's workday.

In summary, the allocation of work units that share a common competency requirement may be automatically performed based on the time aspect of each time-specific work group, as well as delivery time or other requirements of a project. In an exemplary embodiment, the work units may be allocated to the work-unit capable group that is also in a local time zone that is compatible with a workflow for processing the plurality of work units.

F. Distilling Heterogeneous Projects for Multiple Clients into Common Competency Requirements for Efficient Overall Routing to Segmented Pools within a Large Scale Routing System Distilling heterogeneous projects for multiple clients into common competency requirements for efficient overall routing of tasks, such as translation of individual sentences of a document to segmented pools of translation resources within a large scale routing system may result in each task being routed independently of other tasks that are sourced from a single source request, such as a single document or multi-task project. Projects or items for translation may be broken down into work units, such as tasks, sentences, cognizable translation units, and the like. Metadata for these work units may be accessed and used to identify commonalities among the work units. Work units with certain metadata-based commonalities may be logically grouped. This logical grouping may result in the work units from a plurality of distinct projects being logically grouped so that they are grouped differently than when they entered the system (e.g., the work units may be grouped so that they are no longer grouped around the projects in which they entered the system). For example, work units can be grouped by complexity level, sentences for translation may be grouped by the extent of available leverage from existing translation memories, or the like. With various groupings, one can apply a wide range of different strategies of grouping to optimize processing of the work units.

In a translation example, sentence complexity may be a sentence attribute represented in the metadata. Complex sentences can be grouped and these grouped sentences can be routed to the strongest translators, regardless of which source project and client the sentences are sourced from. Similarly sentences in a group of simple sentences may be routed to the more junior translators automatically.

Such logical grouping of work units based on attributes of the work units can enable configuring and operating a distributed worker system (e.g., an internationally dispersed document translation processing system) so that the entire life cycle of the system can be work unit-based rather than project-based or customer-based. In a translation system example, using sentence metadata allows optimizing the life cycle of the sentence through the translation process, including how it is grouped with other translation units (e.g., sentences, segments, and the like) and how the groups are processed.

This common group of work units approach permits configuring the resources in the work process (e.g., human translators, machine translators, and the like) for more efficient operation. An entire global pool of human translators may be configurable into logical work groups that receive work from groups of work units that have attributes that align with the logical work group strengths or capabilities. By using data that is descriptive of the work units (e.g., sentences to be translated) to organize a global pool of translation resources, processing work units may become highly efficient since pools of resources may already be predefined for work as it is ingested.

Figure 27:
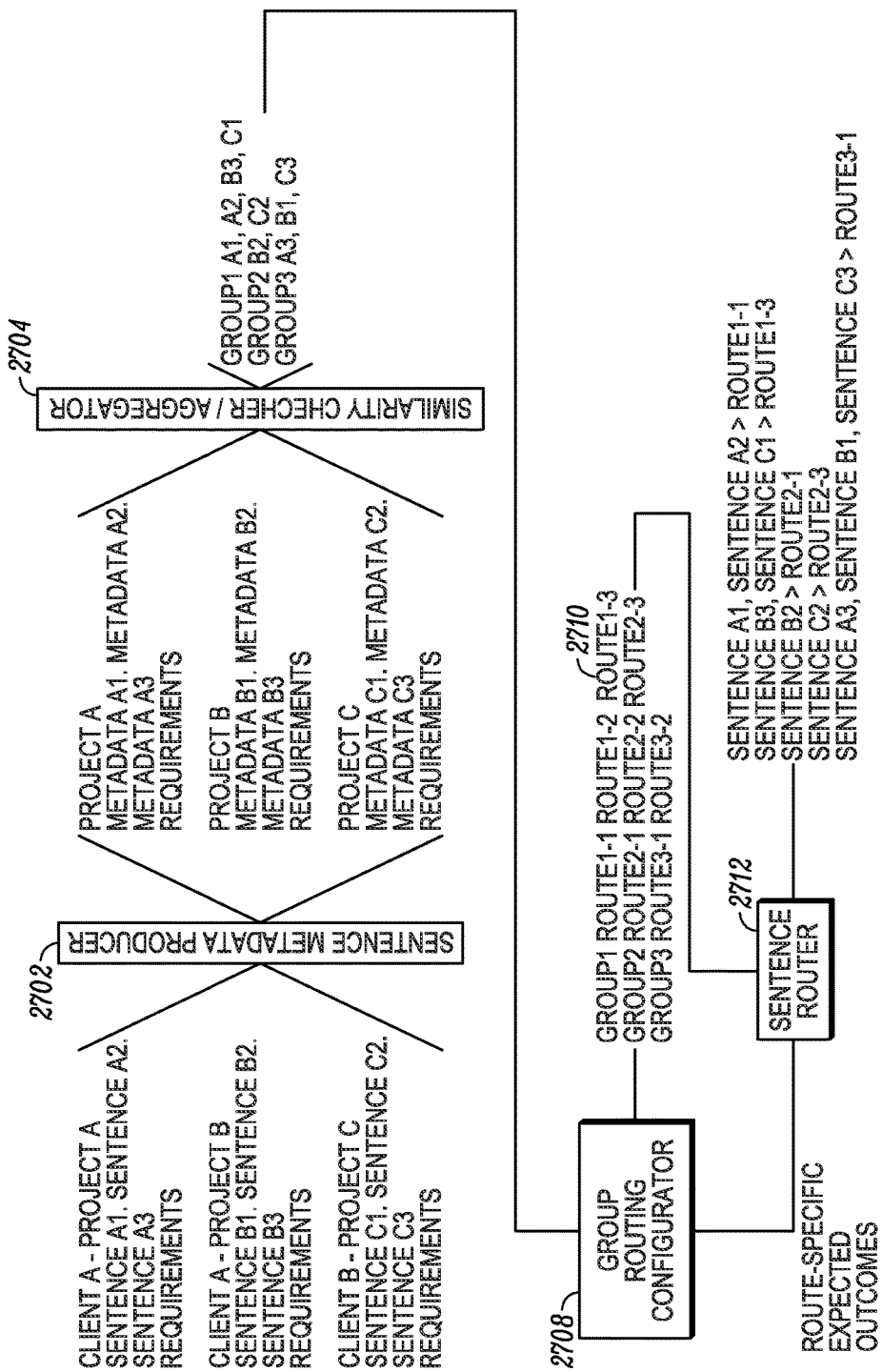
FIG. 27 depicts distilling heterogeneous projects for multiple clients into common competency requirements for efficient overall routing to segmented pools within a large scale routing system.

Referring to FIG. 27, a metadata-producing engine 2702 may process multiple client translation requests to produce metadata that is representative of translation-relevant attributes for a plurality of translation units (e.g., sentences, segments, and the like). The metadata may be used to logically group the translation units so that a group of units may include sentences from a plurality of client requests for translation. Grouping may be based on similarity of metadata, such as language pair, genre, technical subject matter, difficulty of translating, cost limits, and a wide range of other factors. A similarity checker facility 2704 may perform this logical grouping of sentences.

A group routing configuration engine 2708 may select and/or configure a plurality of candidate routes 2710 for each metadata-based logical group of segments. The candidate routes 2710 may be configured and/or selected based on the common metadata associated with each group. The configuration engine may factor route-specific expected outcomes into candidate route configuration/selection. However, the routes may be varied by the engine to address certain aspects of the platform, such as availability of resources, cost of certain resources, client preferences, degree to which the translation units in each group correspond to previously translated content, and the like. In an example of route configuration, a first candidate route for a group may include using translation memories followed by human refinement; a second candidate route for the group may include machine translation followed by human refinement; a third candidate route may include scheduled human translation at a future time when moderately priced human translation resources are available.

With the available candidate routes, units to be translated in a group may be routed by a routing engine 2712 along one of the candidate routes 2710 based on analysis of at least the route-specific expected outcomes in view of the content-specific metadata. More than one segment may be routed on a single candidate route. More than one candidate route may be used for different units in a group based on other factors.

In another translation project example, a plurality of translation projects may each include a plurality of sentences. Each of these sentence may be processed with a translation attribute determination algorithm that may produce sentence-specific metadata based on the sentence content, a context of the sentence, and a plurality of translation requirements associated with the translation project that corresponds to the sentence. Sentences may be arranged into logical groups based on similarity of the produced metadata, as described above and elsewhere herein. One or more candidate routes may be configured for translation of the group of sentences; and each group may be routed along one of the candidate routes. Each group may include sentences from a plurality of the different translation projects so that translation of a source document is managed through a multi-resource distributed translation process on an individual sentence basis while being optimized through the use of the logical groups of the sentences.

Distilling heterogeneous projects for multiple clients into common competency requirements for efficient overall routing of tasks may emphasize translator competency. IN an example that emphasizes translator competency in routing of logically grouped sentences, a plurality of translation projects, each project including a plurality of sentences may be received by a multi-resource distributed process translation platform. The platform may process each of the plurality of sentences with a translation attribute determination algorithm that produces sentence-specific metadata based on the sentence content, a context of the sentence, and a plurality of translation requirements associated with the translation project that corresponds to the sentence. The sentences may be arranged into logical groups based on similarity of the produced metadata. Metadata for the sentences in a logical group may be aggregated into a set of group routing metadata. To address translator competency, a pool of translators (e.g., a global pool) may be segmented into at least two segments of candidate translators based on a similarity of translator-specific competency metadata with the group routing metadata. Based on the similarity of translator competency to group routing metadata, candidate routes for processing each group of sentences may be configured In an example of distilling heterogeneous projects for multiple clients into common competency requirements for efficient overall routing of tasks, a method optimizing task performance is disclosed. For a plurality of projects, each of which may be characterized by a plurality of tasks, the method may start by receiving these multi-task projects. Each of the plurality of tasks may be processed with a task competency requirement determination algorithm that produces task-specific metadata based on the task content, a context of the task, and a plurality of project requirements associated with the project that corresponds to the task. The tasks may be arranged into logical groups based on similarity of the produced metadata, wherein the logical groups include tasks from a plurality of the projects. The metadata for tasks in a given group may be aggregated into a set of group task routing metadata. One or more candidate routes for tasks in a group may be configured to optimize performance of the tasks (e.g., speed, cost, accuracy, and the like). Each task may be routed along one of the candidate routes based on similarity of task-specific metadata with expected outcomes of the candidate routes.

Distilling heterogeneous projects for multiple clients into common competency requirements for efficient overall routing of tasks may take into consideration task execution competency. As noted above task-specific metadata may be produced for each task and tasks across a plurality of different projects may be logically grouped based on the task-specific metadata. An example of such logical grouping may include tasks that require knowledge of mechanical assembly may be grouped and tasks that require knowledge of electronics may be grouped separately from the mechanical assembly knowledge tasks, even if the grouped tasks are from different sources, such as different clients, projects, and the like.

With the logically grouped tasks, group-specific metadata may be produced, such as through aggregating the task-specific metadata for each task in the group. The group-specific metadata may be used to segment at least a portion of a global pool of task workers into at least two segments of candidate workers based on a similarity of worker-specific competency metadata with the competency requirements derivable from the task-specific and/or group-specific metadata for performing the tasks in the group. Candidate task execution routes for a group may be configured so that at least one candidate worker from one of the at least two segments of the global pool of workers is included in the routes. To perform the tasks, each task may be routed along one of the candidate routes based on similarity of task-specific metadata with expected outcomes of the candidate routes. Alternatively, all tasks in a logical group of tasks may be routed along one of the candidate routes based on similarity of group-specific metadata with expected outcomes of the candidate routes.

Distilling heterogeneous projects for multiple clients into common competency requirements for efficient overall routing of tasks may be practiced by a translation system that includes a plurality of machine translation engines disposed in a plurality of countries. The engines capable of accessing a translator competency database storing information about the competencies of a plurality of human translators disposed in a plurality of countries, the plurality of human translators logically grouped in the database into translation competency-based segments of a global pool of translators, the logical grouping based on translation competencies of the translators. The system including at least one interface for communication with the plurality of human translators. The system may also include a translation ingestion engine that detects common translation competency factors across a plurality of sentences across a plurality of client translation requests and logically groups sentences into competency-based translation groups from a plurality of distinct client translation requests based on the common competency factors. Another element of the system may include a translation routing engine that configures translation routes so that a portion of sentences in a competency-based translation group are routed to translators in a translation competency-based segment that has competencies that correlate to the common translation competency factors for the routed translation group of sentences.

The system may further include a translation aggregation engine that receives a corresponding translation for each of the sentences from a plurality of competency-based translation groups and rearranges the translations into distinct translation request groups that group the translations based on the client translation requests to effectively bring the translations of sentences from one source request that were distributed through this method together into a group that substantially matches the source request.

The translation routes may include a variety of translation sources. In an example a portion of the configured translation routes include use of at least one of the plurality of translation engines. As noted above, translation engines may be disposed in a plurality of countries. In an embodiment, the at least one of the plurality of translation engines is selected based on a country in which a translation request is received. This may result in the translation engine country matching the request country. It may also result in the translation country matching a country from an acceptable list of countries based on the request country. In this embodiment, the acceptable list of countries may be determined by export regulations of the request country, countries in which the requesting client has business operations, and the like. The selected translation engine country may be based on a country in which a majority of translators for a configured route are disposed.

The metadata used for logically grouping translation units (e.g., individual sentences, and the like) may be applied to a machine learning process along with translation results to facilitate figuring out which types of groupings based on which metadata are producing the best results.

G. Jurisdiction Segmentation

In addition to segmenting crowd workers according to location based on work performed at a location or time zone, methods and systems for segmenting crowds with specific workers in specific jurisdictions may be provided.

First, there may be provided a plurality of work units wherein each work unit may be associated with at least one jurisdiction requirement. For example, it may be necessary, in order to receive favorable tax treatment, for a certain measure of work units to be performed in a particular state or country. In another example, a client may require that a certain portion of the work units be performed by workers in a German-speaking country. In yet another example, a jurisdiction requirement may require that no more than 50% of a project's work units be performed by workers in a particular country, such as Ireland. Jurisdiction requirements may be identified in data provided to a business process crowd sourcing platform when a project is submitted. The requirements may be embodied as data in a workflow, a project requirement specification, a set of client-specific rules, and the like. Many sources of such requirements are described herein with respect to processing work units (e.g., task units, crowd units, cognizable translation units, segments, and the like) for a variety of embodiments. These sources and others can be useful for holding or transmitting requirements, such as jurisdictional requirements for a project or a work unit to an automated work unit processing system.

Once the jurisdiction requirements are defined, a computerized crowd worker identification facility that has access to jurisdiction information for each of thousands or more crowd workers may identify one or more of these crowd workers who also share a common attribute that is required for processing the plurality of work units. These one or more crowd workers who share a common attribute may also be logically grouped into a work unit-capable group as described elsewhere herein. The work unit-capable group may then be segmented into sets of crowd workers wherein each set comprises workers of a particular jurisdiction. As described above for time-based crowd worker segmenting, performing worker grouping, segmenting, and jurisdiction filtering may be properly accomplished with a highly specialized computerized system due to the complex overlapping nature of work unit requests, worker availability, constantly changing time of day, and the like.

To ensure that the particular jurisdictional requirements are met for a project by workers who are also capable of meeting other requirements for the work units, a work unit scheduling capability may be accessed to ensure that work units that are required to be processed in a particular jurisdiction are properly distributed to workers in those jurisdictions while taking into consideration project scheduling, worker availability of the required jurisdiction, and the like. The net result is that the work units may be allocated to crowd workers of the work unit-capable group that are also in a jurisdiction that is compatible with the at least one jurisdiction requirement.

H. Multi-Path Unit Translation Based on Budget/Quality Targeting, Including Selective Use of Lower Quality Translation than the Target Quality Standard Achieving translation project goals of cost, quality, delivery, among others may be approached in a variety of ways. However, translation of most documents involves translating many individual segments of the document. As an example, a segment, also know as cognizable translation units (CTUs) may be a single sentence. Therefore a translation project cost goal can be achieved through managing costs for translating the individual segments that make up the project (e.g., a document). Other translation project goals (e.g., quality, schedule, resource utilization, efficiency and the like) may be similarly realized.

In an example, achieving a cost goal of translation project that has a dozen segments may be accomplished through careful management of costs for each segment. Rather than simply dividing the cost goal by twelve, individual segments may be analyzed to optimize costs for translating; thereby achieving acceptable translation for each of the segments at a minimum or near-minimum cost. In this example, some segments may be available in a translation memory and the cost to translate these segments is small, whereas other segments may be complex and require use of a highly skilled human translator, therefore the cost may be higher than the average. By balancing out those segments that are more costly to translate than average with segments that are less costly than average to translate, an overall translation cost goal can be achieved.

An architecture to attempt to achieve overall translation project cost/quality goals while managing each segment of the project individually may include multi-path unit translation based on budget/quality targeting. Multi-path unit translation that may include selective use of lower cost/quality translation than a target cost/quality standard may be implemented with an active translation unit digital object that interacts with translation network nodes to meet at least one of a total cost, quality, delivery and other requirements of translation requests.

A cognizable translation unit active object may include content and executable code for facilitating translation of a portion of the content (e.g., a text string portion of the CTU content). Many CTU active objects may be operating contemporaneously in an automated or semi-automated translation system that facilitates active CTU objects interacting with translation resource nodes (e.g., human translators, machine translators, and the like) to attempt to achieve translation project goals.

CTU active objects may advertise a desired cost and delivery, such as through interaction with translation network nodes, so that the nodes and/or humans operating the nodes can respond digitally to the CTU active object. A response may be an acceptance of the advertised cost/delivery, a denial of the advertised cost/delivery, a counter offer, and the like. The CTU active object may determine one or more candidate translation nodes that meet this criteria and any other relevant criteria, such as expertise of the human translator, availability of the translator, and the like. Of these qualifying translation nodes, one may be selected for performing the translation. The actual costs may be accrued against a translation project budget and communicated to other CTU active objects traversing the network of translator nodes so that each can determine an impact on and accordingly adjust their CTU translation cost, quality, and delivery goals.

While CTU active objects may set cost goals, translator nodes may set costs. These costs may be affected by an amount of time remaining in a delivery goal. Higher costs may be required for shorter translation delivery requirements. Likewise, lower costs may be required when time to translation delivery is increased. The automated/executable aspects of an active CTU may process offers, delivery schedules, completed work totals, and the like to effectively achieve complete translation of all units in a translation project while also achieving cost and/or delivery and/or quality goals.

Figure 29:
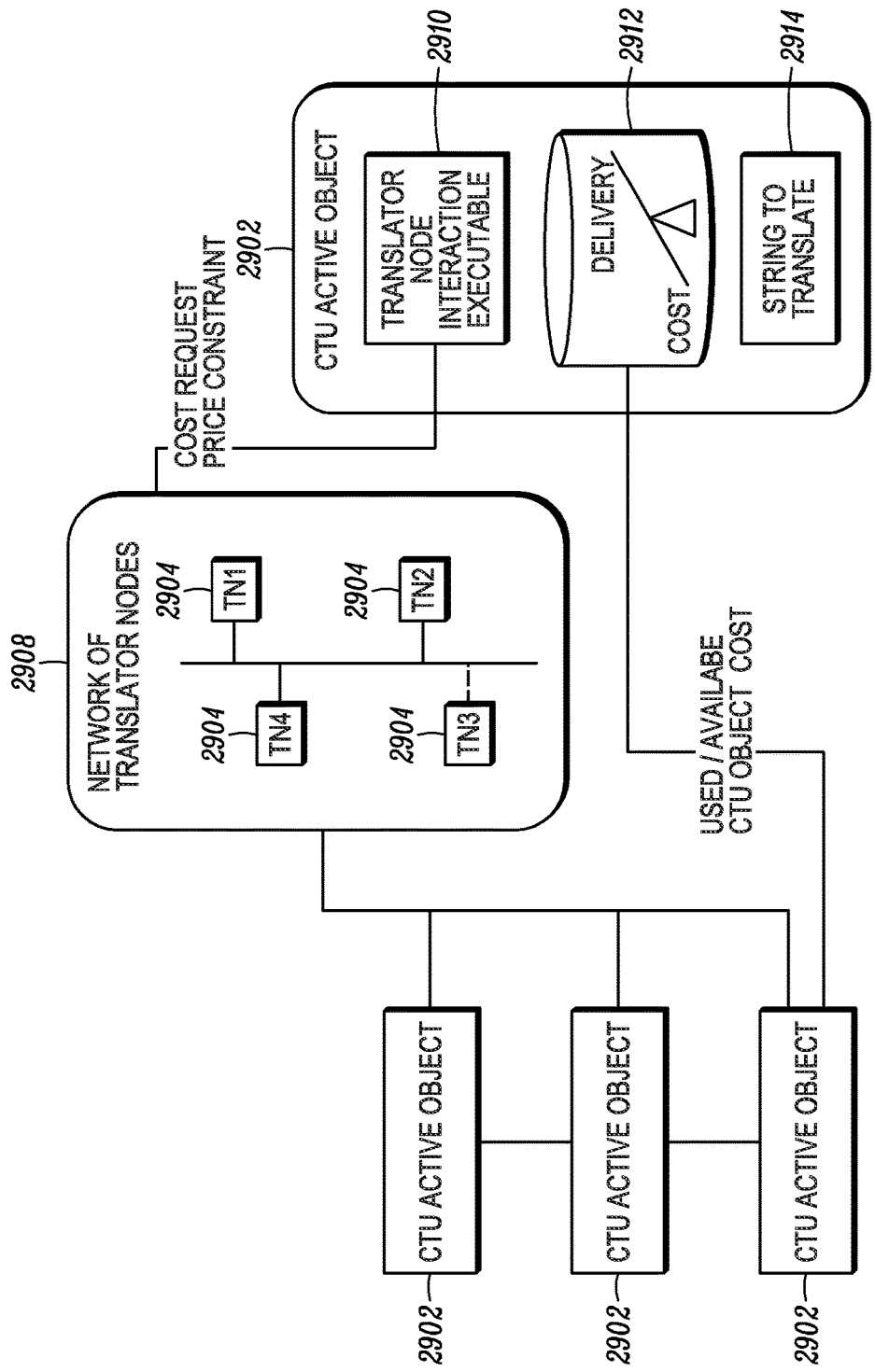
FIG. 29 depicts multi-path unit translation based on budget/quality targeting, including selective use of lower quality translation than target quality standard.

Referring now to FIG. 29 that depicts a block diagram of a system for multi-path unit translation based on budget/quality targeting, active translation objects are described. A translation process may include a plurality of active translation objects 2902 that each represent a unit/segment/sentence and the like to be translated. It is important to keep in mind that although translation is the exemplary function in this example, the method and systems of active object processing described herein may be applied to any distributed crowd of task resources, workers, and the like. Each active object 2902 may communicate with translation nodes 2904 in a network of translation nodes 2908. Through conventional network interactions (e.g., token exchange, direct communication, proxy-based communication, and the like) that facilitate different properties (e.g., an active object and a translator node) in a network to exchange information, active objects 2902 may determine a cost for translating a translatable portion identified by each active object 2902 by at least a portion of the translator nodes 2904 in the network 2908. Active objects 2902 may further communicate (e.g., over the network, through a central server, directly with each other, via a proxy, and the like) to keep an updated available budget for translating all segments of a project with which a portion of the compliment of active objects operating in the network is associated.

An active object, such as an active translation object 2902 may include a translator node interaction executable 2910 that may include code and data for interacting with translator nodes, servers, other active objects, and the like as well as analyzing translation price offers, responses to translation price requests, and the like to determine a cost for using a particular translation node to perform translation of the active objects translatable content. The object 2902 may further include a cost/delivery tradeoff algorithm 2912 that may lead to effective management of available delivery time to reduce translation costs, improve quality, and the like. At least a portion of the active objects 2902 may further include or reference content to be translated 2914.

As an active object 2902 interacts with nodes 2904, each object 2902 may determine a preferred translator node 2904 based on price, availability, delivery, quality, and other aspects such as suitability of the translator at the translation node 2904 for performing the translation, and the like.

Methods and systems of multi-path unit translation based on budget/quality targeting may include methods and systems by which an active translation unit objects set acceptable costs for translation of a translation unit associated with the object. The active object may be configured as a digital structure for a cognizable translation unit to include metadata for translating a text string of the unit and executable code operable to seek a translator out of a pool of translators that meets a translation cost criteria and a translation delivery criteria that are derivable from the metadata. The executable code may interact with translator nodes in a digital network of translator nodes to determine a translator node that meets the translation cost criteria and that is available for translating the text string while meeting the delivery criteria. A portion of the translation cost criteria may have an inverse relationship with an amount of time remaining in the delivery criteria so that, for example costs can be managed throughout the lifecycle of a translation project as it may be determined from a delivery criteria. Also, a limit may be applied to the translation cost so that it does not trend toward infinite as the amount of time remaining to delivery approaches zero. As an example of time/cost tradeoffs, as the amount of time remaining in the delivery criteria is reduced due to passage of time between when the translation project was started and the current calendar time, the portion of the translation cost criteria may increase automatically based on a formula, thereby facilitating selection of a translation node for translating the text string that trades off time for cost. The cost criteria may also include a measure of allowable cost for translating a plurality of related units so that the cost criteria can be adjusted in near-real time as the related units interact with translation nodes. In this way, the allowable cost can be a remainder of a total cost allocation for translating the related units after costs for translations performed for the related units is subtracted from the total cost allocation.

In an alternate embodiment of multi-path unit translation based on budget/quality targeting, translator nodes may set required costs for translating content associated with an active translation unit object. A network of translator nodes may be configured so that each node is operative to receive a request over the network for translation of a cognizable translation unit. Such a request may include a delivery schedule for the translation. Each translator node may further be operative to respond to the request with a cost for translation that is based on an amount of time remaining before the translation must be delivered per the delivery schedule. As with other embodiments, the cost for translation may have an inverse relationship with an amount of time remaining to perform the translation. Therefore, requests for translation with less time remaining to perform the translation may be priced higher by the translation nodes and therefore these requests would receive a response that includes a higher cost for translation than requests for translation of comparable units with more time remaining to perform the translation. This simple inverse relationship can be embodied as an algorithm that the operative portion of the translator nodes utilizes to determine a portion of a price to charge for translation. Translator nodes configured to receive requests over a network of translator nodes may include devices that are adapted to appear to other devices in the network (e.g., devices that submit requests) as dedicated function translation devices. Such adaptation may facilitate high efficient, secure, and timely communication between nodes in a network. Likewise, a network of translator nodes may be a dedicated network (physical, logical, virtual, and the like) that is utilized for translation by a distributed translation platform.

Yet another alternate embodiment of multi-path unit translation based on budget/quality targeting may include dynamic route adjustment based on consumed translation budget for one or more translation units in a translation project. This embodiment may include routing a plurality of cognizable translation units through a first route that includes machine translation nodes and human translation nodes. During the routing, measures of the units and costs of the translations may be received, such as when the translations are performed by the machine translation nodes, translators at the human translation nodes, or a portion of both. The embodiment may include calculating a remainder of a translation budget based on the received measures that may lead to determining a second route to utilize more machine translation nodes or more human translation nodes based on the remainder of the translation budget. More machine translation nodes may be utilized if the adjusted translation budget falls below a dynamic translation budget lower threshold. Likewise, more human translation nodes are utilized if the adjusted translation budget remains above a dynamic translation budget upper translation threshold.

These two thresholds may facilitate compensating for higher costs than anticipated by selecting certain content that is suitable for machine translation to be routed to more machine translation nodes. Likewise, if translation costs for other content that affects the overall budget for translation is lower than anticipated, such a process may dynamically route content to human translators for translation. Such automatic adjustment may enable an operator of a distributed translation network of human translators to ensure that key human translators are provided with paying translation work. A key using these thresholds is that the thresholds can be set so that a cost quoted or estimated for a translation project can be met while also allowing an translation process operator to manage translation resources more effectively.

Such dynamic route adjustment may include routing a second plurality of cognizable translation units through the adjusted first route. This may be followed by repeating the steps above for additional cognizable translation units until all cognizable translation units in a translation project are translated.

Translation budget and quality management may exist as one or more functions of a translation platform that utilizes a variety of translation resources and translator support tools to profitably operate a distributed translation network of human translators. One element of managing budget and quality is to identify high stakes versus low stakes content. Generally high stake content may require being routed through processes that deliver higher quality results than low stakes content. Another way to characterize high steaks content is based on the likelihood that the content requires a higher degree of human translator effort or expertise to translate. As an example, high and low stakes content can be determined based at least in part on term-frequency in such content. If a term that is frequently utilized is a common word for which translation is straightforward and perhaps has been done many times in the past, content with this term may be characterized as low stakes content. If the term frequency in content is low, then the content may be determined to be diverse and therefore may required at least review of any machine translated portion by a human translator. Likewise if term frequency of high complex terms is high in a content, then the content may be characterized as high stakes content.

Additionally, cost-based routing algorithms analogous to those used in peer-to-peer networks could perhaps be used in multi-path unit translation based on budget/quality targeting, such as having each translator node publish its current pricing/cost to neighbor nodes. A translation unit could carry with it a budget metadata element, such as a counter, which could seek the lowest cost available neighbor (which could be anywhere on the network, or within a specified locale, such as behind the firewall of an enterprise, or in a managed crowd, or in a country) at a given time and increment/decrement the counter as the budget is used, so the translation unit itself has metadata awareness of how much of its budget has been used as it routes itself through a network. This can be extended to cover things like resolving collisions based on metadata associated with the translation unit. For example, if two translation units are attempting to use the same low cost/high quality node, and one has nearly expended its budget, while the other has ample remaining budget, the budget-constrained unit may be given priority access to that node to increase the likelihood that both arrive on budget.

With a counter that travels in the metadata of a translation unit, opportunities can also be created for reverse auction pricing and routing. A translation unit can "name its own price" for translation (or partial translation), based in part on the remaining budget and remaining time. If considerable time remains, the unit can set a very low price, while as time reduces, it can automatically raise the price to reflect the urgency. The unit itself (if it is an active unit) can negotiate through the crowd by a programmed, self-pricing and publication mechanism. Embodiments of such multi-path translation have been described above herein.

I. Customization of a Crowd (e.g., Cleansing)

To help ensure that crowd worker work product is processed consistently across a plurality of jurisdictions, it may be necessary to actively adjust worker criteria so that work product may meet a data cleansing or normalization requirement. Such a requirement may not need to be explicitly stated by a user of a business process crowd sourcing platform as maintaining uniformity of work product may be an intrinsic goal of the platform. While meeting such a requirement may impact worker selection within any given jurisdiction, it may be more substantively impacted when workers from a plurality of jurisdictions are to be used. Therefore, there are provided methods and systems for customizing crowd workers for the purposes of data cleansing and/or normalization based, at least in part, on a location of the crowd workers.

First, there is provided a plurality of worker criteria from a project requirement, as described elsewhere herein. For example, a worker criterion may specify that the workers for a project need to have a minimum of a college degree. In another example, a worker criterion may specify that the workers for a project need to have at least 1000 hours working on other projects. Once established, the worker criteria may be mapped to worker attributes in a database of worker information to identify the workers that meet the worker criteria. Although worker criteria may be established as an initial requirement, mapping to worker attributes may take on a dynamic nature due to the often overlapping and potentially conflicting requirements for worker resources in a platform that accommodates a large number of customers, projects, work units, and geographically dispersed workers who may have various working schedules, and the like. To accomplish mapping that facilitates operating such a highly complex and diverse business process execution service efficiently and effectively, specially configured systems of computerized facilities that can access information nearly on-demand across the globe may be required.

Next, the worker criteria may be adjusted based, at least in part, on a target location for accessing crowd workers. For example, consider the instance in which the two criteria discussed above are in force, wherein the crowd workers are to be selected from the group of crowd workers residing in Ireland. Consider further that there may not be enough such workers in Ireland currently available to perform the required work (or enough such workers who meet the worker criteria required to complete the project). This may be due to a general lack of workers; however, it may also be due to qualified workers being assigned to other work projects through the business process execution system. To the extent that such assignments may be made asynchronously for a range of different projects, the number of available workers who meet the criteria may change rapidly over time as well. Efficiently keeping track of this dynamic worker availability environment is well beyond the capabilities of humans alone. In such an instance of insufficient workers who meet a work criterion, various options are possible. For example, workers who do meet the criteria may be reassigned tasks, and the tasks previously assigned to those workers may go back into the queue. In some cases the worker criteria may be adjusted by relaxing a constraint, such as by not requiring a college education. Perhaps, for example, the worker criteria may be adjusted down to a high school education, combined with a minimum number of hours of experience, in order to increase the number of eligible crowd workers. In other examples, the worker criteria may be adjusted to produce a desired composition of crowd workers based upon a worker criteria or attribute. For example, worker criteria may be adjusted to produce a group of eligible crowd workers having a desired distribution of political preferences or affiliations. In other examples, workers from two different locations with different educational standards may be required for a certain set of work units. To ensure that workers in both jurisdictions meet a minimum education level for the project, workers in a first jurisdiction may be required to meet a first education level and workers in a second jurisdiction may be required to meet a second education level that is different from the first education level and is based on differences in the education systems of the first and second jurisdictions. If workers in a third jurisdiction were also to be selected, a third education level requirement might be specified for these third jurisdiction workers based on differences between either the first or second jurisdictions and the third jurisdiction. When only one jurisdiction-specific education level may be specified, workers in other jurisdictions may be used if the education requirement of the first jurisdiction is adjusted to ensure a comparable education level of workers selected in the second or third jurisdiction.

Regardless of the manner in which the worker criteria are adjusted, a plurality of crowd workers in the target location may be selected that satisfy the worker criteria project requirement. This selection may dynamically adjust the available worker/criteria mix for other ongoing or pending business process projects so that the properly configured computerized system described herein would be capable of maintaining for efficient and effective operation of the business process execution platform.

J. Minimum Wage Modeling

A platform for managing crowd workers may generate revenues through effective allocation of work to workers that is consistent with worker capability. Simply put, workers with greater skill, education, or experience are likely to be billed out to a customer at a higher rate than inexperienced or junior workers. This difference in rate may result in greater revenue for a platform facilitator when the more experienced worker performs work for which a higher rate can be charged. Because work itself may be associated with an expectation of cost, or intrinsic value derived from the work, charging for work may be constrained based on aspects of the work. A worker payment model that pays the worker a wage for work performed that may be decoupled from the amount changed to a client for the work to be performed makes it imperative to match workers with work charge rate. Therefore, assigning work that can be performed by a low cost worker (and can only be charged to a client based on low cost worker utilization) to a worker who charges a higher cost/rate/wage, can result in reduced profits for a platform facilitator. Therefore, there is provided methods and systems for crowd task allocation involving modeling work for an appropriate wage. The wage modeling may be considered when determining an appropriate worker location.

First, there is provided task metadata that is useful for determining what a platform facilitator may charge for the work and, therefore, what worker attributes may be appropriate for selecting a work unit. The task metadata may be provided for a plurality of tasks to be allocated to crowd workers. Such metadata may include, for example, a degree of difficulty for completing the task, an approximate amount of money available to be spent on the task, and the like. Next, the task metadata may be processed for each of the tasks with a worker allocation model that facilitates determining a maximum wage level for the task in at least one crowd worker location. For example, it may be determined that maximum wage level for medium difficulty tasks to be performed in Ireland is not to exceed twenty dollars per hour. This model may facilitate ensuring that workers who are near to or above the maximum wage level for the task are excluded from at least initial consideration to perform the work, even if the workers are otherwise qualified and available to perform the work.

As a result, individual crowd workers in the at least one location may then be identified, based, at least on part, on crowd worker wage level information in a database of crowd worker information for workers who have a wage level requirement that is less than or equal to the determined maximum wage level, with the plurality of tasks being distributed to a portion of the identified crowd workers as described elsewhere herein. Since such a platform may allocate work to workers in a large number of different locations, information about wages for each location would facilitate optimizing worker use across locations, jurisdictions, and the like. It may also facilitate worker selection based on location when a difference in wage is detected among locations for a given level of work. Ensuring that inflowing work is distributed to workers to meet all workflow requirements (e.g. quality, delivery, and the like) while optimizing revenue potential for a platform operator may involve tens of thousands, or more, wage model processes running substantially contemporaneously as each work unit may have varying wage model-impacting aspects. Therefore, operation of such a wage-modeling revenue-optimizing crowd-sourcing platform requires and specially configured computerized systems.

K. Jurisdiction-Based Recruiting

Methods and systems are provided herein for employing multi jurisdictional crowd recruiting with automated quality checks upon recruiting.

To facilitate automated crowd recruiting with automated quality checks, there may be received potential worker information comprising, at least, worker self-reporting of personal data, demographic data, professional data, and an on-line presence data of a potential worker. In the instance that the worker personal data includes location information, such as an address, citizenship or other residency information, such data may be automatically validated by comparing the personal location information with independently gathered data from at least one independent networked data source. For example, an automated Internet search may retrieve a work address for the potential worker. In such an instance, it may be enough to validate the potential worker's home address if an independently gathered work address shares a common town and state.

Once validated, worker output validation may be performed. For example, a potential worker may be prompted to perform at least one computer-based skills activity that is adapted based, at least on part, on the received potential worker confirmed location data. For example, a potential worker may be prompted via an Internet based user interface to translate a portion of text from French to English based, at least in part, upon a validation that the potential worker resides in Paris, France.

The result of the computer-based skills activity may be evaluated, either by a person or automatically, so as to classify the potential worker as rejected or qualified to perform work.

L. Crowd Recruiting

Methods and systems of business process crowd-source recruiting may include applying automated electronic recruitment, evaluation, enrollment, and training techniques.

M. Task-Progression Segmentation

Business process workflows may involve applying a work product output by a worker processing a first task to a second task. Determining a worker for the second task may be dependent on the first task output. Therefore, a degree of dynamic worker allocation based on linking tasks may be provided. Therefore, there is provided methods and systems of task progression-based workflows for linking tasks together in a managed crowd.

First, there is acquired a task output of a task performed by a worker at a worker location for a client or customer. For example, the task output may comprise a summary of medical research dealing with vaccines for polio. Next, the task output may be evaluated to determine a criterion for worker selection for a follow-on task that requires use of the task output to perform the follow-on task. In the present example, it may be determined that a follow-on task of evaluating the most promising vaccine approaches using the outputted summaries may be best performed by a worker having a medical degree. As a result, possession of a medical degree may be determined to be a worker selection criterion for the second, linked task.

Then, a portion of the next task to be completed may be routed to a worker based, at least in part, on the determined criteria and a worker location profile for the worker location where the worker resides and/or works. In an exemplary embodiment, the worker location profile may be stored in a database and may comprise a metric of worker experience with customer work for at least the customer and at least one other metric of customer work type across all customer work distributed to workers at the worker location.

N. Dynamic Linking of Tasks in a Task Progression within a Managed Crowd

Dynamic linking of tasks in a task progression within a managed crowd may be implemented with a flexible task configuration engine that can adapt a task from a first configured task type to a second configured task type as the task progresses through an execution route for the task. In embodiments, a "task" may, for example, be a list of data elements to be transformed by a person in an internet-connected crowd/task platform, and then manipulated by a computer system for the task type transformations. In an example, a task request may be processed by a task instance/type generator to output a task instance of a specific task type (e.g., task type A). This task may be processed by a task execution process that may include remote task workers performing at least a portion of the work required for the task. Once a first work criteria for the task type A instance of the task is met (e.g., a sub task is complete), the type of the in-process instance of the task may be changed to a task type B. Workers who may be qualified to perform task type A work may not be qualified to perform task type B work. In such as circumstance, the task may be routed to another worker who is qualified to perform task type B work. The task instance may be changed from type A to type B based on task route and/or workflow data that may be captured and/or derived from the task request.

Adapting a task instance type from A to B may enable dynamically linking tasks in a task progression without requiring that all task steps in a task progression be preconfigured or even known prior to starting the task progression. As information about the work associated with the task is gathered during the progression, a task instance type transformation engine may determine a next best task type for processing the task instance. This may include selecting/adjusting a resource of a next step in the task progression based on a remaining portion of an initial budget for completing the task, and the like.

Figure 28:
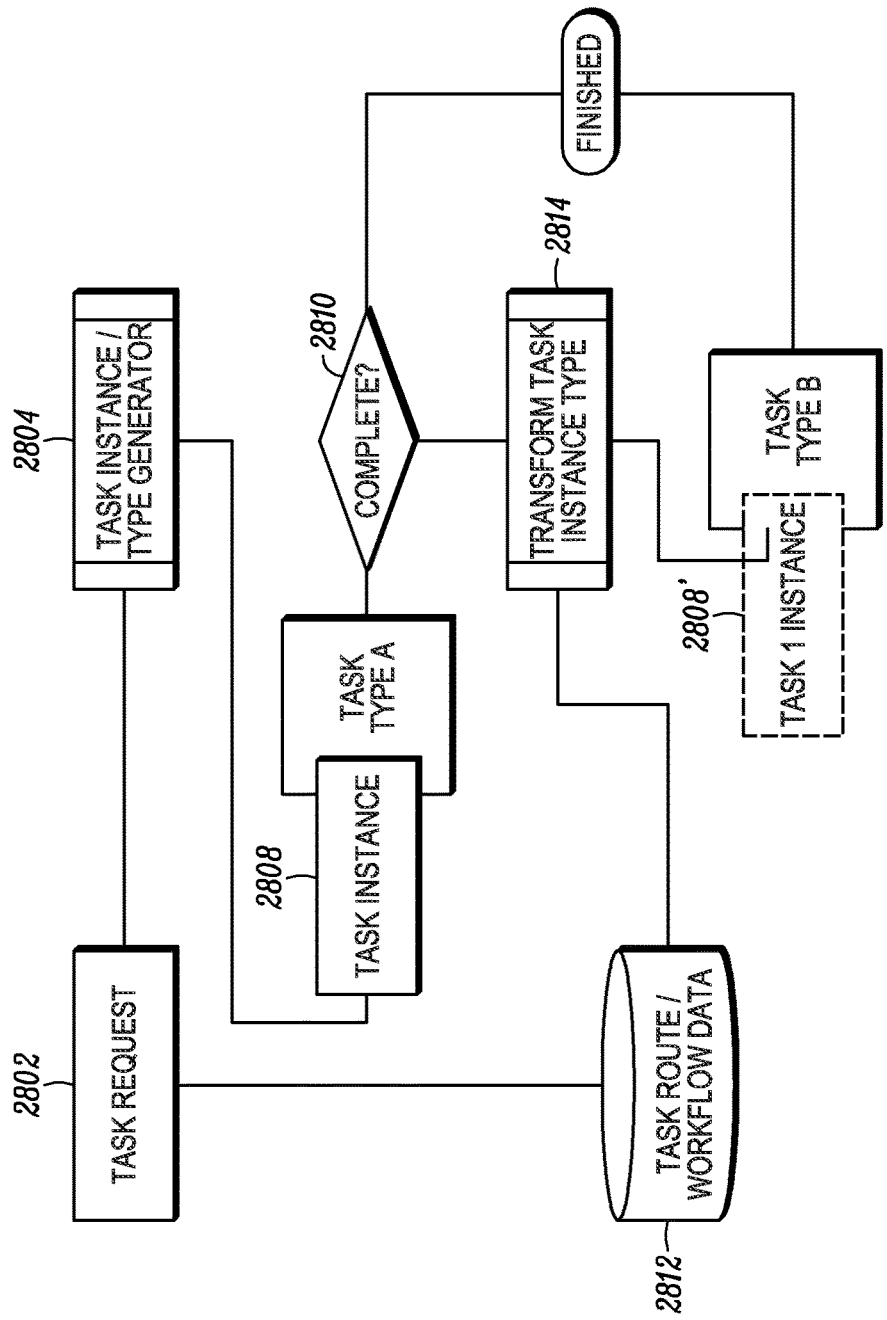
FIG. 28 depicts dynamic linking of tasks in a task progression within a managed crowd.

Referring to FIG. 28, a task request 2802 may be processed by a task instance/type generator 2804 to produce a task instance with task type A 2808. The task instance 2808 may be processed by a task worker or other task processing resource and an assessment as to whether work related to the task is complete 2810. If the work associated with the task is found to not be complete (e.g., a multi-step process), then the task instance 2808 may be processed 2814 so that the task type of the task instance 2808 may be changed. Changing a task type may involve referencing task routing/workflow data 2812 to determine what the next task type should be for a given task instance 2808.

Methods and systems for dynamic linking of tasks in a task progression within a managed crowd may include an exemplary method of dynamic task linking that includes initially associating a first task type with an instance of a task. The method may next include configuring a route for performing the task. The route to be configured may include a first execution step for the first task type and a plurality of candidate second execution steps for a plurality of candidate task types other than the first task type. The plurality of candidate task types may, for example be based on a desired output of the task. The method may include routing the first execution step in the configured route, thereby facilitating production of a first execution output for the task. The task instance processed through the first execution step may be adapted into a second task type based on a result of performing the first execution step and a desired outcome of the task. The second task type may then be used as an index into the candidate of second execution steps to narrow down the possible second execution steps to those that are compatible with the second task type. Preferably the indexing based on the second task type will result in identifying a single second execution step so that the instance of the task with the adapted task type can automatically be processed by the identified second execution step.

An alternate method of dynamic linking of tasks in a task progression within a managed crowd may include receiving a list of a plurality of tasks to be performed by a plurality of task workers. Work units may be divided into a series of steps that may be interrelated, such as by having certain steps being dependent on an outcome of other steps. In certain embodiments, each step may be a separate task or work unit. In other embodiments, a work unit may be composed of a plurality of dependent steps. The dependencies of performing other task actions based on the completion of a first task in the list of tasks may be determined. This may include taking a list of candidate steps for completing a work unit or task and determining what, if any dependencies may exist for each of the steps in the list on a first task. The list of steps may be predefined; based on historical associations among tasks; determined dynamically based on analysis of a work unit, and the like.

At least one such dependency of a task step on an outcome of another task step task may be determined upon the completion of an initial task. In this way a next task, work unit, or task step may be dynamically determined during processing of a project, such as a translation project as a first task, work unit, or step may be finished. The completion of an initial task may be tracked so that the output of the initial task, along with the determined dependent task may be routed to an appropriate task worker.

Dependent tasks may be determined dynamically as noted above; however each task may be characterized by a plurality of different task types that may be used for determining and linking tasks, work units, or steps. In an example, an initial task/task step may be given a certain task type. This task type may be used to process an initial step in the task. Upon completion of the task step/task, the task type may be changed to indicate a next action or step for further processing of the task. This type change may facilitate automatic processing of the next step by allowing the output of the completed task step(s) and a selected next step/action to be routed to an appropriate task worker. In a translation example, a task may comprise translating a sentence. An initial type for the task may indicate to an automated translation processing process to evaluate the sentence for existence of translated content in translation memories. This initial task type may suggest to an automated translation processing facility to perform the initial step of gathering any relevant translation of a portion of the sentence from a translation memory. Based on the outcome of the initial step, the task type may be changed. If no translation portion is found in the translation memory, the task type may be changed to a machine translation task type and the original sentence may be forwarded to a computer for machine translation. If any portion of the sentence is found in the translation memory, the task type may be changed to human translation refinement. Based on this task type change, an automated translation processing facility may route the original sentence, the translated portion from the translation memory, and any pertinent translation metadata to a human translator as a translation refinement task. However, if the quality of the machine translation is suggestive that human translation refinement is not suitable, then a next task step may be to route the translated sentence to a post translation processing facility. In this example of dynamic task linking an initial task type of translation memory lookup may be followed by any of a range of follow-on tasks that are dependent on a result of the initial task processing step.

While task type is changed as a result of each task step completion, each task step may be configured as a distinct task that may be dynamically linked as described herein. A list of candidate tasks for performing translation of the sentence may include translation memory lookup tasks, translation memory output quality analysis tasks, machine translation tasks, human translation tasks, human translation refinement tasks, translation post processing tasks, and the like. Each such task in this list of tasks can be further characterized by how they depend on an outcome of other tasks, such as tasks having been processed already for a particular project, such as a translation project.

Dynamic task type linking may be facilitated by defining a plurality of task types involved in the completion of a project. Further links between pairs of task types may be defined. The links may represent a class of dependency of performing one of the task types on the other task type in the pair. Classes of dependency may include sequential processing dependency where a second task in the pair cannot be performed until the first task in the pair is complete. Other dependency classes may include result-based dependencies, such as an action in a second task of a linked pair of tasks is dependent on an outcome of a first task in the linked pair. An example of such result-based dependency may include an action in a second task may be conditional based on a quality of a result of an outcome of the first task. More specifically in this example, routing of a second task in a task pair may be dependent on an outcome of a first task in that a low quality translation from machine translation may result in a human refinement being routed to a more experienced human translator than would be needed for a higher quality output from a machine first translation task. The dependencies may be used, along with input data available to a task pair from a task-based project to build a route among task types for completing the project. As noted herein the route may be predefined, configured based on linked task-pair dependencies, dynamically configured as task activity is performed, and the like.

At least one of the task types in a task type pair may be configured as a first task of the pair to be performed. A task routing facility may route the configured first task to a worker qualified to perform the first task type so that the worker performs a portion of the task consistent with the first task type. The other task in the task type pair may be configured as a second task of the pair to be performed. This configuring may be based, for example on the a dependency associated with a link among the task types in the pair. The configured second task type may be routed along a route based on the link between the task pair to a worker qualified to perform the second task type, so that the worker can perform a second portion of the task consistent with the second task type.

A variant of dynamic linking of tasks in a task progression within a managed crowd may be based on customer work experience for worker(s) at a particular work relocation. This variant may include taking a task output of a task performed by a worker at a worker location for a particular customer and evaluating the task output to determine a criterion for worker selection for a follow-on task that requires use of the task output to perform the follow-on task. Based on the determined criteria and a worker location profile for the worker location, the profile including: (i) a metric of worker experience with customer work for at least the particular customer; and (ii) at least one other metric of customer work type across all customer work distributed to workers at the worker location. A portion of the task output may be routed to a worker to perform the follow-on task.

Task progression based workflow task linking may be suitable for managing a crowd of workers to perform data research. Tasks to be performed in this field may be relatively complex tasks that are dependent and therefore may need to be linked rather than distributed to a plurality of workers without managing the links among the tasks. In an example, a complex project may require reporting earnings, management stock option holdings, and financial notes for a specific company in a target language. The tasks required to perform this complex project may include; (i) finding an annual report for this company in a first language other than the target language (presuming that an annual report in the target language does not yet exist); (ii) translating the annual report (or at least portions thereof) into the target language; (iii) reporting the earnings and financial notes from the translated annual report; and (iv) reporting management stock option holdings in the target language. Here steps (ii), (iii), and (iv) are tasks that depend on another task. In particular, step (ii) is dependent on step (i); steps (iii) and (iv) are dependent on step (ii).

O. Feedback to Automated Entity Extraction

Crowd sourcing of business process tasks may be combined with automated processes to achieve improved results over using crowd resources or automated processes alone. One such example is for automated entity identification in data records. Automated entity identification in data records can be effectively utilized when the data records adhere to a high degree of consistency, or at least variations in the data are not random. However, most data records are derived from human generated data, such as by direct human data entry, and the like. When large numbers of records need to be processed for identifying entities in the records, crowd sourcing may not be effective or efficient due to requiring a significant number of worker-hours when large data sets are being processed. Therefore, by combining crowd source entity extraction with automated entity extraction, such a business process may be effectively and efficiently implemented on large-scale datasets.

An entity identification project for a data set may include processing the records in the data set with an automated entity extraction facility, such as a specially configured computerized facility that can intake large amounts of data records quickly and process them to extract entities in the records. Records for which entities are not readily identified by such an automated system (e.g. based on the number of milliseconds of computing time being consumed to process a record, for which there are no entities detected, or based on other data related conditions) may be processed by crowd resources. The crowd resource processing results may be provided as feedback to the automated entity identification system to improve the entity identification algorithms employed by the automated entity identification system.

A workflow that indicates such automated and conditional crowd resource processing of data records may be configured and applied to a business process management system, such as the system depicted in FIG. 1 herein. The techniques for task assignment, auditing, aggregating, and payment may be utilized in an embodiment of the system of FIG. 1 for an entity identification use case. Client specific rules, worker metadata, and the like as depicted in the translation business process embodiment of FIG. 2 may also be usefully applied to combined automated and crowd sourced entity identification/extraction. In an example of use of such features of the embodiments of FIGS. 1 and 2 for entity identification, a workflow may indicate that a data record is to be assigned to an automated entity identification processing facility, followed by an audit of the identification result when a measure of automated entity identification falls below a minimum quality threshold. The workflow may indicate that the audit activity is to be performed by a crowd source worker so the audit task may be processed through the task review facility and assigned by the task assignment facility to a crowd worker. Specifics of the audit task may be communicated to the crowd worker and the workflow may indicate that the results of the crowd worker task are to be provided to the automated processing facility as feedback. By tracking the data record throughout this workflow, the feedback provided by the crowd worker may be applied by the automated entity identification facility to improve detection of the entity in the specific data record. The task aggregator may receive input from the automated entity identification facility and from the crowd workers to generate a completed list of identified entities.

P. Cleansing

A business process crowd sourcing management platform may perform a wide range of worker-related functions, such as recruiting, auditing, registration, payment, training, and the like. One of many important activities for such a platform is maintaining integrity of the pool of crowd workers. To maintain such integrity, it may be necessary to cleanse crowd worker records so that there is little or no ambiguity regarding a worker's qualifications, and the like.

A cleansed worker pool may be achieved through methods and systems for cleansing the member records of a crowd. Such cleansing might be desirable in instances when a worker belonging to a crowd has registered more than once using different criteria. Over time, such duplicate filings may result in, for example, a crowd seemingly comprising twenty individuals that really comprises only fifteen unique workers. In such an instance, a work task requiring twenty workers in a group may be distributed to what seems to be twenty individual workers but is really only fifteen separate individuals. This could result in a work task overload for the duplicated individuals. This may also result in certain workers who have registered as if they are actually two or more distinct workers intentionally receiving excess work assignments so that the crowd worker can subcontract his overlapping work assignments to third parties, which may compromise crowd integrity. The methods and systems of cleansing a crowd may address these and other crowd integrity concerns.

First there is gathered crowd worker identification information for a plurality of crowd workers wherein the crowd worker identification information comprises a plurality of typed data fields. Examples of typed data fields include, but are not limited to, social security information, name, address, employment history, degrees received, phone numbers, payment accounts, and the like.

Each of these typed data fields may then be compared across a plurality of crowd workers to produce one or more sets of potential duplicated work entries. For example, all crowd workers having the same street address may be placed in a set of potential duplicated work entries. Likewise, all crowd workers having the same last name with a common work location (e.g. all "Jones" in the same town) may be placed in a set of potential duplicated work entries.

Next, for each set, there may be determined a degree of similarity of data in at least one other typed data field for each set of the potential duplicates. For example, for the set comprised of workers sharing the same street address, for each worker therein, there may be determined a degree of similarity based, in part, on a first name of each of the workers. In the present example, it is unlikely that two separate individuals living at the same address would have the same first name. It is not, however, impossible and, for example, in the case of a college dorm room having many occupants and the same street address, it may occur. Such an occurrence may be less likely than two individuals having the same mobile phone number and sharing both a first and last name.

As a result, it is possible to determine differing degrees of similarity amongst workers in a set. For example, potential duplicate workers in a set may be classified as one of confirmed duplicate, likely duplicate, unlikely duplicate or not a duplicate. Next, one may configure a project-specific crowd worker segment of crowd workers whose classification satisfies a project workflow crowd uniqueness criterion.

In another embodiment, a work product produced by a plurality of crowd workers may be analyzed, either by humans or in an automated fashion, to determine a degree of similarity of the crowd workers based, at least in part, on a comparison of at least two worker characteristics for each crowd worker who produced the work product. For example, there may be extracted from a worker database attributes and/or characteristics defining each worker's degree of education and proficiency in mathematics.

In addition to crowd worker duplicate identification, crowd cleansing may be directed at achieving a certain degree of diversity in worker output. While such techniques as will be described below may effectively identify potential duplicated worker records, an intention may instead be on ensuring that work product meets a certain diversity criteria. Therefore, even workers who are not related may have similarities that could impact the work output in a substantive way, at least in some instances. Therefore detecting such potentially impacted work output may be of high value in certain cases. In accordance with an exemplary and non-limiting embodiment of crowd work cleansing, work product produced by a plurality of crowd workers is obtained. Next, there may be determined a degree of similarity of the crowd workers based, at least in part, on a comparison of at least two worker characteristics for each crowd worker who worked to produce the work product. For example, a work product may be comprised of a plurality of reviews of a movie. There may be, for example, 100 reviews produced as part of the work product with each review reflecting the opinion of a particular worker. It may be determined that 80% of the reviews were written by crowd workers between 18-25 years old with college educations. As a result, 80% of the reviews may be written by crowd workers with a degree of similarity as regards age and education. As a result, it may be the case that, instead of receiving 100 separate reviews, 80% of the work product really reflects the views of a partially homogeneous grouping of crowd workers.

Therefore, based on various determined degrees of similarity, each work product, or sub-work product in the present example, may be classified by extent of differentiation, such as one of, for example, unique, different, substantially cumulative and not different. For example, each of the work units comprising one of the 80% of reviews described above, may be classified as substantially cumulative as each represents, to some degree, the cumulative opinion of a defined demographic. In contrast, perhaps 2% of the reviews are written by 55-65 year olds with doctorates. The reviews written by this second group of crowd workers may be classified as different because, compared to the totality of work product reviews, the perspective reflected in each of the reviews is predominantly unique.

Next, based, at least in part, on the classification, a post-process step may be performed on the work product that corresponds to the classification. For example, in the previous example, a filtering step may be employed to reduce the number of reviews accepted from the 80% worker crowd. Someone wishing to observe a wide variety of reviews will not wish to wade through a large number of reviews that are probably quite similar. In another exemplary embodiment, the mix of reviewers may be normalized around one or more variables or attributes. For example, if assigning a number of stars to a movie based on the 100 exemplary reviews from above, similarities in age groups may be used to ensure that equal numbers of reviews by crowd workers in each of several demographic categories are substantially equally represented.

Other uses of crowd cleansing techniques may include ensuring that work units are automatically adjusted based on crowd worker limitations. Such automatic work unit adjustment may facilitate using crowd workers who may not fully meet the requirements for processing the work unit in some instances. In accordance with an exemplary embodiment of adjusting work units based on crowd worker aspects, project workflow requirements may limit crowd worker access to project work unit information based, at least in part, on characteristics of workers in the crowd. First, project workflow requirements may be established. For example, a project workflow requirement may require that all workers in a crowd selected to have access to certain work unit information have a security clearance.

Next, a determination may be made if a crowd worker being considered to perform a project work unit has any information access-limiting characteristics as defined in the workflow. For example, the crowd worker being considered for task or portion of a workflow may not have a sufficient security clearance.

In response to a determination of limitation, such as of insufficient security clearance, project work unit information may be preprocessed so that information characterized as not suitable for the selected crowd worker is deleted and/or obfuscated prior to sending the work unit information to the selected crowd worker. Preprocessing may be performed automatically or may be assigned to and performed by another crowd worker. In other embodiments, another crowd worker may be chosen for receipt of the non-obfuscated material if the preprocessing may render the work unit to be insufficient for performing the project work.

Part V: Combinations with Third-Party Embodiments

The methods and systems described herein for business process and translation task generation, processing, auditing, resource selection, and process flow management may also be applied to various other embodiments. One such application comprises crowd resource selection involving searching a service provider/crowd resource profile that contains a plurality of fields to facilitate matching one or more desired skills with data in the profile fields and calculating a reputation score for a crowd resource that includes a relative position of the resource with other resources. Such an algorithm may be applied when selecting a crowd resource, such as may be performed by recruit module 110, task assign module 104, business process matcher 124, assign translator module 208 and other systems, methods, or functions for selecting a crowd resource/service provider.

Another such embodiment comprises using linguistic similarity to facilitate machine translating combinations of words captured by a clipboard application or function of a computerized user interface such that the combinations of words are visible to a user in the interface in an area delineated for active non-optical recognition-based translation. In such an embodiment, features described herein such as a translation workflow, translated content library 206, fuzzy matching, machine translating 216, immutable translated portion functionality depicted in at least FIG. 14, and the like may be applied to enhance the basic machine translation of this embodiment.

In yet another embodiment, identifying translators by a unique identifier and tracking translator identity for each segment translated by a translator may be enhanced with various techniques described herein that may be delivered by task review module 102, task assign module 104, output tracker module 114, task aggregator module 106, assign translator module 208, chunk aggregator 220, and the like.

In yet one other such embodiment comprising an in-context exact matching capability includes generating hash codes for content both preceding and following a target content translation segment to enhance/prioritize matches of the target content to previously translated content in translation memories. The various techniques, methods, and systems for generating cognizable translation units, combining machine translation and post-machine crowd-resource refinement, any of which may be determined based at least in part on client-specific rules 202, cognizable translation unit rules 204, a translated content library 206, and the like may be beneficially applied to this embodiment to enhance performance, quality, scalability, and the like.

Another embodiment includes detecting when a source document has changed and notifying a user of such change while processing the changed source document through a translation workflow that encodes the source document into an internal processing format to facilitate translation before recoding the translated document back to a source document compatible format. Various methods, systems, and techniques described herein, such as generation and tracking of cognizable translation units, dynamic translation of content streaming to such a content translation engine, use of translation support materials, algorithms that facilitate assignment of a translation project to a user based on a range of data criteria that includes automatic detection of source content change, and the like may effectively enhance such automated change and translate detection capabilities.

Part VI:

Centralized Translation Via Customizable Third-Party Translation Service Portals The following disclosure relates to translation services, and more particularly, to translation service platforms and methods that facilitate delivery of specialized language translation via customized interface portals, including ones that provide access to translation services, such as through application programming interfaces, from third party environments. Such platforms and methods may be characterized herein as "on-demand" translation service platforms and methods because, among other things, they may allow a user to obtain a high quality translation rapidly, the translation may commence promptly or even immediately (e.g., within five minutes, three minutes, one minute, thirty seconds, ten seconds, five seconds, one second or less) when demanded or requested by the user, without the user having to undertake various preliminary steps, such as setting up an account, negotiating a contract with a translation service, or in some cases even having to navigate to a different environment.

As markets become increasingly global, many companies struggle with translation needs. In many organizations around the world today, translation demands come from multiple stakeholders and departments, representing traditional and digital content types, multiple languages, budgetary requirements and deadlines. From website content (e.g., HTML), email, contracts, product descriptions and eLearning materials to social media, Request for Proposal (RFP) content, and increasing amounts of audio and video content, the list of content that requires translation is varied and extensive. Increases in volume and complexity, as well as demands on expense control and turnaround times make it desirable to have effective translation capabilities; however, many organizations do not have internal staff with broad-ranging translation capabilities across a multiplicity of languages and media; accordingly, an increasing need exists for stakeholders to engage external translation services. However, traditional methods for engaging translators, such as arranging for a batch of translation by entering into a contract with a translation company, sending files for translation, and receiving returned translated content some time later, are subject to various potential bottlenecks (e.g., the need to put a contract in place) that make it difficult to get effective translations done in a timely manner, in particular for materials that are constantly changing, such as social media materials. Individuals increasingly turn to machine translation systems available on the Internet for their speed and convenience for casual translations, but machine translation systems remain very limited in their capabilities, often producing poor quality translations that are not satisfactory for business or commercial situations. A need exists for translation systems that provide high quality translations with increased speed, quality and convenience for a variety of third-parties including individual consumers, third-party translation service providers, in-house translation services, corporate translation services, and the like.

An on-demand or centralized translation platform may include an interface of a host environment that provides translation services, wherein the interface is configured to enable a third party's web environment to provide users of the third party web environment with access to the translation services without exiting the third party web environment.

In a further embodiment of the present disclosure, the interface includes an application programming interface (API) that passes translation requests from the third party web environment to the host environment and returns content translated in the host environment to the third party web environment. In embodiments the host environment may facilitate a mix of machine translation services, translation services by highly experienced and trained translation professionals, and translation services accessed from a crowd (the latter referred to herein as "crowd-sourced translation services" or simply "crowd translation services"). For example, a machine translation may be refined by a crowd or by a trained professional, to ensure high quality, before the translation is returned to the third party environment from which the request was initiated. The interface may include an advertisement, an applet, a menu item, a field or window of a website, an iFrame, or similar element presented as part of the third party environment, such as allowing a user to type or paste content into the interface, select a target language, and request translation.

In a further embodiment of the present disclosure the interface includes an account creation function operable to establish individual user accounts through which the on-demand access to translation services can be ordered from the third party web environment for an identified item to be translated. Account creation can allow storage of financial information, user preferences, and the like, to facilitate obtaining translations with minimal user interaction, such as in a single click.

In embodiments of the present disclosure the interface enables providing at least one of a list and a catalog of translation services that are available.

In embodiments of the present disclosure the at least one list or catalog enables an individual user to select a translation quality level to be achieved for the to translation services.

In embodiments of the present disclosure the interface a function for generating a quotation for the cost of translation services.

In embodiments of the present disclosure the quotation generation function provides a price for the application of a selected translation quality level for the translation services.

In embodiments of the present disclosure the quotation sets fees for the services selected.

In embodiments of the present disclosure the quotation estimates fees for the services selected.

An on-demand translation platform includes, according to one disclosed non-limiting embodiment, a plurality of portals that provide access to an interface of a host environment that provides translation services, wherein each portal is adapted to enable a third party environment to select a distinct user interface for accessing the translation services.

In embodiments of the present disclosure at least one portal provides interfaces with a plurality of translation services.

A further embodiment of the present disclosure, wherein the plurality of translation services includes at least one crowd sourced translation service.

In embodiments of the present disclosure the plurality of translation services includes at least one machine translation service.

In embodiments of the present disclosure an interface of the host translation service provides a portal configuration function for each of the plurality of portals.

In embodiments of the present disclosure the portal configuration function is presented in a multiple choice format.

In embodiments of the present disclosure the portal configuration function generates a portal that exposes a plurality of translation engine capabilities in a customized portal.

In embodiments of the present disclosure configuration information for the customized portal is storable for later retrieval.

In embodiments of the present disclosure the customized interface for a portal is dynamically generated when a user accesses a specific domain.

A method of on-demand translation quoting includes, according to one disclosed non-limiting embodiment, processing a submitted translation content; estimating a measure of machine translation quality for the submitted translation content; and estimating a cost for crowd refinement of a machine translation of the submitted translation content.

A further embodiment of the present disclosure includes determining a cost model for quoting the cost for crowd refinement, the cost model having parameters, such as applicable to a plurality of translation units, such as cognizable translation units, the parameters selected from the group consisting of a domain specificity parameter, a language parameter, a prior translation extent parameter, a crowd size parameter, an initial quality parameter, a quality requirement parameter, a machine translation cost parameter, and a crowd translation cost parameter. The methods and systems disclosed herein may be used to facilitate handling various translation tasks and, in embodiments, a given translation project may be deconstructed into parts, referred to interchangeably herein as cognizable task units or cognizable translation units (CTU), that may be processed using various methods, systems and techniques described herein. One such business process that is described later in detail comprises language translation, wherein a CTU may represent a cognizable translation unit. By way of example, and without limitation, a CTU may comprise enough content that a task can be performed properly (for example, in language translation, enough words that a translator can understand a context of use, such as to select among possible alternatives for translating a word that could have more than one meaning), while not containing so much content that other adverse effects occur (such as creating delays in processing individual units or revealing too much sensitive information to any single worker in a business process). Formation and sizing of a CTU may involve considerations that are particular to the context, such as the source or target language in language translation, the sensitivity of the source information (e.g., containing personally identifiable information (PII), trade secrets, or otherwise sensitive or regulated information), the complexity of the sensitive information (where longer chunks may be needed to provide adequate context for complex content), and other factors. References to CTUs throughout should be understood to include such adaptations and optimizations except where context indicates otherwise. In embodiments, the breaking down of a task into an appropriate CTU may occur in connection with the interface in the third party environment, in the host environment, or in an intermediate processing location, such as enabled by a server, between the two, or in any combination of those.

A further embodiment of the present disclosure includes, storing a data structure for supporting the provision of the cost for crowd refinement, the data structure storing at least one of the parameters.

A further embodiment of the present disclosure includes, transforming the data structure upon receiving an update applicable to at least one of the parameters.

In embodiments of the present disclosure processing includes determining a degree of domain specificity of the submitted translation content.

In embodiments of the present disclosure processing includes determining an estimate of the percent of the submitted translation content that has previously been translated.

In embodiments of the present disclosure processing includes determining an estimate of the size of a crowd required for refinement of the machine translation to meet a delivery requirement.

In embodiments of the present disclosure processing includes performing at least one of machine translation and crowd-sourced refinement of the machine translation to achieve a pre-determined level of translation quality.

A method of quoting a cost for an on-demand translation of submitted content in response to a request includes, according to one disclosed non-limiting embodiment, automatically parsing the submitted content and delivering a quote for translation of the submitted content that is based on at least one human translation parameter and at least one machine translation parameter. A further embodiment of the present disclosure includes presenting the quote with a user interface element by which a client can accept the quote.

A further embodiment of the present disclosure includes, in response to acceptance via a user interface element, automatically initiating machine and human translation consistent with the quote.

A method of configuring a client-specific third-party environment for use of an on demand translation service includes, according to one disclosed non-limiting embodiment, configuring a plurality of unaffiliated third-party translation portals to provide access to translation services via translation request functions available through an interface of a host translation service that provides on demand translation.

In embodiments of the present disclosure the translation request functions include at least an account creation function, a services listing function, and a quote generation function.

In embodiments of the present disclosure the unaffiliated third-party translation portals are selectively configured with one or more combinations of the translation functions.

In embodiments of the present disclosure the configuring includes selecting a first plurality of translation portal functions for a first portal and a second plurality of translation portal functions for a second portal, the first and second plurality of translation portal functions differing by at least one translation portal function.

In embodiments of the present disclosure the translation services include deconstructing an identified content item into a plurality of cognizable translation units and executing on-demand translation of each of the units.

In embodiments of the present disclosure the translated units are reassembled into translated content for delivery to the party requesting the translation.

In embodiments of the present disclosure on-demand translation comprises hybrid machine translation and human crowd translation services.

In embodiments of the present disclosure the on-demand hybrid translation comprises two sequential translation passes for at least a portion of the cognizable translation units, the first translation pass comprising a machine translation pass and the second translation pass comprising crowd-sourced human enrichment of a portion of the machine translated output of the first translation pass.

In embodiments of the present disclosure the second translation pass is performed via an electronic interface that facilitates access to the cognizable translation unit, the machine translation pass output, material from the identified item other than the cognizable translation unit, identified item metadata, and a translation memory of previously translated cognizable translation units.

A method of configuring an automated hybrid translation service includes, according to one disclosed non-limiting embodiment, deploying a translation service that provides crowd-sourced refinement of a machine translation of submitted translation content.

In embodiments of the present disclosure deploying the translation service is through an interface that enables on-demand access.

A further embodiment of the present disclosure includes, deploying the translation service via an interface that facilitates establishing hybrid translation as a self-service capability from an environment of a third party that is independent of the environment that hosts the translation service.

In embodiments of the present disclosure the crowd-sourced refinement of the machine translation includes receiving the machine translated content in a translation-efficient format that is different than the format of the submitted translation content and presenting the received machine translated content in an electronic user interface adapted to simultaneously display the received machine translated content and a portion of the indicated content that corresponds to the received machine translated content, the crowd-sourced resource refining the received machine translated content by applying translation style guides and translation glossaries associated with an entity of a submitter of the submitted translation content.

A platform for configuring and activating on-demand translation service platform delivery capabilities for third-party clients to allow users of the third-party clients to directly access on-demand translation services includes, according to one disclosed non-limiting embodiment, an on-demand translation service including machine translation and crowd-sourced refinement of the machine translation, the on-demand translation services being facilitated by the host of the platform.

In embodiments of the present disclosure configuring the on-demand translation service platform delivery capability includes an interface to an on-demand API.

A platform for configuring and activating on-demand translation service platform delivery capabilities for third-party clients to allow users of the third-party clients to directly access on-demand translation services includes, according to one disclosed non-limiting embodiment, an on-demand translation service operable to directly access on-demand localization of a plurality of media types with at least some common content from a source language into a plurality of different languages, so that the common content is localized consistently across the translated media types.

In embodiments of the present disclosure localization includes a machine translation and crowd-sourced refinement of the machine translation.

Methods and systems and related components thereof are disclosed herein for enabling use of client-specific style guides and translation glossaries for use in discretely submitted translation projects. Such methods and systems include, according to one disclosed non-limiting embodiment, tagging each submitted translation project with a unique identifier that facilitates identifying the client and at least one of a translation style guide and one or more translation glossaries for the client, the unique identifier accessible via a translation management key that uniquely identifies the client to a translation services environment.

In embodiments of the present disclosure the key is submitted via an application programming interface of the translation services environment.

In embodiments of the present disclosure a translation service identification function accessible via the interface determines at least one of a client-specific style guide and a client-specific translation glossary based on the key.

In embodiments of the present disclosure identifying at least one of a translation style guide and one or more translation glossaries for the client is based on matching at least a portion of the key to a database of such keys that is accessible by a server with which the translation environment communicates.

In embodiments of the present disclosure the client may submit the translation project via a third-party translation interface that is configured on behalf of the third party with an interface that enables on-demand quoting of a translation projects, machine translation, and crowd-sourced refinement of the machine translation.

Methods and systems for ensuring use of client-specific style guides and translation glossaries for use in discretely submitted translation projects may include, according to one disclosed non-limiting embodiment, tagging each cognizable translation unit of a submitted translation project with a unique identifier that facilitates identifying the client and at least one of a translation style guide and translation glossaries for the client, the unique identifier accessible via an on demand translation environment interface key that uniquely identifies the client.

In embodiments of the present disclosure the client-specific translation service material is pre-existing material.

In embodiments of the present disclosure a translation service identification function determines at least one of a client-specific style guide and a client-specific translation glossary based on the key.

In embodiments of the present disclosure identifying at least one of a translation style guide and one or more translation glossaries for the client is based on matching at least a portion of the key to a database of such keys that is accessible by a server with which the on-demand translation environment communicates.

In embodiments of the present disclosure the client submits the on-demand translation project via a third-party translation interface that is configured on behalf of the third-party with an API that enables on-demand quoting of a translation projects, machine translation and crowd-sourced refinement of the machine translation.

In embodiments of the present disclosure identifying the at least one of the translation style guide and the translation glossaries for the client is based on matching a portion of the key to a database of such keys.

A further embodiment of the present disclosure includes methods and systems wherein the client submits the ondemand translation project via a third-party translation interface that is configured on behalf of the third-party with an API that enables on-demand quoting of a translation projects, machine translation and crowd-sourced refinement of the machine translation.

Methods and systems of on-demand hybrid translation may include, according to one disclosed non-limiting embodiment, receiving a reference to a submitted translation project; processing the submitted translation project to determine an estimated cost for hybrid translation; providing a quote for hybrid translation based on the estimated cost; and, upon receiving approval: processing the content into cognizable translation units; machine translating the cognizable translation units; offering at least one of the machine translated cognizable translation units for refinement of the machine translation to a set of human translators selected from a set of qualified translators among a crowd of potential translators; presenting the machine translated cognizable translation unit to one of the set of human translators in response to acceptance by the human translator of the offering in an interface that facilitates human refinement of the machine translated cognizable translation unit; receiving the human refined machine translated cognizable translation units; and arranging the human-refined machine translated cognizable translation units into a hybrid translation of the referenced content.

In embodiments of the present disclosure receiving the submitted translation project is via an interface to a platform that provides on-demand quoting.

In embodiments of the present disclosure receiving the submitted translation project is via an interface to a platform that provides on-demand hybrid translation services.

A further embodiment of the present disclosure may include according to one disclosed non-limiting embodiment, assigning a priority level to at least one of the cognizable translation units; machine translating at least one unit of lower priority; having a human translate at least one unit of higher priority; and blending the translated units to provide translated content.

A further embodiment of the present disclosure includes, receiving a request for translation of the referenced content, wherein the request including at least one translation service.

In embodiments of the present disclosure providing a quote includes providing a quote for the at least one translation service in the request and/or estimating fees for the at least one translation service in the request.

In embodiments of the present disclosure processing the content into cognizable translation units comprises deconstructing the referenced content into a plurality of cognizable translation units.

A further embodiment of the present disclosure includes, wherein the interface facilitates access to the cognizable translation unit, the machine translated cognizable translation unit, material from the referenced content other than the cognizable translation unit, referenced content metadata, and a translation memory of previously translated cognizable translation units.

In embodiments of the present disclosure the interface facilitates access to client-specific translation service material selected from the list of translation service material consisting of client-specific style guides and client-specific translation glossaries.

A method of on-demand hybrid translation includes, according to one disclosed non-limiting embodiment, receiving an indication of content to translate from a client; receiving an indication of a translation service from the client; receiving a request for quote of translation of the indicated content based on the indicated translation service; generating at least one translation quote for at least one translation project; delivering the at least one translation quote to the client; receiving authorization of the delivered quote; delivering a request for payment of the at least one translation quote to the client and, upon receiving confirmation of payment: performing machine translation of portions of the indicated content; performing human refinement of at least some of the machine translated portions using an on-demand crowd-sourced translation refinement process; assembling a complete translation of the indicated content from the machine translated portions and the human refined portions; and delivering the complete translation to the client.

In embodiments of the present disclosure at least one of the content and the indication of a service is received from at least one of an application of a client, a website of a client, a mobile device of a client, an electronic mail environment of a client, and a service of a client.

In embodiments of the present disclosure the application is selected from the group consisting of a publication application, a website development application, a mobile content development application, a word processing application, a spreadsheet application, a presentation application, a database application, a productivity application, a work flow management application, and an enterprise software application.

In embodiments of the present disclosure each of the receiving steps comprises receiving a key that identifies the client.

In embodiments of the present disclosure the key relates to an aspect of the user, thereby providing a reference to at least one parameter for a user-specific translation service, and the aspect of the user may comprise contact data of the user and/or user loyalty data.

A further embodiment of the present disclosure includes, wherein the aspect of the user comprises a method of payment for the translation.

A method of on-demand hybrid translation includes, according to one disclosed non-limiting embodiment, combining a machine translation with crowd-sourced refinement of content accessible over a network through an interface configured via an on demand translation portal application programming interface (API).

A method of on-demand hybrid translation includes, according to one disclosed non-limiting embodiment, combining a machine translation with an on-demand crowd-sourced refinement of the machine translation output that is delivered via a computer-computer interface that is compliant with an interface requirement of an on demand translation portal application programming interface (API).

A method of on-demand hybrid translation includes, according to one disclosed non-limiting embodiment, refining a machine translated content by automating allocation of, content delivery to, retrieval from, and/or payment to, an on-demand crowd sourced translation refinement for each unit of the refined machine translated content.

A method of on-demand multi-media translation includes, according to one disclosed non-limiting embodiment, localization through a translation-quoting service-delivery platform adapted to provide coordinated translation of a plurality of media types with at least some common content from a source language into a plurality of different languages so that the common content is localized consistently across the translated media types, the plurality of media types includes at least two of text, video, audio, email, and search engine optimization In embodiments of the present disclosure the localization is performed via the platform on computer software, mobile applications, video games, on-line games, books, movies, videos and streaming content.

In embodiments of the present disclosure the platform facilitates on-demand localization.

In embodiments of the present disclosure the platform facilitates on-demand localization through an API that is adapted to support on-demand localization quoting, machine localization and crowd-sourced refinement of the machine localization.

Methods and systems of transaction resolution for a hybrid, on-demand translation include, according to one disclosed non-limiting embodiment, methods and systems for taking estimates for human-refined, machine-translation of content; determining the extent of human and machine activity undertaken in a translation; and resolving payment for the translation based on the estimate and the determined extent of activity.

Methods and systems of on-demand hybrid translation include, according to one disclosed non-limiting embodiment, methods and systems for receiving an indication of content to translate from a client; receiving an indication of a translation service from the client; receiving a request for quote of translation of the indicated content based on the indicated translation service; generating at least one translation quote for at least one translation project; delivering the at least one translation quote to the client; receiving authorization of the delivered quote; and delivering a request for payment of the at least one translation quote to the client.

In embodiments of the present disclosure upon receiving confirmation of payment: performing machine translation of portions of the indicated content; performing human refinement of at least some of the machine translated portions using an on-demand crowd-sourced translation refinement process; assembling a complete translation of the indicated content from the machine translated portions and the human refined portions; and delivering the complete translation to the client.

The foregoing features and elements may be combined in various ways without exclusivity, unless expressly indicated otherwise. These features and elements, as well as the operation thereof, will become more apparent in light of the following description and the accompanying drawings. It should be appreciated, however, that the following description and drawings are intended to be exemplary in nature and non-limiting.

Figure 32:
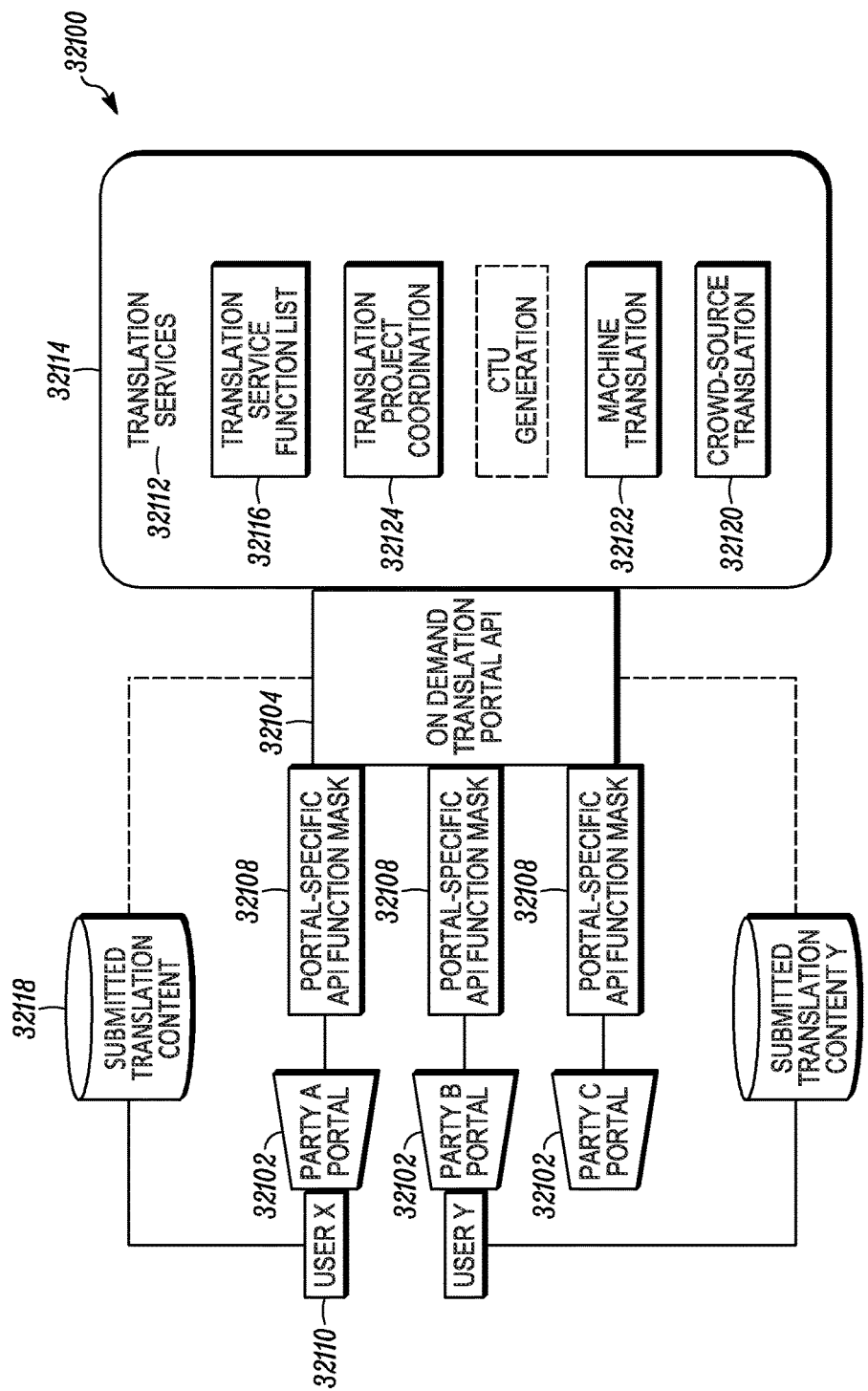
FIG. 32 is a schematic view of a translation platform for providing centralized translation service for a plurality of third-party translation service environments.

FIG. 32 schematically illustrates an architecture for a translation platform 32100 that provides customized access to translation services. The platform 32100 may facilitate providing on-demand translation portal-specific interfaces that may be customized to meet portal provider requirements of a user to enable convenient access to the translation services.

The on-demand translation platform 32100 may provide access to various translation services offerings and components, such as, but not limited to, language-to-language translation and localization of text, video, and/or audio content using resources such as machine translation, crowd-sourced human translation, outsource center translation and localization, and the like. The platform may include service offerings, customization of access capabilities to these service offerings, and/or dynamic utilization of machine, crowd-sourced, and outsource center resources for providing on-demand translation and localization.

The methods and systems provided by such a platform may enable computerized access to any or all of these services through an on-demand capability that is extended to end users through customized on-demand translation interfaces and localization portals. End users need not consume relatively large amounts of computing resources from their local client/laptop/desktop to receive customized user-centric translation services. This allows improved operation of end user computing devices, including desktop, portable, and mobile devices so that the devices can more efficiently perform translation by distributing the computing load for translation over the resources of the platform.

In an example of improved local computing utilization, a customized on-demand translation and localization interface portal, such as a web page, may be accessed by web browser executing on the local computer system. This customized on-demand translation portal may facilitate translation of a large document (or other source material, which may be multimedia) located on the local computer without requiring the local computer to execute a complex machine translation program, thereby improving the operational efficiency of the local computer. In this way, accurate and cost effective translation of the large document or other source material can be performed through the local computer by the local computer executing a web browser and providing access to the large document. Through networked access to dedicated translation servers that receive user input via the customized on-demand translation portal or interface from the local computer, including accessing the locally stored document, the local computer can deliver skilled translation of the document relatively efficiently. This efficiency may be driven in part by an on-demand translation application programming interface ("API") that may execute on one or more of the dedicated translation servers to receive a customized version of the information input by the user to the customized on-demand translation portal. The on-demand translation API may then configure translation projects that utilize the platform resources appropriately (e.g., performing some machine translation, some human translation, and possibly some human refinement of machine translation, with further iterations and combinations thereof possible also) to fulfill the user's translation or localization request as performed by the user's local computer.

Localization may include a process of adapting product-specific media or materials to comply with language, mores, social customs, traditions, norms and conventions of a specific country or region. Localization supplements translation activity by applying a comprehensive understanding of a target culture in order to adapt the product-specific media to local needs. The on-demand translation platform 32100 may provide this access through a specialized on-demand translation API that exposes a range of translation services and service configuration functions to third party program execution environments, including, without limitation, web sites, mobile devices, desktops, laptops, enterprise servers, web servers, and other network accessible environments. Localization may further include a process (referred to herein as a "Global Brand Voice" process) to develop tone, style guides, and glossaries that may be used to create tailored, localized content for each client. The Global Brand Voice process may establish an operational standard for global brand messaging/communications that improves global consistency, clarifies the in-country review process, and aligns corporate translation owners, in-country reviewers, and translation firms to a common brand voice that is operationalized through glossaries, style guides and translation memories. This process may help create collective buy-in from in-country reviewers for global consistency and to streamline the review process. In one example of the operation of this process, a commitment session may provide an initial virtual meeting to align all parties around globally consistent content. Next, a process referred to herein as "Linguistic Asset Development" may be used to leverage existing assets and work with the client to extend and formalize the linguistic assets. Next, sessions referred to herein as "In-Language Review Sessions" may provide for collaboration with linguists and the in-country reviewers to refine and validate the linguistic assets and operational quality standards. A final review may then be initiated prior to going live with the project. An on-demand customized localization portal may be configured based on this process to access the glossaries, style guides, translation memories, linguistic resources (e.g., country-specific translators), and other resources and conventions derived from the process. A result may be a customized on-demand localization portal that facilitates access to a client-specific Global Brand Voice localization capability.

The on-demand translation platform 32100 may provide an architecture for customized on-demand access to translation services through customization of on-demand translation portals 32102 that provide differentiated access to the specialized on-demand translation portal application programming interface (API) 32104. To ensure that a wide range of customized on-demand translation portals can be readily customized for specific client needs, the specialized on-demand translation application programming interface 32104 may present multiple translation services 32112 of the platform in a standardized application programmatic interface that the customized portals can access. In an example of customization of a portal for accessing translation services through the API 32104, FIG. 32 depicts a multiple of customizable on-demand translation portals 32102 that may be customized via an on-demand translation API service masking function as depicted by the multiple of portal-specific API function masks 32108.

Multiple customized on-demand translation portals 32102 may service multiple respective users 32110. The on-demand translation portal API 32104 may provide standardized access to the various translation services 32112 such as, for example, crowd source translators 32120, machine translators 32122, and other translations to include but not be limited to straight machine translation, machine translation with post-editing by one or more humans, crowd translation, professional translation, hybrid translations and specialist domain translation. It should be appreciated that the elements of the on-demand translation architecture 100 may be otherwise distributed across multiple locations, computing architectures, wired and wireless devices, networked servers, operating systems, languages, and the like.

Combinations and selections of the user selectable translation services 32112 provide different quality levels, which range, for example, from raw machine translation to professional translation by domain specialists. These translation services 32112 also represent different quality levels such as straight machine translation, machine translation with human post-editing, crowd translation, professional translation, hybrid translations and specialist domain translation. Content-specific services permit, for example, subtitled videos, translated customer relationship management ("CRM") data, and the like.

In addition to providing access to a full set of translation project control configuration functions for configuring and driving the translation offerings described herein, the customized on-demand translation portals 32102 may facilitate particular translation service provider requirements. Such customization may include branding that can impact the "look and feel" of a customized on-demand translation portal 32102 via, for example, the portal specific function masks 108.

Customization may further include controlled access to a subset of all possible translation services 32112 offered through limited exposure of the on-demand translation platform 32100 capabilities. Customization may further include preconfiguring certain parameters, such as currency, translation service utilization, billing procedures, and the like. The user may optionally override one or more of these preconfigured parameters of the specific customized on-demand translation portals 32102. Customization may further include setting defaults for certain functions (e.g., minimum price, lead time, etc.) that may otherwise be configurable. Customization may also include establishing acceptable ranges of user configurable parameters, such as lead time, cost, and the like, so that a user cannot configure a translation project to be completed in less than a minimum amount of time (e.g., less than one-hour, one-day, and the like).

The on-demand translation portal specialized API 32104 may provide an interface to a translation engine 32114 as well as a translation project configuration facility that may accept data from the user via the customized on-demand translation portals 32102 in the form of API commands and the like that may relate to configuring and performing a translation project. The engine 32114 as defined herein is a translation platform that the on-demand translation portal API 32104 provides access to and that utilizes the various selected translation services 32112. That is, the translation engine 32114 performs at least a portion of the actual translation via the translation services 32112.

A translation project configuration facility 32124 may be operable to receive translation project configuration instructions such as requesting a quote, indicating lead time, and the like. The translation project configuration facility 32124 may also perform certain functions that generate feedback to the on-demand translation portal API 32104 to ultimately ensure that the customized on-demand translation portals 32102 that initiated the on-demand translation request receives the feedback.

The customizable on-demand translation portals 32102 such as standard retail (see FIGS. 45 and 46), standard enterprise (see FIG. 47), and customized versions of others (see FIG. 48), may facilitate access to the translation services 32112. In an example for illustrating potential differences between standard retail and standard enterprise portals, standard enterprise portals may have, for example, five features that standard retail portals might not have, such as: 1) Invitation only (enterprise portal users may need to be invited); 2 different payment options, including pre-paid credits and customer submitted electronic purchase orders; 3) configurability, such as having unique translation workflows that allow for the application of client-specific linguistic assets (e.g., style guides, glossaries, trademarks, and the like); 4) configurability to offer additional offerings specific to a client; and 5) configurability for different pricing levels and options than retail portals (e.g., for long-term contracts, volume discounts for very large projects, or the like). It is noted that any customized portal may have any combination of customized features, including the foregoing five features, even if the customized portal is for use in a retail environment; that is, such features are not entirely incompatible with use in a retail portal environment.

The customization capabilities of the customizable on-demand translation portals 32102 may be provided in a way such that the on-demand translation portal API 32104 may not be directly impacted by such customizations. Customization may therefore be performed by the portals themselves and/or a customization interface capability to ensure all interactions with the on-demand translation portal API 32104 comply with the on-demand translation portal API 32104 interface requirements by a customization capability of the on-demand translation platform 32100. However, it is contemplated herein that the on-demand translation portal API 32104 may itself provide the customization services and/or be customized in such a way as to limit or otherwise offer differentiated on-demand translation services.

Customization may allow third parties, such as public translation service providers, enterprise customers, in-house translation service providers, and others to provide their customers with simplified access to on-demand translation services. In one example, a large enterprise customer may provide a customized on-demand translation service portal that provides fields for an employee in the enterprise to enter data such as a purchase order number, a department number, a list of destinations of the translation, a list of target translation languages, a preconfigured set of translation project parameters, and the like. Members of the enterprise portal may need to be specifically invited, or a user with sufficient privileges may be able to invite a member directly.

Customization may further be useful for automatically populating data fields, such as those described above (purchase order number, department number, etc.) and others described herein, based on an identity of the on-demand portal user. In this example, specific billing procedures may be tied to the specific portal user identity, e.g., a user in an Italian office could be identified and the invoicing may be directed to the Italian office form of payment.

Customization may also allow an in-house translation service provider to offer translation services to select third parties. In this example, a multi-national enterprise may have configured an in-house translation service portal 32102 via a portal specific API mask 32108 for its employees. This in-house translation service portal may also be made available to suppliers of this enterprise so that items provided to the enterprise that need to be translated may be processed using the enterprise's configuration settings, such as pricing, etc. In this way, suppliers to the enterprise can deliver localized versions of instructions, user manuals, Global Brand Voice and the like, that comply with the specific enterprise translation requirements.

Generally, the translation platform 32100 may provide a list of services that the user 32110 may find useful when requesting on-demand translation. The translation portal API 32104 may essentially standardize how these services are accessed so that the interface with the translation engine 32114 can be significantly automated, and potentially fully automated. Customization via the portal specific masks 32108 hides the standard translation portal API 32104 from the user 32110 while allowing the user to have access to the full set of translation capabilities thereof. In one example, the portal specific masks 32108 may not expose to the user the type of translation service to be used. Instead, the customized portals 32102 may collect data, such as cost goals, translation quality goals, delivery goals, and the like. The customized on-demand translation portals 32102 may then adapt this data into commands for the standard translation portal API 32104 to pass the data to the translation engine 32114 to facilitate performance of the desired translation goals.

A set of translation engine access functions 32116 may be provided via the on-demand translation portal API 32104 to facilitate programmatic (e.g., automated) access to the capabilities of the translation engine 32114. This programmatic access to these capabilities may facilitate interaction with the translation services 32112 from the customizable portals 32102 through which the users 32110 can submit on-demand requests for the translation of submitted translation content 32118 in various file formats such as, for example only, doc, docx, xml, strings, po, mif, inx, xls, xlsx, txt, vtt, xliff, xlf, resj son, html, rtf, htm, csv, srt, idml, json, ini, properties, yaml, yml, resx, resw, psd, pptx, pdf, mp4, mov, fly, wmv, m4v png, jpg, jpeg, bmp, indd, and any other file format or content source, such as streaming content. Such content may be password protected, and access may be restricted to the customer and, optionally, additional users authorized by the customer. It should be appreciated that a company/enterprise that may have multiple internal or third party partner users.

The customized on-demand translation portals 32102 may include, but are not limited to, a website or other web accessible environment such as a web service or other Intranet or Internet accessible resource. Third parties, such as large enterprise clients, may configure a private on-demand translation portal that may be accessible via enterprise-specific Intranet and the like. Customized on-demand translation portals may, optionally, not be limited to one per enterprise client. In an example of multiple customized on-demand translation portals in a single enterprise, an engineering department may configure a customized on-demand translation portal for translating internal engineering documents for use by foreign language speaking engineers, and a marketing department of the same enterprise may configure a customized on-demand translation portal for translating customer-facing marketing material for consumption by foreign language speaking customers and prospects. These different portals may have different profiles, style guides, glossaries, and the like. For example, the engineering-oriented portal may need to retain certain technical terms in the source language to ensure a high degree of precision, such as in naming a particular component, and the tone or emotional content may be deemed largely irrelevant. In contrast, the marketing portal may seek consistency in tone and emotive content across different languages, including with respect to use of idiomatic expressions that capture a certain tone in one language but require creative, rather than literal, translation in order to maintain a similar tone in a target language.

Other embodiments of portals may include a fillable form, such as an email form that may be filled in by a user to request on-demand translation services. The customized on-demand translation portals 32102 programmatic interface may essentially allow access to the translation services provided by the translation engine 32114 via interaction such as websites, custom programmed interfaces, email portals, remote devices, and others.

The on-demand translation platform 32100 may further permit third parties to offer the translation services 32112 of the translation engine 32114 to their users. Convenience may range from providing branded access to services, to preconfiguring any of a plurality of translation service parameters and limiting access to a subset of the full range of translation services 32112. The customized on-demand translation portals 32102 may provide access to services such as creating accounts via a "Create Account" function;

listing translation services available via a "List Services" function; requesting a quote for a translation submission via a "Generate Quote" function, and other such functions.

Through the respective portal specific API function mask 32108, the on-demand translation platform 32100 facilitates configuring the multiple of customized on-demand translation access portals 32102 for access to any number of unrelated and/or unaffiliated third parties, while maintaining a robust, automatable, and predictable interface to the translation services 32112.

The customized on-demand translation access portals 32102 may each operate as a distinct customized interface to the translation services 32112. Based on one or more portal specific API function masks 32108, the translation engine 32114 capabilities and the translation services 32112 thereof may be presented to users 32110 as distinct translation service offerings that are tuned to meet the needs of each particular user, such as relating to translation in particular fields or domains. For example, a customized on-demand translation access portal 32102 may be configured for use by sports bloggers so that a customized translation glossary of sports terms may be made available to translators; a different on-demand translation access portal 32102 may be configured for use by political commentators wherein political jargon, slogans, and the like may be configured in a predefined translation memory to facilitate economical and efficient translation; and a different on-demand translation access portal 32102 may be configured for employees and vendors of an enterprise so that aspects such as method of payment and the like may be automatically populated. Each of these example of on-demand translation access portals 32102 may thus provide dedicated translation services to the specific user 32110, but in doing so need only adapt the on-demand translation access portal 32102 as such while accessing the common translation engine 32114 and translation services 32112 through the on-demand translation API 32104.

Considering further the example of FIG. 1 in which customized access to the translation services 32112 via the on-demand translation API 32104 is provided by portal-specific API function masks 32108, each of the multiple of portal specific API function masks 32108 may provide portal configuration functions to customize each of the multiple of portals 32102. The portal configuration functions of each of the multiple of portal specific API function masks 108 may be accessed, for example, via a web browser over a network to facilitate access to a predetermined range of on-demand translation portal customization options. Some of such customization options may, for example, be presented in the web browser as a predefined range of multiple-choice options so that a user can select one of a multiple of available options to configure at least one aspect of a portal-specific API function mask 32108.

Other options for configuring a customized on-demand translation portal API function mask 108 may require additional data to be provided, e.g., a logo for branding the customized on-demand translation portals 32102. Still other options may permit selecting a subset of available functions such as a co-branding package with a simple "white label" theme with the customer's logo. In addition, the options may include, but not be limited to, changing a default front page image to an image of the user's choice, changing the default welcome text to a text phrase and its location (e.g., to the right of the front page image), and/or including/excluding translation service categories and translation services. The selected options and additional data may be gathered into a portal-specific customization data set that may be used to automatically generate a variant of a portal template. Alternatively, the customization data set may be used by a human to generate a customized on-demand translation portal that exposes a specific set of translation engine services from the full set of such services that are available through the on-demand translation API 32104.

Each customized on-demand translation portal 32102 may be configured and stored for later retrieval by a user, such as via a specific URL or other electronic pointer. Considering the example of FIG. 1, this may include storing Party A portal data 32102, such as a web page to facilitate user 32110 access, and storing Party A portal-specific API function mask 32108 to facilitate portal 32102 interfacing to the on-demand translation portal API 32104. The customized portals 32102 may alternatively be dynamically generated when such a specific URL is accessed in a way that may be similar to how a dynamic web page is generated. That is, configuration information for generating Party A portal 32102 and for configuring Party A portal-specific API function mask 108 may be stored and processed when the specific URL is accessed so that the user interface of the Party A portal 32102 and the Party A portal-specific function mask 108 are automatically generated. In either static or dynamic customized translation portal operation, the on-demand translation portal API 32104 may facilitate on-demand access to the translation services 32112 so that a third-party customized portal (e.g., a web site/environment, and the like) can provide its users with convenient and specifically delineated access to the translation services 32112.

The on-demand translation portal API 32104 may provide access to various functionality such as a "create account" function, a "list services" function, and/or a "generate quote" function as well as other alternative or additional functionality. The "create account" function may establish individual or shared user accounts through which the on-demand translation services 32112 can be ordered for an identified item to be translated. The "list services" function may be utilized to select a translation service that ensures that a predefined quality level is to be achieved for the ordered translation, among other things. The "generate quote" function can automatically quote the application of a selected translation quality of the translation content 32118 in which the quote includes a quote for the services selected and/or an estimate for the selected quality. It should be appreciated that other translation service functions, and sub-combinations thereof, may alternatively, or additionally, be provided.

Figure 33:
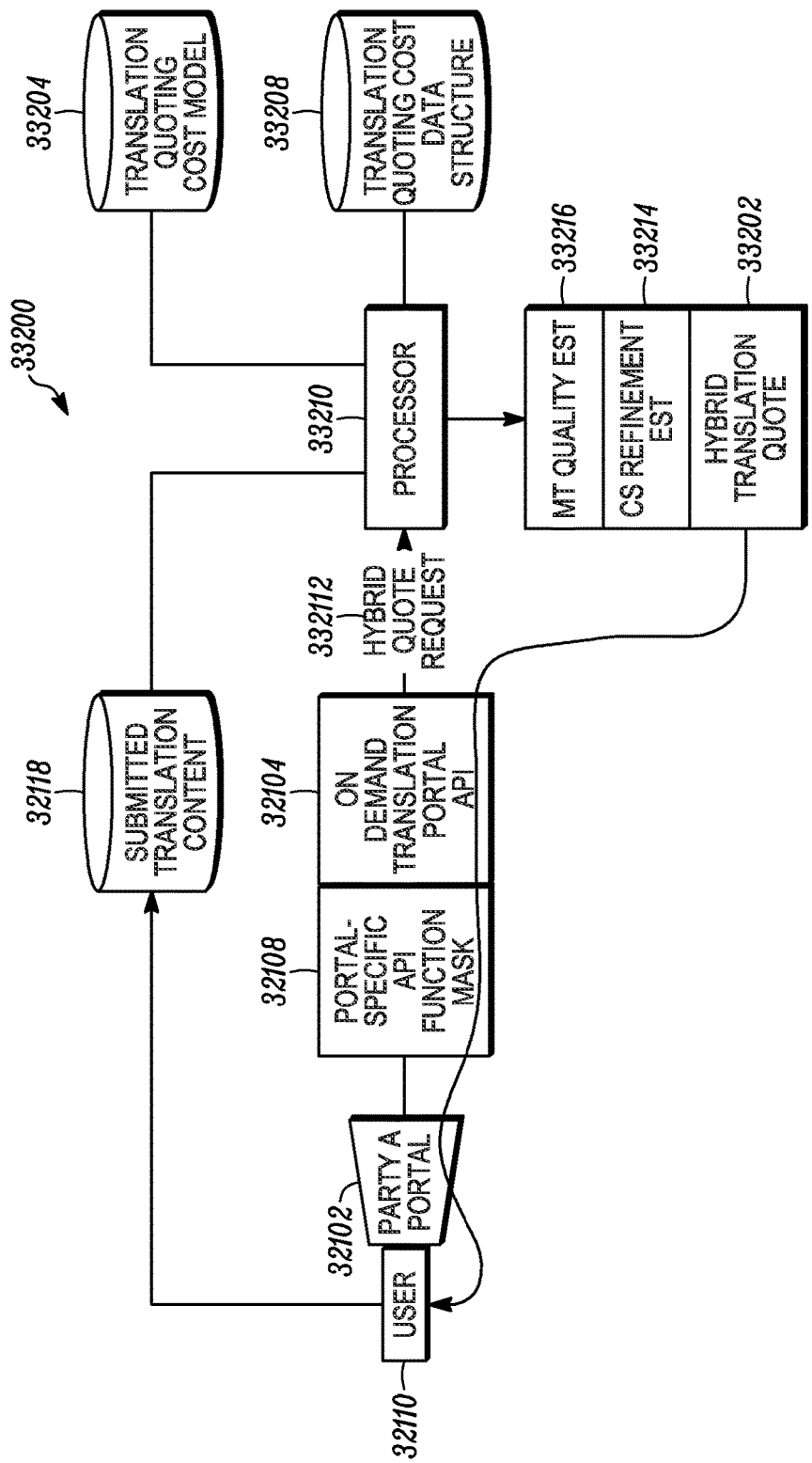
FIG. 33 is a schematic view of automatic quoting, cost model for translation quoting, cost data structure and quoting for hybrid translation for a translation platform.

With reference to FIG. 33, a "generate quote" or quote generation function 33200, according to non-limiting embodiments, may rely on receiving sufficient input to the on-demand translation portal API 32104. This input may be provided to the on-demand translation portal API 32104 through API function calls such as the "generate quote" function 33200.

A user may prepare a translation request using the customized on-demand translation portal 32012 by entering data into the portal that characterizes the request. The translation request data may facilitate automatically generating a hybrid translation quote 33202. The translation request data may include source and destination languages, restrictions on use of machine translation, access to client-provided translation materials, expected delivery timing, expected delivery quality, regional resource restrictions, descriptive aspects of the content, e.g., confidentiality, intended audience, etc. A user of the portal may access this data during the quote generation process as data input to a translation portal, and/or data that is preconfigured in the portal, such as through a customized portal configuration process described elsewhere herein.

Data that may be required for automated quote generation that is not provided by the user via the portal 32102, or from preconfigured portal parameters, may be assigned a default value in the on-demand translation portal API 32104. Any data value provided from the portal 32012, whether input by the user, or preconfigured into the portal 32102, may be overridden by default, minimum, or maximum values of such data in the on-demand translation portal API 32104. Overriding data input from the portal 32102 may, for example, be required to ensure that the underlying computational and human translation services maintain a minimum availability for other translation requests.

Other factors that may impact automating translation quote generation may include access to a translation cost model 33204, the robustness of a translation cost data structure 33208, and the like, that are communicated to a processor 33210. It should be appreciated that the functions of the processor 33210 may be performed in various manners and are represented schematically in this disclosed non-limiting embodiment. The translation cost model 33204 may utilize the translation quoting cost data structure 33206, in which case the usefulness of the translation quoting cost model 33204 may be dependent on access to a robust cost data structure 33208. The translation cost quoting model 33204 is described further herein, but may incorporate algorithms that act on data input to the on-demand translation portal API 32104 as part of the request, data in the cost data structure, other available data, data generated by the translation engine 32114 as a result of performing translation operations, and the like.

The "Generate Quote" API function 33200 may be configured with default or initial data so that a quote for a translation request can be generated even when a very limited amount of data about the translation quote is received. This may be facilitated by the cost data structure 33208 provided by earlier quotes for any given user. That is, the cost data structure 33208 may utilize earlier quotes and other data of past transactions as a baseline or average to facilitate the quote.

In one example, automating the translation quote for a user that provides a periodic blog for translation may only require a user ID and an indication that the translation request is for a new blog translation because other data, such as with respect to prior blog quote translations, may be accessible through the cost data structure 33202. Other data that may be accessible in the cost data structure 33208 may include translator charges, machine translation costs, per-word translation costs, per CTU translation costs, content domain specificity, availability of existing translations in a translation memory or archive, translation quality cost factor, translator jurisdiction cost factors, and the like.

In another example, processing a hybrid machine and human quote request 33212 for submitted translation content 32118 may include automatically parsing content indicated in the translation request, generating the hybrid translation quote 33202 that is based on at least one human translation parameter 33214, e.g., crowd source refinement, and at least one machine translation parameter 33216, e.g., machine quality estimation, and delivering the generated hybrid translation quote 33202 to the on-demand translation portal 32012 from which the hybrid translation quote request 33212 was generated.

The on-demand translation portal API 32104 may also provide functionality to automatically quote hybrid translation of submitted translation content 32118 that is referenced by a user through a third-party translation interface (e.g., Party A portal 32012). The third-party translation interface may be configured for the third-party to access a customized view of the on-demand translation portal API 32104. Such a customized view of the on-demand translation portal API 32104 may facilitate performing on-demand quoting, machine translation, and crowd-sourced refinement of the machine translation. On-demand quoting may involve processing the submitted translation content 32118 to determine an estimated degree of machine translation quality 33216 and costs for crowd source refinement 33214 of the machine translation.

In one example, the on-demand translation may include hybrid machine translation/crowd-sourced (MT/CS) translation. The hybrid translation may include, for example, two or more sequential translation passes for at least a portion of the cognizable translation units in which one (e.g., a first) translation pass is a machine translation (MT) pass, and another (e.g., a second) translation pass includes a crowd-sourced (CS) human enrichment pass of at least a portion of the machine translated output of the other translation pass. A translation pass may be performed via an electronic interface that facilitates access to, for example, a cognizable translation unit, the machine translation pass output, material from the identified item other than the cognizable translation unit, identified item metadata, and/or a translation memory of previously translated content, such as previously translated cognizable translation units.

The on-demand translation portal API 32104 may also provide functionality to generate the translation quoting cost model 33204 for quoting submitted translation content 32118, the translation quoting cost model 33204 having parameters applicable to each of a plurality of cognizable translation units. The parameters applicable to cognizable translation units may be, for example, a technicality parameter, a field/domain parameter, a context parameter, a topic parameter, a client preference parameter, a prior translation extent parameter, a crowd size parameter, a quality parameter, a machine translation cost parameter, a crowd cost parameter, and/or other parameters.

The on-demand translation portal API 32104 may also provide functionality to generate the translation quoting cost data structure 33208, such as for supporting generation of the hybrid translation quote 33202. The parameters thereof may include, for example, a technicality parameter, a field/domain parameter, a context parameter, a topic parameter, a client preference parameter, a prior translation extent parameter, a crowd size parameter, a quality parameter, a machine translation cost parameter, a crowd cost parameter, and other such parameters.

The on-demand translation portal API 32104 may also provide functionality to automatically parse the submitted translation content 32118 for generating the hybrid translation quote 33202 based on at least one human translation parameter and at least one machine translation parameter. The hybrid translation quote 33202 may be presented via a user interface element of the portal 32012 by which the user can accept the quote. Upon acceptance via the user interface element, the translation engine 32114 initiates translation consistent with the hybrid translation quote 33212.

Determination of the estimate may alternatively or additionally include determining a degree of domain specificity of the submitted translation 32118, such as based on machine analysis of the words used in the translation. For example, source content that uses many words that occur with low frequency in general language, source content that includes many words that match terms that appear in technical sources (e.g., glossaries for technical subjects), and/or source content that includes many long words, long sentences and/or complex sentence structures, may be attributed a higher degree of technicality than other content. The determination of an estimate may be further based on the percent of content that has previously been translated, the size of a crowd required for refinement of the machine translation to meet a delivery schedule, likely effectiveness of a machine translation, and/or performing at least one of machine translation and crowd-sourced refinement of the machine translation to achieve a pre-determined level of translation quality or accuracy.

With reference to FIG. 34, each unaffiliated translation portal 32102 may be configured with various combinations of the translation functions 32116 to accommodate a third-party on-demand translation portal configuration requirement. Each of the translation portals may be selectively configured such that each may have a set of specific translation portal functions that correspond to at least a portion of the translation functions offered by the on-demand translation portal API 32104. The translation services may include deconstructing the submitted translation content into a plurality of cognizable translation units ("CTUs") and executing on-demand translation of each of the units. The translated units may then be reassembled for delivery to the party ordering the translation.

The user interface element of the portal 32102 by which the user can accept the quote may include various user interface features, such as text entry fields, buttons, icons, drop-down menus, and options and selections therefore, including lists, drag and drop features, touch/pinch features suitable for touch screen interfaces, and the like. For example, the hybrid translation quote request 33212 may be generated in response to a pricing unit type that includes, but is not limited to, words, minutes, pages, standardized pages, rows, characters, files, etc. Other selectable inputs, such as pricing for minimum units, may be provided to generate a base cost, per unit cost, and/or per language unit cost.

Figure 35:
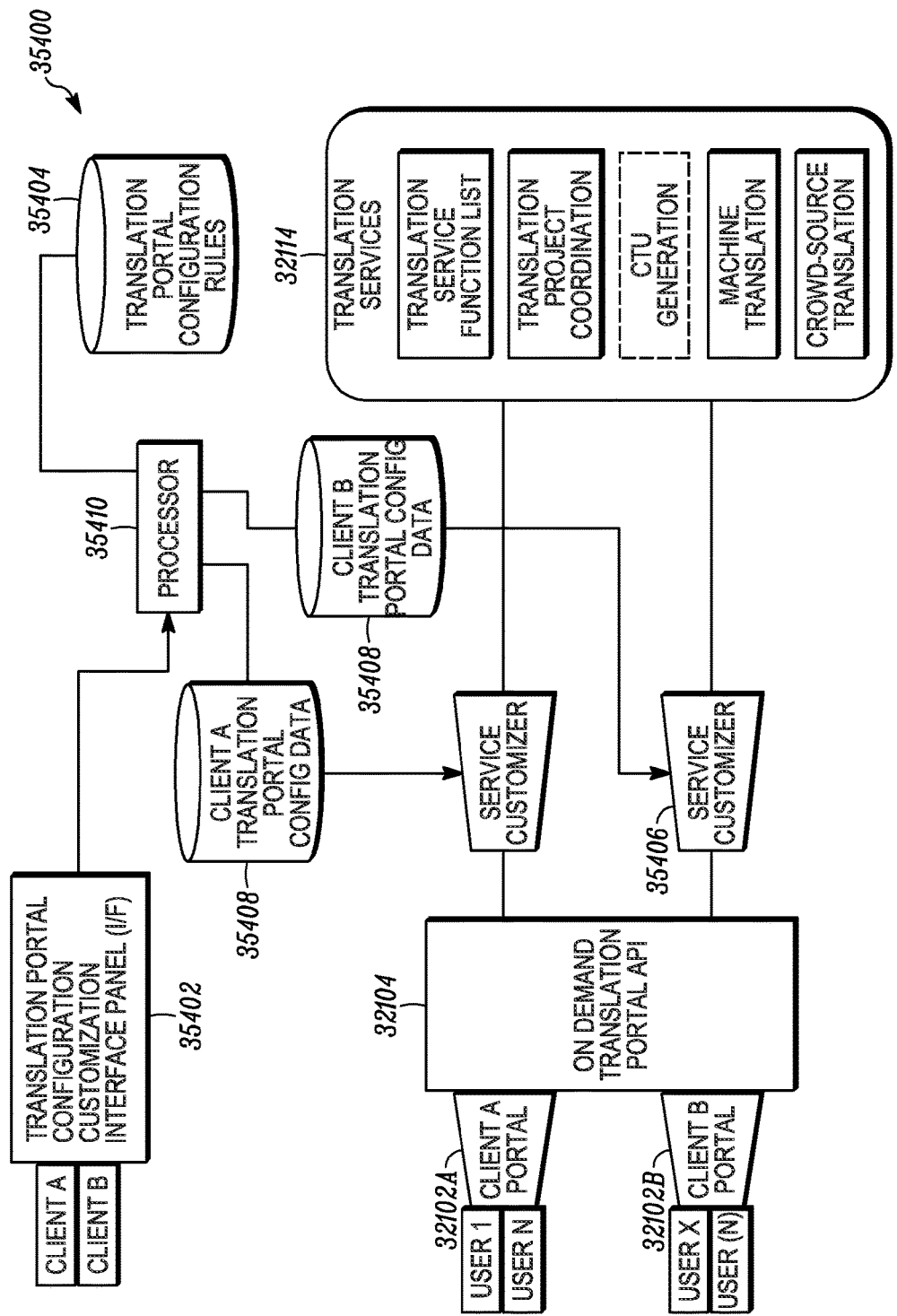
FIG. 35 is a schematic view of automatic configuration of self-service hybrid translation service offerings; translation self-service API; and hybrid translation service delivery capability configuring and activating.

With reference to FIG. 35, an on-demand translation service platform 35400, according to one disclosed non-limiting embodiment, may allow for configuring any portion of the translation services offered by the on-demand translation portal API 32104 in a range of user-centric portals that may facilitate convenient access to the translation services. Such customized portals 32102 are generally described elsewhere herein, but may include entity-specific portals (e.g., for use by in-house users (such as employees/contractors) of an entity), third-party portals (e.g., for offering of the translation services under third-party management, such as affiliates and the like), and any other type of desired customization (e.g., branding of the translation services), and the like.

Customization of the on-demand translation portals 32102 may include a customization interface 35402 through which a third-party may identify and customize the elements of the on-demand translation portals 32102. This interface 35402 may result in automated generation, semi-automated generation, or manual customization of on-demand translation portals 32102. Automated portal generation may be accomplished through automatic web resource configuration based on a template, form, document type definition, or the like, or may be built using a portal generation program that applies a set of portal generation confirmation rules 35404 to the customization data provided by a third-party through the customization interface 35402 to generate an electronic portal and interface that meets the needs expressed by the third-party.

In one example, a third-party may use the portal configuration customization interface 35402 to configure an on-demand translation portal 32012 to expose only certain types of services, such as to expose only hybrid (e.g. machine and human) translation services. Other translation services available through the API 32104, such as machine-only translation or human-only translation, may be masked and therefore not exposed through the user-configured on-demand translation portal 32102. By configuring the on-demand translation portal 32102 to offer only hybrid translation services, the third-party may effectively offer self-service hybrid translation services. The portal 32102 may accomplish a hybrid translation by instructing (e.g., providing programmatic commands) to the on-demand translation portal API 32104 to arrange use of machine and human translation for any translation request provided through the portal. Another example involves configuring the customized portal 32102 to generate API 32104 instructions to configure each translation project requested to perform machine translation followed by human refinement. This can be contrasted with an alternate customized on-demand translation portal that allows a user of the customized portal to select machine, human, or hybrid translation services.

The methods and platforms for generating customized on-demand translation portals 102 may include a platform that offers portal customization services for configuring and activating on-demand translation service platform delivery capabilities to directly access on-demand translation services. The platform may include the on-demand translation portal API 32104, customization capabilities 35406, and back-end translation services and confirmation data 35408 through a managed platform that is not exposed to the user. As noted above, customization of the on-demand translation portal 32012 may be accomplished by developing an interface to the on-demand translation portal API 32104 for exposing capabilities of the translation engine in a programmatic way.

The portal configuration customization interface 35402 may be utilized by processor 35410 through the set of portal generation confirmation rules 35404 to generate, in this example, two distinct translation portal configuration data sets, e.g., one for client A portal and one for the client B portal. These configuration data sets may be used by the service customizers 406 to customize how the API 32104 communicates with the translation engine 32114 to provide customized on-demand translation services. That is, in this embodiment, the customization is implemented on the opposite side of the portal API 32104 as compared to the above-described embodiment of FIGS. 32 and 33.

The platform 35400 of FIG. 4 may implement the customized localization portals, such as portals 32102A and 32102B, via use of one or more service customizer modules 35406 that may receive client-specific translation portal configuration data and adapt communications between translation resources and an on-demand translation portal API 32104. The service customizer modules 35406 receive back-end translation services and confirmation data 35408 through the processor 35410. The client may access the translation portal configuration panel 35402 and provide portal customization input so that the processor 35410 uses localization portal configuration rules 35404 to generate client translation portal configuration data 408 that may provide reference information to the service customizer 35406 for use by the API 32104.

The on-demand translation portals 32102 may automatically configure translation requests to be processed by the translation engine 32114 as an automated hybrid translation service that provides crowd-sourced refinement of machine-translated content through an interface that enables on-demand access. The automatic configuration may facilitate establishing hybrid translation as a self-service capability. A programmer may configure this self-service capability to deploy a translation service that provides crowd-sourced refinement of machine-translated content. The crowd-sourced refinement may include receiving the machine-translated content in a translation-efficient format that is different than the format of the submitted translation content.

The received machine translated content may be received in an electronic user interface such as the on-demand translation portals 32102 adapted to simultaneously display the received machine translated content and a portion of the indicated content that corresponds to the received machine translated content and through which the crowd-sourced resource refines the received machine translated content. The crowd-sourced resource refines the received machine translated content by applying translation style guides and translation glossaries associated with an entity of a submitter of the indicated content.

The platform 35400 may allow users of the third-party clients to directly access on-demand translation services that may include machine translation and crowd-sourced refinement of the machine translation. A platform owner may provide these on-demand translation services, wherein the on-demand translation service platform delivery capability includes an interface to the on-demand translation portal API 32104.

Figure 36:
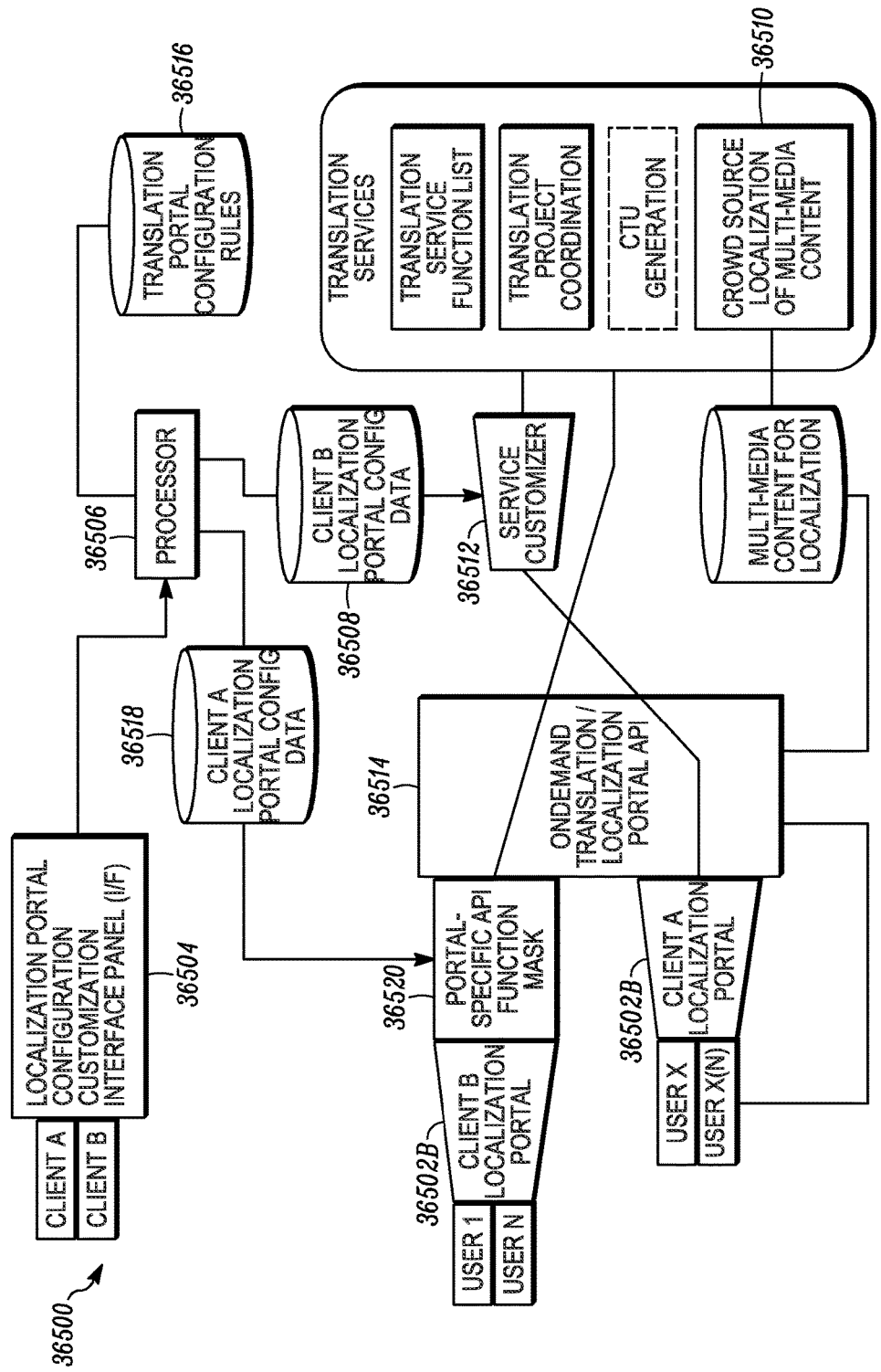
FIG. 36 is a schematic view of a crowd-sourced, multimedia localization portal.

With reference to FIG. 36, an on-demand translation service platform 36500 according to non-limiting embodiments is provided for configuring and activating on-demand multi-media content localization portals 36502. On-demand multi-media content localization portals 36502 may allow users to directly access on-demand localization of a plurality of media types. A platform 36500 that facilitates configuring and activating customized variations of on-demand multi-media content localization platform portals 36502 brings a range of specialization to on-demand localization. Localization providers (e.g., portal 36502 operators) may customize service offerings, such as, for example, for certain jurisdictions from both the origination and destination perspectives. In an example as depicted in FIG. 36, client A may use the translation portal configuration interface 36504 to specify a set of localization services, such as may be configured by the processor 36506 and stored in the client, a translation portal configuration data set 36508. The result may be a customized localization portal 36502A for localization provider client A that focuses on localization of Korean originated multi-media content for consumption by English-speaking consumers in the United States. Client A localization portal 36502A may be configured to favor crowd resources for crowd source localization of multi-media content 36510 who have Korean and English language and other training that is pertinent to providing high quality U.S. localization. Client A localization portal 36502A may also be customized to provide a Korean language user interface, use Korean corporate branding, and the like. A wide range of customization is possible; exemplary embodiments of a translation portal configuration panel 36504 may be similar to the translation portal configuration interface capability depicted in FIG. 34 herein.

The platform 36500 of FIG. 36 may implement customized localization portals, such as portals 36502A and 36502B via use of one or more service customizer modules 36512 that may receive client-specific translation portal configuration data and adapt communications between translation resources and an on-demand translation portal API 32104. Other embodiments for customization of localization portals are possible, such as using portal-specific function masks as depicted in FIG. 32 here.

Multi-media localization may include a plurality of content source types, which may include, without limitation, computer software, mobile applications, video games, on-line games, books, movies, videos, streaming content, audio, video, text, print, still images, websites, forms, file formats, audio, video, print, electronic images, packaging/manuals, social media messaging, software programs, signage, contracts, proposals, policies, and many others, including ones that may have at least some common content. Common content may include a logo, phrase, jingle, product image, commercial theme, and other aspects of the various content types. At least one objective of an on-demand platform for multi-media content localization may include localizing such common content consistently across the localized media types. When a platform, such a translation platform comprising a translation engine 32114 or translation services 32112 as described herein that may utilize a plurality of translation and localization resources (e.g., machine, distributed crowd resources, translation memories, translation rules, and the like) is utilized for localization, ensuring consistent localization of common content may be highly desirable. Therefore, a customized localization portal may be configured by the platform 36500 to facilitate such consistent localization.

In another example of configuring an on-demand localization portal, a client or clients may access the localization portal configuration panel 36504 and provide portal customization input so that the processor 36506 uses localization portal configuration rules 36516 to generate client B localization portal data 36518 that may provide reference information to portal specific API function mask 36520 that may operate similarly to portal-specific API function mask 32108 as described herein.

Through use of customized on-demand localization portals 36502A, 36502B, localization of a plurality of different types of media materials that have at least some common content, e.g. a video, blog, and audio recording for a particular topic, may be localized in an on-demand manner from a source language or jurisdiction into a plurality of different languages or jurisdictions so that the common content is localized relatively consistently across the translated media types.

Figure 37:
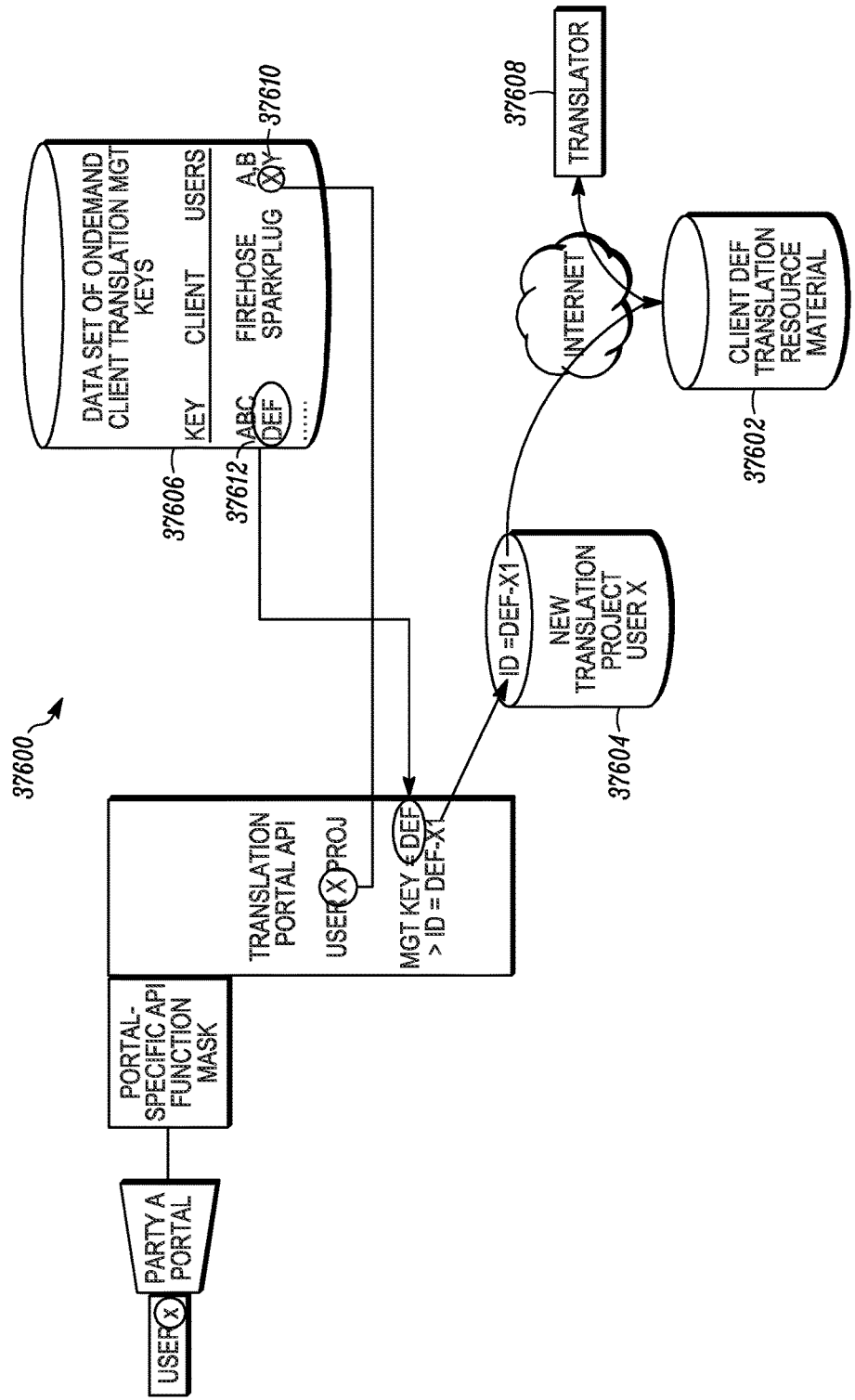
FIG. 37 is a schematic view of an automating use of client-specific translation service material.

With reference to FIG. 37, an on-demand translation service platform 37600 according to non-limiting embodiments may be applied to a wide range of application environments and scenarios. Users of on-demand translation services may have translation service material that may be specific to the client/user. As an example, a corporation may have a library of translation service material provided by corporate offices in a variety of jurisdictions. This may include preferred translations of certain terms in product descriptions, and the like. The customization methods and platforms for the on-demand translation portals 32102 described herein may facilitate automating translator use of user or client-specific translation service material.

One example of facilitating automated translator use of client-specific translation service material may include ensuring use of client-specific style guides and translation glossaries 37602 in discretely submitted on-demand translation projects by tagging each submitted translation project 37604 with a unique identifier for the client. The unique identifier may also identify one or more translation style guides and/or translation glossaries for the client. The unique identifier may be accessible by a translation resource 37608 of a translation engine, such as the translation engine 32114 depicted and described variously herein via an on-demand translation management key 37606 that uniquely identifies the client to the on-demand translation portal API 32104. Use of client-specific translation material may be applied to a specific translation request so that any processing of that request by the translation engine, such as converting the content to be translated into cognizable translation units, may utilize the client-specific translation services.

As noted elsewhere herein, on-demand translation portal API 32104 services may be exposed through the on-demand translation portals 32102 that may be accessible to users via public and/or private networks. In this way, users located anywhere there is access to a public network (e.g., the Internet) may have access to translation services via the on-demand translation portal API 32104. In addition, the actual translation services that may be accessible by the on-demand translation portal API 32104 may be executed in any suitable jurisdiction or medium and may be independent of where the user is located. Similarly, the execution of the on-demand translation portal API 32104 may be performed on any one or more computers located in jurisdiction(s) independent of the user location.

In addition to optional jurisdiction independence, deployment of customized on-demand translation portals 32102, including location, language, physical medium, and the like, may be independent of the operation of the on-demand translation portal API 32104 and therefore independent of where and how the translation services are actually performed so long as the customized portal provides a computer-to-computer interfacing capability that is compliant with the on-demand translation portal API 32104 interfacing and programmatic operational requirements. In other embodiments, deployment may be location-aware, such as to ensure that sensitive content, such as technical data that is prohibited from export to some places, remains within required jurisdictional boundaries, such as involving crowd translation by crowd workers residing within known jurisdictions.

The methods and platforms for configuring and activating customized on-demand translation portals to access translation services via on-demand translation portal API 32104 may provide access to highly capable translation service offerings that automate allocation of crowd resources, content delivery to the crowd sources, translated content retrieval from the crowd resources, and payment to the crowd resources for acceptable translation services provided.

In this example, on-demand multi-media translation may be offered. Localization may be provided through a translation-quoting service-delivery platform that is adapted to provide coordinated translation of a plurality of media types with at least some common content from a source language into a plurality of different languages so that the common content is localized consistently across the translated media types. Translation service offerings may also include translation transaction resolution, e.g., payment processing capabilities. Translation transaction resolution may allow for making payment adjustments related to the estimated and actual translation services that are utilized. Various payment options for translation and other services may be supported, such as credit card, prepayment, electronic payment, provisioning, etc.

As an example of translation transaction resolution, a hybrid translation service offering may generate estimates for human-refined machine translation of content. The extent of human and machine activity undertaken in the translation may also be separately determined. Translation transaction resolution may include resolving payment for the translation based on the estimate and the determined extent of activity.

An on-demand API project workflow for settlement of the translation transaction may include a client application, e.g., an on-demand translation portal 32012 that a translation user uses to access the translation services via the on-demand translation portal API 32104. The user may indicate content to translate, select a translation service offering and request a quote. The portal may provide the content and on-demand translation portal API 32104 compatible commands to the on-demand translation portal API 32104, which generates one or more projects and one or more quotes based on the translation request. Upon the on-demand translation portal API 32104 receiving an approval of the quote from the user via the portal, the on-demand translation portal API 32104 may generate an invoice and forward it to a payment processor and to the user via the portal. Upon notification of payment completion from the payment processor, the on-demand translation portal API 32104 may communicate translation job commands to a translation platform. The on-demand translation portal API 32104 may interact with the translation platform and notify the user when the quoted translation project is complete.

Referring again to FIG. 37, client-specific style guides and translation glossaries may be used in discretely submitted on-demand translation projects by tagging each submitted translation project with a unique identifier 37610 that facilitates identifying the client and client-specific translation resource material, such as at least one of a translation style guide and one or more translation glossaries for the client. The unique identifier 37610 is accessible via an on-demand translation management key 37612 that uniquely identifies the client to the translation API. The client-specific translation service material 37602 may include pre-existing material. The translation service identification function is accessible via the on-demand translation portal API 32104 to determine at least one of a client-specific style guide and a client-specific translation glossary based on the on-demand translation management API key 37612. The translation service identification function includes identifying at least one of a translation style guide and translation glossaries for the client based on matching a portion of the on-demand translation management API key (e.g., user identifier 37610) to a database of such API keys that is accessible by a server with which the on-demand translation portal API 32104 communicates. The client may submit the on-demand translation project via a third-party translation interface, such as customized translation portals 32102 as depicted and described herein, that is configured on behalf of the third-party to interface with an API 32104 that enables on-demand quoting of a translation projects, machine translation and crowd-sourced refinement of the machine translation.

Figure 38:
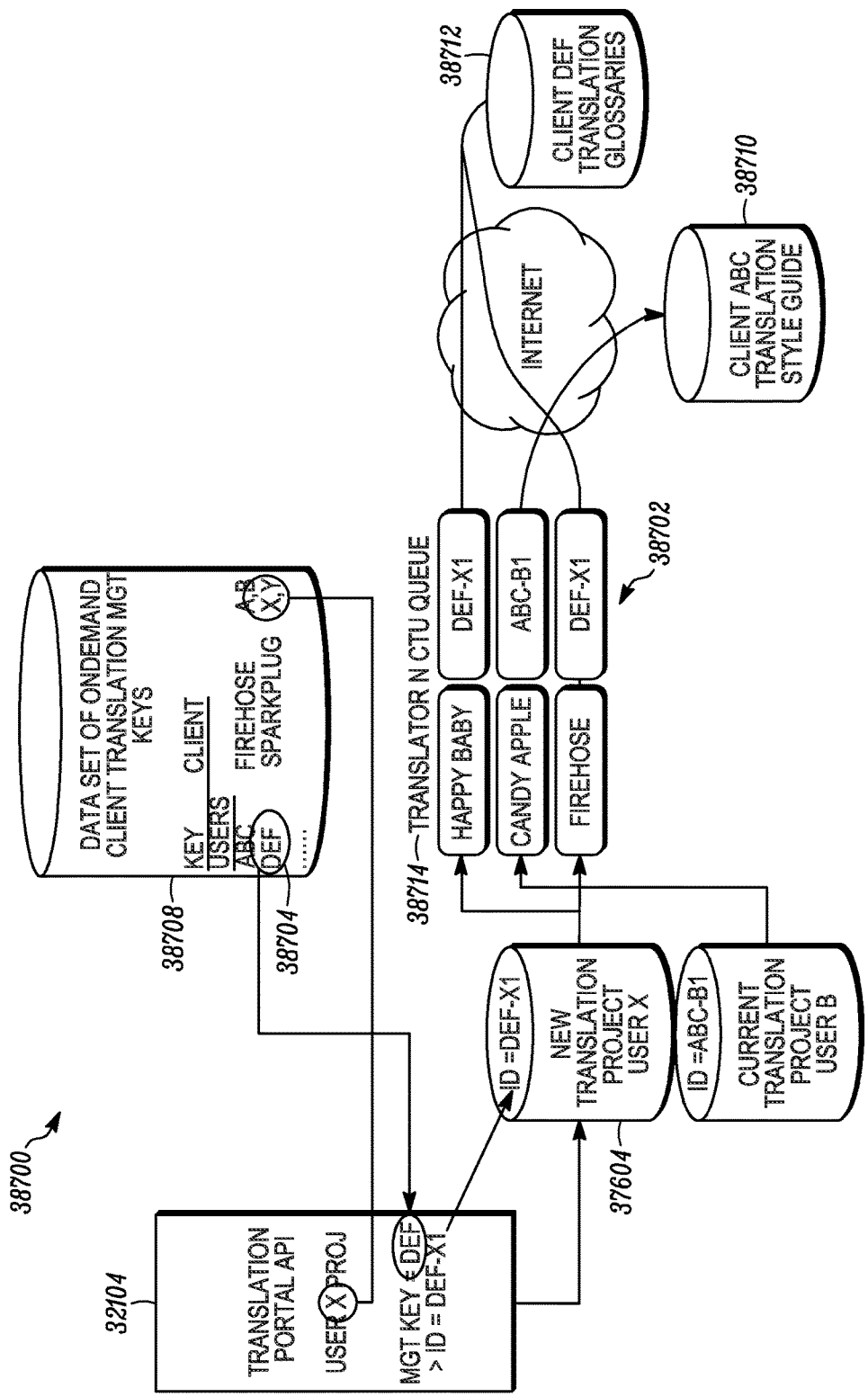
FIG. 38 is a schematic view of an automating use of client-specific translation service material for a cognizable translation unit.

With reference to FIG. 38, an on-demand translation service platform 38700 according to non-limiting embodiments may employ a translation service identification function to facilitate use of client-specific style guides and translation glossaries to process a plurality of cognizable translation units 38702 in a translation queue 38714 from a plurality of different translation projects that may be concurrently being translated. The platform 38700 may tag each cognizable translation unit with a unique identifier 38704 that facilitates identifying the client and at least one of a translation style guide 38710 and translation glossaries 38712 for the client. The unique identifier may be accessible via the on-demand translation management API key data set 38708 that facilitates matching a user of the on-demand translation portal to the associated client.

Requests to the on-demand translation portal API 32104 may be signed using a set of API keys that may be stored in a management key dataset 38708. Typically, one master set of keys may be utilized for creating accounts for users and managing a set of API keys for each user. This facilitates payment and access control by the on-demand translation portal API 32104.

The translation service identification function may be accessible via the on-demand translation portal API 32104 to determine at least one of a client-specific style guide and a client-specific translation glossary based on the on-demand translation management API key determined from management key data set 38708. Identifying at least one of a translation style guide and translation glossaries for the client is based on matching a portion of the on-demand translation management API key (e.g. user "X" or key "DEF") to a database of such API keys that is accessible by a server with which the on-demand translation portal API 32104 communicates.

Alternatively, the client may submit the on-demand translation project via a third-party translation interface that is configured on behalf of the third-party with an API that enables on-demand quoting of a translation projects, machine translation and crowd-sourced refinement of the machine translation and submits a specific management key 38704 that may simplify the translation service identification function operation.

Figure 39:
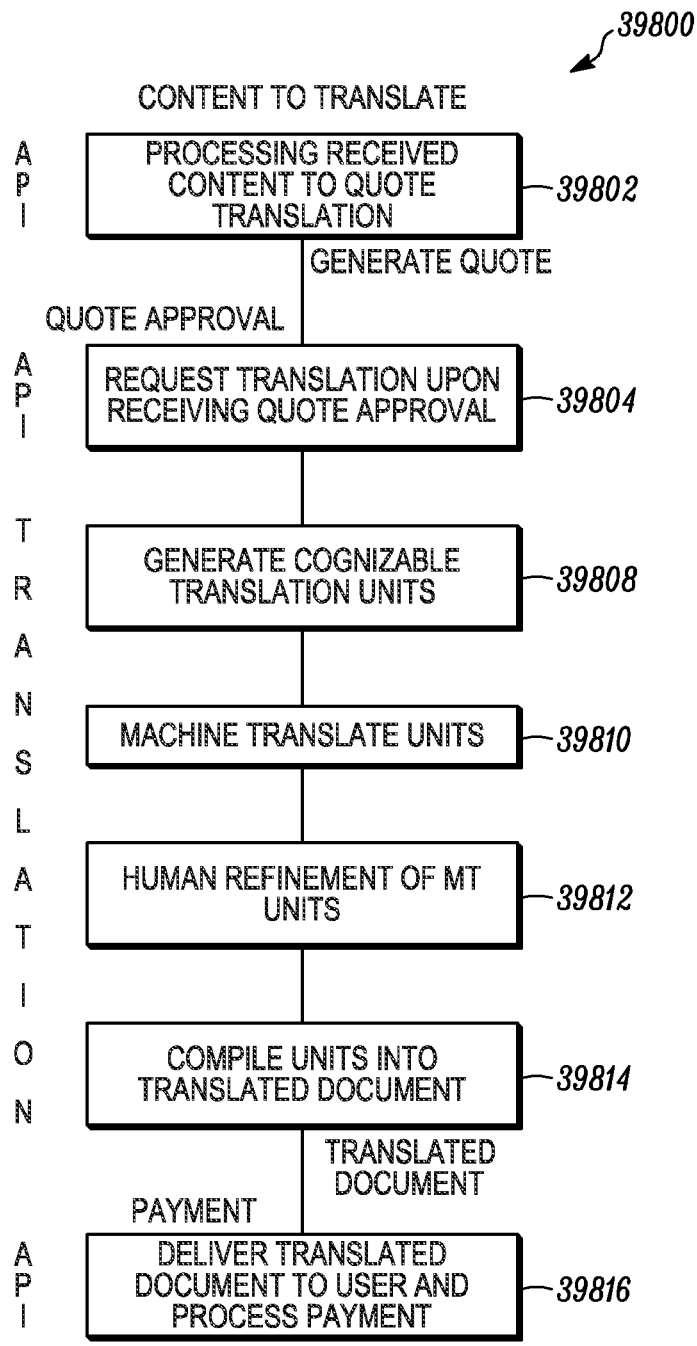
FIG. 39 is a flowchart illustrating a method of hybrid (machine translation/crowd-sourced; "MT/CS") translation.

With reference to FIG. 39, hybrid machine translation and human refinement may be accessed via the customized on-demand translation portal so that content may flow from a user of such a portal through the translation engine that utilizes machine translation techniques and then routes the translated material to human translators (e.g. crowd-sourced translators) and finally combines the resulting translated content into a deliverable as described by the portal user at time of translation request submission. Any number of iterations or variations may be possible, e.g., machine-human-machine-human etc.).

Hybrid machine translation with human refinement may further be automated for an on-demand translation portal user by the portal automating a sequence of on-demand translation portal API 32104 compatible interface commands/instructions and using the on-demand translation portal API 32104 programmatic interface to provide those commands automatically to the on-demand translation portal API 32104 to perform the actions required to effect the hybrid translation. Instructions for the on-demand translation portal API 32104 may include requesting a quote for hybrid translation of content indicated by a user of the portal; generating a translation project; delivering the quote for the project to the user via the portal; managing payment of the quote; and/or instructing the translation engine to perform hybrid translation of the indicated content.

A method of hybrid (e.g., MT/CS) translation 39800 includes steps that may be performed by the API 32104 (e.g., steps 39802, 39804, and 39816) and steps that may be performed by a translation service capability (e.g., steps 39808-39814), such as a translation capability 32112 and/or 32114 as described herein. The process 39800 may include receiving a reference to content to be translated, such as in an interface to a platform that provides on-demand quoting and/or on-demand hybrid translation services. The indicated content may be processed to determine an estimated cost for hybrid translation and a quote based on the estimated cost may be generated (e.g., for the user of the platform). Upon receiving approval, the API may generate translation engine commands, such as by setting up a translation project control data structure and delivering this data structure to a computer automated or at least semi-automated translation engine in a request for hybrid translation (step 39804). The hybrid translation may include steps performed by a translation platform that may combine machine and human translating, such as processing the content into cognizable translation units (step 39808), machine translating the cognizable translation units (step 39810), and offering at least one of the machine translated cognizable translation units for refinement of the machine translation to a set of human translators selected from a set of qualified translators among a crowd of potential translators (step 39812). The machine translated cognizable translation unit may be presented to one of the set of human translators in response to acceptance by the human translator of the offering in an interface that facilitates human refinement of the machine translated cognizable translation unit. Next, the human refined machine translated cognizable translation units may be received and compiled into a hybrid translation (step 39814) of the submitted translation content. The hybrid translation process 800 may conclude with the API 32104 delivering the translation from step 39814 to the user and managing payment (step 39816).

Figure 40:
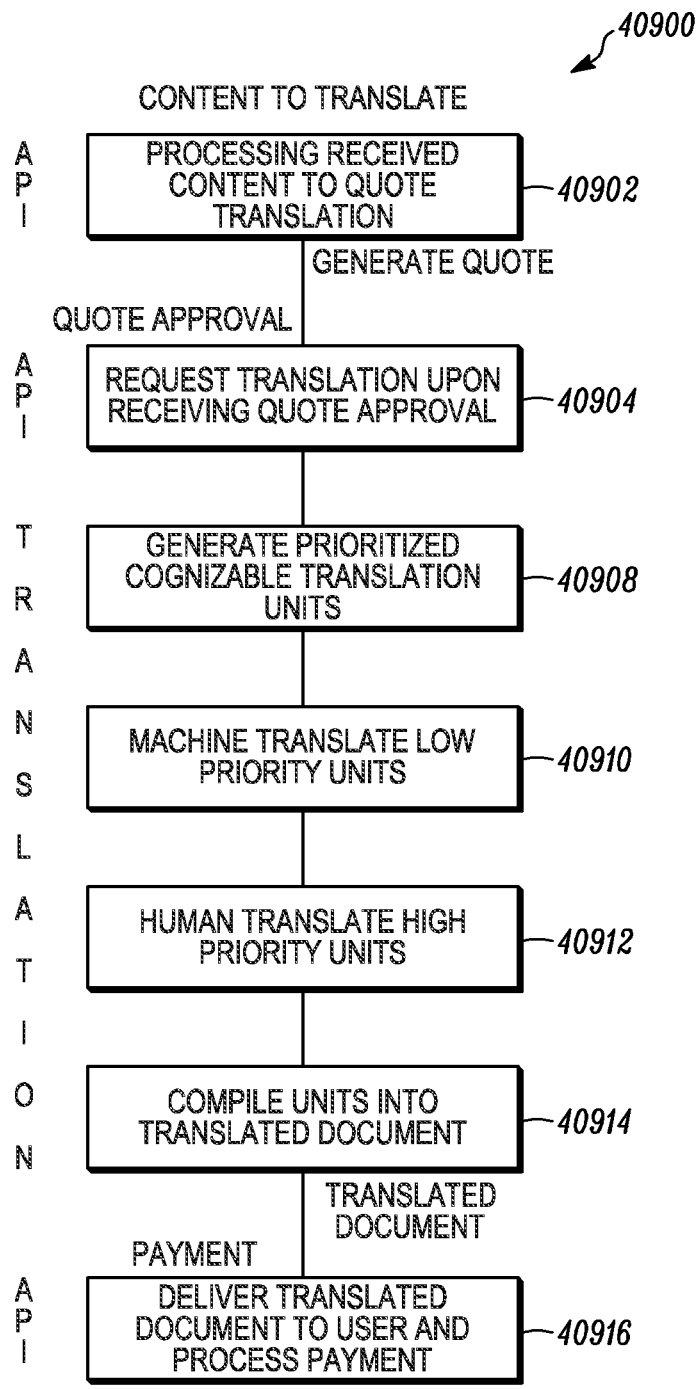
FIG. 40 is a flowchart illustrating a method of hybrid (MT/CS) translation based on the priority of the translation units.

Alternatively, with reference to FIG. 40, a hybrid translation method 40900 according to one disclosed non-limiting embodiment may be based on the priority of the translation units. The API 32104 may perform steps 40902, 40904, and 40916 that may be comparable to steps 39802, 39804, and 39816 described above and depicted in FIG. 39. Translation engine steps 40908-40914 may differ from corresponding steps 39808-39814 of FIG. 39 at least in that unit prioritization may impact how the units are processed. A priority level may be assigned to at least one of the cognizable translation units when the units are generated (step 40908). Units may then be processed differently based on assigned priority level. Lower priority units may be machine translated (step 40910). Higher priority units may be human translated (step 40912). Rather than having a human refine the machine translated units from step 40910, the lower priority machine translated units and the higher priority human translated units may be blended to provide the translated content (step 40914). The prioritized unit hybrid translation process 40900 may conclude with the API 32104 delivering the translation from step 40914 to the user and managing payment (step 40916).

Figure 41:
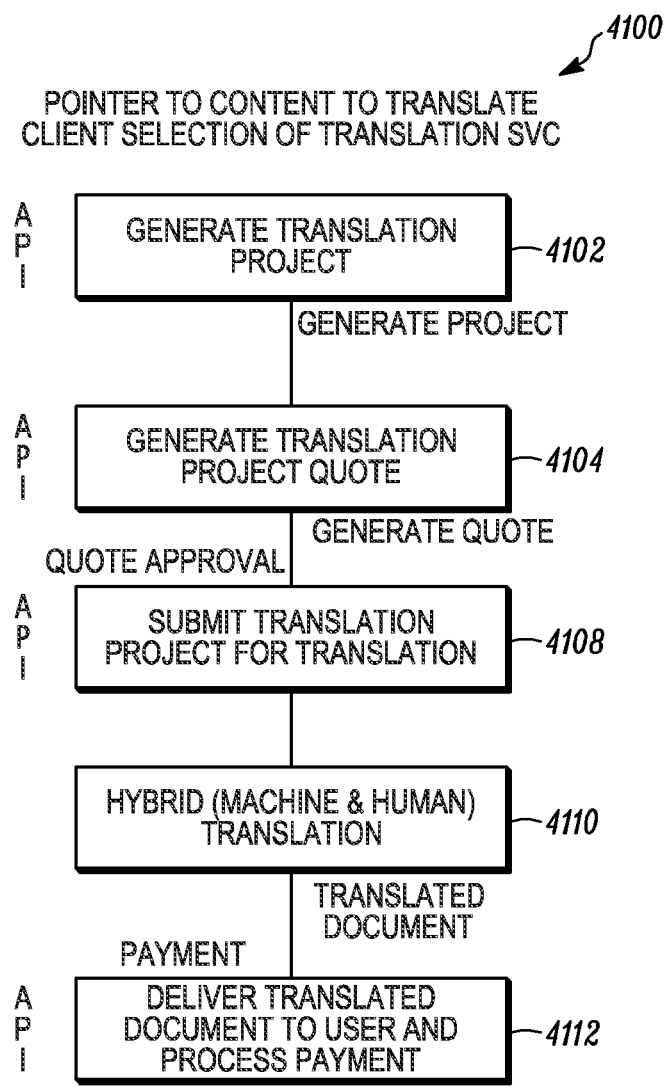
FIG. 41 is a flowchart illustrating a method of hybrid (MT/CS) translation without the user having any specific knowledge of what type of translation processing is being performed.

Alternatively, a user may access automated on-demand translation via an on-demand translation API 32104 described herein without the user having any specific knowledge of what type of translation processing is being performed. FIG. 41 represents such a scenario by depicting actions performed by the on-demand translation API 32104 (e.g., steps 4102, 4104, and 4112) and indicates translation as a single logical action (step 4110). The API 32104 steps 4102, 4104, and 4112 may correspond to steps 39802, 39804, and 39816 of FIG. 39 and/or steps 40902, 40904, and 40916 of FIG. 40. The quote generated in step 4104 may indicate quantitative (e.g., cost and schedule) and/or qualitative (e.g., high, medium, low translation quality) criteria, with or without revealing how such translation will be achieved. Optionally, the quote may not reveal to the user whether the translation will include translation by humans, machines, or a combination thereof.

The translation work performed during step 4110 may involve deconstructing the submitted translation content into a plurality of cognizable translation units. In that case, locations of the CTUs in the source content may be preserved so that translated content can be placed in proper order in a re-constructed target document. The functions of step 4110 may further include access by a translator to the cognizable translation unit, the machine translated cognizable translation unit, material from the submitted translation content other than the cognizable translation unit, submitted translation content metadata, and a translation memory of previously translated cognizable translation units.

Figure 42:
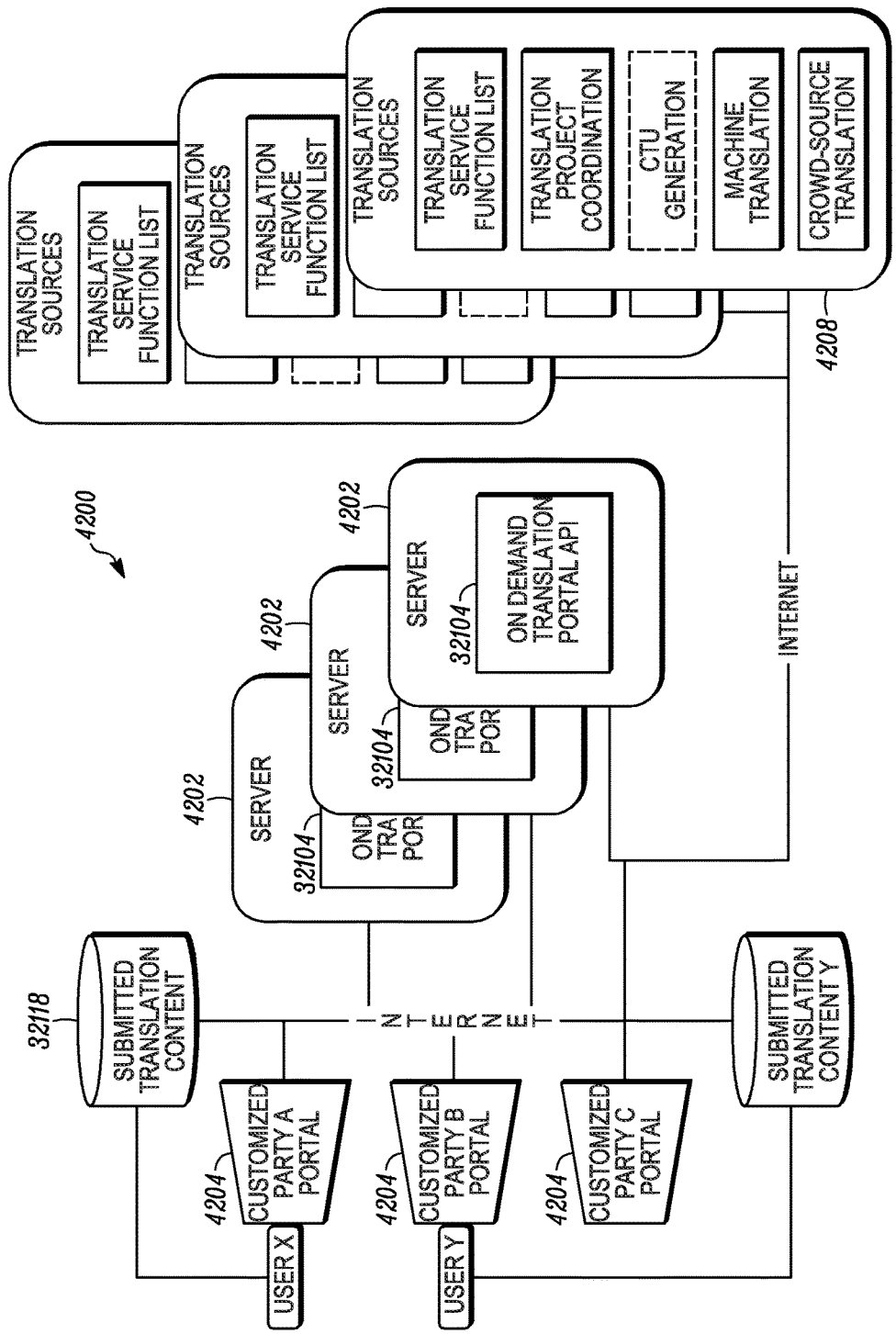
FIG. 42 is a schematic view of a distributed on-demand translation API-compliant hybrid translation.

With reference to FIG. 42, a distributed on-demand translation service platform 4200 is depicted. Any number of on-demand translation portal APIs 32104 may be executing on any number of physical or virtual different servers 4202. These servers may interface with customized on-demand translation portals 4204 that may be operating on individual users' computers. Alternatively, each on-demand translation portal 4204 may be executing on one or more web servers and may be accessed through a web browser or other similar remote access capability of the user's computer. Although shown as distinct from the servers 4202, any number of the customized on-demand translation portals 4204 may be executing on the same server 4202 and any of the plurality of on-demand translation portal APIs 32104. Translation resources 4208 may similarly be distributed. Computing resources, such as machine translation, for example, may be executing on dedicated machine translation severs to facilitate optimized execution of translation functions. Alternatively, any or all of the portals 4204, APIs 32104, and services 4208 may execute on a single server or other computer. By allocating certain functions, such as portals 4204, APIs 32104, and services 4208 to different computers in a distributed/networked architecture, operational efficiencies may be gained for each computer thereby reducing costs and/or overhead associated with performing many different functions on a single system. Such a distributed architecture further leverages the existence of around-the-clock access to services due to the nature of crowd sourcing in jurisdictions in different time zones around the globe. Utilizing machine translation resources in a jurisdiction where people are generally not using computing resources (e.g. at night when most people are sleeping), and concurrently utilizing crowd resources in another jurisdiction during typical daytime working hours may further advance efficiencies. Such an architecture can further be enabled by the on-demand translation portal APIs 32104 each operating with a common programmatic interface. In this way, any API-compliant portal 4204 and any API-compliant resources 4208 can interface to any on-demand translation portal API 32104 independent of location, customization, physical computer architecture, and the like.

Figure 43:
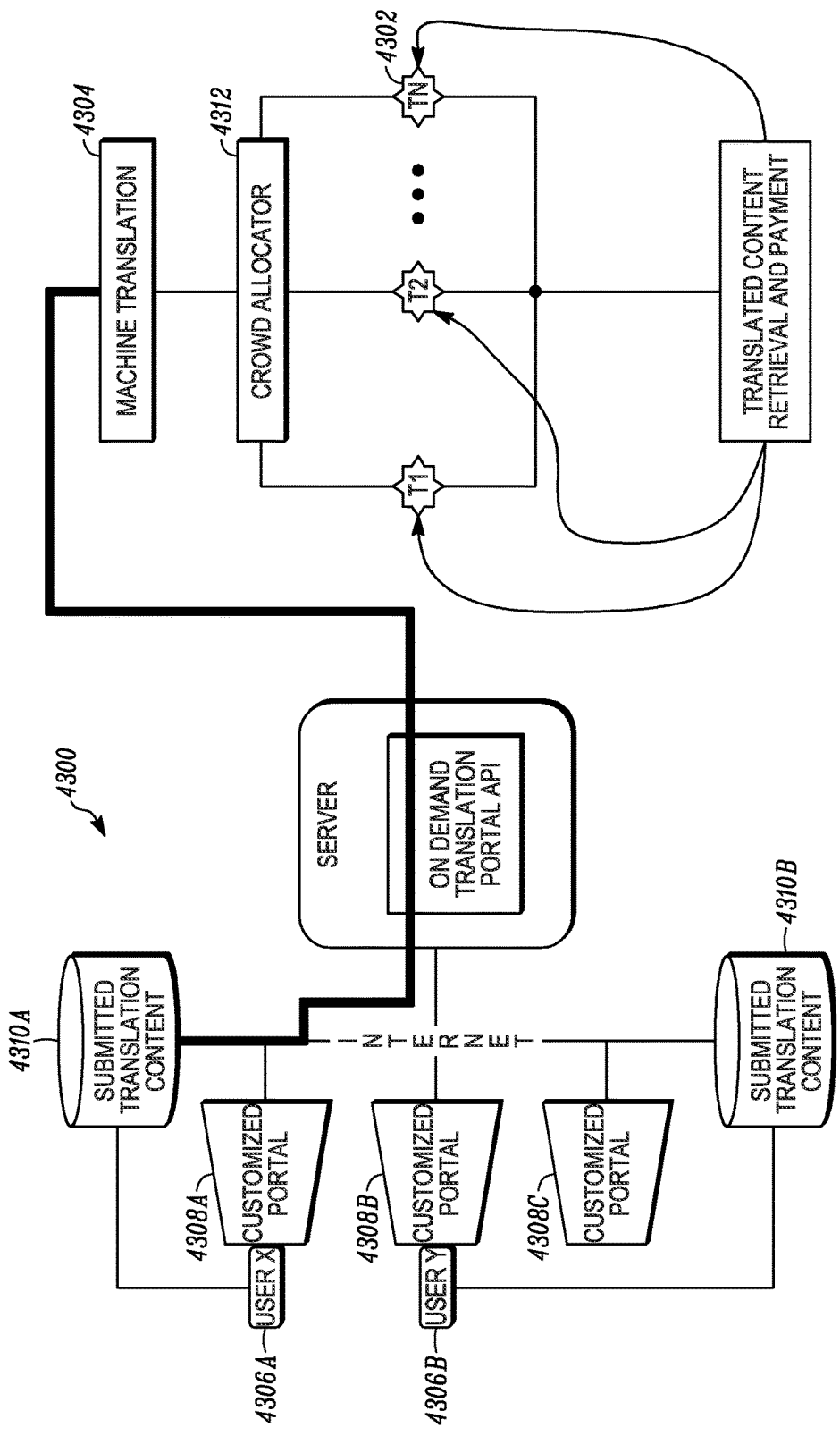
FIG. 43 is a schematic view of an on-demand crowd sourced MT refinement.

With reference to FIG. 43, an on-demand translation service platform 4300, according to one disclosed non-limiting embodiment, may automate the allocation of, content delivery to, retrieval from, and payment to, a crowd resource 4302 for refinement of each unit of machine translated content 4304. Each user 4306 may interact with a customized on-demand translation portal 4308 of the platform 4300. Each user may indicate to the platform 4300 via the portal 4308 a location of submitted translation content 4310. The portal 4308 may communicate with a running instance of the on-demand translation portal API 32104 information about the user's request for translation, including the location of the submitted translation content 4310. The corresponding running instance of the API 32104 may convert the information provided by the portal 4308 into translation project control data, such as in a control data structure, that may be used by a translation engine to perform the machine translation 4304, crowd translator allocation via a crowd allocator 4312, and reconciliation with the translators 4302. As depicted in the embodiment of FIG. 43, a single running instance of an on-demand translation portal API 32104 may serve a plurality of users 4306 via a plurality of customized on-demand translation portals 4308 while maintaining proper continuity of each requested translation activity between a translation engine and the user.

Figure 44:
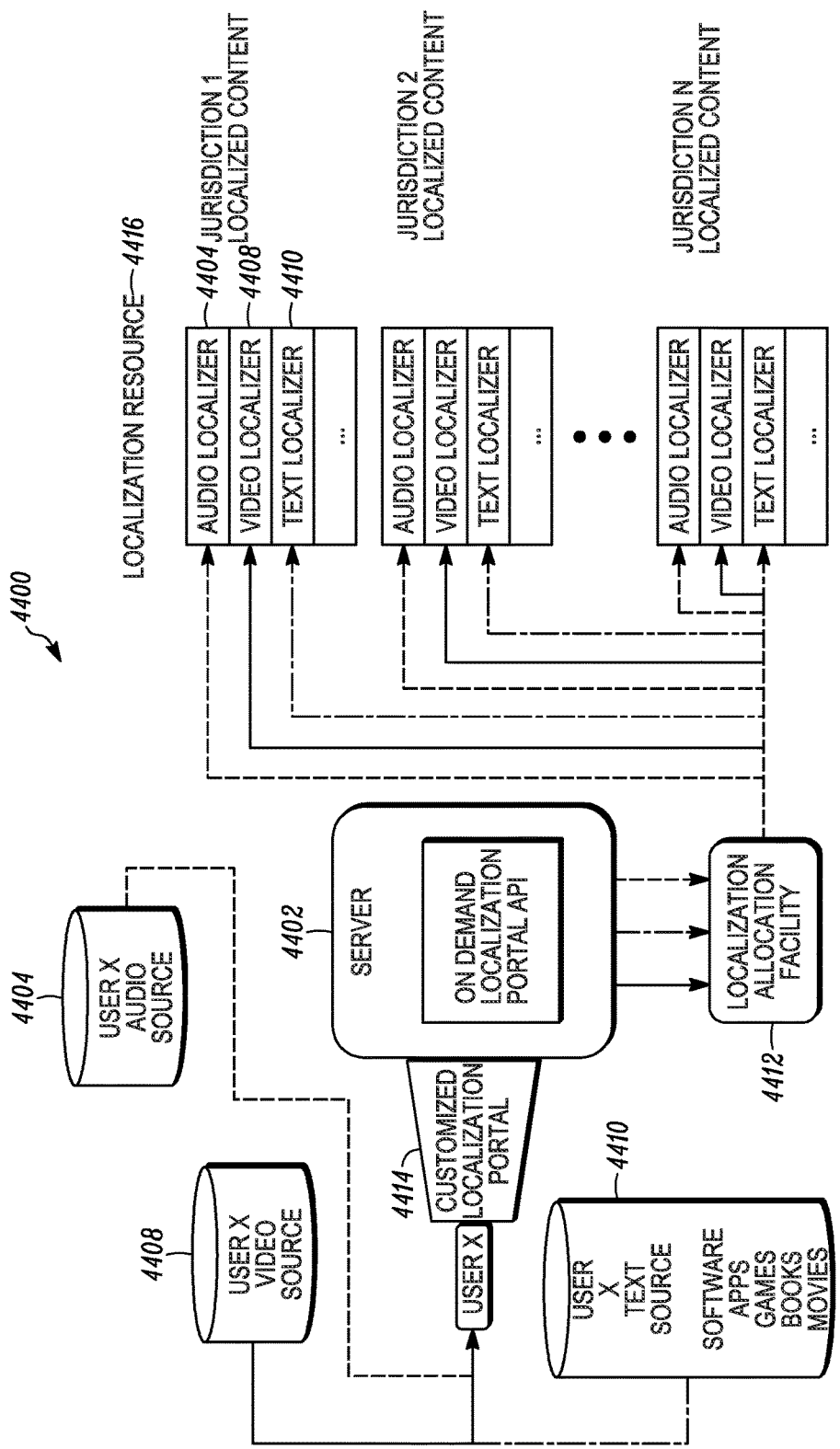
FIG. 44 is a schematic view of an on-demand multi-media translation.

With reference to FIG. 44, an on-demand translation service platform 4400 according to one disclosed non-limiting embodiment may provide for localization through an on-demand translation-quoting service-delivery capability (e.g., API-enabled server 4402) based on an on-demand localization portal API 32104. The platform 4400 may be adapted to provide coordinated translation of a plurality of media types 4404, 4408, and 4410. The platform may facilitate translating and localizing common content found in these media types from a source language into a plurality of different languages via a localization allocation facility 4412. Although the embodiment of FIG. 44 depicts three media types (4404, 4408, and 4410), more or fewer media types may be localized in any submitted localization project. In an example of multi-media localization, a submitted localization project may include at least two types of media, such as text, video, audio, email, and search engine optimization.

An objective of the platform is that any content that is common across two or more of the types of media should preferably be localized consistently across the translated media types. Localization may be performed via the platform on a wide range of content including, without limitation, computer software, mobile applications, video games, on-line games, books, movies, videos, streaming content, and the like. The platform facilitates on-demand localization through, for example, an API that is adapted to support on-demand localization quoting, machine localization and crowd-sourced refinement of the machine localization. As depicted in the embodiment of FIG. 44, a single set of source content may be received through an on-demand customized localization portal 4414 as part of a translation request from a user; each type of media in the request may be allocated to a plurality of jurisdiction-specific localization resources 4416, thereby facilitating "one-to-many" language/jurisdiction localization. The resources may further be media specific localization resources.

The submitted localization projects may include, for example, functionality and features referred to herein as "Create Projects" and "Generate Price." A "Create Projects" feature may facilitate creation of discrete projects from source content based on service selections of the client and the nature of the content. A single quote can yield multiple projects if the amount of source content is large or the source content is diverse enough to require different handling. Generate Price may facilitate creation of a price for the translation project either by analyzing the source content to find inputs (word count, minute count, row count, character count, page count, etc.) for a pricing formula, or with a manual workflow where a project manager reviews the source content and sets a price.

Figure 45:
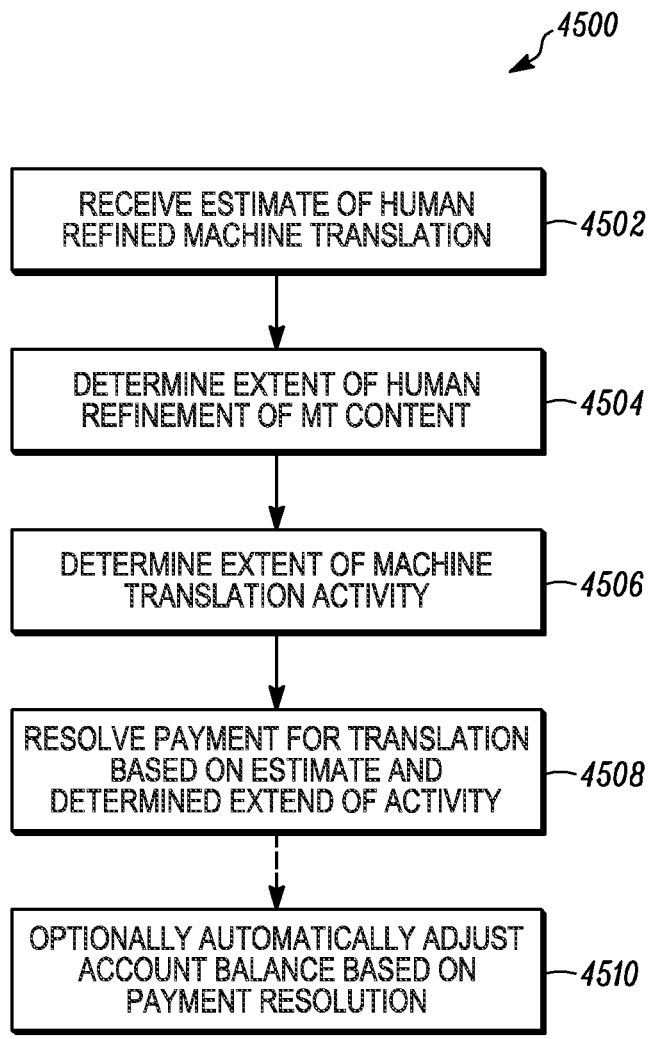
FIG. 45 is a schematic view of a transaction resolution for hybrid, on-demand translation.

With reference to FIG. 45, translation service offerings may include translation transaction resolution, e.g. payment processing capabilities. Translation transaction resolution may beneficially allow for making payment adjustments related to estimated and actual translation services used. In translation transaction resolution, estimates may be generated for human-refined machine translation of content. Such translation transaction resolution may include resolving payment for the translation based on the estimate and the determined extent of activity.

An on-demand API project workflow for settlement of a translation transaction may include a client application (e.g., on-demand translation portal as described variously herein) that a translation user may use to access translation services via an on-demand translation API as described variously herein. The user may indicate content to translate, select a translation service offering, and request a quote. The portal may provide the content and on-demand API compatible commands to the on-demand API, which may generate one or more projects and one or more quotes based on the translation request. Upon the on-demand API receiving an approval of the quote from the user via the portal, the on-demand API may generate an invoice and forward it to a payment processor and/or to the user via the portal. Upon notification of payment completion from the payment processor, or other acceptable assurances of payment by the user, the on-demand API may communicate translation job commands to a translation platform. The on-demand API may interact with the translation platform and notify the user when the quoted translation project is complete. Preparing a quote for the requested translation services may include estimating an amount of/cost for human refined machine translation. Information generated when preparing the translation request quote and information gathered while performing the translation may be beneficially applied to settlement of on-demand translation transaction processing.

Transaction resolution for hybrid, on-demand translation may include taking estimates for human-refined, machine translation of content (e.g., such as an estimate prepared when a quote for the translation project is being prepared as noted above). The extent of human and machine activity undertaken in a translation may be determined and payment for the translation based on the estimate and the determined extent of activity is resolved.

In one disclosed non-limiting embodiment, transaction resolution for a hybrid, on-demand translation method 4500 may initially include receipt of estimates for human-refined, machine-translation of content (step 4502). Next, the extent of human activity (step 4504) and the extent of machine activity (step 4506) undertaken in a translation may be determined. Finally, payment for the translation based on the estimate and the determined extent of activity may be resolved (step 4508). Optionally, the account balance may be automatically adjusted based on the payment resolution (step 4510).

Figure 46:
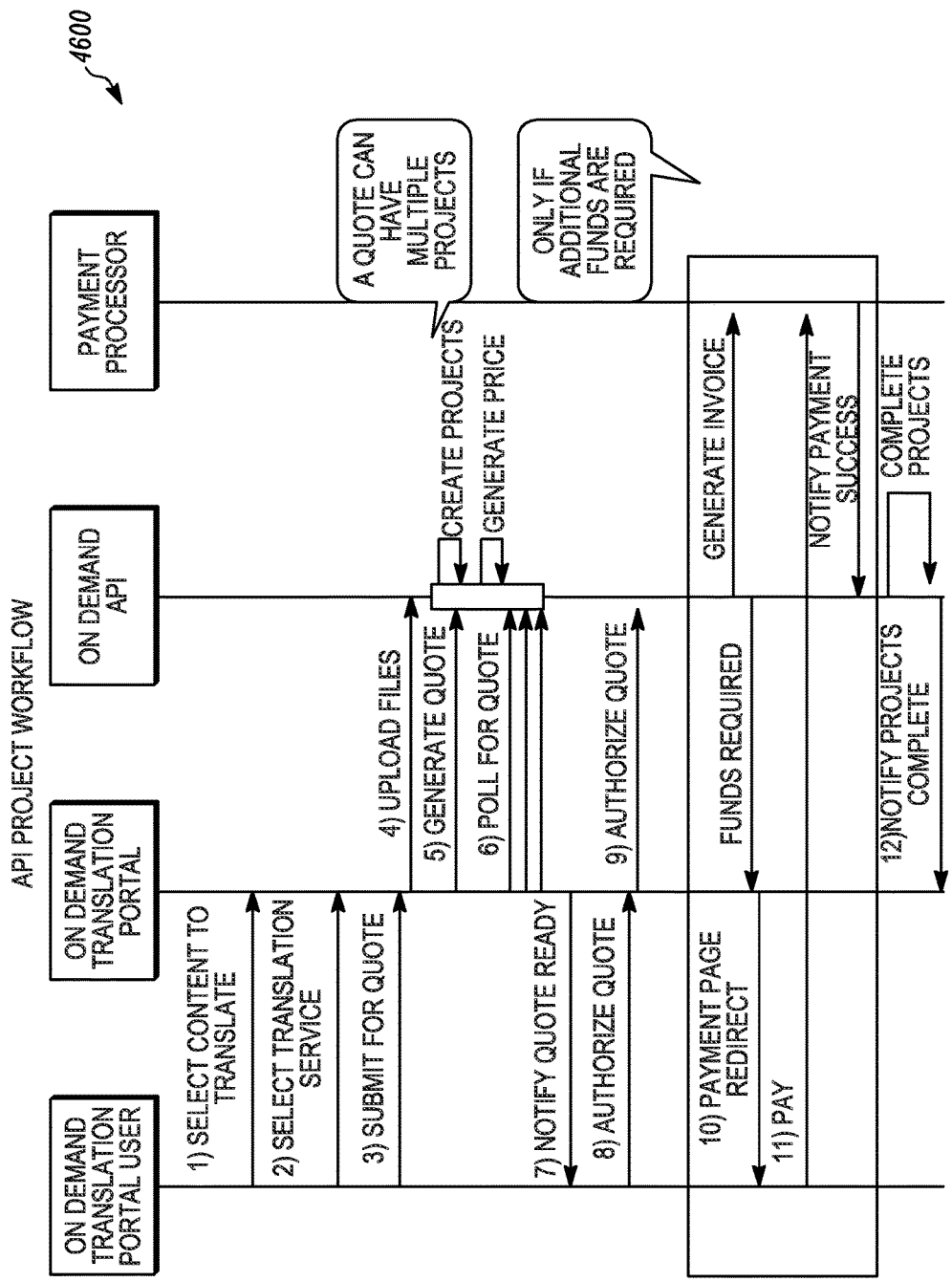
FIG. 46 is a flow chart illustrating an on-demand application programming interface workflow.

With reference to FIG. 46, a high-level sequence diagram 4600 illustrates the workflow for creating and completing on-demand translation projects. First, the user the client application to build a list of content to be translated. These assets can be products or files. Next, the user selects an option to translate the selected assets and is presented a list of translation services that are available. Typically, these translation services will represent different quality levels such as straight machine translation, machine translation with human post-edit, crowd translation, professional translation, and specialist domain translation. The list of available services can be found by calling the "List Services" API.

Next, the user submits the list of content assets for a quote. If the project is file-based, the client application uploads each file. If the project is product-based, the products are sent to the on-demand platform when generating the quote. Next, the client application calls the Generate Quote API to build a quote for the selected content and translation service. Product-based projects and some file-based products will come back immediately with a completed quote containing a price. Other quotes will require additional time to parse the files. If the price is not ready, the quote will come back with a status of "Calculating" and no price. If this is the case, the client application should regularly call the Get Quote API until the quote is "Pending" or has a status of "Error." Next, the client application may notify the user that the price is ready. The user can authorize or reject the quote. The client application calls either the Authorize Quote or Reject Quote API depending on the user's preference. If the user has a prepaid balance or has been given free translation credit, authorizing the quote will automatically start the translation projects. If funds are required, the user must go through a payment process. If payment is required, the authorize quote request will come back with an HTTP status code of "1042." The body of the response will contain a Payment URL that the user can follow to submit payment. Next, the client application sends the user to the payment page to pay for the balance due. Finally, the on-demand translation platform 32100 will complete the projects and notify the client application that the translated content is ready.

The on-demand translation service platform may beneficially increase speed of business, manage decentralized demand without adding headcount, outsource and extend established shared services approach to translation, maintain consistency with existing translation memories and glossaries, streamline administration with self-service user and account management, manage costs with payment options including POs and procurement/credit cards, and realize cost savings through best practice services.

Figure 47:
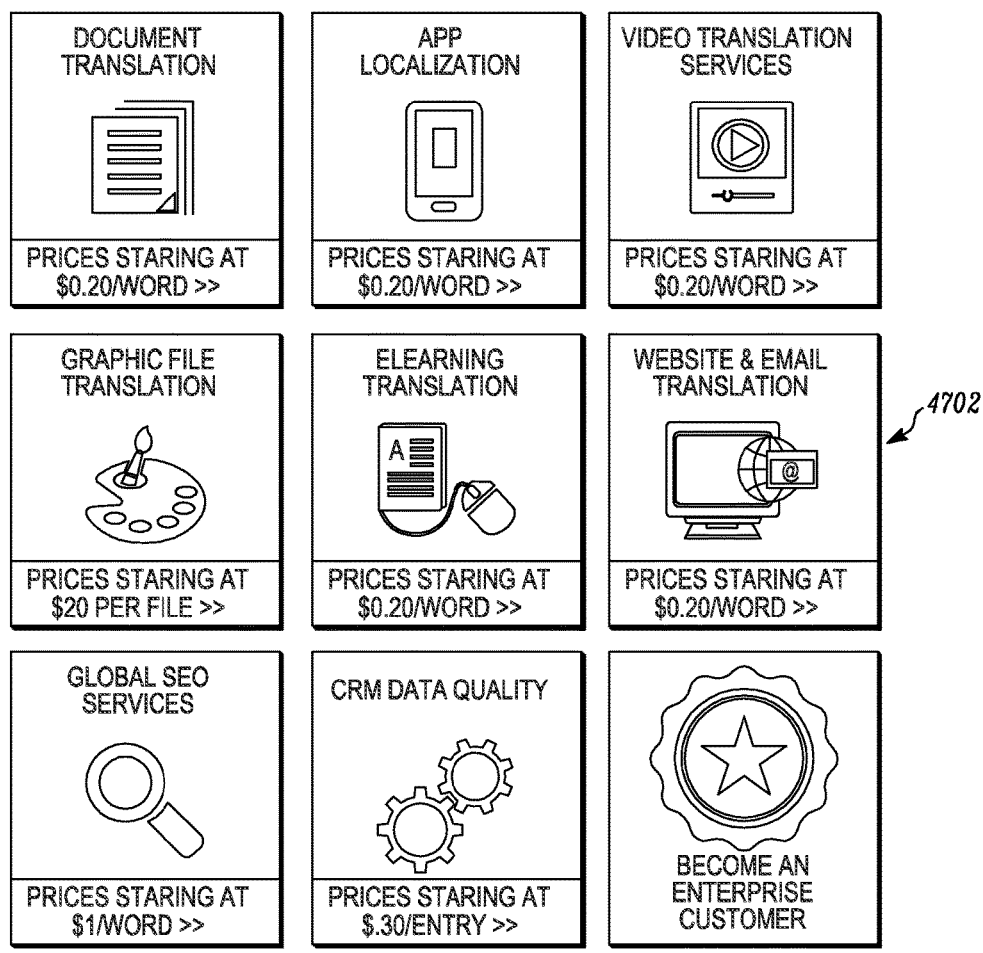
FIG. 47 depicts an exemplary retail on-demand translation portal interface.

With reference to FIG. 47, an exemplary retail on-demand portal 4702 is depicted. Translation services depicted in FIG. 47, including document translation, application localization, and other services, some of which may correspond to preconfigured translation project configurations that the retail portal 4702 may offer. Each such service offering may be communicated to the on-demand API 32104 as one or more API instructions. The API 32104 may process these one or more API instructions and generate translation project information, such as in the form of a translation project data and command data structure for use by a translation engine to perform the corresponding service. In an example, a user may select a "Document Translation" service. A corresponding document translation project request form may be presented to the user that may be preconfigured with pricing of $0.20/word. If a user were to select "Graphic File Translation", a project request form may be presented to the user that may be preconfigured with pricing of $20 per file. The portal 4702 may process the submitted project request form and/or the API 32104 may process the request. The API may convert information received regarding this translation request into a set of instructions, commands, data, project control information, and the like such as by generating a workflow for fulfilling the translation request.

With reference to FIG. 48, an exemplary on-demand portal screen 4802 for processing videos is depicted. This portal screen 4802 may be presented in response to a user selecting "Video Translation Services" from the set of translation service options presented in the on-demand translation portal 4702 that is depicted in FIG. 47. Here, the portal message may facilitate refinement of a retail video translation service. By selecting one or more of the video translation options presented in portal screen 4802, a set of API commands may be configured to deliver the selected video translation service request to the API that may further generate information, such as a workflow or similar project configuration and control data to control operation of a translation engine for fulfilling the specific video translation request from the portal screen 4802.

Figure 49:
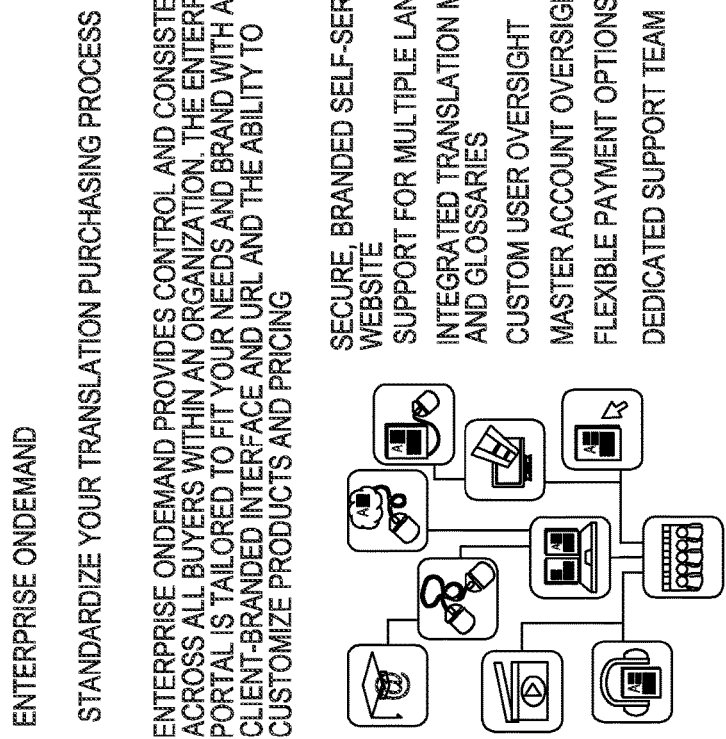
FIG. 49 depicts an exemplary enterprise portal request screen.

With reference to FIG. 49, an exemplary enterprise on-demand portal request form is depicted. A user, such as an enterprise user, in response to submitting this request, may be granted access to the methods and systems described herein that facilitate generating customized on-demand translation portals. As an example of authorized access, a user may be granted access to the portal customization interface depicted in FIG. 34 to facilitate configuring one or more customized on-demand translation portals.

Figure 50:
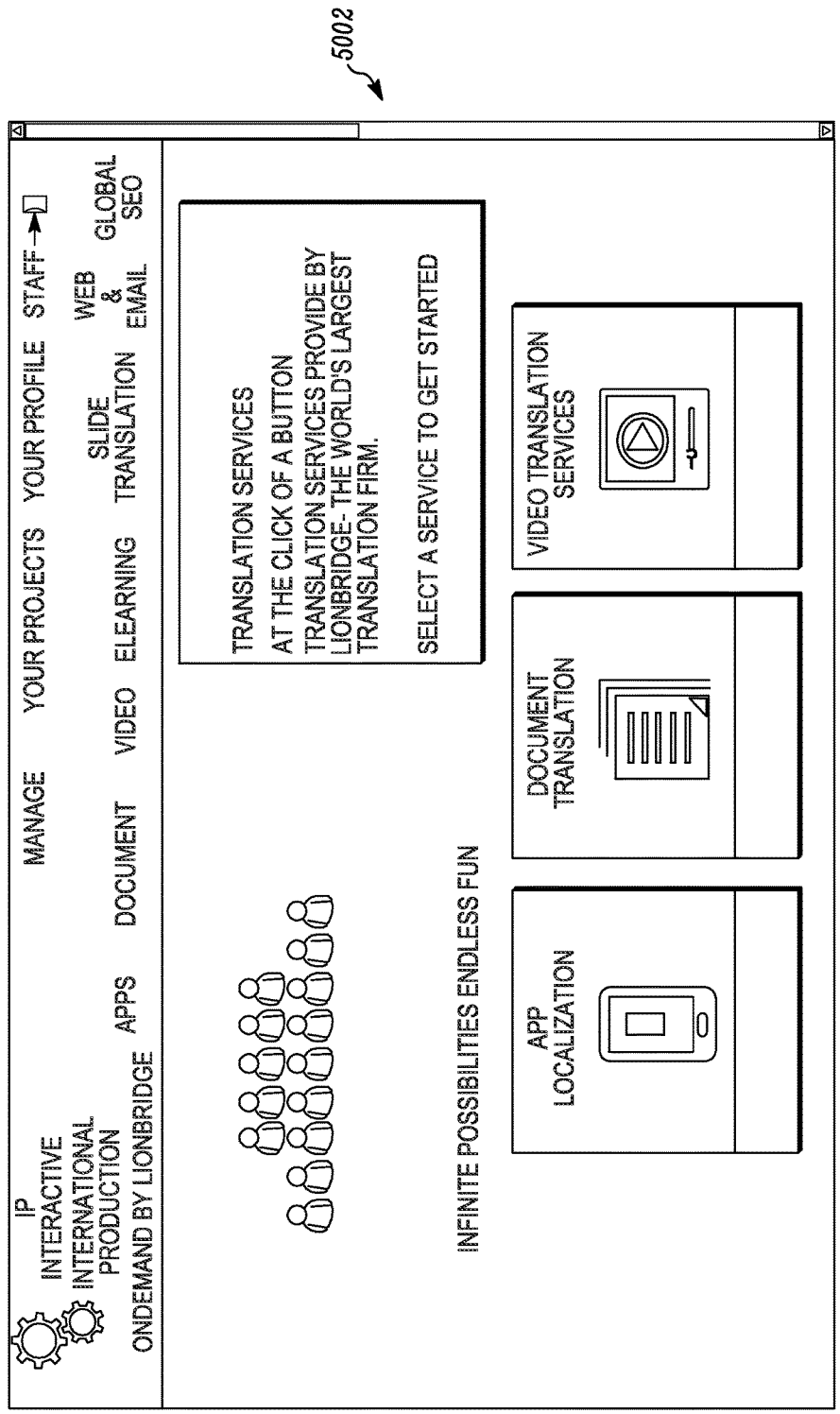
FIG. 50 depicts an exemplary customized enterprise on-demand translation portal.

With reference to FIG. 50, an example of a customized on-demand enterprise translation portal 5002 is depicted. The customized on-demand enterprise translation portal may include, for example, client specific graphics and predetermined desired translation options such as application localization, document translation, and video translation.

Translation Costs

Translation costs for certain language pairs may present challenges to an automated translation project quotation algorithm due to limited availability of translators who can perform direct translation between the language pairs. While pricing for use of such translators can be fairly predictable, due to limited availability, scheduling may be less so. Therefore, use of a time-dependent model of translator availability and quality may be applied to facilitate automated translation estimating. Such a model may be based on actual prior availability and quality of translators who are qualified to perform translation between the languages in the language pair. Cost and delivery timing may also be factored into an estimate so that automated estimates may be presented for different translation time horizons. In an alternative cost estimating technique, translation into an intermediate language may be factored into the cost estimate.

Figure 31:
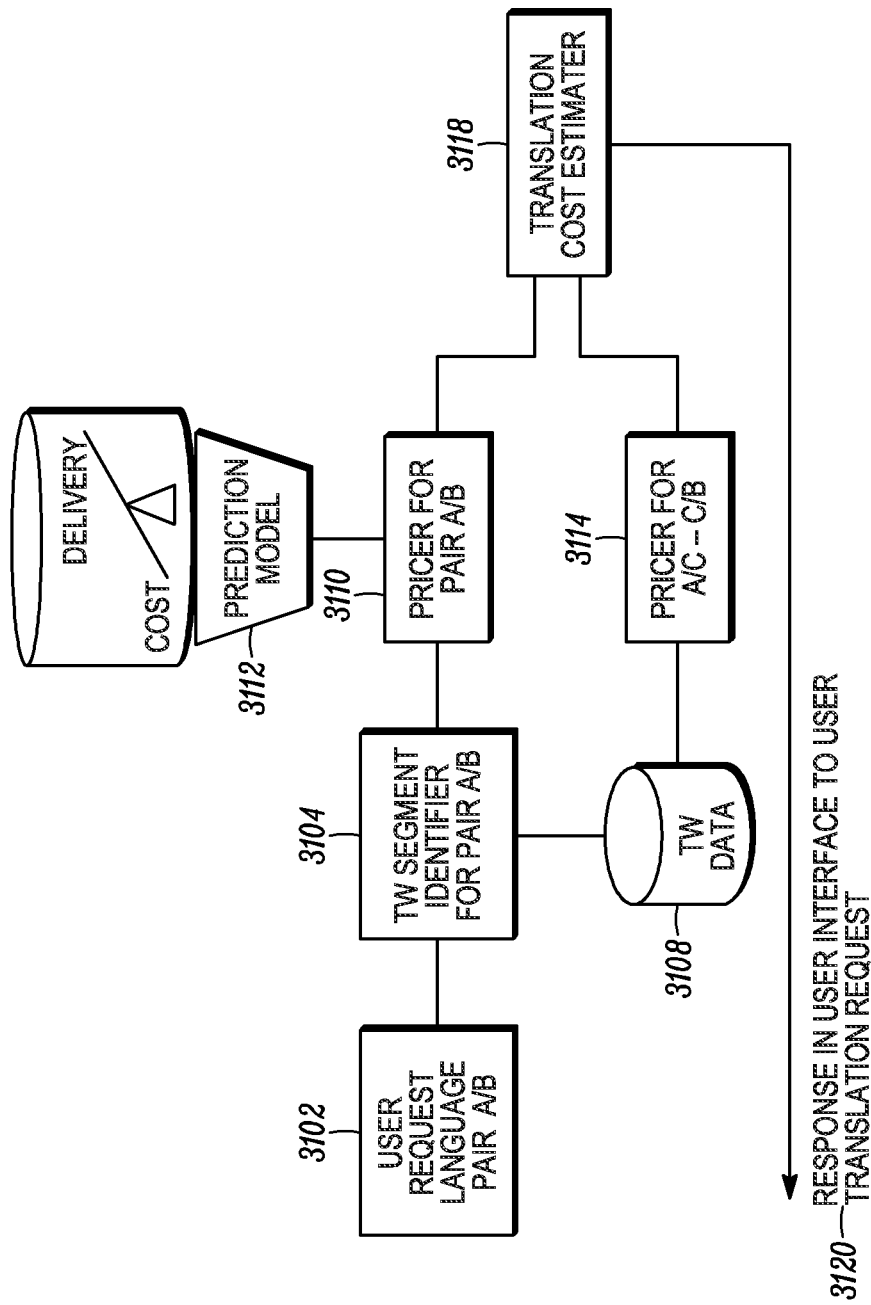
FIG. 31 depicts automated quotation algorithms for a translation project.

Referring to FIG. 31, automated translation quoting may take a user request 3102 of translating from a first language in a language pair to a second language in the pair and identify 3104 a segment of a pool of translators who can translate the language pair directly based on translation worker data 3108. A price prediction engine 3110 may apply a translator availability and quality prediction model 3112 to the identified segment to produce at least one direct translation cost estimate or more than one estimate for different translation delivery times. The translator data and the language pair translation request may be analyzed by an intermediate language price estimating engine 3114 to produce an estimate of using at least two translators to perform the translation through an intermediate language. These pricing engine outputs may be processed by a translation cost estimator 3118 so that one or more of these estimates may be presented to a user interface 3120 in response to the user submitting a translation request 3102.

In embodiments, a system for automated quoting could include the following capabilities:

Set a pricing premium on specific language pairs. For example en-us (English—United States) to fr-fr (French—France) pricing could be increased by 50%

Set a turn around multiplier on specific language pairs. For example, en-us (English—United States) to fr-fr (French—France) pricing could take 50% longer Set language holidays. For example, no translations into French on Bastille Day. This could extend the due date on projects that span Bastille Day.

An embodiment of differentiated pricing based on intermediate translation may include a method of intermediate content translation quoting that may include these method steps.

(i) Receive a request for translation, the request identifying a language pair.

(ii) Determine a current state of translator availability based on the language pair.

(iii) Identify at least one segment of a global translator pool, the segment including a plurality of translators suitable for being offered to perform the requested translation based on the language pair.

(iv) Apply a time-dependent model of translator availability and quality to the segment of the global translator pool to determine at least two distinct prices for the translation request. The first distinct price may be based on one of the plurality of translators suitable for being offered the requested translation performing the translation. The second distinct price may be on routing the request for translation to a first translator to translate from a first language of the language pair to an intermediate language and then routing the intermediate language translation to a second translator to translate from the intermediate language to the second language of the identified language pair.

(v) A final step may include presenting at least one of the two distinct prices for the translation based on a delivery timing requirement associated with the request to the requester and receiving a confirmation from the requester.

A system for automated quotation based on language pair pricing algorithms for translation projects may include the following elements:

(i) a database indicating language competencies for a plurality of language translators;

(ii) a translator availability tracking engine for determining the availability of language translators during a given time period; and (iii) a translation project quotation engine for estimating the cost of a translation project, wherein the quotation engine varies the quoted price for the quotation depending on whether a translator is currently available for direct translation of a segment from a source language to a target language.

In such a system, if a translator is not available for direct translation of a segment from a source language to a target language, the quotation engine may provide a quotation based on the cost of translating from the source language to an intermediate language and from the intermediate language to the target language.

Part VII. Additional Background on Translation and Localization Services

Any or all of the exemplary and non-limiting embodiments below of various translation and localization related services may be used in combination with the systems and methods described herein, including all embodiments described in any Clauses or Claims herein.

Computer Aided Translation ("CAT") Tools or translation memory ("TM") tools may be used. A translation workspace may be used for translation and localization services.

CAT Tools may provide several advantages when used during translation. Because they allow the translator to reuse previously translated content, there is an opportunity for:
Reduced costs
Improved final quality
Faster delivery of final materials
CAT Tools may add efficiency to the translation process by:
Separating content into working "chunks" of text called Segments (A segment is usually a sentence, a heading, or a list item)
Storing segments in matched pairs (source and target text) called Translation Units (TUs) in a Translation Memory™ database for reuse
Storing terminology in matched pairs (source and target) in a term database, or Glossary, for reference
Providing statistical reusability reports and word counts
Working with Segmentation: Translatable text is often segmented based on normal punctuation, including:
Paragraph mark
Combination of: Full stop+Space+Capital letter
Translation Workspace segments text during translation with segment separators:
A file that is prepared (pre-processed) for translation has been segmented and marked with specific character styles.
Concordance Search may be used for searching TMs for strings and translations which are shorter than segments and are not found by the glossary search and the TM segment matching. Concordance search searches may match in the foreground TM (Translation TM or Alias) and in all its background TMs.
Sort results by different parameters
Delete segments from connected TM (not background TM)
Match Rates: Previously translated segments may be presented during translations as a "match percentage" from the TM.
100% match (significantly reduced effort): The source segment is exactly the same as a previously translated segment stored in the TM, including all text and formatting.
Fuzzy match (partially reduced effort): Portions of the source segment match a previously translated segment stored in the TM. The percentage (1%-99%) indicates how closely the segments match. For example, if "The house is red." is already stored in the TM, "The house is blue." would return a 75% match.
No matches (full effort): No similar segments exist in the TM, or the percentage match is so low (usually less than 50%) that reuse causes more rework rather than less. Also known as "new words".
Goals of TM Management may include:
Leveraging Quality and Quantity
Get the best quality matches from the TMs
Get the greatest number of matches from the TMs
Prevent and Correct Problems
Identify and minimize errors in TMs
TM Management may be accomplished using, for example:
Web User Interface
TM creation, deletion, organization
Language & Segmentation settings
TM Import and Export
TM content search
User access and permissions
Translation Workspace Tools:
Attribute management
TM content search and edit
TM Import and Export
The Translation Workspace web user interface may grant secure access to selected linguistic assets from anywhere in the world.
The workspace, or tenancy, may contain linguistic assets:
TMs;
Glossaries;
Review Packages used to edit or comment on translations;
Translation Workspace Tools can be used for batch operations, including TM Management tasks;
Methods may be provided to allow linking of TMs and Glossaries to the background of any TM.
Background Links May Allow the User of a Translation Workspace to:
Get higher reuse from live assets by linking them together
Maintain integrity of the individual TMs and Glossaries
Use Premiums and Penalties to suggest the best matches first
During Translation:
Background TMs may offer matches, but may not be updated
Background Glossary term matches may appear in the auto-terminology
Background Linking: Penalties & Premiums
Background linking an asset with a penalty applied may allow the user to leverage from the asset without the TM matches being promoted as preferred matches. For example, for a less desirable asset (different product line, division, or translations not yet approved), applying a penalty makes the content available to the translators, but at a reduced match rate.
Background linking an asset with a premium applied may allow the user to prioritize the segment matches from a TM. For example, for a preferred asset (same product line, division, or highly trusted translation), applying a premium makes the content available to the translator ahead of other content matches.
TM Management may help ensure a greater number of higher quality matches
TM Management may accomplished using:
Translation Workspace web user interface
Translation Workspace Tools
Background linking TMs and Glossaries may allow increased leverage, while keeping data separate and organized
Premiums and penalties may prioritize matches from background linked TMs
Access to TMs may be granted by adding Members, or publishing an Alias
TM content may be updated by:
Translating content and saving to the TM
Cleaning translated content to the TM
Exporting the TM, editing the export, and then importing back the TM
Using the TM Maintenance Editor in Translation Workspace Tools
TM attributes may help categorize Translation Units for reference during translation.
File pre-processing and post-processing steps may help enable various file types to be translated within a computer-aided translation (CAT) environment.
Pre-processing may convert source language files into a translatable RTF or XLIFF format.
The Analysis tool may report on word counts and match rates, to help estimate project costs and required level of effort.

Example of a Cloud-Based Translation Management System:

To compete effectively in global markets, enterprises face the challenge of translating large volumes of content across distributed divisions and product lines into multiple languages. The scale and complexity of that challenge has surpassed the ability to manage and streamline these activities and processes on a global basis.

A Translation Management System ("TMS") may automate and accelerate global translation tasks and reduce the cost of supporting local language content. Such a TMS may also centralize translation efforts, merging manual, disparate processes into a single, streamlined program.

Such a TMS may manage and streamline the localization process for project managers, language service providers (LSPs), freelance translators, linguistic reviewers and subject matter experts. The product may integrate with existing authoring tools and content management systems (CMS) and improve translation efficiency with advanced translation technologies, including translation memory, terminology management and automated workflows.

A SaaS delivery platform may enable the TMS to get up and running easily and quickly. Additionally, the low initial investment offered by remote hosting may lead to a quick ROI. The TMS may use web protocols, services and standards to enable rapid integration into enterprise CMS applications. An entire supply chain can access translation packages including terminology and translation memories and make real-time updates to shared translation assets.

QUALITY CONTENT FOR END USERS—The TMS may help to control the quality and consistency of translated content and ensure all translations are sent through pre-defined review cycles.

REDUCED COST—The TMS's automated "live asset" management may automatically identify what content has changed and what has previously been approved. Only new content is sent out for direct human translation. The cost of translations may, for example, be reduced by as much as 40% and the overall cost of the translation program may, for example, be reduced by as much as 80%.

EASY TO USE AND MAINTAIN—Steps that required dozens of man hours may be reduced to a few easy steps with the TMS managing the translation assets, assigning tasks to approved LSPs, and maintaining and storing TM's in the cloud making the process a 24/7 live environment.

ABILITY TO SCALE—The TMS can allow for a closer match between expense and actual usage and users may easily upgrade or downgrade to match changing needs.

MULTIVENDOR SUPPORT—The TMS's cloud-based solution allows a worldwide supply chain to access assigned tasks and all work on live TM's so approved translators or reviewers can work with SME's to ensure high quality output. Integration may be provided with most third party WCM systems (e.g. Dotsub, Adobe, Sitecore, IBM, Vidori etc.)

The TMS may be highly extensible through custom scripting and may have a well-documented API for custom integrations or customization with a user's localization process.

The TMS may be designed to enable any localization processes. It may include multiple tools to simplify and accelerate the entire translation process. Technologies may include translation memory so previous translations can be reused, a terminology manager to ensure corporate phrases and terms are translated accurately, and flexible workflows and process automation.

With TMS, previous translations may easily be stored and reused.

The system also may automate and manage all version issues between authors, translators and reviewers, reducing administrative burdens. New languages or types of content may easily be added so the translation program scales as the company grows.

The TMS may provide users with the full capability to model their own translation process through workflow customization and automate many of the tasks associated to it.

A SaaS based Translation Management System may streamline the localization process by combining automation processes and human tasks through a flexible workflow engine.

The TMS may integrate with the Live Asset management functionality to create a powerful translation productivity solution.

Activities and Workflow Templates

In the TMS, all projects may utilize activities and workflow templates with steps defined at the system level. On the project level, the TMS users may add Settings to Activities and combine them with the workflow templates to workflow configurations. An example of how a project in the workflow may be created on the basis of a configuration described below:

ROLES AND TASKS: Different users have different roles matching their positions in the localization process. Roles correspond to access rights, cascading from the central Project Administrator function down to a set of end user roles.

Every user may have her/his own view to the Translation Workspace Enterprise, and sees projects and tasks that are assigned to her/him. The Project Administrator role has rights that cover any operations on the project level from managing users and project configurations to submitting jobs.

The different tasks of any project are assigned to the end-users, which, as a category, cover several different roles e.g. Project Manager, Translator, Reviewer, DTP operator, and the Engineer. The user with an end-user role can accept and reject task assignments, committing to fulfill the task by accepting it.

FILES: the Translation Workspace Enterprise project tasks include files to be processed. The files are saved to the Translation Workspace Enterprise server and retrieved from there for processing locally by users, and saved again to the server after processing. File formats support includes the most common standard digital document file formats. Support for other formats can be implemented by file mapping and scripting.

Process Elements: Workflows are created by assigning the following process elements:

PROJECT: Projects are created in Translation Workspace Enterprise by the Project Administrator. A project is a localization project, with everything that that entails e.g. translation of a set of source files into multiple target languages, with existing legacy from which to leverage, and technical conversion and layout tasks. Projects are further broken down into tasks, jobs, and activities.

Task: A Task is a work item, a file to be localized in a given locale, or a generic task, which the Translation Workspace Enterprise system takes care of (e.g. analysis, file conversion). Tasks are created based on the workflow selected when the user submits a job. The workflow configuration may also automatically assign and plan these tasks. A Project Administrator can still control and override any automatic assignments and planning Job: A Job contains the tasks in all locales. A user sees only tasks assigned to her/him.

Activity: An Activity is a category of tasks belonging to a job; one step in the workflow includes one Activity.

WORKFLOW TEMPLATE: A predefined Workflow Template including different localization project steps for a Job from word count analysis to delivery. The activities can be further configured by the Project Administrators.

WORKFLOW CONFIGURATION: A Workflow Configuration is used for creating new client specific workflows by combining a group of Activity Settings with a Workflow Template.

ACTIVITY SETTING: The configuration of one workflow activity (e.g. Analysis, Filtering) saved as a setting with parameters that can be included in a Workflow Configuration.

ASSIGN: Tasks are assigned to different users (with different roles). The role representatives (Customer, Project Manager, Translator, Reviewer, and Engineer) accept and process or reject the tasks.

STATUS: The status of the different Jobs and Job activities informs the user whether the item is: Not Started, In Progress, Completed Elements can be combined using Workflow Configurations in a Workflow Template that can be reused to build a new workflow. Each workflow consists of individual building blocks which make it easy to create new Workflow Configurations based on specific file formats or client process requirements. For example, enabling or disabling Client Review in a translation process simply means disabling that Activity and saving the Workflow Configuration as a new template.

Multimedia: The systems and methods described herein may also be used in connection with multimedia translation and localization. Such multimedia translation and localization can be challenging, particularly in the highly demanding video game space, and methods and approaches for trying to automate initial recognition of potentially problematic symbols or images may be applied (e.g., cigarettes or alcohol in games that could lead to a higher rating or regulatory issues if the game is for children, certain symbols that have potentially controversial religious connotations). Machine learning, crowd sourcing, chunking could be used and combined with human translation/localization to increase the likelihood that these issues are caught and resolved earlier in the development cycle and at a minimum before product release, particularly for simultaneous worldwide launches.

"Real Time" Translation: Systems and methods may be provided for a cloud-based, customized, self-service and, real-time translation platform; which may substantially instantly translate communications into multiple languages.

"Just in Time" Translation/Localization: The systems and methods described herein may also be useful for changing/evolving translation and localization, such as in addressing the challenges involved in having a moving target for translation, where the client or enterprise customer desires to start a substantial translation and/or localization project (due to time constraints and/or size/complexity of the materials to be translated/localized) but also is continuing to modify/edit the underlying contents, possibly right up until release.

QA/QC: The systems and methods described herein may also be useful for Quality Assurance/Quality Control such as accuracy/consistency/coherency checks when materials are re-combined after being sent out in chunks for translation and/or for crowd sourced translation (or, in the multi-media context, when audio, video, or a data table is translated by one person and the related text is translated by another person).

Security: Security, confidentiality, privacy and other regulatory requirements and processes also may be addressed in the systems and methods described herein. For example, clients and enterprise customers often have strict needs to protect their confidential information that is being translated and/or localized. Digital rights management and/or a secure data room may be used to assist with security and confidentiality.

Part VIII. Additional Statements of Disclosure

The following are additional possible embodiments, any of which may stand alone or may be used in combination with one or more of the other embodiments described in the Clauses set forth below and/or in the Claims as set forth below.

I. Training a machine learning system/automated engine to improve routing within a distributed translation process Clause 1: A system for metadata-based improvement of routing of segments for translation among a plurality of machine and human translators, comprising:

A first set of metadata associated with a segment for translation, the first set of metadata derived from contextual information gathered during ingestion of the segment for translation;

A second set of metadata associated with the segment for translation, the second set of metadata derived during processing of the segment with a translation processing engine; and A segment routing engine that determines a plurality of candidate routes for translating the segment based at least on the first set of metadata; selects one of the routes based on a correlation between the first set of metadata and the second set of metadata; routes the segment via the selected route; and updates the second set of metadata in response to the segment being translated via the selected route.

Clause 2: The system of Clause 1, wherein the first set of metadata comprises at least one of segment complexity, segment length, an extent of matching of the segment to pre-translated segments in a translation memory, target quality of translation of the segment, client for the segment, project ID for the segment, domain/taxonomy of the segment, and language of the segment.

Clause 3: The system of Clause 2, wherein the second set of metadata comprises at least one of segment translation quality, translator identification, and translation cost.

Clause 4: The system of Clause 1, further comprising a data structure that comprises the content to be translated, a portion of the first data set of metadata, a portion of the second set of metadata, an indication of a candidate translation of the content, and an indication of a final translation of the content.

Clause 5A: The system of Clause 4, wherein the indication of a candidate translation of the content comprises a reference to a translation memory.

Clause 5B: The system of Clause 4, wherein the indication of a final translation of the content comprises a reference to a translation memory.

Clause 5C: The system of Clause 4, wherein the indication of a final translation comprises a translation of the segment.

Clause 6: The system of Clause 1, wherein the segment routing engine correlates a portion of the first set of metadata with at least one update to the second set of metadata.

Clause 7: The system of Clause 1, wherein herein the segment routing engine updates the second set of metadata with data indicative of a correlation between a portion of the second metadata and a portion of the first set of metadata.

Clause 8: The system of Clause 1, wherein the portion of the second set of metadata includes a measure of translation quality, a translator's local time of day when the translator translated the segment, and a measure of the translator's current translation work shift.

Clause 9: The system of Clause 7, wherein the data indicative of a correlation is between a translator of the segment and a client associated with the segment.

Clause 10: The system of Clause 7, wherein the data indicative of a correlation indicates preference for a translator who translated the segment for translating future segments associated with a client that is associated with the segment that was translated by the translator.

Clause 11: The system of Clause 1, wherein herein the segment routing engine updates a routing preference data set for a client associated with the segment based on the correlation.

Clause 12: A method comprising:
  Receiving a segment for translation from a client;
  Receiving first metadata that provides a translation engine routing context about the client and the segment; and
  Analyzing the first metadata and availability of human translators to produce at least one recommended route for translating the segment, wherein the recommended route includes scheduling the segment to be routed to at least one human translator whose availability is consistent with a translation delivery requirement of the first metadata.

Clause 13: The method of Clause 12, further comprising routing the segment to the translator via a translation management system that comprises a logical network of machine translators and human translators, wherein the translation management system is capable of determining that an available human translator in the network is not qualified to translate the segment.

Clause 14: A method of training a segment translation routing engine, comprising:
  Receiving a segment in a first language for translation to a second language;
  Receiving first metadata that describes characteristics of the segment, a client associated with the segment, and translation workflow parameters;
  Comparing a portion of the first metadata to metadata in a segment routing metadata database;
  Based on a result of the comparing, configuring a translation route for the segment, the translation route including at least two translation steps of translation memory lookup, machine translation, and human translation;
  Gathering metadata from the at least two translation steps, the gathered metadata describing the translation route;
  Gathering a measure of the success of the translation route;
  Using a machine learning system to process the gathered metadata, the first metadata and the gathered measure of success to train the routing engine to produce an improved routing.

Clause 15: A method, comprising:
  Receiving a segment for translating from a first language to a second language;
  Receiving metadata associated with the segment, the metadata describing client translation criteria;
  Configuring a translation route for the segment using a randomized routing engine; Processing the segment via the configured translation route to produce a translation of the segment;
  Gathering route-related feedback during the processing; and
  Rating at least one of the randomized routing engine and the translation route based on a compliance with the client translation criteria.

Clause 16: The method of Clause 15, further comprising adjusting the routing of a machine routing engine based on successful routes found by the randomized routing engine as indicated by the feedback.

Clause 17: A method, comprising:
  Configuring a translation routing engine to generate a plurality of available routes among human and machine translation resources;
  Routing a plurality of translations according to the plurality of available routes;
  Comparing outcomes for the plurality of routes against client-specified criteria; and
  Using a machine learning engine to improve the generation of routes by the translation routing engine based on the comparison.

Clause 18: The method of Clause 17, wherein the plurality of available routes are generated at least in part using a probabilistic route selection facility.

II. Real time or near real time updating of crowd worker segmentation database to reflect ongoing experience and task allocation (e.g., routing based on awareness of what is currently assigned to other workers and based on current needs)

Clause 1: A method of global translation of a plurality of segments requiring language translation among human and machine resources that become available for translation activities, comprising:
  Gathering data that is descriptive of translation work being performed by a first group of translation resources that include at least a plurality of human translators in a plurality of international jurisdictions;
  Providing a translation resource availability computer model that uses the gathered data to predict future availability and expected translation quality for at least a portion of the first group for at least one translation time period; and
  Replying to a request for translation by a user, the request including a plurality of translation requirements, wherein at least a cost of translation and a schedule of translation is determined by applying the output of the translation resource availability model to predict future availability and expected translation quality from at least one translation resource that meets at least one of the plurality of translation requirements.

Clause 2: The method of Clause 1, further comprising applying the translation resource availability computer model to predict availability of a second group of translation resources based on data gathered with respect to the first group of translation resources.

Clause 3: The method of Clause 1, wherein the first group is a crowd that is available at a first time period and the second group is a crowd that is available at a second time period.

Clause 4: The method of Clause 1, wherein a portion of the first group of translators includes translators that share a common attribute by which translators are arranged into logical segments of a global translator pool.

Clause 5: The method of Clause 1, wherein the first group of translators includes a plurality of segments of the global translator pool.

Clause 6: The method of Clause 1, wherein the model facilitates predicting future availability and expected translation quality distinctly for each of the plurality of segments of the global translator pool.

Clause 7: The method of Clause 1, wherein a cost of translation and a schedule of translation is based on configuring a route for the requested translation that schedules the translation to be performed by a translator from a segment of the global translator pool that is predicted to meet a quality requirement and a cost requirement of the translation request at a point of time in the future.

Clause 8: The method of Clause 7, wherein the point of time in the future is based on a minimum number of translators from the segment being predicted to be available to perform the requested translation.

Clause 9: The method of Clause 7, wherein a majority of translators associated with the segment of the global translator pool are unavailable for translation when the request for translation is received.

Clause 10: A method of translating content, comprising:
Receiving a request for translation of a segment, the request identifying a language pair, the language pair comprising a source language of the segment and a target language into which the segment is to be translated;
Determining a state of translator availability among a pool of translation resources for the segment based on the language pair; Identifying a plurality of translators in the pool suitable for being offered the requested translation based on the language pair;
Applying a time-dependent model of translator availability and quality to the segment to determine at least two distinct prices for the translation request; and
In response to the request for translation, presenting at least one of the two distinct prices for the translation based on a timing requirement for delivery of the translated segment to the requester.

Clause 11: The method of Clause 10, wherein one of the at least two distinct prices is based on scheduling the translation to be performed by a translator in the segment who is available to translate the content contemporaneously with receiving the request, and another of the at least two distinct prices is based on scheduling the translation to be performed by one of a plurality of translators who are not available contemporaneously with receiving the request, but are predicted to be available at a point of time in the future.

Clause 12: The method of Clause 10, wherein the current state of translator availability based on the language pair is only for translators who are known to have successfully translated between the language pair at least once previously.

Clause 13: The method of Clause 10, wherein the segment only includes translators who are known to have successfully translated between the language pair at least once previously.

Clause 14: A method of translating content, comprising:
Receiving a request for translation of a segment, the request identifying a language pair, the language pair comprising a source language of the segment and a target language into which the segment is to be translated;
Providing a translation resource availability computer model that uses gathered data about a pool of translation resources to predict future availability of human translation resources that are capable of translating from the source language to the target language; and
Using the output from the computer model to generate at least one routing option and at least one price for the translation that is based on the predicted availability of the resources.

Clause 15: The method of Clause 14, wherein the prediction of availability is based on at least one of the source language, the target language, the time of day at which translation may take place, and the location of a translation resources.

Clause 16: The method of Clause 14, further comprising providing a demand prediction computer model for predicting future demand for translations from the source language to the target language.

Clause 17: The method of Clause 16, wherein the prediction of demand is a range that is based on a range of prices for the translation.

Clause 18: The method of Clause 17, wherein the pricing for a translation is based on the output of the translation resource availability model and the output of the demand prediction model.

Clause 19: The method of Clause 16, wherein at least one of the prediction of availability and the prediction of demand is based on at least one of the source language, the target language, the time of day at which translation may take place, and the location of a translation resources.

Clause 20: The method of Clause 14, further comprising providing a supply prediction computer model for predicting future supply for translations from the source language to the target language.

Clause 21: The method of Clause 20, wherein the prediction of supply is a range that is based on a range of prices for the translation.

Clause 22: The method of Clause 21, further comprising routing a plurality of translation segments based on the predicted availability of translation resources and based on at least one of the predicted demand for and the predicted supply of translation resources for the language pair for at least one price for the translation of the segment.

III. Distilling heterogeneous projects for multiple clients into common competency requirements for efficient overall routing to segmented pools within a large scale routing system A. Optimizing Translation
Clause 1: A method of translation, comprising:
  Receiving a plurality of translation projects, each project including a plurality of sentences;
  Processing each of the plurality of sentences with a translation attribute determination algorithm that produces sentence-specific metadata based on the sentence content, a context of the sentence, and a plurality of translation requirements associated with the translation project that corresponds to the sentence;
  Arranging the sentences into logical groups based on similarity of the produced metadata;
  Configuring candidate routes for the translation of the group of sentences; and Routing each group along one of the candidate routes.
Clause 2: The method of Clause 1, wherein the logical groups include sentences from a plurality of the translation projects.

B. Translator Competency
Clause 1: A method of translation, comprising:
  Receiving a plurality of translation projects, each project including a plurality of sentences;
  Processing each of the plurality of sentences with a translation attribute determination algorithm that produces sentence-specific metadata based on the sentence content, a context of the sentence, and a plurality of translation requirements associated with the translation project that corresponds to the sentence;
  Arranging the sentences into logical groups based on similarity of the produced metadata;
  Aggregating the metadata for sentences in a given group into a set of group routing metadata;
  Segmenting a global pool of translators into at least two segments of candidate translators based on a similarity of translator-specific competency metadata with the group routing metadata; and
  Configuring routes for the groups to segments of translators based on the determined similarity.

C. Optimizing Task Performance
Clause 1: A method of translation, comprising:
  Receiving a plurality of projects, each project including a plurality of tasks;
  Processing each of the plurality of tasks with a task competency requirement determination algorithm that produces task-specific metadata based on the task content, a context of the task, and a plurality of project requirements associated with the project that corresponds to the task;
  Arranging the task into logical groups based on similarity of the produced metadata, wherein the logical groups include tasks from a plurality of the projects;
  Aggregating the metadata for tasks in a given group into a set of group routing metadata;
  Configuring candidate routes for tasks in a group that optimize performance of the tasks; and
  Routing each task along one of the candidate routes based on similarity of task-specific metadata with expected outcomes of the candidate routes.

D. Task Execution Competency
Clause 1: A method of translation, comprising:
  Receiving a plurality of projects, each project including a plurality of tasks;
  Processing each of the plurality of tasks with a task performance attribute determination algorithm that produces task-specific metadata based on the task content, a context of the sentence, and a plurality of task performance requirements associated with the project that corresponds to the task;
  Arranging the tasks into logical groups based on similarity of the produced metadata, wherein the logical groups include tasks from a plurality of the projects;
  Aggregating the metadata for tasks in a given group into a set of group routing metadata;
  Segmenting a global pool of workers into at least two segments of candidate workers based on a similarity of worker-specific competency metadata with the competency requirements for performing the tasks in the group; Configuring candidate routes for tasks in a group that targets using at least one candidate worker from one of the at least two segments of the global pool of workers; and
  Routing each sentence along one of the candidate routes based on similarity of task-specific metadata with expected outcomes of the candidate routes.
Clause 2: A translation system comprising:
  A plurality of machine translation engines disposed in a plurality of countries; a translator competency database storing information about the competencies of a plurality of human translators disposed in a plurality of countries, the plurality of human translators logically grouped in the database into translation competency-based segments of a global pool of translators, the logical grouping based on translation competencies of the translators;
  At least one interface for communication with the plurality of human translators;
  A translation ingestion engine that detects common translation competency factors across a plurality of sentences across a plurality of client translation requests and logically groups sentences into competency-based translation groups from a plurality of distinct client translation requests based on the common competency factors; and
  A translation routing engine that configures translation routes so that a portion of sentences in a competency-based translation group are routed to translators in a translation competency-based segment that has competencies that correlate to the common translation competency factors for the routed translation group of sentences.
Clause 3: The system of Clause 2, further comprising a translation aggregation engine that receives a corresponding translation for each of the sentences from a plurality of competency-based translation groups, wherein optionally at least a portion of the translations being processed by a human translator in at least a portion of the competency-based translation groups, and rearranges the translations into distinct translation request groups that group the translations based on the client translation requests.
Clause 4: The system of Clause 1, wherein a portion of the configured translation routes include use of at least one of the plurality of translation engines.
Clause 5: The system of Clause 1, wherein the at least one of the plurality of translation engines is selected based on a country in which a translation request is received.
Clause 6: The system of Clause 1, wherein the at least one of the plurality of translation engines is selected based on a country in which a majority of translators for a configured route are disposed.

IV. Dynamic Linking of Tasks in a Task Progression within a Managed Crowd

Clause 1: A method of dynamic task linking, comprising:
Associating a first task type with a task;
Configuring a route for performing the task that includes a first execution step for the first task type and a plurality of candidate second execution steps for a plurality of candidate task types other than the first task type, wherein optionally the plurality of candidate task types are based on a desired output of the task;
Routing the first execution step in the configured route, thereby facilitating production of a first execution output for the task;
Adapting the task output from the first execution step into a second task type based on a result of performing the first execution step and a desired outcome of the task; and
Routing the task to a second execution step selected from the plurality of candidate task types based on the second task type.

Clause 2: A method of dynamic task linking, comprising:
Receiving a list of a plurality of tasks to be performed by a plurality of task workers;
Determining at least one dependency of a dependent task upon the completion of an initial task;
Tracking the completion of the initial task by at least one worker; and Routing the output of the completed initial task with the dependent task to an appropriate task worker for the dependent task.

Clause 3: A method of dynamic task type linking, comprising:
Defining a plurality of task types involved in the completion of a project;
Defining links between pairs of task types that represent a class of dependency of performing one of the task types on the other of the task type in the pair of task types; and
Building a route among task types for completing the project based on input data available to the project and dependencies among the tasks.

Clause 4: The method of Clause 3, further comprising:
Configuring at least one task as a first task type in a pair of task types;
Routing the task to a worker qualified to perform the first task type, the worker performing a portion of the task consistent with the first task type;
Configuring at least one task as a second task type in the pair of task types; and
Routing the task along the route based on the link between the task pair to a worker qualified to perform the second task type, the worker performing a portion of the task consistent with the second task type.

Clause 5: A method of task-progression based workflow, comprising:
taking a task output of a task performed by a worker at a worker location for a customer;
evaluating the task output to determine a criterion for worker selection for a follow-on task that requires use of the task output to perform the follow-on task; and
based on the determined criteria and a worker location profile for the worker location that comprises a metric of worker experience with customer work for at least the customer and at least one other metric of customer work type across all customer work distributed to workers at the worker location, routing a portion of the task output to a worker to perform the follow-on task.

Clause 6: A workflow for linked tasks, comprising:
a workflow step for processing a task with workers in a crowd;
a workflow step for evaluating output of the task to determine a worker criterion for a follow-on task; and
a workflow step for processing the follow-on task based on the evaluated output and the worker criterion.

V. Multi-Path Unit Translation Based on Budget/Quality Targeting, Including Selective Use of Lower Quality Translation than Target Quality Standard A. CTU Module Sets Acceptable Cost Clause 1: A cognizable translation unit digital structure comprising:
metadata for translating a text string of the unit and executable code operable to seek a translator out of a pool of translators that meets a translation cost criteria and a translation delivery criteria that are derivable from the metadata, the executable code interacting with translator nodes in a digital network of translator nodes to determine a translator node that meets the translation cost criteria and that is available for translating the text string while meeting the delivery criteria, wherein a portion of the translation cost criteria has an inverse relationship with an amount of time remaining in the delivery criteria.

Clause 2: The structure of Clause 1, wherein as the amount of time remaining in the delivery criteria is reduced, the portion of the translation cost criteria increases, thereby facilitating selection of a translation node for translating the text string.

Clause 3: The structure of Clause 1, wherein the cost criteria includes a measure of allowable cost for translating a plurality of related units and the cost criteria is adjusted in real time as the related units interact with translation nodes.

Clause 4: The structure of Clause 3, wherein the allowable cost is remainder of a total cost allocation for translating the related units after costs for translations performed for the related units is subtracted from the total cost allocation.

B. Translator Node Sets Required Costs

Clause 1: A network of translator nodes, each node operative to receive a request over the network for translation of a cognizable translation unit, the request including a delivery schedule for the translation, each node further operative to respond to the request with a cost for translation that is based on an amount of time remaining before the translation must be delivered per the delivery schedule, wherein the cost for translation has an inverse relationship with the amount of time remaining to perform the translation so that requests for translation with less time remaining to perform the translation receive a higher cost response than requests for translation of comparable units with more time remaining to perform the translation.

C. Dynamic Route Adjustment Based on Consumed Translation Budget

Clause 1: A method comprising, routing a plurality of cognizable translation units through a first route that includes machine translation nodes and human translation nodes;
Receiving measures of the units and costs of the translations, the translations performed by at least one of the machine translation nodes and translators at the human translation nodes;

Calculating a remainder of a translation budget based on the received measures; and Determining a second route to utilize more machine translation nodes or more human translation nodes based on the remainder of the translation budget, wherein more machine translation nodes are utilized if the adjusted translation budget falls below a dynamic translation budget lower threshold and wherein more human translation nodes are utilized if the adjusted translation budget remains above a dynamic translation budget upper translation threshold.

Clause 2: The method of Clause 1, further comprising:

Routing a second plurality of cognizable translation units through the adjusted first route; and Repeating the receiving, adjusting, adjusting, and routing steps above for additional cognizable translation units until all cognizable translation units in a translation project are translated.

VI. Routing Based on Worker Localization (and Determining Impact of Locale Based on Analysis of Content of CTU)

Clause 1: A method of routing to satisfy localization constraints, comprising:

Receiving a request for a task to be performed by a human worker selectable from a predefined pool of human workers, wherein the request includes at least one worker location constraint;

Processing the location constraint with a worker location database that includes worker computer logical address data and worker physical location data, to determine a candidate set of workers from the pool that satisfy at least the worker location constraint based on the worker physical location;

Requesting current location information of a first worker in the candidate set of workers by sending a digital message to a worker computer logical address of the first worker;

Receiving a response from a computer that is responsive to the worker computer logical address of the first worker, the response including data that indicates a physical location of the responsive computer;

Validating that the physical location of the responsive computer complies with the worker location constraint; and Offering the task to the first worker based on the physical computer location validation result.

Clause 2: The method of Clause 1, wherein validating the physical location comprises comparing an IP address of the computer to a database that facilitates matching computer physical location information with IP addresses.

Clause 3: The method of Clause 1, wherein offering the task includes sending a digital message with a sole destination of the computer at the physical location.

Clause 4: The method of Clause 3, wherein the digital message includes a constraint that the task cannot be forwarded to another computer.

Clause 5: The method of Clause 1, wherein the localization constraint indicates a network firewall behind which the task must be performed.

Clause 6: The method of Clause 1, wherein the localization constraint indicates a plurality of locations where the task is not permitted to be performed.

Clause 7: The method of Clause 1, wherein the pool of workers is configured into a plurality of logical worker segments, the segments representing distinct physical locations of workers, the candidate set of workers being selected from a segment of the pool of workers that is limited to worker computers with IP addresses that satisfy the localization constraint.

Clause 10: A method of remote worker segmentation, comprising:

configuring a crowd worker database with segmentation data comprising worker location, customer work distributed to workers at the worker location, worker experience with the customer work, and customer work type;

deriving a worker location profile based on the segmentation data, wherein the worker location profile comprises a metric of worker experience with customer work for a plurality of customers for whom work has been distributed to workers at the worker location and at least one other metric of customer work type across customer work distributed to workers at the worker location; and logically segmenting crowd workers into crowd segments based on the metric of worker experience, worker location, and the customer work type.

VII. Automated Quotation Algorithms for Translation Project

A. Differentiated Pricing Based on Intermediate Translation

Clause 1: A method of intermediate content translation quoting, comprising:

Receiving a request for translation, the request identifying a language pair;

Determining a current state of translator availability based on the language pair;

Identifying at least one segment of a global translator pool, the segment including a plurality of translators suitable for being offered the requested translation based on the language pair;

Applying a time-dependent model of translator availability and quality to the segment to determine at least two distinct prices for the translation request, the first distinct price based on one of the plurality of translators suitable for being offered the requested translation performing the translation, the second distinct price based on routing the request for translation to a first translator to translate from a first language of the language pair to an intermediate language and then routing the intermediate language translation to a second translator to translate from the intermediate language to the second language of the identified language pair; and In response to the request for translation, presenting at least one of the two distinct prices for the translation based on a delivery timing requirement associated with the request to the requester and receiving a confirmation from the requester.

Clause 2: A system, comprising:

A database indicating language competencies for a plurality of language translators;

A translation project quotation engine for estimating the cost of a translation project; and A translator availability tracking engine for determining the availability of language translators during a given time period, wherein the quotation engine varies the quoted price for the quotation depending on whether a translator is currently available for direct translation of a segment from a source language to a target language.

Clause 3: The system of Clause 1, wherein if the translator is not available for direct translation of a segment from a source language to a target language, the quotation engine provides a quotation based on the cost of translating from the source language to an intermediate language and from the intermediate language to the target language.

A. Cognizable Unit Chunking

Clause 1. A method of distributed translation, comprising:
taking a source document for translation;
breaking down the source document into a plurality of discrete cognizable translation units;
determining a translator for each of the units based on a workflow requirement for translating the document; and
distributing each of the units to a determined translator.

Clause 2. The method of Clause 1, wherein a cognizable translation unit comprises an independently translatable text string subset of a document.

Clause 3. The method of Clause 1, wherein a cognizable translation unit comprises a complete sentence.

Clause 4. The method of Clause 1, wherein a cognizable translation unit comprises a portion of a sentence.

Clause 5. The method of Clause 1, wherein a cognizable translation unit comprises a plurality of sequential sentences.

Clause 6. The method of Clause 1, wherein a cognizable translation unit comprises at least an independent clause.

Clause 7. The method of Clause 1, wherein the size of the cognizable translation unit is selected to provide enough content to enable a translator to understand the grammatical context of the translation unit while obscuring the substantive content of the source document from which the translation unit is derived.

B. Platform

Clause 1: A method of free-flow cognizable translation unit-based document translation, comprising:
taking a source document for translation;
breaking down the source document into a plurality of discrete cognizable translation units, wherein each unit is associated with a position in the source document;
determining a translator for each of the units based on a workflow requirement for translating the document;
distributing each of the units to a determined translator for translating into translated units;
receiving each of the translated units in an order of translation; and
assembling the translated units into a translated document based on the position of each corresponding cognizable translation unit in the original document.

Clause 2: The method of Clause 1, wherein distributing each of the units to a determined translator is performed independently of the source document position of each of the units.

C. Crowdsourcing

Clause 1: A method of automated crowd worker activation comprising:
receiving potential worker information comprising worker self-reporting of at least one of personal data, demographic data, professional data, skills data, location data, experience data, interest data, preference data and on-line presence data of a potential worker;
automatically validating at least one element of data of each of the personal data, demographic data, professional data, and on-line presence data by a comparison with independently gathered data from at least one independent networked data source;
administering a worker qualification process in which the potential worker is prompted to perform at least one skills activity that is based on the received potential worker demographic data and professional data; and
based on an automated evaluation of the skills activity, performing one of rejecting the potential worker or accepting the potential worker as a qualified worker.

Clause 2: The method of Clause 1, further comprising creating a financial institution-connected work credit account to which the qualified worker has confidential access; and
upon acceptance of a completed unit of work from the qualified worker, automatically applying a credit corresponding to the unit of work that is redeemable through the financial institution, to the worker-exclusive work credit account.
wherein the skills activity is computer-based.

D. Distribution Based on Difficulty

Clause 1: A method of translation based on degree of difficulty, comprising:
taking a plurality of cognizable translation units;
calculating a degree of difficulty of translating at least one of the units;
determining a translator for at least a portion of the plurality of units based on the calculated degree of difficulty; and
distributing each unit of the plurality of units to a determined translator.

Clause 2: The method of Clause 1, wherein taking a plurality of cognizable translation units includes dividing a source document into the units.

Clause 3: The method of Clause 1, wherein calculating the degree of difficulty of translating is based on a content attribute of a document of which the cognizable translation unit is a subset.

Clause 4: The method of Clause 1, wherein calculating the degree of difficulty of translating is based on a workflow requirement for translating the document.

Clause 5: The method of Clause 1, wherein distributing is performed within a workflow for obtaining a translation of an item containing the cognizable translation unit and wherein the workflow includes a plurality of available translators at remote locations.

Clause 6: A method of translation based on outcome objective, comprising:
taking a plurality of cognizable translation units;
determining at least one outcome objective of translating at least one of the units;
determining a translator for each of the units based on the determined outcome objective; and
distributing each of the units to a determined translator.

Clause 7: The method of Clause 6, wherein taking a plurality of cognizable translation units includes dividing a source document into the units.

Clause 8: The method of Clause 6, wherein the outcome objective is determined from a workflow requirement for translating the document.

Clause 9: The method of Clause 6, wherein the outcome objective is expressed as a level of quality for the translation.

Clause 10: The method of Clause 6, wherein the outcome objective is expressed as an aggregated total cost of translation for an item containing the cognizable translation units.

Clause 11: The method of Clause 6, wherein distributing is performed within a workflow for obtaining a translation of an item containing the cognizable translation unit and wherein the workflow includes a plurality of available translators at remote locations.

Clause 12: A method of translation based on translation task parameters, comprising:

taking a plurality of cognizable translation units;

determining a task parameter for translating at least one of the units;

determining a translator for each of the units based on the task parameter; and distributing each of the units to a determined translator.

Clause 13: The method of Clause 12, wherein taking a plurality of cognizable translation units includes dividing a source document into the units.

Clause 14: The method of Clause 12, wherein the task parameter is determined from a workflow requirement for translating the plurality of cognizable translation units.

Clause 15: The method of Clause 12, wherein the task parameter is selected from the group consisting of a price paid for the task, a cost for executing the task, a quality level required for the task, a complexity level of the task, a deadline for the task, a budget for the task, a time for starting the task, and a size of the task.

Clause 16: The method of Clause 12, wherein distributing is performed within a workflow for obtaining a translation of an item containing at least one of the cognizable translation units and wherein the workflow includes a plurality of available translators at remote locations.

E. Parallel Processing

Clause 1: A method of distributed translation based on discrete partitioning of an original document, comprising:

taking a plurality of cognizable translation units;

mapping the plurality of cognizable translation units to positions in an original document;

determining a translator for each of the units based on a workflow requirement for translating the document;

distributing each of the units to a determined translator for translating into a destination object; and assembling the destination objects into a translated document based on the position of each corresponding cognizable translation unit in the original document.

Clause 2: The method of Clause 1, wherein taking a plurality of cognizable translation units includes dividing a source document into the units.

Clause 3: The method of Clause 1, wherein a cognizable translation unit may be mapped to a plurality of discrete positions in the original document.

Clause 4: The method of Clause 1, wherein assembling the destination objects into a translated document is further based on a syntax reference that is specific to the language of the translated document.

Clause 5: The method of Clause 1, wherein distributing is performed within a workflow for obtaining a translation of an item containing the cognizable translation unit and wherein the workflow includes a plurality of available translators at remote locations.

Clause 6: The method of Clause 1, further comprising identifying cognizable translation units that have redundant subject matter and mapping each such cognizable translation units to a plurality of positions within the document that use the redundant subject matter, so that redundant items can be translated once and used more than once in the assembly of the document.

Clause 7: A method of distributed translation based on relative partitioning of an original document, comprising:

taking a plurality of cognizable translation units;

mapping the plurality of cognizable translation units to relative positions in such original document;

determining a translator for each of the units based on a workflow requirement for translating such document;

distributing each of the units to a determined translator for translating into a destination object; and assembling the destination objects into a translated document based on the relative position of each corresponding cognizable translation unit in the original document.

Clause 8: The method of Clause 7, wherein taking a plurality of cognizable translation units includes dividing a source document into the units.

Clause 9: The method of Clause 7, wherein distributing is performed within a workflow for obtaining a translation of an item containing the cognizable translation unit and wherein the workflow includes a plurality of available translators at remote locations.

F. Matching to Translator Specialization

Clause 1: A method of translator expertise matching, comprising:

taking a cognizable translation unit to be translated;

analyzing an aspect of the unit to be translated to determine a degree of domain specificity of the unit;

comparing the determined degree of domain specificity to a domain content threshold value;

for each unit that exceeds the domain content threshold, processing at least one of the contents of the unit or the degree of domain specificity to determine a field of the unit; and identifying at least one translator for translating the unit from a plurality of available translators based on a comparison of the field of the unit and translator domain expertise metadata.

Clause 2: The method of Clause 1, wherein taking a cognizable translation unit includes generating the unit from a source document.

Clause 3: A method of translator expertise matching, comprising:

accepting a cognizable translation unit to be translated, the unit having a determined field and degree of domain specificity; and identifying at least one translator for translating the unit from a plurality of available translators based on the domain specificity and translator domain expertise metadata.

Clause 4: A method of translator expertise matching, comprising:

selecting a cognizable translation unit to be translated, the unit having a determined field and degree of domain specificity; and identifying at least one translator for translating the unit from a plurality of available translators based on the domain specificity and translator domain expertise metadata.

Clause 5: The method of Clause 1, wherein the degree of domain specificity is indicative of a field of domain specificity of the unit.

Clause 6: The method of Clause 1, wherein analyzing an aspect of the unit to determine a degree of domain specificity of the unit comprises processing unit source document metadata.

Clause 7: The method of Clause 1, wherein analyzing an aspect of the unit to determine a degree of domain specificity of the unit comprises processing metadata for a workflow of the unit to be translated.

G. Variant of Matching to Translator

Clause 1: A vector-based method of translator selection, comprising:
  taking a cognizable translation unit to be translated;
  referencing a data store of translators comprising a plurality of translation-specific attributes for a plurality of translators;
  calculating a translation similarity metric for the unit based on relevance of the unit to a plurality of translation-relevant attributes; and
  routing the cognizable translation unit to a translator based on a calculated distance of the translation similarity metric with translator-specific values of the translation-specific attributes in the data store of translators.

Clause 2: The method of Clause 1, wherein taking a cognizable translation unit includes generating the unit from a source document.

Clause 3: The method of Clause 1, wherein similarity is based on a vector distance between attributes of a translation unit and a translator.
  wherein calculating a translation similarity vector distance comprises analyzing at least one of the units, metadata for a workflow of the unit to be translated, and translation unit source document metadata.
  wherein the data store comprises a database of translators.
  wherein the data store comprises a distributed data store of translators.
  wherein the data store comprises at least one of a relational database, an SQL database, an object-oriented database, a NoSQL database, a NewSQL database, and an XML database.

H. Merging

Clause 1: A method of free-flow cognizable translation unit-based document translation, comprising:
  taking a plurality of cognizable translation units of a source document;
  mapping the plurality of cognizable translation units to positions in the source document;
  determining a translator for each of the units based on a workflow requirement for translating the document;
  distributing each of the units to a determined translator for translating into translated units;
  receiving each of the translated units; and
  assembling the translated units into a translated document based on the position of each corresponding cognizable translation unit in the original document.

Clause 2: The method of Clause 1, wherein taking a plurality of cognizable translation units includes dividing a source document into the units.

Clause 3: The method of Clause 1, wherein the order of translation is independent of discrete positions of the units in the source document.

Clause 4: The method of Clause 1, wherein assembling the translated units into a translated document is done as each translated unit is received.

Clause 5: The method of Clause 1, wherein assembling the translated units into a translated document is done as all translated units of a portion of the source document are received.

Clause 6: The method of Clause 5, wherein the portion of the source document comprises the entire document.

Clause 7: The method of Clause 5, wherein the portion of the source document comprises a paragraph.

Clause 8: The method of Clause 5, wherein the portion of the source document comprises a section of the source document defined in a translation workflow for translating the source document.

Clause 9: The method of Clause 5, wherein distributing each of the units to a determined translator is performed independently of the discrete source document position of each of the units.

I. Privacy

Clause 1: A method of data privacy during translation, comprising;
  taking a plurality of cognizable translation units;
  determining at least one translator for each of the units based on a document-specific workflow requirement; and
  distributing segments of any unit with a confidentially factor attribute value that exceeds a document-specific confidentiality threshold to distinct determined translators so that any specific determined translator receives only one of the segments.

Clause 2: The method of Clause 1, wherein taking a plurality of cognizable translation units includes dividing a source document into the units.

Clause 3: The method of Clause 1, wherein the document-specific confidentiality threshold is dependent on translator confidentiality agreement metadata.

Clause 4: The method of Clause 3, wherein a document-specific confidentiality threshold is lower when translator confidentiality agreement metadata indicates the translator has agreed to maintain confidentiality through the agreement than when the translator confidentiality agreement metadata indicates that the translator has not agreed to maintain confidentiality through the agreement.

Clause 5: The method of Clause 4, further comprising determining a confidentiality factor for each unit.

Clause 6: The method of Clause 5, further comprising determining at least a second translator for each unit with a confidentially factor attribute value that exceeds a document-specific confidentiality threshold.

Clause 7: The method of Clause 4, wherein variable privacy thresholds are adapted to the type of document/chunk being translated.

Clause 8: The method of Clause 4, wherein distributing of discrete confidential segments is to translators at different remote locations.

Clause 9: A method of data privacy during translation, comprising:
  recognizing confidential material in the document to be translated;
  dividing the document into a plurality of cognizable translation units, the units sized to reduce the ability of a reader to understand the substance of the confidential material from a single unit; and
  routing cognizable translation units that comprise confidential material to translators at remote locations from each other to discourage reassembly of the document.

Clause 10: The method of Clause 9, wherein the units sized so that the substance of the confidential material is not determined by translating a single unit.

Clause 11: A method of data privacy during translation, comprising:
  determining a translator degree of confidentiality obligation based on confidentiality agreement information in the translator metadata database; and
  sizing cognizable translation units for information deemed to be confidential based on the determined translator degree of confidentiality obligation.

Clause 12: The method of Clause 11, wherein cognizable translation units are sized larger for translators with a determined confidentiality obligation than for translators without a determined confidentiality obligation.

J. Rule-Based Routing

Clause 1: A method of distributed translation, comprising:
 taking a plurality of cognizable translation units;
 determining a translator for each of the units based on a plurality of cognizable rules for translating the document; and
 distributing each of the units to at least one determined translator.

Clause 2: A method of distributed translation, comprising:
 calculating a degree of fuzzy matching of a unit to be translated to entries in a translation memory;
 determining a subject matter domain of the unit to be translated;
 based on a relative position of the fuzzy matching degree to a fuzzy matching expert threshold, distributing the unit to one of a translator ranked as an expert in the subject matter of the unit and a translator ranked lower than expert in the subject matter of the unit.

Clause 3: The method of Clause 2, wherein the unit is distributed to the expert when the fuzzy matching percentage is below the fuzzy matching expert threshold.

Clause 4: The method of Clause 2, wherein the unit is distributed to the translator ranked lower than expert when the fuzzy matching percentage is equal to or above the fuzzy matching threshold.

Clause 5: The method of Clause 2, wherein the plurality of cognizable rules comprises at least two of the following:
 language expertise of translator
 domain expertise of translator
 availability of translator
 backlog of translator
 price of the translator
 domain expertise of the translator
 similarity of sentences to previously translated
 metadata for content and resources (e.g., vector distance between the object and the resource)
 machine translatability
 need/desire for redundancy/confirmation
 fitting total translation price to a budget by allocating across resources
 difficulty factor of the chunk
 complexity of the chunk
 domain of the chunk
 similarity of the chunk to previously translated material
 routing based on legal expertise in a country
 routing based on value of the material (e.g., how often it is viewed, how many people view it, presence on home page, presence in publication versus knowledge base)
 routing based on metadata associated with the material
 legal/liability concerns (e.g., drug labels)
 based on emotive content (e.g., the emotive content may require routing by paragraph rather than by sentence).

K. Routing Based on Similarity

Clause 1: A similarity-based method of distributed translation, comprising:
 taking a plurality of cognizable translation units for translation;
 determining similarity of contents among the plurality of units;
 configuring at least one workflow for translating the plurality of cognizable translation units so that similar units are routed to the same translators.

Clause 2: A similarity-based method of distributed translation, comprising:
 taking a plurality of cognizable translation units for translation;
 determining similarity of contents among the plurality of units;
 grouping units based on the determined similarity; and
 routing the plurality of units for translation to a set of translators that are common to units of a group.

Clause 3: The method of Clause 2, wherein determining a similarity of contents comprises performing at least one of calculating edit distance of a portion of the plurality of units and executing fuzzy matching algorithms on the plurality of units.

L. Metadata

Clause 1: A method of distributed translation, comprising:
 taking source content to be translated;
 identifying sections of the source content;
 breaking down each section into cognizable translation units;
 determining a frequency with which at least one section of source content is likely to be accessed;
 assigning a translation level of service value to each unit based on the frequency; and
 distributing the units to translators to facilitate providing the assigned level of service.

Clause 2: A method of distributed translation, comprising:
 taking source content to be translated;
 breaking down the source content into cognizable translation units;
 determining a frequency of occurrence of each cognizable translation unit in the source content based on at least one of edit distance comparison of all units and fuzzy matching of all units; and
 for each unit with a frequency of occurrence above a frequency of occurrence threshold, distributing the units to translators with overall quality scores above a quality score threshold.

Clause 3: The method of Clause 2, wherein the frequency of occurrence threshold is a predetermined value.

Clause 4: The method of Clause 3, wherein the predetermined value is referenced in a client translation rules database.

Clause 5: The method of Clause 2, wherein units with higher frequencies are assigned higher levels of service than units with lower frequencies.

Clause 6: The method of Clause 2, wherein an indexed position of a corresponding section comprises a position that is identified in an index of the source content.

Clause 7: The method of Clause 2, wherein an indexed position of a corresponding section comprises a position that is identified in an index of the section.

Clause 8: The method of Clause 2, wherein a level of service value comprises a translation quality value.

Clause 9: The method of Clause 2, wherein a level of service value comprises a translator compensation value.

Clause 10: The method of Clause 2, wherein a level of service value comprises a translator compensation range.

M. Delivery Quality Target Metric

Clause 1: A method of workflow configuration, comprising:
 taking a work-output quality criterion for a crowd worker-based project, wherein the project comprises a plurality of discrete work units; and
 selecting among a plurality of work unit task flows that facilitate providing the work-output quality criterion by supporting at least one of multiple workers independently performing a common work unit task and human review of work-output by a work unit auditor, wherein the auditor moderates work output from the multiple workers.

Clause 2: The method of Clause 1, wherein the auditor is a subject matter expert.

Clause 3: The method of Clause 1, wherein the auditor is a language expert
Clause 4: The method of Clause 1, wherein selecting among a plurality of work unit task flows is based on at least two of a linguistic quality rating output from a workflow, workflow cost, and time required to complete at least one work unit through the workflow.
Clause 5: The method of Clause 1, wherein selecting among a plurality of work unit task flows comprises comparing a calculated workflow output acceptance rate against a workflow acceptance threshold, wherein the workflow output acceptance rate comprises an acceptance measure comprising dividing a number of acceptances by the auditor into a total number of work units completed through the workflow.

N. Providing Context for Chunks

Clause 1: A method of translation with associated content, comprising:
  taking a cognizable translation unit of a document to be translated;
  determining a portion of the document that is proximal to the cognizable translation unit that provides context for the unit;
  combining the proximal portion of the document and the cognizable translation unit thereby forming a unit in context; and
  distributing the unit in context to a translator to facilitate translating the cognizable translation unit.
Clause 2: The method of Clause 1, wherein forming a unit of context comprises at least one of prepending and appending at least one adjacent cognizable translation unit to the cognizable translation unit to be translated
Clause 3: The method of Clause 1, wherein the unit in context comprises a paragraph.
Clause 4: The method of Clause 1, wherein the unit in context comprises at least two non-adjacent cognizable translation units.
Clause 5: The method of Clause 1, wherein the unit in context comprises a cognizable translation unit to be translated and a translation of the proximal portion.

O. Worker Efficiency in Multi-Lingual Data Research

Clause 1: A method of translation using immutable units, comprising:
  taking a source document to be translated;
  analyzing the source document content to determine portions of the content that can be represented by predefined immutable translations;
  breaking down the source document into cognizable translation units; and
  facilitating translation of at least one cognizable translation unit by presenting at least one cognizable translation unit with an immutable portion in an electronic user interface that permits translation of the cognizable translation unit while preventing changes to the immutable portion.
Clause 2: The method of Clause 1, wherein the determined portions are replaced with the predefined immutable translations.
Clause 3: The method of Clause 1, wherein an immutable portion comprises a single word.
Clause 4: The method of Clause 1, wherein an immutable portion is translation customer-specific.
Clause 5: The method of Clause 1, wherein an immutable portion is context specific.
Clause 6: The method of Clause 1, wherein presenting a cognizable translation unit comprises presenting a translation of the cognizable translation unit and wherein the electronic user interface permits changes to the translation of the cognizable translation unit.

P. Auditing Crowd Output

Clause 1: A method of automated crowd worker quality auditing, comprising:
  taking first work output by a crowd worker for a unit of work assigned to the worker; and
  if an audit schedule for one of the crowd worker and a project of the unit of work indicates auditing the first work output:
    dispatching the unit of work to at least one other crowd worker;
    receiving second work output by the at least one other crowd worker for the dispatched unit of work; and
    automatically auditing at least one of the first work output and the second work output by electronically comparing the first work output with the second work output.
Clause 2: A method of automated worker quality auditing, comprising:
  comparing results output from a plurality of workers performing a common task to produce a difference value;
  adding the difference value to an average of difference values for the worker from a plurality of previous difference value calculations; and
  determining at least one of a worker's quality and a worker's change in quality based on at least one of the magnitude and the direction of change made to the average as a result of the adding step.
Clause 3: The method of Clause 2, wherein the average of difference value for the worker is based on a fixed number of most recent difference value calculations.
Clause 4: The method of Clause 2, wherein the difference value is expressed as an edit distance of the results.
Clause 5: The method of Clause 2, wherein the difference value is expressed as a fuzzy match of the results.
Clause 6: A method of automated worker quality auditing, comprising:
  applying a series of regular expression rules to data output by a worker;
  for each applied regular expression that results in a successful outcome, incrementing a result success counter by a predetermined value;
  determining a task audit score by comparing the success counter and the number of total rules applied; and
  producing an overall audit quality score based on a plurality of task audit scores.
  wherein comparing includes dividing the success counter by the number of total rules applied.
  wherein the data output by the worker comprises a plurality of data fields and wherein at least one regular expression rule is configured for evaluating one of the plurality of data fields.
  wherein producing an overall audit quality score comprises averaging the determined task audit score with an average of a predetermined number of previous audit scores to produce an overall audit quality score.
Clause 7: The method of Clause 6, wherein each data field of the plurality of data fields is evaluated by at least one field-specific regular expression rule.

Q. Data Storage Architecture

Clause 1: A dataset for a crowd sourcing project, comprising:
  a data storage architecture based on a plurality of sets of key-value pairs that contains:
    workflow information,
    task handling information,
    work unit input information,
    work unit output information, and
    participating crowd worker information, wherein the plurality of sets of key-value pairs is configured as a substantially flat set of data records.

Clause 2: The dataset of Clause 1, wherein the plurality of sets of key-value pairs is configured as JSON or XML records.

R. Quality-Tuned Chunking

Clause 1: A method of adaptive translation, comprising:
taking a definition of translation quality for content to be translated;
configuring a translation workflow with smart routing factors to facilitate delivering the defined translation quality;
breaking down the content into translation units that comprise a plurality of sequential words; and
routing the translation units to translators based on the translation workflow.

Clause 2: The method of Clause 1, wherein a start position in the content of a translation unit and a length of a translation unit is adjusted based on the defined translation quality.

Clause 3: The method of Clause 1, wherein the translation units comprise cognizable translation units.

S. Budget-ROI Based Routing

Clause 1: A method of routing translation units, comprising:
taking a definition of a translation budget for translating source content from a source language into a destination language;
taking a plurality of cognizable translation units that together comprise the source content to be translated; and
routing the cognizable translation units to translators to deliver translation of the source content within the translation budget while ensuring that translation quality of a portion of the plurality of cognizable translation units complies with translation quality criteria.

Clause 2: The method of Clause 1, wherein the translation quality criteria is derived from a workflow for translating the content.

Clause 3: The method of Clause 1, wherein a first portion of the plurality of cognizable translation units is routed to translators who have achieved a first level of translation quality based on prior translations, and where a second portion of the plurality of cognizable translation units is routed to translators who have achieved a second level of translation quality based on prior translations.

Clause 4: The method of Clause 1, wherein the first level of translation quality is a higher level of quality than the second level of translation quality.

Clause 5: The method of Clause 1, wherein a first portion of the plurality of cognizable translation units is routed to first translators who have a level of subject matter expertise of the subject matter in the content to be translated that is above a subject matter expertise threshold defined in the workflow.

Clause 6: The method of Clause 1, wherein a first portion of the plurality of cognizable translation units is routed to first translators with a first average translation compensation, thereby consuming a first portion of the translation budget, and wherein an average translator compensation for translators for a second portion of the plurality of cognizable translation units is defined to ensure translation of the source content does not exceed the translation budget.

T. Quality-Based Routing

Clause 1: A method of quality-based routing, comprising:
taking a plurality of cognizable translation units of source content;
determining a translation quality criterion for each unit; and
routing the plurality of cognizable translation units to translators who have achieved a translation quality rating that is greater than or equal to the translation quality criterion for each unit.

Clause 2: The method of Clause 1, wherein determining a translation quality criterion is based on a level of service requirement for translating the source content.

U. Emotive Content

Clause 1: A method of translation of emotive content, comprising:
taking a portion of content to be translated;
taking translation workflow requirements for translating the content;
analyzing at least one of the portions of content to be translated and the workflow requirements to determine if the portion of content comprises emotive subject matter;
adjusting a definition of a cognizable translation unit for the content based on the determination;
breaking down the portion of the content into a set of cognizable translation units for translation based on the adjusted definition;
and distributing the cognizable translation units to one or more translators for translating based on the workflow requirements.

Clause 2: The method of Clause 1, wherein adjusting a definition of a cognizable translation unit comprises increasing the scope of sequential content to be included in a cognizable translation unit.

V. Customized Support Materials

Clause 1: A method of translation, comprising:
taking a cognizable translation unit;
determining at least one translation aid that corresponds to the unit based on at least one of contents of the unit and translation requirements of a document of which the unit is a part; and
distributing the at least one translation aid to a translator to facilitate translating the unit.

Clause 2: The method of Clause 1, wherein the at least one translation aid comprises a dictionary entry.

Clause 3: The method of Clause 1, wherein the at least one translation aid comprises at least one entry of a client-specific dictionary.

Clause 4: The method of Clause 1, wherein the at least one translation aid comprises a representative translation.

Clause 5: The method of Clause 1, wherein the at least one translation aid comprises a translation of a portion of the unit.

Clause 6: The method of Clause 1, wherein the at least one translation aid comprises an immutable object that represents a translation of a subset of the unit.

Clause 7: The method of Clause 1, herein distributing is performed within a workflow for obtaining a translation of an item containing the cognizable translation unit and wherein the workflow includes a plurality of available translators at remote locations.

Clause 8: The method of Clause 1, wherein the translation aid is selected based on information about the capabilities of the translator to whom the translation unit is distributed.

W. Database Comparison at Segment Level

Clause 1: A method of cognizable translation unit classification, comprising:
taking a cognizable translation unit to be translated;
taking a data store of translations comprising at least one source language and one destination language, wherein translations in the data store are indexed by at least one parameter type that is common to a plurality of translation projects, the parameter type including at least one of translation customer identifier, source language keyword, source language, content topic, and destination language;

determining if the database comprises at least one translation that corresponds to the cognizable translation unit to be translated based on a portion of the contents of the cognizable translation unit to be translated; and classifying the cognizable translation unit to be translated as one of previously translated, needing original translation, and needing adjustment to a previous translation based on the determination of a corresponding translation.

W. Fuzzy Match

Clause 1: A method of translation using fuzzy matching-based routing, comprising:

taking a cognizable translation unit of content to be translated;

searching for the cognizable translation unit in a translation memory comprising translations of content;

calculating a match percentage for the cognizable translation unit based on the search results; and routing the cognizable translation unit to a translator based on the calculated match percentage.

Clause 2: The method of Clause 1, wherein a match percentage represents a measure of sameness that is less than a direct match between the cognizable translation unit and content in the translation memory.

Clause 3: The method of Clause 1, wherein routing the cognizable translation unit comprises routing a cognizable translation unit with a calculated match percentage above a first sameness threshold to a first translator.

Clause 4: The method of Clause 1, wherein routing the cognizable translation unit comprises routing a cognizable translation unit with a calculated match percentage below a second sameness threshold to a second translator.

X. Matched Pairs

Clause 1: A method of updating a translation memory, comprising:

taking a translation of a cognizable translation unit;

comparing the translation to content in a translation memory;

for direct matches of the translation to content in the translation memory, linking a source language cognizable translation unit of the translation to source language content of the content in the translation memory, wherein an owner of the source language cognizable translation unit of the translation is different than an owner of the directly matched content in the translation memory.

Y Multi-Frame User Interface ("UI")

Clause 1: A user interface, comprising:

a plurality of adjacent content frames for managing crowd-distributed workflows, wherein each frame depicts a different aspect of crowd-distributed workflows; and a document presentation capability operable within a document viewing frame of the plurality of adjacent content frames that facilitates sliding the document viewing frame into a viewable portion of an electronic display through which the user interface is accessible when an active crowd distributed workflow indicates that information in the document is pertinent to a worker task defined in the active workflow.

Clause 2: The method of Clause 1, wherein at least a portion of the plurality of adjacent content frames are presented side-by-side in the user interface.

Clause 3: The method of Clause 1, wherein the document viewing frame is responsive to user inputs to the user interface.

Clause 4: The method of Clause 1, wherein being responsive to user inputs comprises sliding out of the viewable portion of the electronic display.

Clause 5: The method of Clause 1, wherein being responsive to user inputs comprises sliding into the viewable portion of the electronic display.

Z. Blended Worker-Source Process

Clause 1: A method of blended worker-sourcing, comprising:

taking a plurality of worker tasks that are defined by a project workflow;

determining a first portion of the worker tasks that can be performed by individual crowd workers;

determining a second portion of the worker tasks that can be performed by at least one of internal work resources and outsourcing center-based worker resources;

configuring the project workflow to designate the first portion of worker tasks for distribution to individual crowd workers and to designate the second portion of worker tasks for distribution to at least one of an internal worker and an outsourcing center; and managing the distribution and performance of the plurality of worker tasks based on the configured project workflow.

AA. Dashboard for Blended Worker Sourcing

Clause 1: A dashboard for managing blended worker-sourcing, comprising:

a task viewing frame of the dashboard for viewing a plurality of worker tasks that are defined by a project workflow;

a task analysis frame for selecting criteria to determine a first portion of the worker tasks that can be performed by individual crowd workers, and for selecting criteria to determine a second portion of the worker tasks that can be performed by at least one of an internal worker resource and an outsourcing center-based worker resource;

a project workflow configuration frame to facilitate configuring the project workflow to designate the first portion of worker tasks for distribution to individual crowd workers and to designate the second portion of worker tasks for distribution to at least one of an internal worker and an outsourcing center; and a project workflow management frame for managing the distribution and performance of the plurality of worker tasks based on the configured project workflow.

AB. Location Segmentation

Clause 1: A method of remote worker segmentation, comprising:

configuring a crowd worker database with segmentation data comprising worker location, customer work distributed to workers at the worker location, worker experience with the customer work, and customer work type;

deriving a worker location profile based on the segmentation data, wherein the worker location profile comprises a metric of worker experience with customer work for a plurality of customers for whom work has been distributed to workers at the worker location and at least one other metric of customer work type across customer work distributed to workers at the worker location; and logically segmenting crowd workers into crowd segments based on the metric of worker experience, worker location, and the customer work type.

AC. Time of Day/Competency Segmentation

Clause 1: A method of task, worker, and time-based remote worker management, comprising:

taking a plurality of work units, wherein each work unit is associated with at least one competency requirement;

identifying a portion of the plurality of work units that share a common competency requirement;

logically grouping remote workers who share the common competency requirement into a work unit-capable group;

logically segmenting the work unit-capable group into sets of remote workers by local time zone; and facilitating allocation of the work units that share a common competency requirement to remote workers in the work unit-capable group that are also in a local time zone that is compatible with a workflow for processing the plurality of work units.

AD. Jurisdiction Segmentation

Clause 1: A method of jurisdiction-based crowd worker management, comprising:

taking a plurality of work units, wherein each work unit is associated with at least one jurisdiction requirement;

identifying crowd workers who share a common attribute that is required in a workflow for processing the plurality of work units;

logically grouping crowd workers who share the common attribute into a work unit-capable group;

logically segmenting the work unit-capable group into sets of crowd workers by jurisdiction; and facilitating allocation of the work units to crowd workers in the work unit-capable group that are also in a jurisdiction that is compatible with the at least one jurisdiction requirement.

AE. Customization of a Crowd (e.g., Cleansing)

Clause 1: A method of crowd customization, comprising:

taking a plurality of worker criteria from a project requirement;

mapping the worker criteria to worker attributes in a database of worker information;

adjusting the worker criteria based on a target location for accessing crowd workers; and selecting a plurality of crowd workers in the target location that satisfy the worker criteria project requirement AF. Minimum Wage Modeling Clause 1: A method of task allocation to crowd workers, comprising:

taking task metadata for a plurality of tasks to be allocated to crowd workers;

processing the task metadata for each of the plurality of tasks with a worker allocation model that determines a maximum cost level for the task in at least one crowd worker location; and identifying individual crowd workers in the at least one location based on crowd worker cost information in a database of crowd worker information who have a cost requirement that is less than or equal to the determined maximum cost level; and distributing the plurality of tasks to a portion of the identified crowd workers.

AG. Cleansing

Clause 1: A method of cleansing a crowd, comprising:

taking crowd worker identification information for a plurality of crowd workers, wherein the crowd worker identification information comprises a plurality of typed data fields;

comparing data in a specific typed data field across a plurality of crowd workers thereby producing a plurality of sets of potential duplicated worker entries;

determining a degree of similarity of data in at least one other typed data field for within each set of the potential duplicates;

based on the determined degree of similarity, classifying each set of potential duplicates as one of confirmed duplicates, likely duplicates, unlikely duplicates, not duplicates; and configuring a project-specific crowd worker segment of crowd workers whose classification satisfies a project workflow crowd uniqueness criteria.

Clause 2: A method of cleansing crowd work product, comprising:

taking work product produced by a plurality of crowd workers;

determining a degree of similarity of the crowd workers based on a comparison of at least two worker characteristics for each crowd worker who produced the work product;

based on the degree of similarity classifying each work product for an extent of uniqueness; and based on the classification performing a post-process step on the work product that corresponds to the classification.

Clause 3: A method of cleansing input for use by workers in a crowd, comprising:

taking project workflow requirements for limiting access to project work unit information based on characteristics of workers in the crowd;

determining if a crowd worker selected to perform a project work unit has any information-limiting characteristics as defined in the workflow; and based on the determination, preprocessing project work unit information so that information characterized as not suitable for the selected crowd worker is at least one of deleted and obfuscated prior to sending the work unit information to the selected crowd worker.

Clause 4: The method of Clause 1, further comprising selecting another crowd worker if the pre-processing causes the work unit information to be insufficient for the selected crowd worker to perform the work unit.

AH. Jurisdiction-Based Recruiting

Clause 1: A method of automated crowd worker activation comprising:

receiving potential worker information comprising a worker self-reporting at least one of personal data, demographic data, professional data, skills data, location data, experience data, interest data, preference data and on-line presence data of a potential worker;

automatically validating worker location by a comparison of received worker location information with independently gathered data from at least one independent networked data source;

administering a worker output quality process in which the potential worker is prompted to perform at least one computer-based skills activity that is adapted based on the received potential worker confirmed location data; and based on an automated evaluation of the computer-based skills activity, performing one of rejecting the potential worker or accepting the potential worker as a qualified worker.

AI. Task-Progression Segmentation

Clause 1: A method of task-progression based workflow, comprising:

taking a task output of a task performed by a worker at a worker location for a customer;

evaluating the task output to determine a criterion for worker selection for a follow-on task that requires use of the task output to perform the follow-on task; and based on the determined criteria and a worker location profile for the worker location that comprises a metric of worker experience with customer work for at least the customer and at least one other metric of customer work type across all customer work distributed to workers at the worker location, routing a portion of the task output to a worker to perform the follow-on task.

Clause 2: A workflow for linked tasks, comprising:
a workflow step for processing a task with workers in a crowd;
a workflow step for evaluating output of the task to determine a worker criterion for a follow-on task; and
a workflow step for processing the follow-on task based on the evaluated output and the worker criterion.

AJ. On Demand Translation

Clause 1. A translation platform, comprising:
an interface to a host environment that provides translation services, wherein the interface is configured to enable a third party's web environment to provide users of the third party web environment with access to the translation services without exiting the third party web environment.

Clause 2. The platform as recited in claim 1, wherein the interface is an application programming interface that passes translation requests from the third party web environment to the host environment.

Clause 3. The platform as recited in Clause 1, wherein the interface includes an account creation function operable to establish individual user accounts through which the access to translation services can be ordered from the third party web environment for an identified item to be translated.

Clause 4. The platform as recited in Clause 1, wherein the interface enables providing at least one of a list and a catalog of translation services that are available.

Clause 5. The platform as recited in Clause 4, wherein the at least one list or catalog enables an individual user to select a translation quality level to be achieved for the to translation services.

Clause 6. The platform as recited in Clause 1, wherein the interface a function for generating a quotation for the cost of translation services.

Clause 7. The platform as recited in Clause 6, wherein the quotation generation function provides a price for the application of a selected translation quality level for the translation services.

Clause 8. The platform as recited in Clause 7, wherein the quotation sets fees for the services selected.

Clause 9. The platform as recited in Clause 7, wherein the quotation estimates fees for the services selected.

Clause 10. The platform as recited in Clause 1, wherein translation services commence immediately when requested by the user.

Clause 11. The platform as recited in Clause 10, wherein the translation services commence within a time period selected from the set consisting of: five minutes, three minutes, one minute, thirty seconds, ten seconds, five seconds, or one second or less.

Clause 12. An on-demand translation platform, comprising:
a plurality of portals that provide access to an interface of a host environment that provides translation services, wherein each portal is adapted to enable a third party environment to select a distinct user interface for accessing the translation services.

Clause 13. The platform as recited in Clause 12, wherein at least one portal provides interfaces with a plurality of translation services.

Clause 14. The platform as recited in Clause 13, wherein the plurality of translation services includes at least one crowd sourced translation service.

Clause 15. The platform as recited in Clause 13, wherein the plurality of translation services includes at least one machine translation service.

Clause 16. The platform as recited in Clause 12, wherein an interface of the host translation service provides a portal configuration function for each of the plurality of portals.

Clause 17. The platform as recited in Clause 16, wherein the portal configuration function is presented in a multiple choice format.

Clause 18. The platform as recited in Clause 17, wherein the portal configuration function generates a portal that exposes a plurality of translation engine capabilities in a customized portal.

Clause 19. The platform as recited in Clause 18, wherein configuration information for the customized portal is storable for later retrieval.

Clause 20. The platform as recited in Clause 18, wherein the customized interface for a portal is dynamically generated when a user accesses a specific domain.

Clause 21. A method of translation quoting, comprising:
processing a submitted translation content;
estimating a measure of machine translation quality for the submitted translation content; and
estimating a cost for crowd refinement of a machine translation of the submitted translation content.

Clause 22. The method as recited in Clause 21, further comprising determining a cost model for quoting the cost for crowd refinement, the cost model having parameters applicable to a plurality of cognizable translation units, the parameters selected from the group consisting of a domain specificity parameter, a language parameter, a prior translation extent parameter, a crowd size parameter, an initial quality parameter, a quality requirement parameter, a machine translation cost parameter, and a crowd translation cost parameter.

Clause 23. The method as recited in Clause 22, further comprising storing a data structure for supporting the provision of the cost for crowd refinement, the data structure storing at least one of the parameters.

Clause 24. The method as recited in Clause 23, further comprising transforming the data structure upon receiving an update applicable to at least one of the parameters.

Clause 25. The method as recited in Clause 22, wherein processing includes determining a degree of domain specificity of the submitted translation content.

Clause 26. The method as recited in Clause 22, wherein processing includes determining an estimate of the percent of the submitted translation content that has previously been translated.

Clause 27. The method as recited in Clause 22, wherein processing includes determining an estimate of the size of a crowd required for refinement of the machine translation to meet a delivery requirement.

Clause 28. The method as recited in Clause 27, wherein processing includes performing at least one of machine translation and crowd-sourced refinement of the machine translation to achieve a pre-determined level of translation quality.

Clause 29. A method of quoting an estimated cost for a translation of submitted content in response to a request, comprising:
automatically parsing the submitted content; and
delivering an estimate for translation of the submitted content that is based on at least one human translation parameter and at least one machine translation parameter.

Clause 30. The method as recited in Clause 29, further comprising presenting the estimate with a user interface element by which a client can accept the quote.

Clause 31. The method as recited in Clause 29, further comprising in response to acceptance via a user interface element, automatically initiating machine and human translation consistent with the estimate.

Clause 32. A method of configuring a client-specific third-party environment for use of a translation service, comprising:

configuring a plurality of unaffiliated third-party translation portals to provide access to translation services via translation request functions available through an interface of a host translation service that provides on demand translation.

Clause 33. The method as recited in Clause 32, wherein the translation request functions include at least an account creation function, a services listing function, and a quote generation function.

Clause 34. The method as recited in Clause 32, wherein the unaffiliated third-party translation portals are selectively configured with one or more combinations of the translation functions.

Clause 35. The method as recited in Clause 32, wherein the configuring includes selecting a first plurality of translation portal functions for a first portal and a second plurality of translation portal functions for a second portal, the first and second plurality of translation portal functions differing by at least one translation portal function.

Clause 36. The method as recited in Clause 32, wherein the translation services include deconstructing an identified content item into a plurality of cognizable translation units and executing on-demand translation of each of the units.

Clause 37. The method as recited in Clause 36, wherein the translated units are reassembled into translated content for delivery to the party requesting the translation.

Clause 38. The method as recited in Clause 32, wherein translation comprises hybrid machine translation and human crowd translation services.

Clause 39. The method as recited in Clause 32, wherein the hybrid translation comprises two sequential translation passes for at least a portion of the cognizable translation units, the first translation pass comprising a machine translation pass and the second translation pass comprising crowd-sourced human enrichment of a portion of the machine translated output of the first translation pass.

Clause 40. The method as recited in Clause 39, wherein the second translation pass is performed via an electronic interface that facilitates access to the cognizable translation unit, the machine translation pass output, material from the identified item other than the cognizable translation unit, identified item metadata, and a translation memory of previously translated cognizable translation units.

Clause 41. A method of configuring an automated hybrid translation service, comprising:

deploying a translation service that provides crowd-sourced refinement of a machine translation of submitted translation content.

Clause 42. The method as recited in Clause 41, wherein deploying the translation service through an interface that enables on-demand access.

Clause 43. The method as recited in Clause 42, further comprising deploying the translation service via an interface that facilitates establishing hybrid translation as a self-service capability from an environment of a third party that is independent of the environment that hosts the translation service.

Clause 44. The method as recited in Clause 41, wherein the crowd-sourced refinement of the machine translation includes receiving the machine translated content in a translation-efficient format that is different than the format of the submitted translation content; and presenting the received machine translated content in an electronic user interface adapted to simultaneously display the received machine translated content and a portion of the indicated content that corresponds to the received machine translated content, the crowd-sourced resource refining the received machine translated content by applying translation style guides and translation glossaries associated with an entity of a submitter of the submitted translation content.

Clause 45. A platform for configuring and activating translation service platform delivery capabilities for third-party clients to allow users of the third-party clients to directly access translation services, comprising:

a translation service including machine translation and crowd-sourced refinement of the machine translation, the on-demand translation services being provided by the platform owner.

Clause 46. The platform as recited in Clause 45, wherein configuring the translation service platform delivery capability includes an interface to an on-demand API.

Clause 47. A platform for configuring and activating on-demand translation service platform delivery capabilities for third-party clients to allow users of the third-party clients to directly access translation services, comprising:

a translation service operable to directly access localization of a plurality of media types with at least some common content from a source language into a plurality of different languages so that the common content is localized consistently across the translated media types.

Clause 48. The platform as recited in Clause 47, wherein localization includes a machine translation and crowd-sourced refinement of the machine translation.

Clause 49. A method of enabling use of client-specific style guides and translation glossaries for use in discretely submitted translation projects, comprising:

tagging each submitted translation project with a unique identifier that facilitates identifying the client and at least one of a translation style guide and one or more translation glossaries for the client, the unique identifier accessible via a translation management key that uniquely identifies the client to a translation services environment.

Clause 50. The method as recited in Clause 49, wherein the key is submitted via an application programming interface of the translation services environment.

Clause 51. The method as recited in Clause 49, wherein a translation service identification function accessible via the interface determines at least one of a client-specific style guide and a client-specific translation glossary based on the key.

Clause 52. The method as recited in Clause 49, wherein identifying at least one of a translation style guide and translation glossaries for the client is based on matching a portion of the key to a database of such keys that is accessible by a server with which the translation environment communicates.

Clause 53. The method as recited in Clause 49, wherein the client submits the translation project via a third-party translation interface that is configured on behalf of the third-party with an interface that enables on-demand quoting of a translation projects, machine translation, and crowd-sourced refinement of the machine translation.

Clause 54. A method of ensuring use of client-specific style guides and translation glossaries for use in discretely submitted translation projects, comprising:

tagging each cognizable translation unit of a submitted translation project with a unique identifier that facilitates identifying the client and at least one of a translation style guide and translation glossaries for the client, the unique identifier accessible via an on demand translation environment interface key that uniquely identifies the client.

Clause 55. The method as recited in Clause 54, wherein the client-specific translation service material is pre-existing material.

Clause 56. The method as recited in Clause 54, wherein a translation service identification function determines at least one of a client-specific style guide and a client-specific translation glossary based on the key.

Clause 57. The method as recited in Clause 54, wherein identifying at least one of a translation style guide and translation glossaries for the client is based on matching a portion of the key to a database of such keys that is accessible by a server with which the translation environment communicates.

Clause 58. The method as recited in Clause 54, wherein the client submits the translation project via a third-party translation interface that is configured on behalf of the third-party with an API that enables quoting of a translation projects, machine translation and crowd-sourced refinement of the machine translation.

Clause 59. The method as recited in Clause 54, wherein identifying the at least one of the translation style guide and the translation glossaries for the client is based on matching a portion of the key to a database of such keys.

Clause 60. The method as recited in Clause 54, wherein the client submits the translation project via a third-party translation interface that is configured on behalf of the third-party with an API that enables quoting of a translation projects, machine translation and crowd-sourced refinement of the machine translation.

Clause 61. A method of hybrid translation, comprising:
receiving a reference to a submitted translation project;
processing the submitted translation project to determine an estimated cost for hybrid translation;
providing a quote for hybrid translation based on the estimated cost; and, upon receiving approval:
processing the content into cognizable translation units;
machine translating the cognizable translation units;
offering at least one of the machine translated cognizable translation units for refinement of the machine translation to a set of human translators selected from a set of qualified translators among a crowd of potential translators;
presenting the machine translated cognizable translation unit to one of the set of human translators in response to acceptance by the human translator of the offering in an interface that facilitates human refinement of the machine translated cognizable translation unit;
receiving the human refined machine translated cognizable translation units; and
arranging the human-refined machine translated cognizable translation units into a hybrid translation of the referenced content.

Clause 62. The method as recited in Clause 61, wherein receiving the submitted translation project is via an interface to a platform that provides quoting.

Clause 63. The method as recited in Clause 61, wherein receiving the submitted translation project is via an interface to a platform that provides on-demand hybrid translation services.

Clause 64. The method as recited in Clause 61, further comprising:
assigning a priority level to at least one of the cognizable translation units;
machine translating at least one unit of lower priority;
having a human translate at least one unit of higher priority; and
blending the translated units to provide translated content.

Clause 65. The method as recited in Clause 61, further comprising receiving a request for translation of the referenced content, wherein the request including at least one translation service.

Clause 66. The method as recited in Clause 61, wherein providing a quote includes providing a quote for the at least one translation service in the request.

Clause 67. The method as recited in Clause 61, wherein providing a quote includes estimating fees for the at least one translation service in the request.

Clause 68. The method as recited in Clause 61, wherein processing the content into cognizable translation units comprises deconstructing the referenced content into a plurality of cognizable translation units.

Clause 69. The method as recited in Clause 61, wherein the interface facilitates access to the cognizable translation unit, the machine translated cognizable translation unit, material from the referenced content other than the cognizable translation unit, referenced content metadata, and a translation memory of previously translated cognizable translation units.

Clause 70. The method as recited in Clause 61, wherein the interface facilitates access to client-specific translation service material selected from the list of translation service material consisting of client-specific style guides and client-specific translation glossaries.

Clause 71. A method of hybrid translation, comprising:
receiving an indication of content to translate from a client;
receiving an indication of a translation service from the client;
receiving a request for quote of translation of the indicated content based on the indicated translation service;
generating at least one translation quote for at least one translation project;
delivering the at least one translation quote to the client;
receiving authorization of the delivered quote;
delivering a request for payment of the at least one translation quote to the client and, upon receiving confirmation of payment:
performing machine translation of portions of the indicated content;
performing human refinement of at least some of the machine translated portions using an crowd-sourced translation refinement process;
assembling a complete translation of the indicated content from the machine translated portions and the human refined portions; and
delivering the complete translation to the client.

Clause 72. The method as recited in Clause 71, wherein at least one of the content and the indication of a service is received from at least one of an application of a client, a website of a client, a mobile device of a client, an electronic mail environment of a client, and a service of a client.

Clause 73. The method as recited in Clause 72, wherein the application is selected from the group consisting of a publication application, a website development application, a mobile content development application, a word processing application, a spreadsheet application, a presentation application, a database application, a productivity application, a work flow management application, and an enterprise software application.

Clause 74. The method as recited in Clause 71, wherein each of the receiving steps comprises receiving a key that identifies the client.

Clause 75. The method as recited in Clause 74, wherein the key relates to an aspect of the user, thereby providing a reference to at least one parameter for a user-specific translation service.

Clause 76. The method as recited in Clause 75, wherein the aspect of the user comprises contact data of the user.

Clause 77. The method as recited in Clause 75, wherein the aspect of the user comprises user loyalty data.

Clause 78. The method as recited in Clause 75, wherein the aspect of the user comprises a method of payment for the translation.

Clause 79. A method of hybrid translation, comprising:

combining a machine translation with an crowd-sourced refinement of content accessible over a network through an interface configured via an translation portal application programming interface (API).

Clause 80. A method of hybrid translation, comprising:

combining a machine translation with an on-demand crowd-sourced refinement of the machine translation output that is delivered via a computer-computer interface that is compliant with an interface requirement of an on demand translation portal application programming interface (API).

Clause 81. A method of hybrid translation, comprising:

refining a machine translated content by automating allocation of, content delivery to, retrieval from, and payment to, an on-demand crowd sourced translation refinement for each unit of the refined machine translated content.

Clause 82. A method of multi-media translation, comprising:

localization through a translation-quoting service-delivery platform adapted to provide coordinated translation of a plurality of media types with at least some common content from a source language into a plurality of different languages so that the common content is localized consistently across the translated media types, the plurality of media types includes at least two of text, video, audio, email, and search engine optimization Clause 83. The method as recited in Clause 82, wherein the localization is performed via the platform on computer software, mobile applications, video games, on-line games, books, movies, videos and streaming content.

Clause 84. The method as recited in Clause 82, wherein the platform facilitates localization.

Clause 85. The method as recited in Clause 82, wherein the platform facilitates localization through an API that is adapted to support localization quoting, machine localization and crowd-sourced refinement of the machine localization.

Clause 86. A method of transaction resolution for a hybrid, translation, comprising:

taking estimates for human-refined, machine-translation of content;

determining the extent of human and machine activity undertaken in a translation; and resolving payment for the translation based on the estimate and the determined extent of activity.

Clause 87. A method of hybrid translation, comprising:

receiving an indication of content to translate from a client;

receiving an indication of a translation service from the client;

receiving a request for quote of translation of the indicated content based on the indicated translation service;

generating at least one translation quote for at least one translation project;

delivering the at least one translation quote to the client;

receiving authorization of the delivered quote; and delivering a request for payment of the at least one translation quote to the client.

Clause 88. The method as recited in Clause 85, wherein upon receiving confirmation of payment:

performing machine translation of portions of the indicated content;

performing human refinement of at least some of the machine translated portions using an crowd-sourced translation refinement process;

assembling a complete translation of the indicated content from the machine translated portions and the human refined portions; and delivering the complete translation to the client.

Part IX: Machine Embodiments

While only a few embodiments of the present disclosure have been shown and described, it will be obvious to those skilled in the art that many changes and modifications may be made thereunto without departing from the spirit and scope of the present disclosure as described in the Clauses above and in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs, codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

We claim:

1. A system for improvement of routing of segments for translation among a plurality of machine and human translators, comprising:
   a set of metadata associated with a segment for translation, the set of metadata derived from contextual information gathered during ingestion of the segment for translation;
   a segment routing engine that determines a plurality of candidate routes for translating the segment based, at least in part, on the application of at least one route generation rule to the set of metadata and selects at least one candidate route based, at least in part, on an application of at least one route selection rule;

a training engine that modifies at least one of the route generation rule and the route selection rule used by the segment routing engine for each of a plurality of instances of segment translation in a training metadata set, tracks at least one metric relating to the outcome of translation of each of the instances of the training data set, compares the outcomes for a plurality of versions of the rules, and adjusts at least one of the route generation rule and the route selection rule based on the at least one outcome metric; and a route configuration engine that processes the segment of translation through at least one of the plurality of candidate routes in response to the adjusted at least one of the route generation rule and the route selection rule.

2. A system of claim 1, wherein the metadata set comprises information relating to at least one of segment complexity, segment length, an extent of matching of the segment to pre-translated segments in a translation memory, target quality of translation of the segment, client for the segment, project ID for the segment, domain/taxonomy of the segment, and language of the segment.

3. A system of claim 1, wherein the plurality of candidate routes are generated at least in part using a probabilistic route selection facility.

4. A system of claim 1, wherein at least one of the route generation rule and the route selection rule involves a probabilistic factor.

5. A system for translation of a plurality of segments requiring language translation among human and machine resources that become available for translation activities, comprising:

a data collection facility for gathering data that is descriptive of translation work performed by a first group of translation resources that include at least a plurality of human translators in a plurality of international jurisdictions;

a translation resource availability computer model that uses the gathered data to provide an output data structure that comprises a prediction of future availability and expected translation quality for at least a portion by the first group of translation resources for at least one translation time period; and a translation routing engine that routes the plurality of segments by applying at least one routing rule to the output data structure.

6. A system of claim 5, further comprising applying the translation resource availability computer model to predict availability of a second group of translation resources, wherein the first group comprises a crowd that is available at a first time period and the second group comprises a crowd that is available at a second time period.

7. A system of claim 6, further comprising a price prediction engine that predicts a price of translation by each of the first group of translation resources and the second group of translation resources, wherein at least one of the at least two prices is based, at least in part, on scheduling the translation to be performed by a translator in the segment who is available to translate the content contemporaneously with receiving the request, and another of the at least two prices is based, at least in part, on scheduling the translation to be performed by one of a plurality of translators who are not available contemporaneously with receiving the request, but are predicted to be available at a point of time in the future.

8. A system for translation, comprising:

an information technology interface for receiving a plurality of projects, each project including a plurality of tasks;

a task competency determination module for processing each of the plurality of tasks using a task competency requirement determination algorithm that takes a task information data structure relating to each task and generates a task-specific metadata structure based, at least in part, on the task content, a context of the task, and a plurality of project requirements associated with the project that corresponds to the task;

a similarity module that operates on the task-specific metadata structure to arrange the tasks into logical groups based on similarity of the produced metadata, wherein the logical groups include tasks from a plurality of the projects; and a task routing engine that aggregates the metadata for tasks in a given group into a set of group routing metadata, configures candidate routes for tasks in a group that optimize performance of the tasks and routes each task along one of the candidate routes based, at least in part, on similarity of task-specific metadata with expected outcomes of the candidate routes.

9. A system of claim 8, further comprising a worker-segmentation module for segmenting a global pool of workers into at least two segments of candidate workers based on a similarity of worker-specific competency metadata with the competency requirements for performing the tasks in the group, wherein the routing engine configures candidate routes for tasks in a group that targets using at least one candidate worker from one of the at least two segments of the global pool of workers.

10. A translation system of claim 8, further comprising:

A plurality of machine translation engines disposed in a plurality of countries;

a translator competency database storing information about the competencies of a plurality of human translators disposed in a plurality of countries, the plurality of human translators logically grouped in the database into translation competency-based segments of a global pool of translators, the logical grouping based, at least in part, on translation competencies of the translators, wherein the task routing engine uses information about competencies of translators from the database in determining a route for a task.

11. A system of claim 10, further comprising a translation aggregation engine that receives a corresponding translation for each of the sentences from a plurality of competency-based translation groups, at least a portion of the translations being processed by a human translator in at least a portion of the competency-based translation groups, and rearranges the translations into distinct translation request groups that group the translations based, at least in part, on the client translation requests.

12. A method of dynamic task linking, comprising: associating a first task type with a task;

configuring a route for performing the task that includes a first execution step for the first task type and a plurality of candidate second execution steps for a plurality of candidate task types other than the first task type, wherein the plurality of candidate task types are based on a desired output of the task;

routing the first execution step in the configured route, thereby facilitating production of a first execution output for the task;

adapting the task output from the first execution step into a second task type based, at least in part, on a result of performing the first execution step and a desired outcome of the task; and routing the task to a second execution step selected from the plurality of candidate task types based, at least in part, on the second task type.

13. A cognizable translation unit digital structure comprising:

a metadata structure for recording data about a text string of the unit;

executable code operable to seek a translator out of a pool of translators that meets a translation cost criteria and a translation delivery criteria that are derivable from the metadata, the executable code interacting with translator nodes in a digital network of translator nodes to determine a translator node that meets the translation cost criteria and that is available for translating the text string while meeting the delivery criteria, wherein a portion of the translation cost criteria has an inverse relationship with an amount of time remaining in the delivery criteria; and wherein the executable code is further operable to assign the determined translator node to translate the text string.

14. A digital structure of claim 13, wherein as the amount of time remaining in the delivery criteria is reduced, the portion of the translation cost criteria increases, thereby facilitating selection of a translation node for translating the text string.

15. A system for routing to satisfy localization constraints, comprising:

a task collection interface for receiving a request for a translation task to be performed by a human worker selectable from a predefined pool of human workers, wherein the request includes at least one worker location constraint;

a routing engine for processing the location constraint with a worker location database that includes worker computer logical address data and worker physical location data, to determine a candidate set of workers from the pool that satisfy at least the worker location constraint based, at least in part, on the worker physical location;

a communication module for requesting current location information of a first worker in the candidate set of workers by sending a digital message to a worker computer logical address of the first worker;

a location validation module for receiving a response from a computer that is responsive to the worker computer logical address of the first worker, the response including data that indicates a physical location of the responsive computer, and validating that the physical location of the responsive computer complies with the worker location constraint; and wherein the routing engine further assigns the translation task to the selected human worker in response to the validating.

16. A system of claim 15, wherein the routing engine routes the task to a worker based, at least in part, on the result of the physical computer location validation.

17. A system, comprising:

a database indicating language competencies for a plurality of language translators;

a translation project quotation engine for estimating the cost of a translation project received from a user;

a translator availability tracking engine for determining the availability of language translators during a given time period, wherein the quotation engine varies the quoted price for the quotation depending on whether a translator is currently available for direct translation of a segment from a source language to a target language; and wherein the translation project quotation engine provides the varied quoted price to the user for the translation project.

18. A system of claim 17, wherein if a translator is not available for direct translation of a segment from a source language to a target language, the quotation engine provides the quoted price, at least in part, on the cost of translating from the source language to an intermediate language and from the intermediate language to the target language.

19. A system of claim 18, wherein the quotation engine offers a lower quoted price for later direct language translation and a higher quoted price for immediate language translation that involves a two-step translation involving an intermediate language.

* * * * *

UNITED STATES PATENT AND TRADEMARK OFFICE
CERTIFICATE OF CORRECTION

PATENT NO. : 10,248,653 B2
APPLICATION NO. : 14/933465
DATED : April 2, 2019
INVENTOR(S) : Eric A. Blassin et al.

It is certified that error appears in the above-identified patent and that said Letters Patent is hereby corrected as shown below:

On the Title Page

In item (74), in Column 2, in "Attorney, Agent, or Firm", Lines 1-2, delete "Afiliates" and insert -- Affiliates --, therefor.

In the Drawings

On Sheet 3 of 52, in Figure 2A, reference Numeral 2A10, Line 12, delete "ASSISTENT" and insert -- ASSISTANT --, therefor.

On Sheet 3 of 52, in Figure 2A, reference Numeral 2A14, Line 17, delete "ASSEST" and insert -- ASSET --, therefor.

On Sheet 3 of 52, in Figure 2A, reference Numeral 2A14, Line 18, delete "AUTORNATION" and insert -- AUTOMATION --, therefor.

On Sheet 17 of 52, in Figure 16, reference Numeral 1600, Line 5, delete "MODDLEINITIAL" and insert -- MIDDLEINITIAL --, therefor.

On Sheet 17 of 52, in Figure 16, reference Numeral 1610, Line 1, delete "CONUTRIES" and insert -- COUNTRIES --, therefor.

On Sheet 22 of 52, in Figure 20, Line 17, delete "AVAILBLE" and insert -- AVAILABLE --, therefor.

On Sheet 22 of 52, in Figure 20, Line 20, delete "AVAILBLE" and insert -- AVAILABLE --, therefor.

On Sheet 31 of 52, in Figure 29, Line 13, delete "AVAILABE" and insert -- AVAILABLE --, therefor.
In the Specification Signed and Sealed this
Eighteenth Day of February, 2020

Andrei Iancu
*Director of the United States Patent and Trademark Office*

CERTIFICATE OF CORRECTION (continued)
U.S. Pat. No. 10,248,653 B2

In Column 2, Line 24, delete "needs)" and insert -- needs). --, therefor.

In Column 7, Line 61, delete "an/or" and insert -- and/or --, therefor.

In Column 9, Line 29, delete "LessGood" and insert -- Less Good --, therefor.

In Column 11, Line 19, delete "1610" and insert -- 1610. --, therefor.

In Column 12, Line 37, delete "may by" and insert -- may be --, therefor.

In Column 20, Line 64, delete "module." and insert -- module --, therefor.

In Column 27, Line 59, delete "that that" and insert -- that --, therefor.

In Column 77, Line 36, delete "note" and insert -- noted --, therefor.

In Column 81, Line 27, delete "configured" and insert -- configured. --, therefor.

In Column 84, Line 1, delete "know" and insert -- known --, therefor.

In Column 87, Line 39, delete "required" and insert -- require --, therefor.

In Column 94, Line 21, delete "the a" and insert -- the --, therefor.

In Column 100, Line 47, delete "the to" and insert -- the --, therefor.

In Column 107, Line 3, delete "optimization" and insert -- optimization. --, therefor.

In Column 131, Line 14, delete "Memory™" and insert -- Memory (TM) --, therefor.

In Column 134, Line 56, delete "that that" and insert -- that --, therefor.

In Column 135, Line 3, delete "planning" and insert -- planning. --, therefor.

In Column 155, Line 2, delete "expert" and insert -- expert. --, therefor.

In Column 155, Line 31, delete "translated" and insert -- translated. --, therefor.

In Column 161, Line 40, delete "requirement" and insert -- requirement. --, therefor.

In Column 163, Line 32, delete "the to" and insert -- the --, therefor.

In Column 169, Line 37, delete "optimization" and insert -- optimization. --, therefor.

In the Claims

CERTIFICATE OF CORRECTION (continued)
U.S. Pat. No. 10,248,653 B2

In Column 176, Line 36, in Claim 10, delete "A" and insert -- a --, therefor.